(12) United States Patent
Laut

(10) Patent No.: US 12,116,521 B2
(45) Date of Patent: Oct. 15, 2024

(54) LIQUID CRYSTAL MEDIUM

(71) Applicant: MERCK PATENT GMBH, Darmstadt (DE)

(72) Inventor: Sven Christian Laut, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 18/014,031

(22) PCT Filed: Jun. 30, 2021

(86) PCT No.: PCT/EP2021/067948
§ 371 (c)(1),
(2) Date: Dec. 30, 2022

(87) PCT Pub. No.: WO2022/002997
PCT Pub. Date: Jan. 6, 2022

(65) Prior Publication Data
US 2023/0295510 A1  Sep. 21, 2023

(30) Foreign Application Priority Data
Jul. 3, 2020 (EP) ..................... 20183845

(51) Int. Cl.
G02F 1/1333  (2006.01)
C09K 19/30  (2006.01)
C09K 19/54  (2006.01)

(52) U.S. Cl.
CPC ........ C09K 19/3003 (2013.01); C09K 19/544 (2013.01); *C09K 2019/3004* (2013.01)

(58) Field of Classification Search
CPC ............ C09K 19/3001; C09K 19/3003; C09K 19/544; C09K 2019/3004; C09K 2019/0444; G02F 1/1333
See application file for complete search history.

(56) References Cited

U.S. PATENT DOCUMENTS

| 10,519,377 | B1* | 12/2019 | Xing | .................. C09K 19/3066 |
| 10,774,264 | B2 | 9/2020 | Kurihara et al. | |
| 11,370,969 | B2 | 6/2022 | Engel et al. | |
| 2016/0002532 | A1 | 1/2016 | Saito et al. | |
| 2017/0022415 | A1 | 1/2017 | Furusato et al. | |
| 2019/0390112 | A1 | 12/2019 | Hirschmann et al. | |
| 2022/0081617 | A1 | 3/2022 | Tuffin et al. | |
| 2023/0183572 | A1* | 6/2023 | Gao | ........................ C09K 19/12 252/299.61 |

FOREIGN PATENT DOCUMENTS

| EP | 3628721 A1 | 4/2020 | |
| EP | 3323873 B1 | 8/2020 | |
| EP | 3587536 B1 | 3/2021 | |
| WO | WO 2019/115485 A1 * | 6/2019 | ............. C09K 19/04 |
| WO | 2020127528 A1 | 6/2020 | |

OTHER PUBLICATIONS

International Search Report PCT/EP2021/067948 dated Sep. 22, 2021 (pp. 1-3).

* cited by examiner

*Primary Examiner* — Geraldina Visconti
(74) *Attorney, Agent, or Firm* — MILLEN, WHITE, ZELANO & BRANIGAN, P.C.; Brion P. Heaney

(57) ABSTRACT

The present invention relates to a liquid crystal (LC) medium comprising a compound of formula I

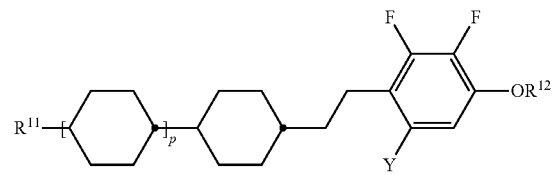

and one or more compounds of formula II

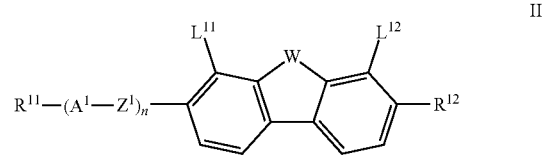

as defined in claim 1, and to the use thereof for optical, electro-optical and electronic purposes, in particular in LC displays, especially in IPS, FFS, VA or PS-VA displays.

19 Claims, No Drawings

LIQUID CRYSTAL MEDIUM

The present invention relates to a liquid crystal (LC) medium and to the use thereof for optical, electro-optical and electronic purposes, in particular in LC displays, especially in IPS, FFS, VA or PS-VA displays.

One of the liquid-crystal display (LCD) modes used at present is the TN ("twisted nematic") mode. However, TN LCDs have the disadvantage of a strong viewing-angle dependence of the contrast.

In addition, so-called VA ("vertically aligned") displays are known which have a broader viewing angle. The LC cell of a VA display contains a layer of an LC medium between two transparent electrodes, where the LC medium usually has a negative dielectric anisotropy. In the switched-off state, the molecules of the LC layer are aligned perpendicular to the electrode surfaces (homeotropically) or have a tilted homeotropic alignment. On application of an electrical voltage to the two electrodes, a realignment of the LC molecules parallel to the electrode surfaces takes place.

Furthermore, OCB ("optically compensated bend") displays are known which are based on a birefringence effect and have an LC layer with a so-called "bend" alignment and usually positive dielectric anisotropy. On application of an electrical voltage, a realignment of the LC molecules perpendicular to the electrode surfaces takes place. In addition, OCB displays normally contain one or more birefringent optical retardation films in order to prevent undesired transparency to light of the bend cell in the dark state. OCB displays have a broader viewing angle and shorter response times compared with TN displays.

Also known are so-called IPS ("in-plane switching") displays, which contain an LC layer between two substrates, where the two electrodes are arranged on only one of the two substrates and preferably have intermeshed, comb-shaped structures. On application of a voltage to the electrodes, an electric field which has a significant component parallel to the LC layer is thereby generated between them. This causes realignment of the LC molecules in the layer plane.

Furthermore, so-called FFS ("fringe-field switching") displays have been reported (see, inter alia, S. H. Jung et al., Jpn. J. Appl. Phys., Volume 43, No. 3, 2004, 1028), which contain two electrodes on the same substrate, one of which structured in a comb-shaped manner and the other is unstructured. A strong, so-called "fringe field" is thereby generated, i.e. a strong electric field close to the edge of the electrodes, and, throughout the cell, an electric field which has both a strong vertical component and also a strong horizontal component. FFS displays have a low viewing-angle dependence of the contrast. FFS displays usually contain an LC medium with positive dielectric anisotropy, and an alignment layer, usually of polyimide, which provides planar alignment to the molecules of the LC medium.

FFS displays can be operated as active-matrix or passive-matrix displays. In the case of active-matrix displays, individual pixels are usually addressed by integrated, non-linear active elements, such as, for example, transistors (for example thin-film transistors ("TFTs")), while in the case of passive-matrix displays, individual pixels are usually addressed by the multiplex method, as known from the prior art.

Furthermore, FFS displays have been disclosed (see S. H. Lee et al., Appl. Phys. Lett. 73(20), 1998, 2882-2883 and S. H. Lee et al., Liquid Crystals 39(9), 2012, 1141-1148), which have similar electrode design and layer thickness as FFS displays, but comprise a layer of an LC medium with negative dielectric anisotropy instead of an LC medium with positive dielectric anisotropy. The LC medium with negative dielectric anisotropy shows a more favourable director orientation that has less tilt and more twist orientation compared to the LC medium with positive dielectric anisotropy, as a result of which these displays have a higher transmission. The displays further comprise an alignment layer, preferably of polyimide provided on at least one of the substrates that is in contact with the LC medium and induces planar alignment of the LC molecules of the LC medium. These displays are also known as "Ultra Brightness FFS (UB-FFS)" mode displays. These displays require an LC medium with high reliability.

The term "reliability" as used hereinafter means the quality of the performance of the display during time and with different stress loads, such as light load, temperature, humidity, voltage, and comprises display effects such as image sticking (area and line image sticking), mura, yogore etc. which are known to the skilled person in the field of LC displays. As a standard parameter for categorising the reliability usually the voltage holding ration (VHR) value is used, which is a measure for maintaining a constant electrical voltage in a test display. Among other factors, a high VHR is a prerequisite for a high reliability of the LC medium.

In VA displays of the more recent type, uniform alignment of the LC molecules is restricted to a plurality of relatively small domains within the LC cell. Disclinations may exist between these domains, also known as tilt domains. VA displays having tilt domains have, compared with conventional VA displays, a greater viewing-angle independence of the contrast and the grey shades. In addition, displays of this type are simpler to produce since additional treatment of the electrode surface for uniform alignment of the molecules in the switched-on state, such as, for example, by rubbing, is no longer necessary. Instead, the preferential direction of the tilt or pretilt angle is controlled by a special design of the electrodes.

In so-called MVA ("multidomain vertical alignment") displays, this is usually achieved by the electrodes having protrusions which cause a local pretilt. As a consequence, the LC molecules are aligned parallel to the electrode surfaces in different directions in different, defined regions of the cell on application of a voltage. "Controlled" switching is thereby achieved, and the formation of interfering disclination lines is prevented. Although this arrangement improves the viewing angle of the display, it results, however, in a reduction in its transparency to light. A further development of MVA uses protrusions on only one electrode side, while the opposite electrode has slits, which improves the transparency to light. The slit electrodes generate an inhomogeneous electric field in the LC cell on application of a voltage, meaning that controlled switching is still achieved. For further improvement of the transparency to light, the separations between the slits and protrusions can be increased, but this in turn results in a lengthening of the response times. In so-called PVA ("patterned VA") displays, protrusions are rendered completely superfluous in that both electrodes are structured by means of slits on the opposite sides, which results in increased contrast and improved transparency to light, but is technologically difficult and makes the display more sensitive to mechanical influences ("tapping", etc.). For many applications, such as, for example, monitors and especially TV screens, however, a shortening of the response times and an improvement in the contrast and luminance (transmission) of the display are demanded.

A further development are displays of the so-called PS ("polymer sustained") or PSA ("polymer sustained alignment") type, for which the term "polymer stabilised" is also occasionally used. In these, a small amount (for example 0.3% by weight, typically <1% by weight) of one or more polymerisable, compound(s), preferably polymerisable monomeric compound(s), is added to the LC medium and, after filling the LC medium into the display, is polymerised or crosslinked in situ, usually by UV photopolymerisation, optionally while a voltage is applied to the electrodes of the display. The polymerisation is carried out at a temperature where the LC medium exhibits a liquid crystal phase, usually at room temperature. The addition of polymerisable mesogenic or liquid-crystalline compounds, also known as reactive mesogens or "RMs", to the LC mixture has proven particularly suitable.

Unless indicated otherwise, the term "PSA" is used hereinafter when referring to displays of the polymer sustained alignment type in general, and the term "PS" is used when referring to specific display modes, like PS-VA, PS-TN and the like.

Also, unless indicated otherwise, the term "RM" is used hereinafter when referring to a polymerisable mesogenic or liquid-crystalline compound.

In the meantime, the PS(A) principle is being used in various conventional LC display modes. Thus, for example, PS-VA, PS-OCB, PS-IPS, PS-FFS, PS-UB-FFS and PS-TN displays are known. The polymerisation of the RMs preferably takes place with an applied voltage in the case of PS-VA and PS-OCB displays, and with or without, preferably without, an applied voltage in the case of PS-IPS displays. As can be demonstrated in test cells, the PS(A) method results in a pretilt in the cell. In the case of PS-OCB displays, for example, it is possible for the bend structure to be stabilised so that an offset voltage is unnecessary or can be reduced. In the case of PS-VA displays, the pretilt has a positive effect on response times. For PS-VA displays, a standard MVA or PVA pixel and electrode layout can be used. In addition, however, it is also possible, for example, to manage with only one structured electrode side and no protrusions, which significantly simplifies production and at the same time results in very good contrast and in very good transparency to light.

Furthermore, the so-called posi-VA displays ("positive VA") have proven to be a particularly suitable mode. Like in classical VA displays, the initial orientation of the LC molecules in posi-VA displays is homeotropic, i.e. substantially perpendicular to the substrates, in the initial state when no voltage is applied. However, in contrast to classical VA displays, in posi-VA displays LC media with positive dielectric anisotropy are used. Like in the usually used IPS displays, the two electrodes in posi-VA displays are arranged on only one of the two substrates, and preferably exhibit intermeshed and comb-shaped (interdigital) structures. By application of a voltage to the interdigital electrodes, which create an electrical field that is substantially parallel to the layer of the LC medium, the LC molecules are transferred into an orientation that is substantially parallel to the substrates. In posi-VA displays polymer stabilisation, by addition of RMs to the LC medium which are polymerised in the display, has also proven to be advantageous, as a significant reduction of the switching times could thereby be realised.

PS-VA displays are described, for example, in EP 1 170 626 A2, U.S. Pat. Nos. 6,861,107, 7,169,449, US 2004/0191428 A1, US 2006/0066793 A1 and US 2006/0103804 A1. PS-OCB displays are described, for example, in T.-J-Chen et al., Jpn. J. Appl. Phys. 45, 2006, 2702-2704 and S. H. Kim, L.-C-Chien, Jpn. J. Appl. Phys. 43, 2004, 7643-7647. PS-IPS displays are described, for example, in U.S. Pat. No. 6,177,972 and Appl. Phys. Lett. 1999, 75(21), 3264. PS-TN displays are described, for example, in Optics Express 2004, 12(7), 1221.

Below the layer formed by the phase-separated and polymerised RMs which induce the above mentioned pretilt angle, the PSA display typically contains an alignment layer, for example of polyimide, that provides the initial alignment of the LC molecules before the polymer stabilisation step.

Rubbed polyimide layers have been used for a long time as alignment layers. However, the rubbing process causes a number of problems, like mura, contamination, problems with static discharge, debris, etc. Therefore instead of rubbed polyimide layers it was proposed to use polyimide layers prepared by photoalignment, utilizing a light-induced orientational ordering of the alignment surface. This can be achieved through photodecomposition, photodimerization or photoisomerization by means of polarised light.

However, still a suitably derivatised polyimide layer is required that comprises the photoreactive group. Generally the effort and costs for production of such a polyimide layer, treatment of the polyimide and improvement with bumps or polymer layers are relatively great.

In addition, it was observed that unfavourable interaction of the polyimide alignment layer with certain compounds of the LC medium often leads to a reduction of the electrical resistance of the display. The number of suitable and available LC compounds is thus significantly reduced, at the expense of display parameters like viewing-angle dependence, contrast, and response times which are aimed to be improved by the use of such LC compounds. It was therefore desired to omit the polyimide alignment layers.

For some display modes this was achieved by adding a self alignment agent or additive to the LC medium that induces the desired alignment, for example homeotropic or planar alignment, in situ by a self assembling mechanism. Thereby the alignment layer can be omitted on one or both of the substrates. These display modes are also known as "self-aligned" or "self-aligning" (SA) modes.

In SA displays a small amount, typically 0.1 to 2.5%, of a self-aligning additive is added to the LC medium. Suitable self-aligning additives are for example compounds having an organic core group and attached thereto one or more polar anchor groups, which are capable of interacting with the substrate surface, causing the additives on the substrate surface to align and induce the desired alignment also in the LC molecules. Preferred self-aligning additives comprise for example a mesogenic group and a straight-chain or branched alkyl side chain that is terminated with one or more polar anchor groups, for example selected from hydroxy, carboxy, amino or thiol groups. The self-aligning additives may also contain one or more polymerisable groups that can be polymerised under similar conditions as the RMs used in the PSA process.

Hitherto SA-VA displays and SA-FFS displays haven been disclosed. Suitable self-aligning additives to induce homeotropic alignment, especially for use in SA-VA mode displays, are disclosed for example in US 2013/0182202 A1, US 2014/0138581 A1, US 2015/0166890 A1 and US 2015/0252265 A1.

The SA mode can also be used in combination with the PSA mode. An LC medium for use in a display of such a combined mode thus contains both one or more RMs and one or more self-aligning additives.

Like the conventional LC displays described above, PSA displays can be operated as active-matrix or passive-matrix displays. In the case of active-matrix displays, individual pixels are usually addressed by integrated, non-linear active elements, such as, for example, transistors (for example thin-film transistors ("TFTs")), while in the case of passive-matrix displays, individual pixels are usually addressed by the multiplex method, as known from the prior art.

The PSA display may also comprise an alignment layer on one or both of the substrates forming the display cell. The alignment layer is usually applied on the electrodes (where such electrodes are present) such that it is in contact with the LC medium and induces initial alignment of the LC molecules. The alignment layer may comprise or consist of, for example, a polyimide, which may also be rubbed, or may be prepared by a photoalignment method.

In particular for monitor and especially TV applications, optimisation of the response times, but also of the contrast and luminance (thus also transmission) of the LC display continues to be demanded. The PSA method can provide significant advantages here. In particular in the case of PS-VA, PS-IPS, PS-FFS and PS-posi-VA displays, a shortening of the response times, which correlate with a measurable pretilt in test cells, can be achieved without significant adverse effects on other parameters.

The invention is based on the object of providing novel suitable materials, in LC media, optionally comprising reactive mesogens (RM), for use in displays, which do not have the disadvantages indicated above or do so to a reduced extent. In particular, there is still a need in the art for liquid crystal media with high reliability.

Further, it is an object of the present invention to provide alternative media in addition to existing media known to the skilled person in order to broaden the range of available materials what allows for a more specific optimisation of a particular display.

A particular problem arises where a display with a particularly high contrast is desirable, as a high contrast requires high elastic constants which lower the scattering, but this can result in a slower response time. It is an object of the present invention to provide a liquid crystal medium with fast response time.

These objects have been achieved in accordance with the present invention by materials and processes as described herein. In particular, it has been found, surprisingly, that the use of liquid crystalline hosts as described hereinafter allows to achieve the advantageous effects as mentioned above.

The present invention relates to a liquid crystal medium comprising one or more compounds of formula I

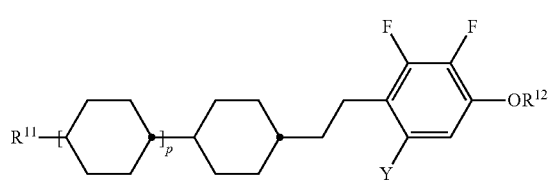

in which
$R^{11}$, $R^{12}$ identically or differently, denote H, or a straight chain or branched alkyl radical having 1 to 15 C atoms, where one or more $CH_2$ groups in these radicals may each be replaced, independently of one another, by

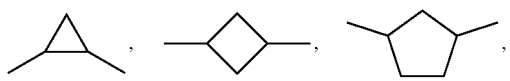

—C≡C—, —CF$_2$O—, —OCF$_2$—, —CH═CH—, —O—, —CO—O— or —O—CO— in such a way that O atoms are not linked directly to one another, and in which one or more H atoms may be replaced by halogen,
Y denotes H or $CH_3$, preferably H,
p is 0 or 1, preferably 1,
and
one or more compounds of formula II

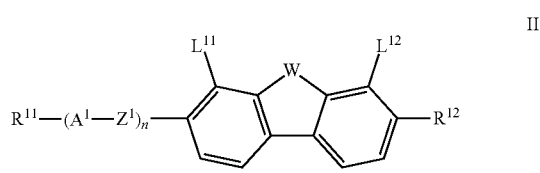

in which
$R^{11}$ and $R^{12}$ each, independently of one another, denote H, an alkyl or alkoxy radical having 1 to 15 C atoms, where one or more $CH_2$ groups in these radicals may each be replaced, independently of one another, by

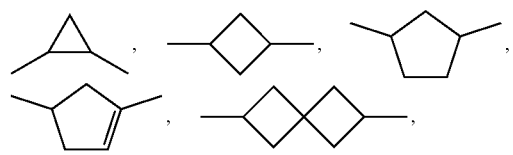

—C≡C—, —CF$_2$O—, —OCF$_2$—, —CH═CH—, by —O—, —CO—O— or —O—CO— in such a way that O atoms are not linked directly to one another, and in which, in addition, one or more H atoms may be replaced by halogen,
$A^1$ on each occurrence, independently of one another, denotes
  a) a 1,4-cyclohexenylene or 1,4-cyclohexylene radical, in which one or two non-adjacent $CH_2$ groups may be replaced by —O— or —S—,
  b) a 1,4-phenylene radical, in which one or two CH groups may be replaced by N, or
  c) a radical from the group spiro[3.3]heptane-2,6-diyl, 1,4-bicyclo-[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl,
  where the radicals a), b) and c) may be mono- or polysubstituted by methyl, ethyl and/or halogen atoms, preferably fluorine,
n is 0, 1 or 2, preferably 0 or 1,
$Z^1$ on each occurrence independently of one another denotes
  —CO—O—, —O—CO—, —CF$_2$O—, —OCF$_2$—, —CH$_2$O—, —OCH$_2$—, —CH$_2$—, CH$_2$CH$_2$—, —(CH$_2$)$_4$—, —CH═CH—CH$_2$O—, C$_2$F$_4$—, —CH$_2$CF$_2$—, —CF$_2$CH$_2$—, —CF═CF—, —CH═CF—, —CF═CH—, —CH═CH—, —C≡C— or a single bond, and $L^{11}$ and $L^{12}$ each, independently of one another, denote H, F, Cl, $CF_3$ or $CHF_2$, preferably F, and W denotes O or S, preferably S.

Compounds of formula I are described for example in US 2017/022415 A1 and in US 2016/0002532 A1. Compounds of formula II are described for example in EP 3 628 721 A1.

Surprisingly, by using a compound of formula I in combination with one or more compounds of formula II in a medium, a significantly smaller response time parameter $\gamma_1/K_1$ can be achieved which results in faster switching of a display comprising said medium, while the contrast of said display is not negatively affected or even improved.

Preferably, the medium comprises one or more compounds of formula I above in which p is 0, and one or more compounds of formula I in which p is 1.

Preferably, the medium comprises one or more compounds of formula 1-1 and/or one or more compounds of formula 1-2:

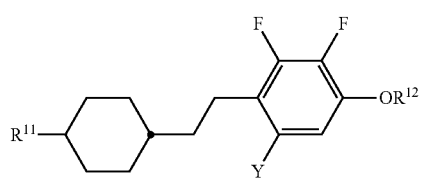

I-1

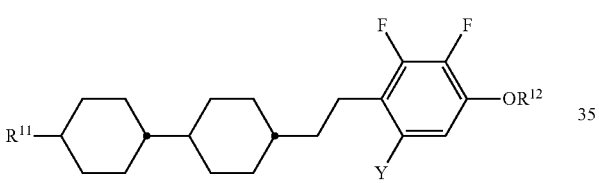

I-2 in which Y, $R^{11}$ and $R^{12}$ have the meanings given above for formula I and $R^{11}$ preferably denotes in each case optionally fluorinated alkyl or alkoxy or alkenyl or alkenyloxy each having up to 7 C atoms or cycloalkyl or cycloalkoxy each having 3 to 5 C atoms or cycloalkylalkyl or cycloalkylalkoxy each having 3 to 7 C atoms, and $R^{12}$ preferably denotes, in each case optionally fluorinated, alkyl or alkenyl each having up to 7 C atoms or cycloalkyl having 3 to 5 C atoms or cycloalkylalkyl having 3 to 7 C atoms.

Preferred compounds of formula 1-1 are selected from the following sub-formulae:

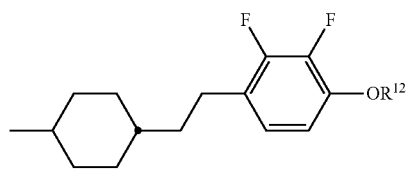

I-1-1

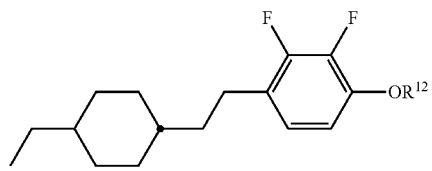

I-1-2

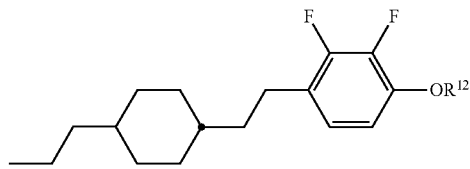

I-1-3

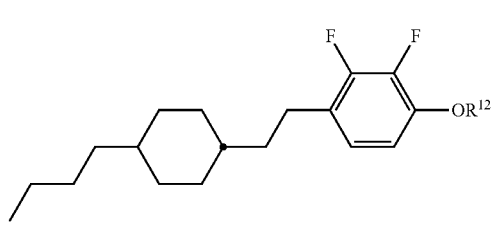

I-1-4

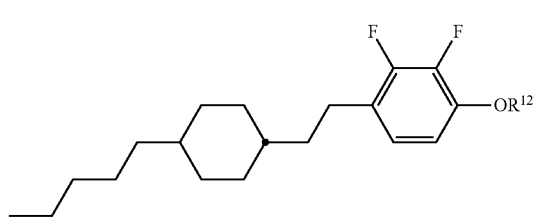

I-1-5

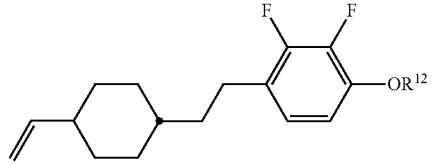

I-1-6

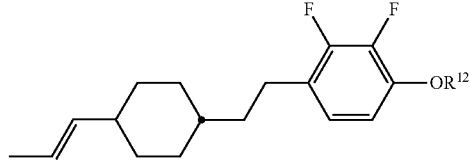

I-1-7

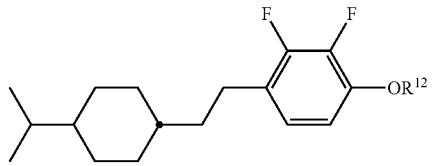

I-1-8

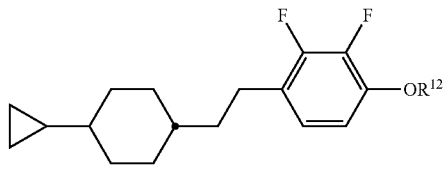

I-1-9

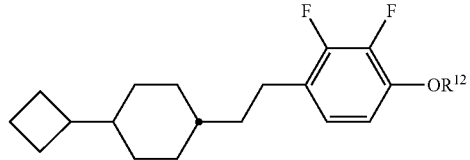

I-1-10

I-1-11
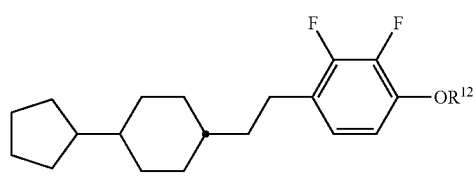
I-1-12
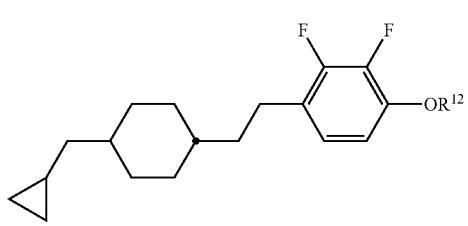
I-1-13
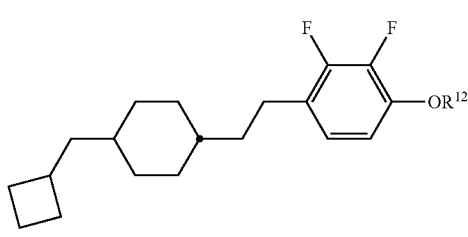
I-1-14
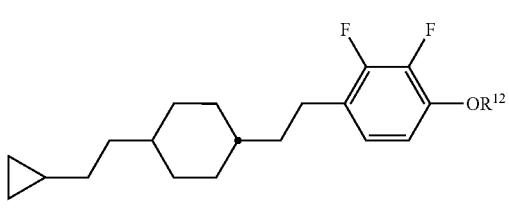
I-1-15
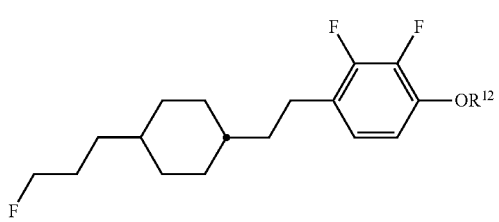
I-1-16
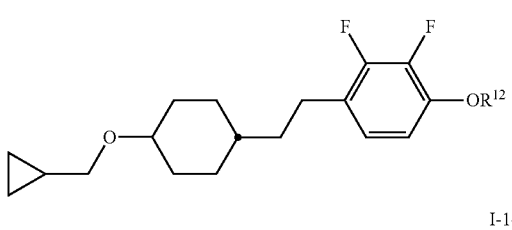
I-1-17
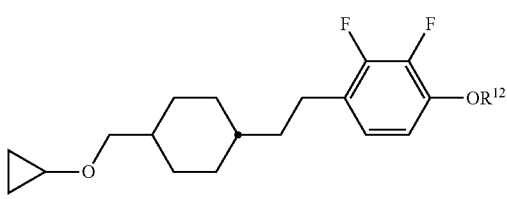
I-1-18
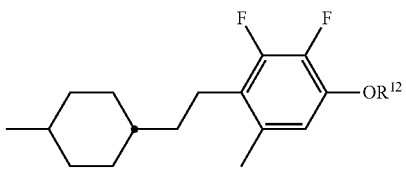
I-1-19
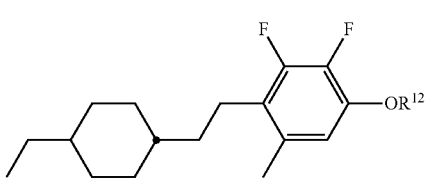
I-1-20
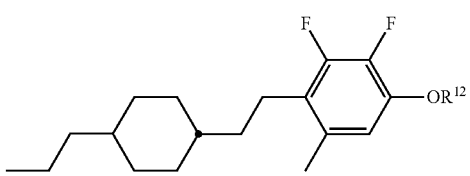
I-1-21
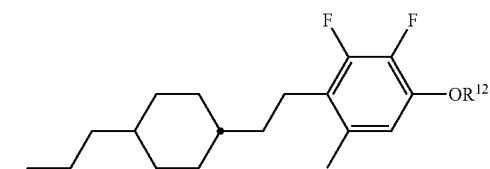
I-1-22
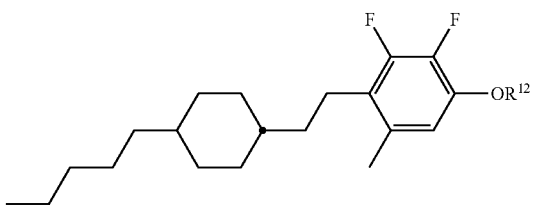
I-1-23
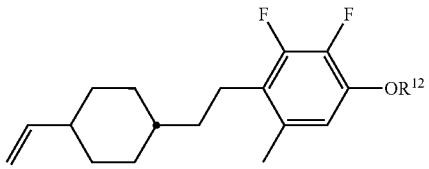
I-1-24
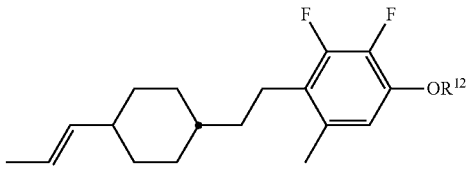
I-1-25
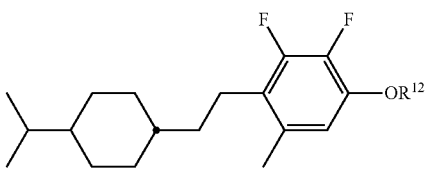

I-1-26
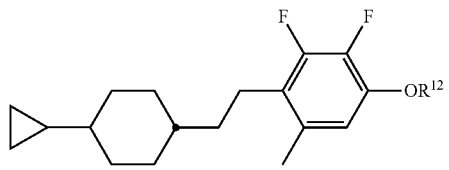
I-1-27
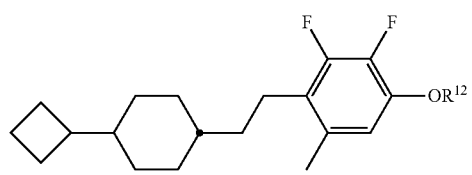
I-1-28
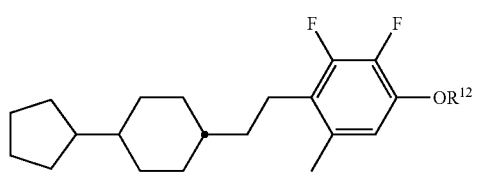
I-1-29
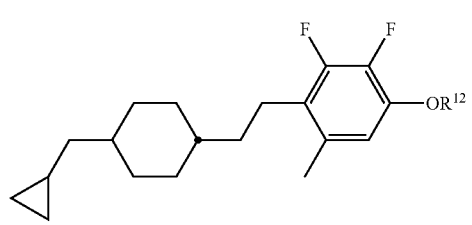
I-1-30
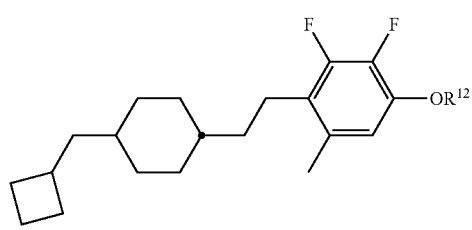
I-1-31
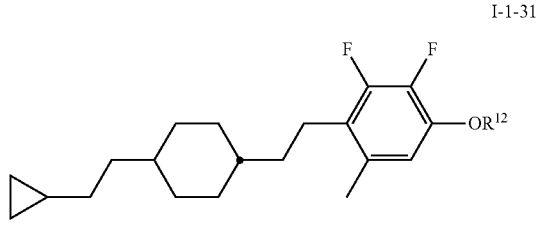
I-1-32
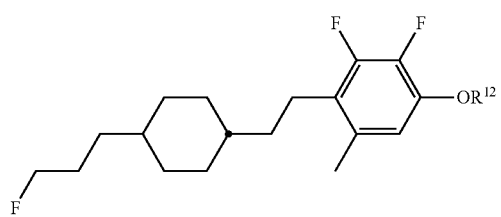
I-1-33
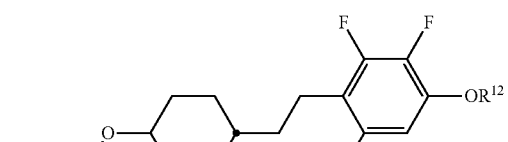
I-1-34
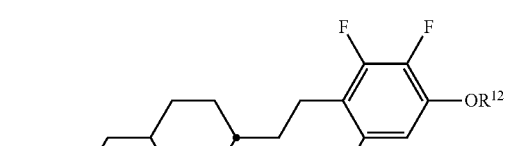
in which $R^{12}$ has the meanings given above and preferably denotes alkyl having 1 to 5 C atoms.
Very preferred compounds of formula 1-1 are the compounds 1-1-1 to 1-1-17, particularly preferred I-1-1 to I-1-7.
Preferred compounds of formula 1-2 are selected from the following sub-formulae:
I-2-1
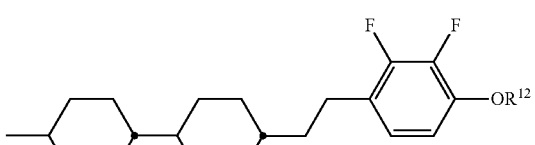
I-2-2
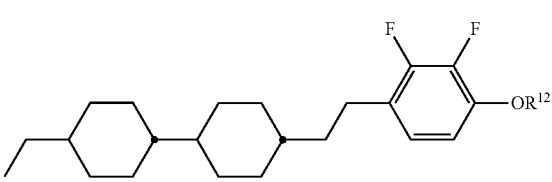
I-2-3
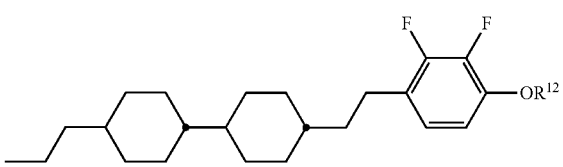
I-2-4
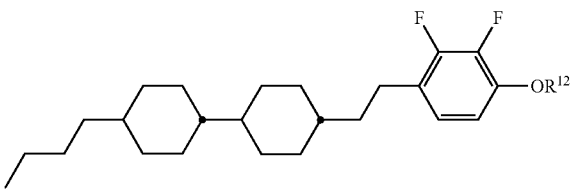

I-2-5
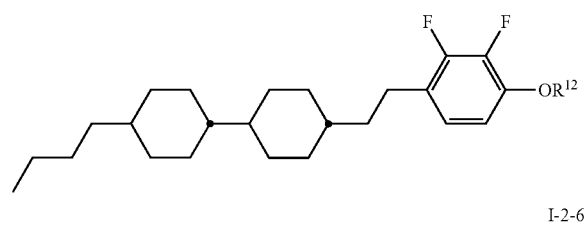
I-2-6
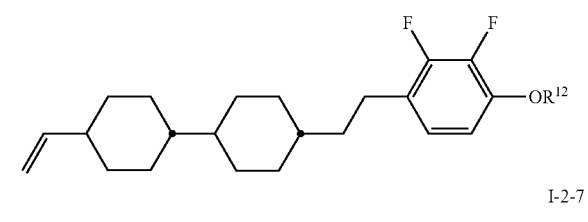
I-2-7
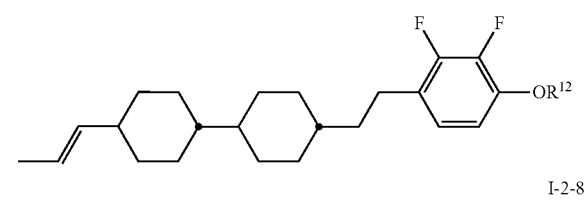
I-2-8
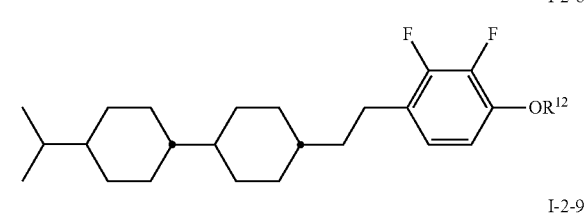
I-2-9
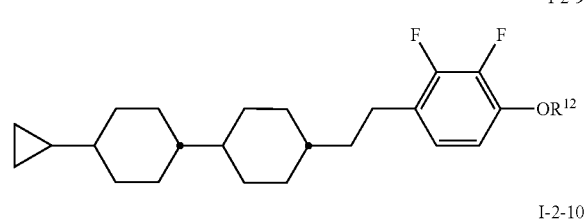
I-2-10
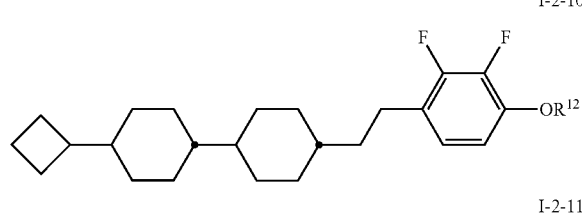
I-2-11
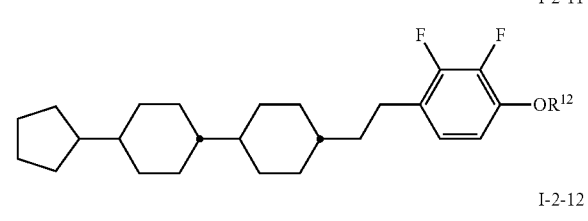
I-2-12
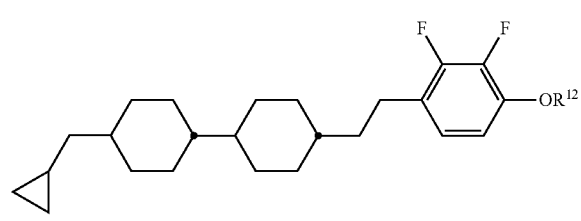
I-2-13
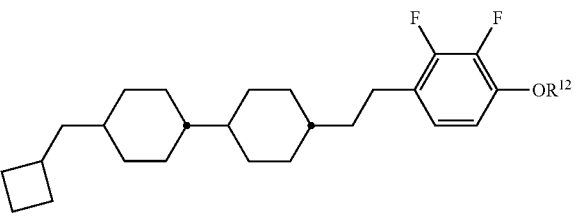
I-2-14
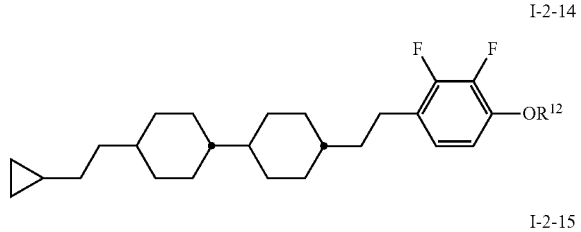
I-2-15
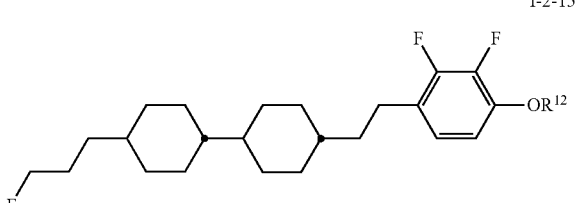
I-2-16
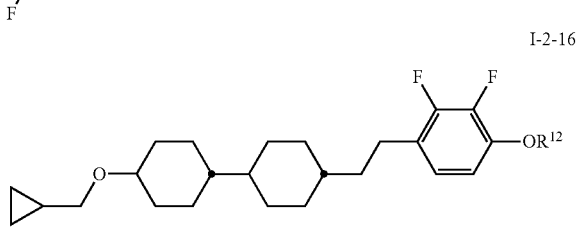
I-2-17
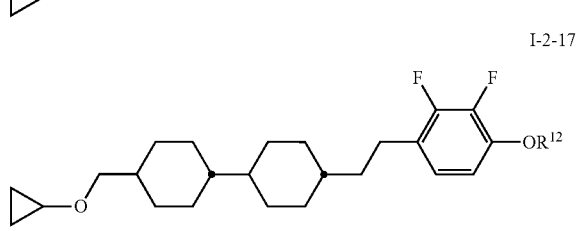
I-2-18
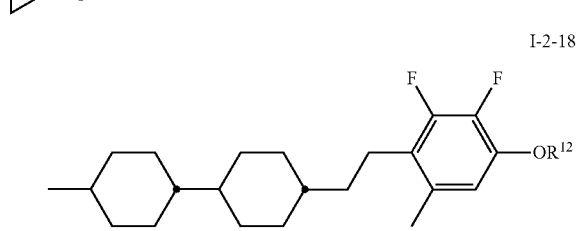
I-2-19
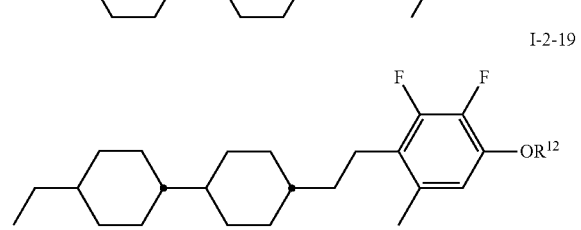
I-2-20
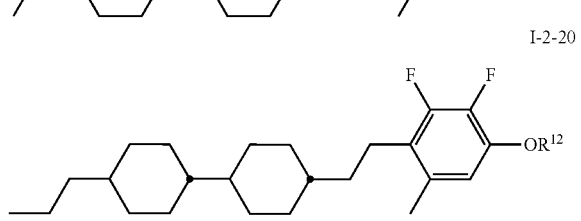

I-2-21
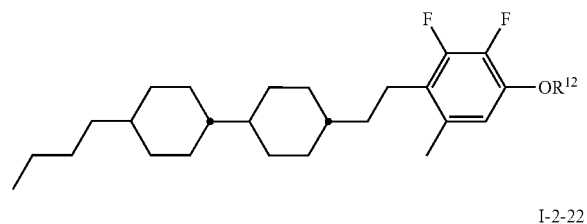

I-2-22
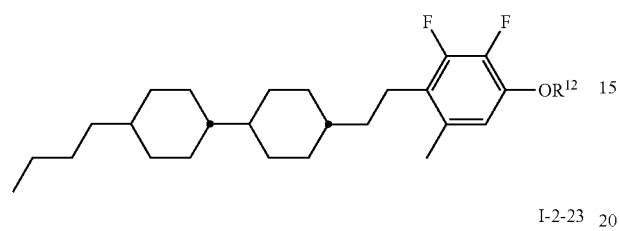

I-2-23
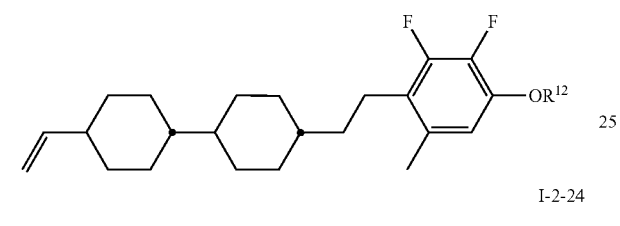

I-2-24
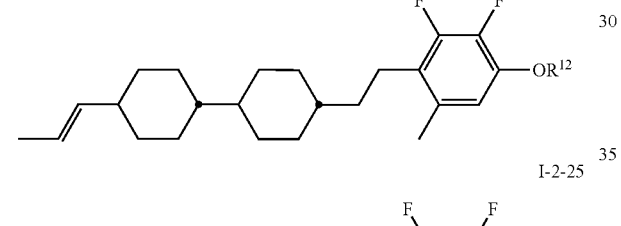

I-2-25
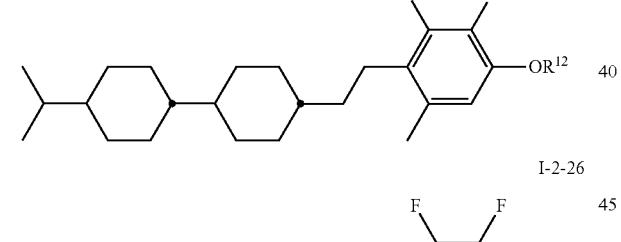

I-2-26
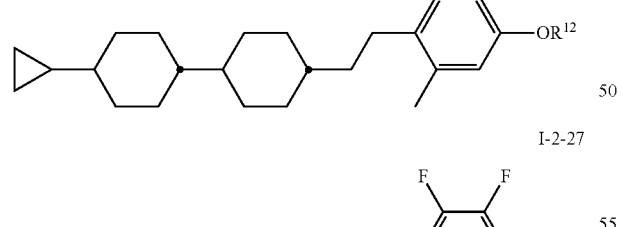

I-2-27
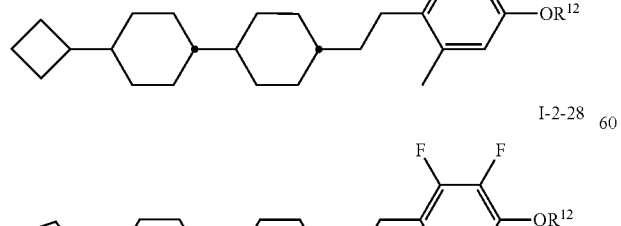

I-2-28
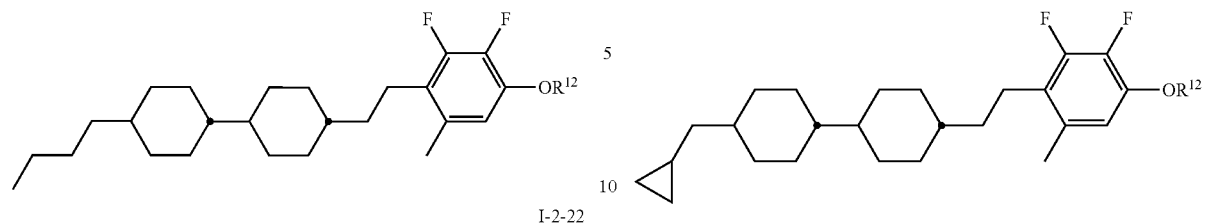

I-2-29
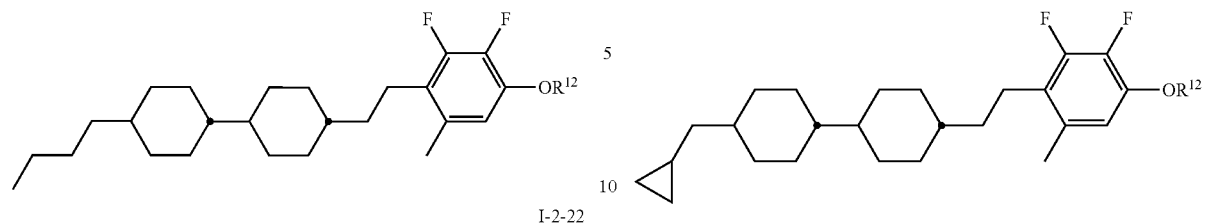

I-2-30
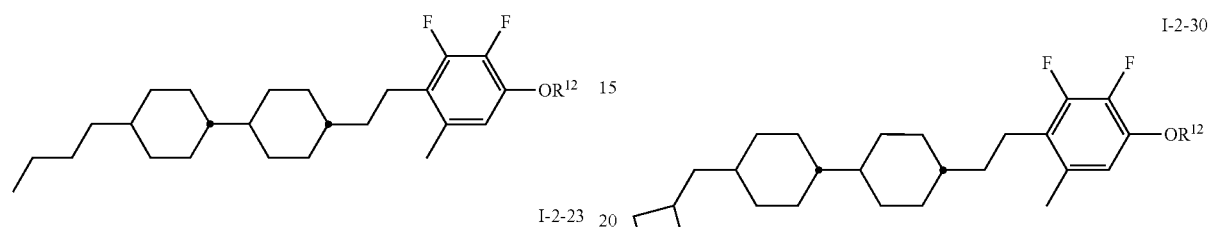

I-2-31
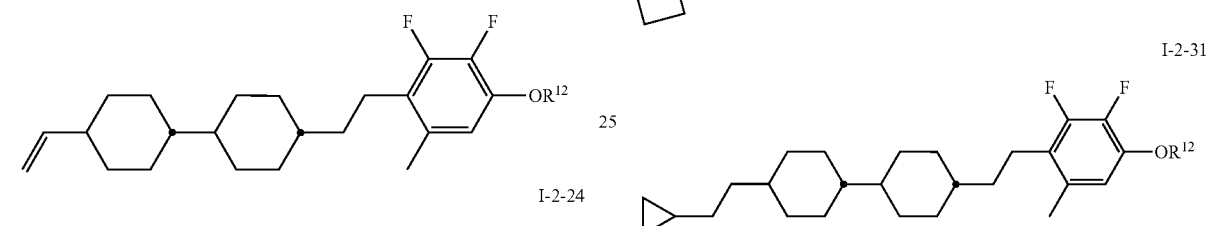

I-2-32
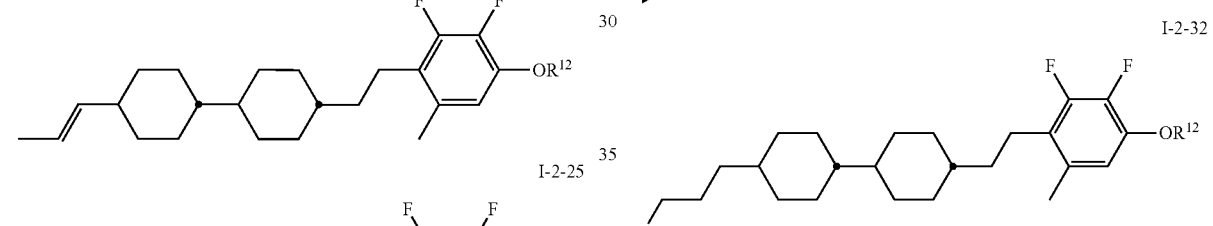

I-2-33
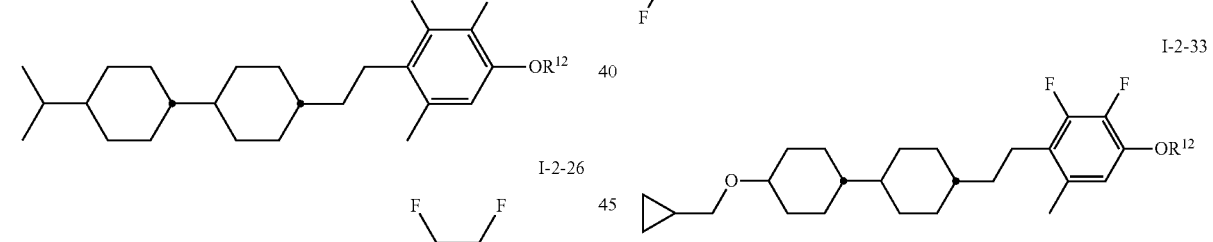

I-2-34 in which $R^{12}$ has the meanings given above and preferably denotes alkyl having 1 to 5 C atoms.

Very preferred compounds of formula I-2 are the compounds I-2-1 to I-2-17, in particular I-2-1 to I-2-7.

Preferably, the medium comprises one or more compounds of formula II above in which W denotes S and n is 0.

In a preferred embodiment of the present invention the medium comprises one or more compounds of the formula II-1 and/or II-2

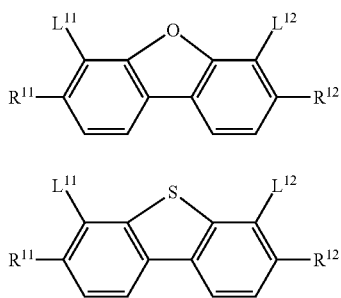

II-1

II-2 in which the occurring groups have the same meanings as given under formula II above and preferably $R^{11}$ and $R^{12}$ each, independently of one another, denotes an alkyl, alkenyl or alkoxy radical having up to 15 C atoms, more preferably one or both of them denote an alkoxy radical and $L^{11}$ and $L^{12}$ each preferably denote F.

In a preferred embodiment the media comprise one or more compounds of the formula II-1 selected from the group of compounds of formulae II-1-1 to II-1-10, preferably of formula II-1-6,

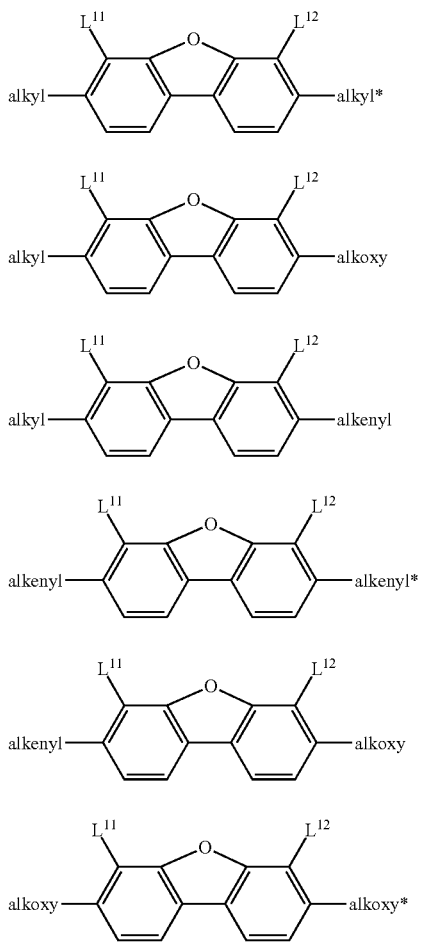

II-1-1

II-1-2

II-1-3

II-1-4

II-1-5

II-1-6

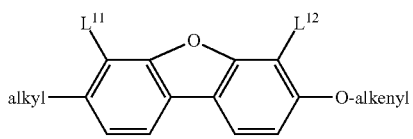

II-1-7

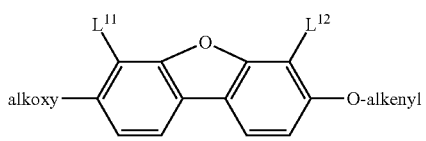

II-1-8

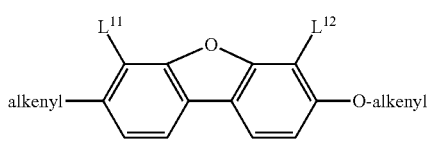

II-1-9

II-1-10 in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^{11}$ and $L^{12}$ each, independently of one another, denote F or Cl, preferably both F.

In a preferred embodiment the media comprise one or more compounds of the formula II-2 selected from the group of compounds of formulae II-2-1 to II-2-10, preferably of formula II-2-6,

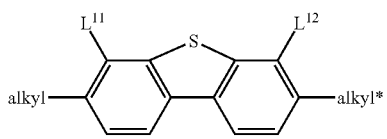

II-2-1

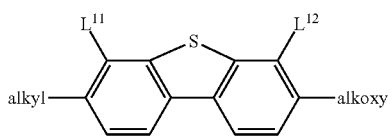

II-2-2

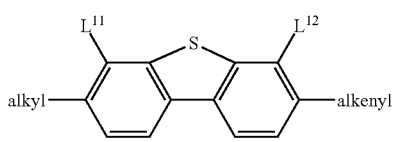

II-2-3

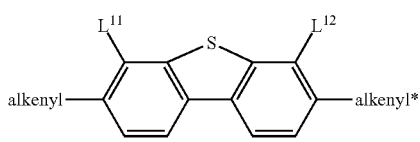

II-2-4

-continued

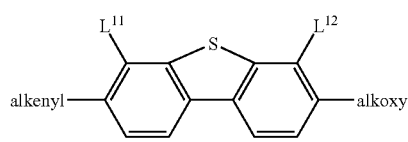
II-2-5

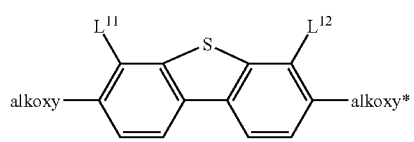
II-2-6

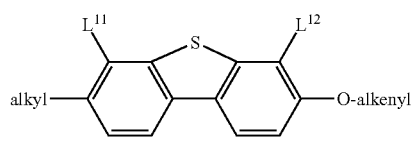
II-2-7

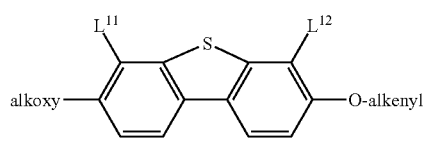
II-2-8

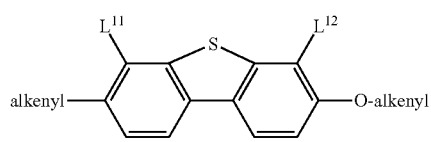
II-2-9

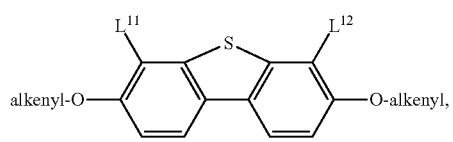
II-2-10 in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^1$ and $L^2$ each, independently of one another, denote F or Cl, preferably both F.

In a preferred embodiment of the present invention the medium comprises one or more compounds of the formula IIA-1 and/or IIA-2

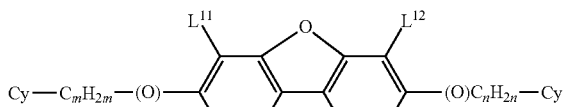
IIA-1

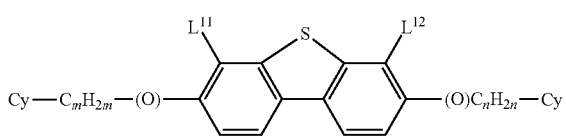
IIA-2 in which $L^{11}$ and $L^{12}$ have the same meanings as given under formula II, m and n are, identically or differently, 0, 1, 2, 3, 4, 5 or 6, preferably 1, 2 or 3, very preferably 1, (O) denotes O or a single bond, and Cy denotes a cycloaliphatic group having 3, 4 or 5 ring atoms, which is optionally substituted with alkyl or alkenyl each having up to 3 C atoms, or halogen or CN, and preferably denotes cyclopropyl, cyclobutyl or cyclopentyl.

The compounds of formula IIA-1 and/or IIA-2 are contained in the medium either alternatively or additionally to the compounds of formula II, preferably additionally.

Very preferred compounds of the formulae IIA-1 and IIA-2 are the following:

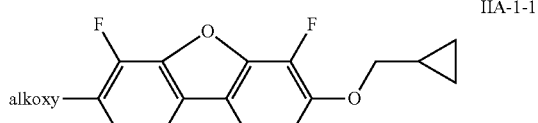
IIA-1-1

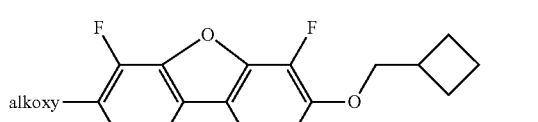
IIA-1-2

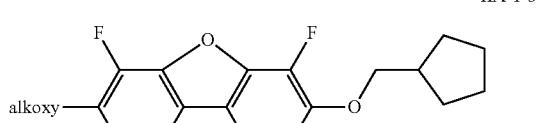
IIA-1-3

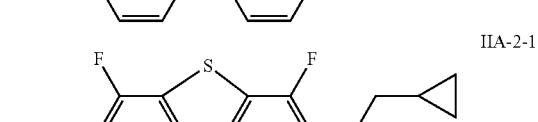
IIA-2-1

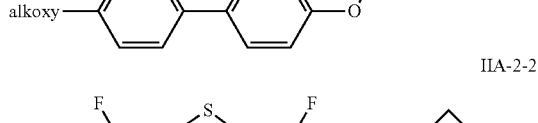
IIA-2-2

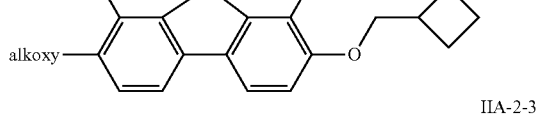
IIA-2-3

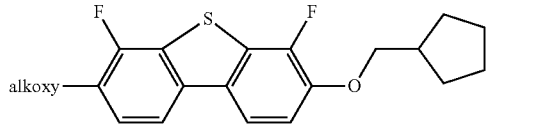

in which alkoxy denotes a straight-chain alkoxy radical having 1-6 C atoms.

In a preferred embodiment of the present invention, the medium comprises one or more compounds of formula II-3

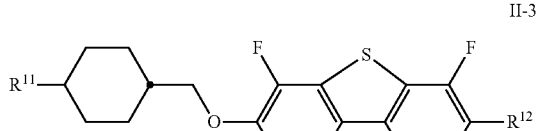
II-3 in which $R^{11}$, $R^{12}$ identically or differently, denote H, an alkyl or alkoxy radical having 1 to 15 C atoms, in which one or more CH$_2$ groups in these radicals are optionally replaced, independently of one another, by,

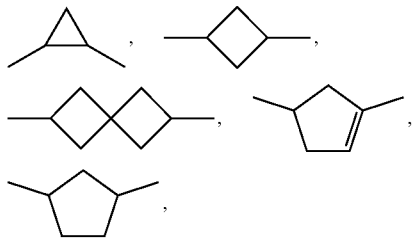

—C≡C—CF$_2$O—, —OCF$_2$—, —CH=CH—, —O—, —CO—O— or —O—CO— in such a way that atoms are not linked directly to one another, and in which, in addition, one or more H atoms may be replaced by halogen.

In formula II-3, $R^{11}$ preferably denotes alkyl, alkenyl, alkoxy, each having up to 7 C atoms or cycloalkyl having 3 to 5 C atoms or (C$_3$ to C$_5$ cycloalkyl)alkyl with 1 to 3 alkyl C atoms.

In formula II-3, $R^{11}$ preferably denotes alkoxy having up to 7 C atoms or cycloalkoxy having 3 to 5 C atoms or (C$_3$ to C$_5$ cycloalkyl)alkoxy with 1 to 3 alkyl C atoms.

The compounds of formula II-3 are preferably selected from the group of compounds of the formulae II-3-1 to II-3-11:

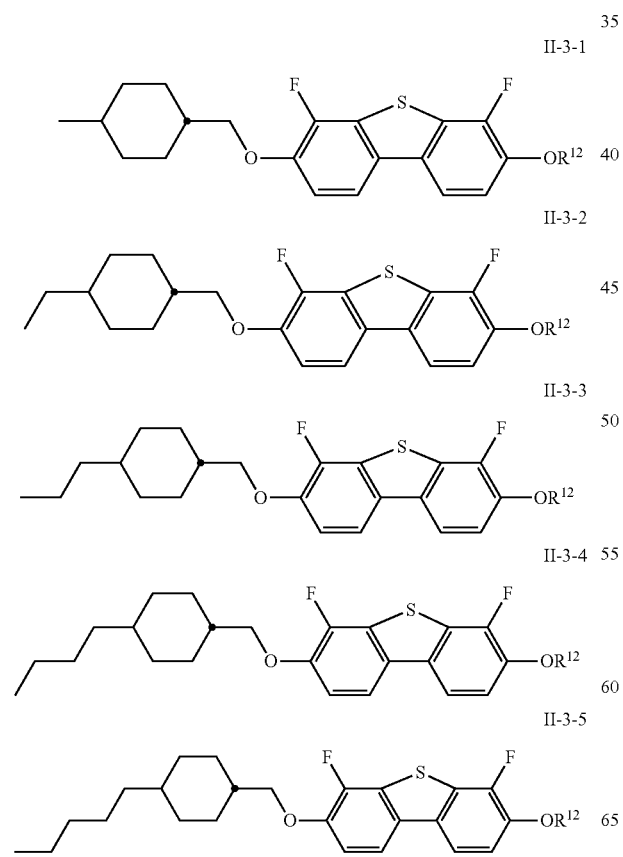

in which $R^{12}$ denotes alkyl having 1 to 7 C-atoms, preferably ethyl, n-propyl or n-butyl, or cyclopropyl, cyclobutyl, cyclopentyl, cyclopropylmethyl, cyclobutylmethyl or cyclopentylmethyl.

In a preferred embodiment of the present invention, the medium comprises one or more compounds of the formulae II-4 to 11-6, preferably of formula II-5,

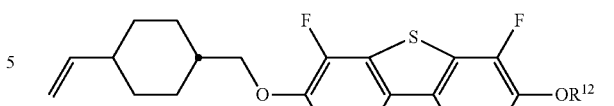

II-3-6

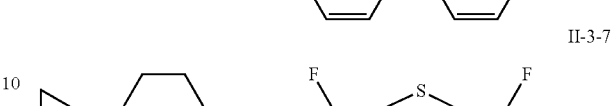

II-3-7

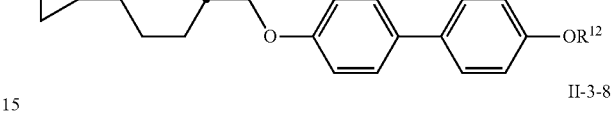

II-3-8

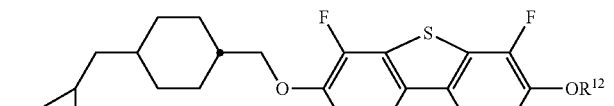

II-4

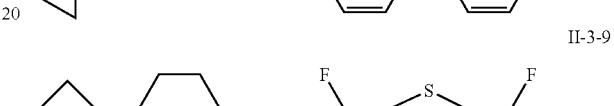

II-5

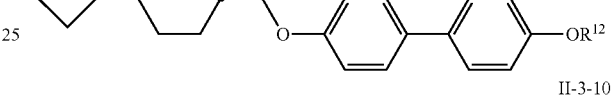

II-6 in which the parameters have the meanings given above, R$^{11}$ preferably denotes straight-chain alkyl and R$^{12}$ preferably denotes alkoxy, each having 1 to 7 C atoms.

In a preferred embodiment the media comprise one or more compounds of the formula II selected from the group of compounds of formulae II-7 to II-9, preferably of formula II-8,

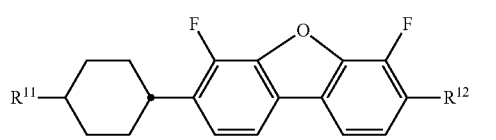
II-7

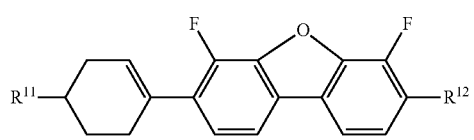
II-8

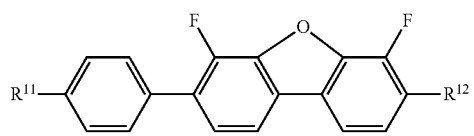
II-9 in which R$^{11}$ and R$^{12}$ have the meanings given above, R$^{11}$ preferably denotes straight-chain alkyl and R$^{12}$ preferably denotes alkoxy each having 1 to 7 C atoms.

Preferably, the medium according to the invention comprises one or more compounds selected from the group of compounds of the formulae IIIA, IIIB, IIIC,

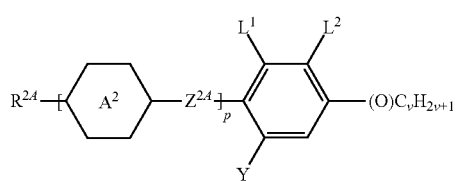
IIIA

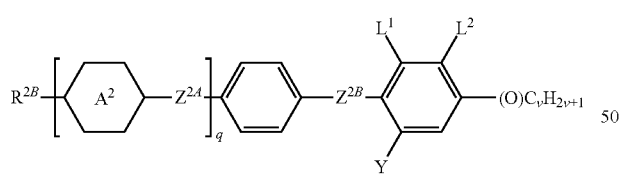
IIIB

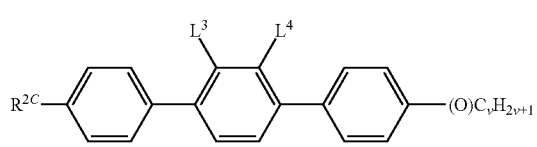
IIIC

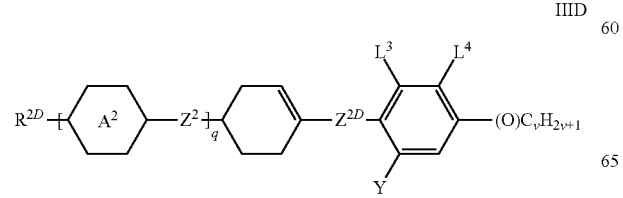
IIID

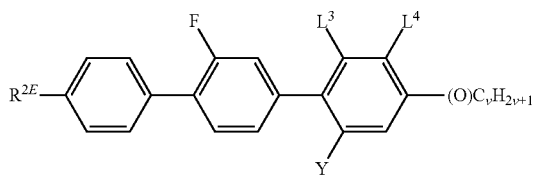
IIIE in which

R$^{2A}$, R$^{2B}$, R$^{2C}$, R$^{2D}$ and R$^{2E}$ each, independently of one another, denote H, an alkyl or alkenyl radical having up to 15 C atoms which is unsubstituted, monosubstituted by CN or CF$_3$ or at least monosubstituted by halogen, where, in addition, one or more CH$_2$ groups in these radicals may be replaced by —O—, —S—,

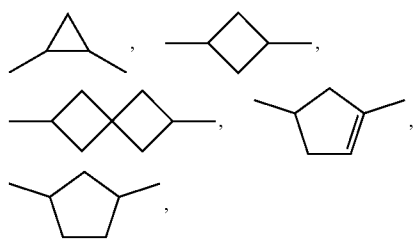

—C≡C—, —CF$_2$O—, —OCF$_2$—, —OC—O— or —O—CO— in such a way that O atoms are not linked directly to one another,

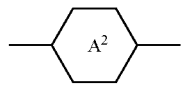

denotes

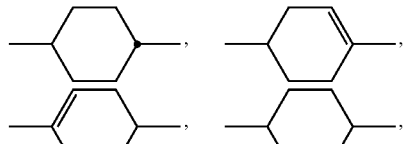

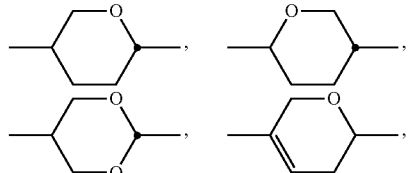

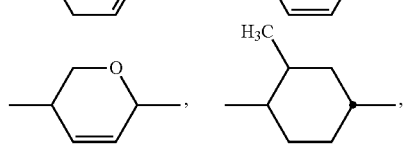

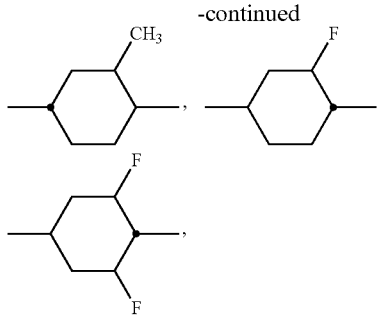

preferably

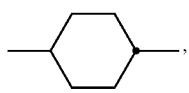

$L^1$ to $L^4$ each, independently of one another, denote F, Cl, $CF_3$ or $CHF_2$, Y each, identically or differently, denotes H, F, Cl, $CF_3$, $CHF_2$ or $CH_3$, preferably H or $CH_3$, very preferably H, $Z^{2A}$ each, independently of one another, denote a single bond, —CH=CH—, —$CF_2$O—, —$OCF_2$—, —$CH_2$O—, —$OCH_2$—, —COO—, —OCO—, —$C_2F_4$—, —CF=CF—, —CH=$CHCH_2$O—, $Z^2$, $Z^{2B}$ and $Z^{2D}$ each, independently of one another, denote a single bond, —$CH_2CH_2$—, —CH=CH—, —$CF_2$O—, —$OCF_2$—, —$CH_2$O—, —$OCH_2$—, —COO—, —OCO—, —$C_2F_4$—, —CF=CF—, —CH=$CHCH_2$O—, p denotes 0, 1 or 2, q denotes 0 or 1, and v denotes is 1, 2, 3, 4, 5, or 6.

In the compounds of the formulae IIIA, IIIB and IID, $Z^2$ may have identical or different meanings. In the compounds of the formula IIIB, $Z^2$ and $Z^{2B}$ may have identical or different meanings. In the compounds of the formula IID, $Z^2$ and $Z^{2D}$ may have identical or different meanings.

In the compounds of the formulae IIIA, IIIB, IIIC, IID and IIIE, $R^{2A}$, $R^{2B}$, $R^{2C}$, $R^{2D}$ and $R^{2D}$ each preferably denote alkyl having 1 to 6 C atoms, in particular $CH_3$, $C_2H_5$, n-$C_3H_7$, n-$C_4H_9$, n-$C_5H_{11}$.

In the compounds of the formulae IIIA, IIIB and IID, $L^1$, $L^2$, $L^3$ and $L^4$ preferably denote $L^1$=$L^2$=F and $L^3$=$L^4$=F, furthermore $L^1$=F and $L^2$=Cl, $L^1$=Cl and $L^2$=F, $L^3$=F and $L^4$=Cl, $L^3$=Cl and $L^4$=F. $Z^2$ and $Z^{2B}$ in the formulae IIIA and IIIB preferably each, independently of one another, denote a single bond, furthermore a —$C_2H_4$— bridge.

If, in the formula IIIB, if $Z^2$=—$C_2H_4$— or —$CH_2$O—, $Z^{2B}$ is preferably a single bond or, if $Z^{2B}$=—$C_2H_4$— or —$CH_2$O—, $Z^2$ is preferably a single bond.

In formula IID, $Z^{2D}$ is preferably a single bond.

In the compounds of the formulae IIIA, IIIB and IID, (O)$C_vH_{2v+1}$ preferably denotes O$C_vH_{2v+1}$. In the compounds of the formula IIIC, (O)$C_vH_{2v+1}$ preferably denotes $C_vH_{2v+1}$.

In the compounds of the formula IIIC, $L^3$ and $L^4$ preferably each denote F.

Preferred compounds of the formulae IIIA, IIIB, IIIC and IID are indicated below:

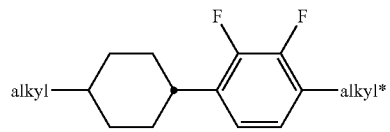

IIIA-1

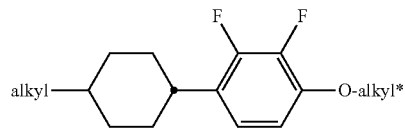

IIIA-2

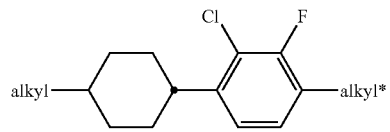

IIIA-3

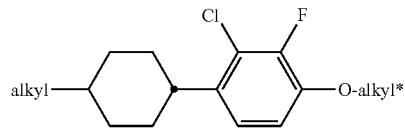

IIIA-4

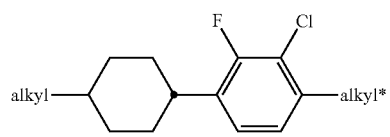

IIIA-5

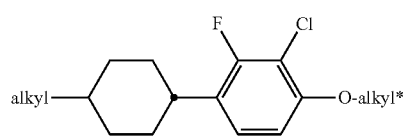

IIIA-6

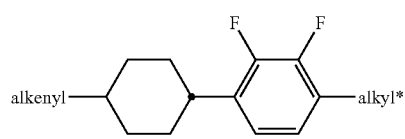

IIIA-7

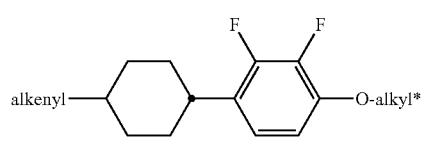

IIIA-8

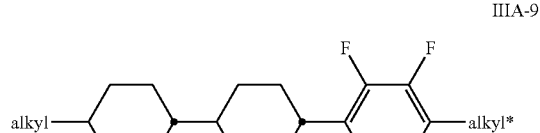

IIIA-9

IIIA-10

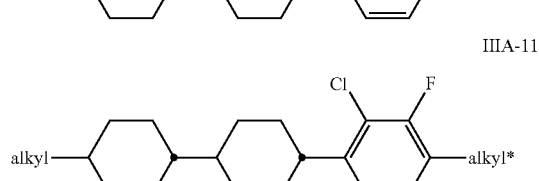

IIIA-11

-continued
IIIA-12
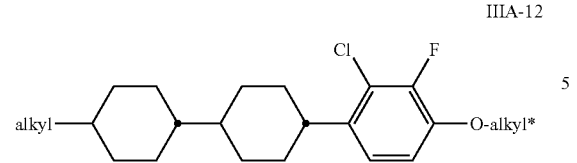
IIIA-13
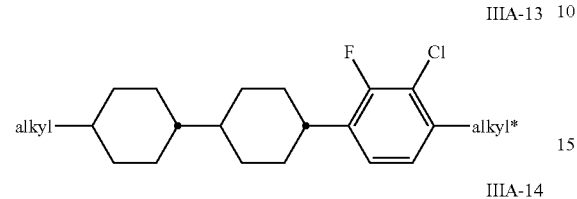
IIIA-14
IIIA-15
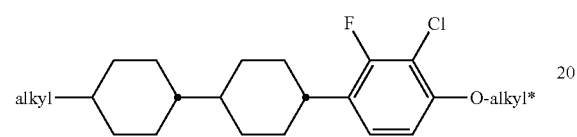
IIIA-16
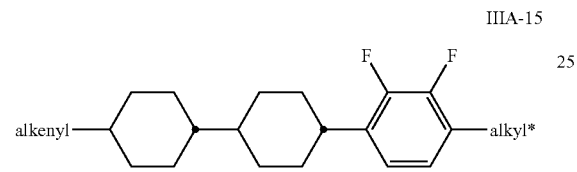
IIIA-17
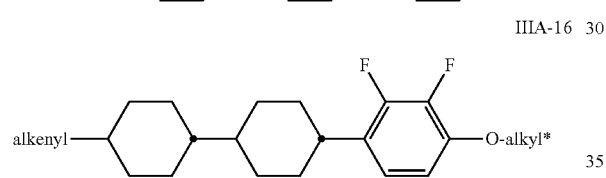
IIIA-18
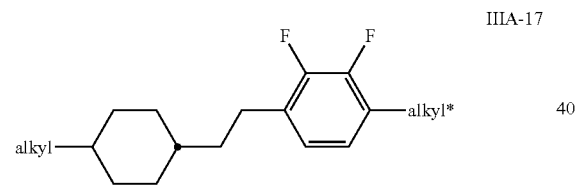
IIIA-19
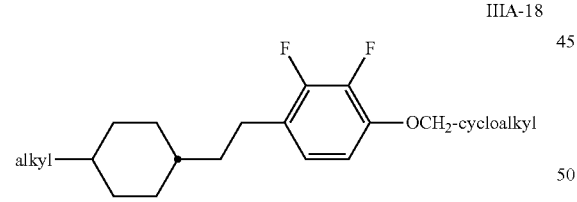
IIIA-20
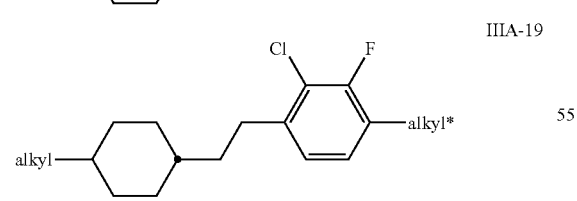
-continued
IIIA-21
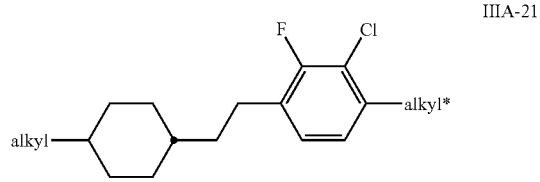
IIIA-22
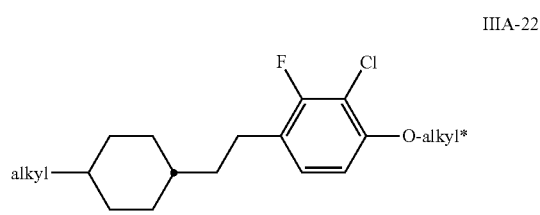
IIIA-23
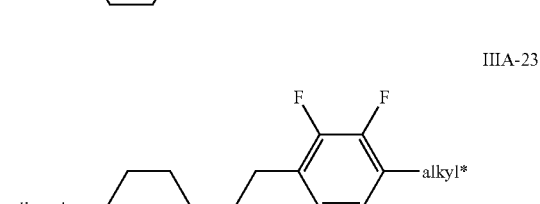
IIIA-24
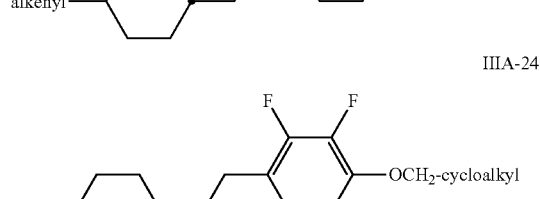
IIIA-25
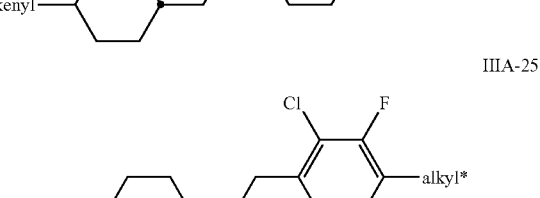
IIIA-26
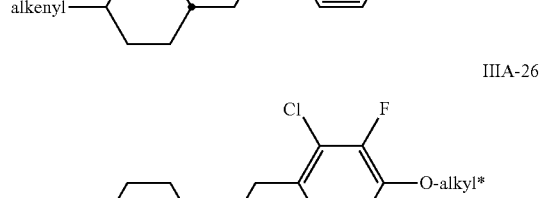
IIIA-27
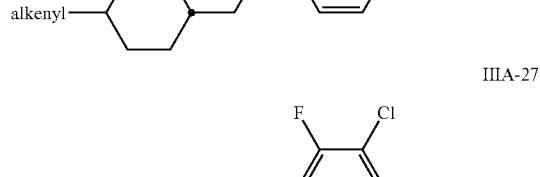
IIIA-28
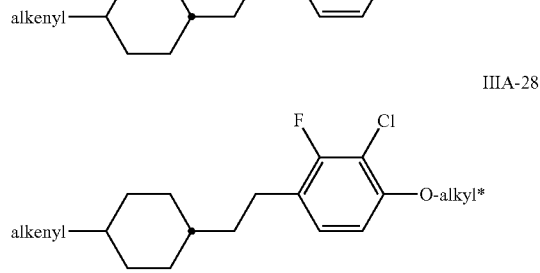

IIIA-29
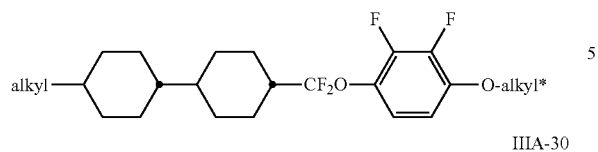
IIIA-30
IIIA-31
IIIA-32
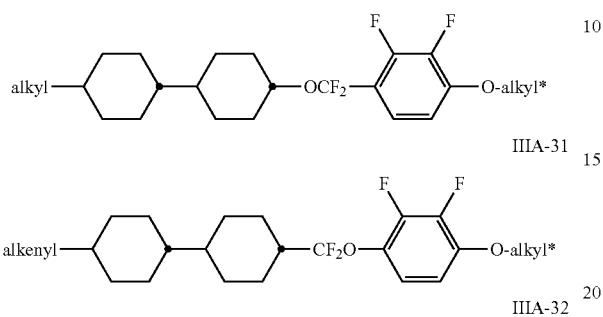
IIIA-33
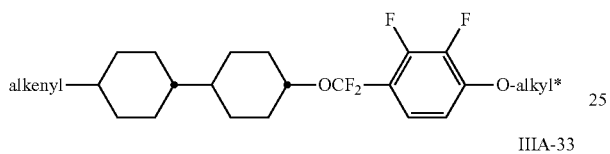
IIIA-34
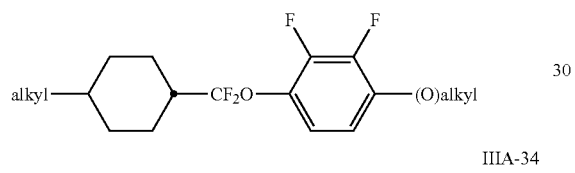
IIIA-35
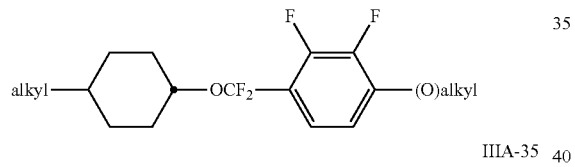
IIIA-36
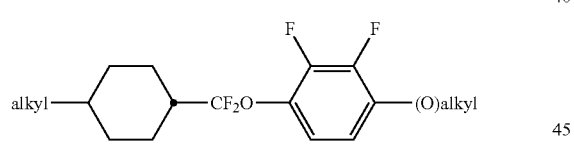
IIIA-37
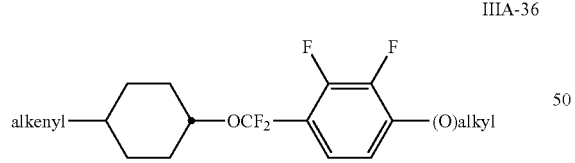
IIIA-38
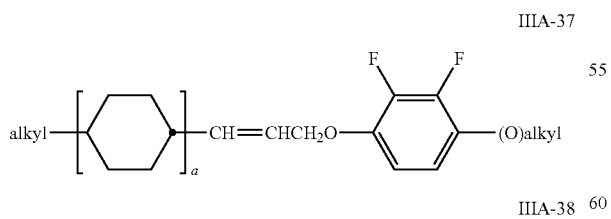
IIIA-39
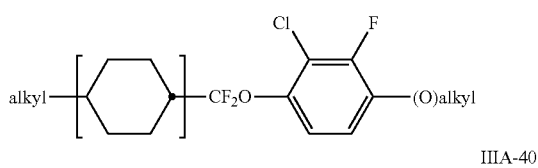
IIIA-40
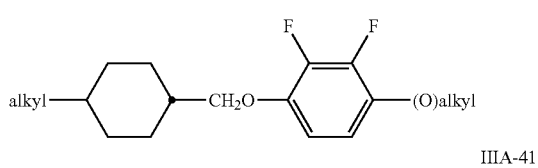
IIIA-41
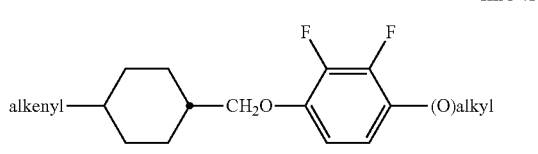
IIIA-42
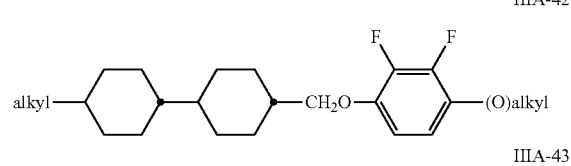
IIIA-43
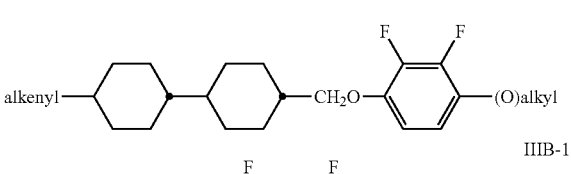
IIIB-1
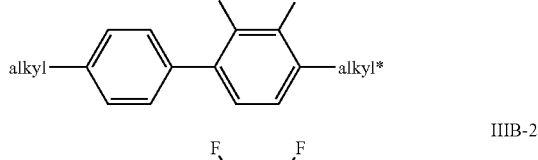
IIIB-2
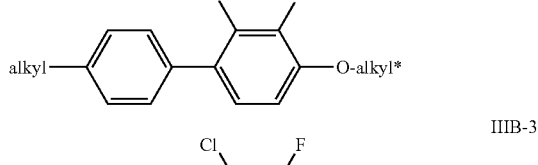
IIIB-3
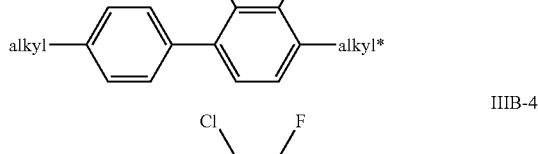
IIIB-4
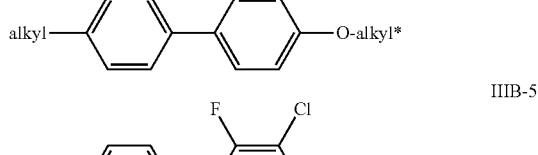
IIIB-5
IIIB-6
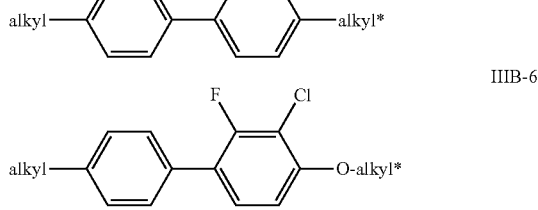

IIIB-7
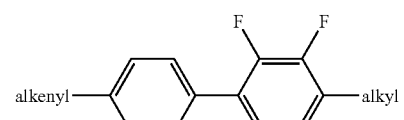
IIIB-8
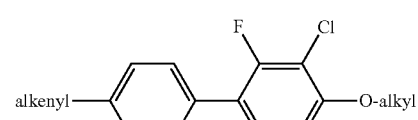
IIIB-9
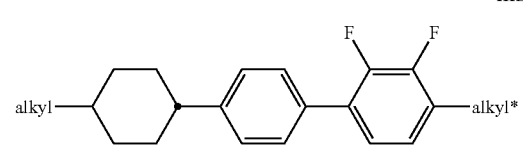
IIIB-10
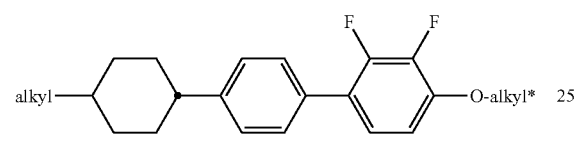
IIIB-11
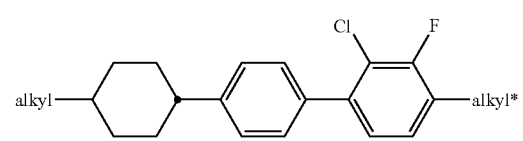
IIIB-12
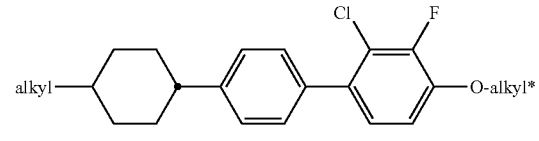
IIIB-13
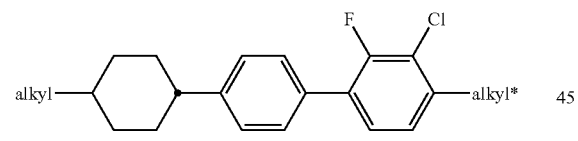
IIIB-14
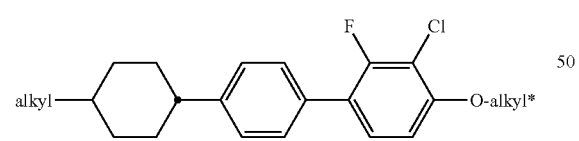
IIIB-15
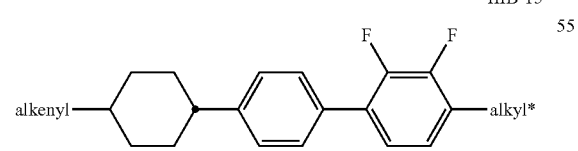
IIIB-16
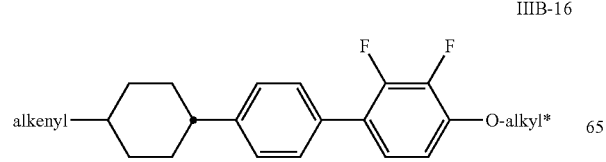
IIIB-17
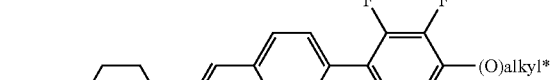
IIIB-18
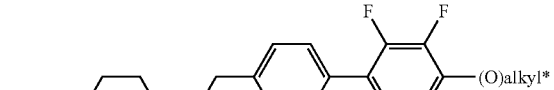
IIIB-19
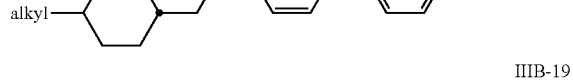
IIIB-20
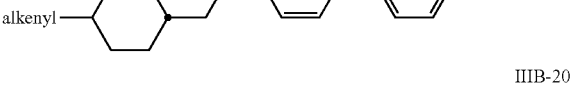
IIIB-21
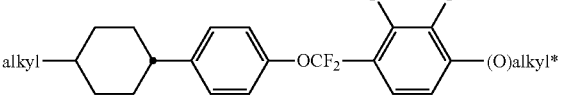
IIIB-22
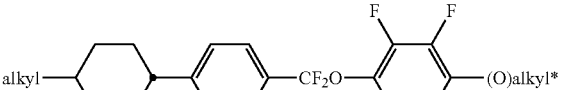
IIIB-23
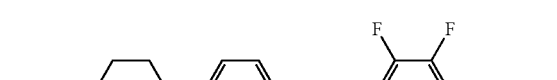
IIIC-1
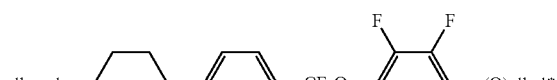
IIID-1
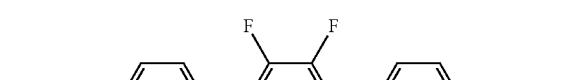
IIID-2
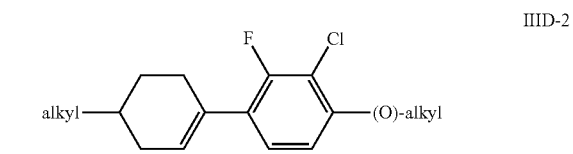

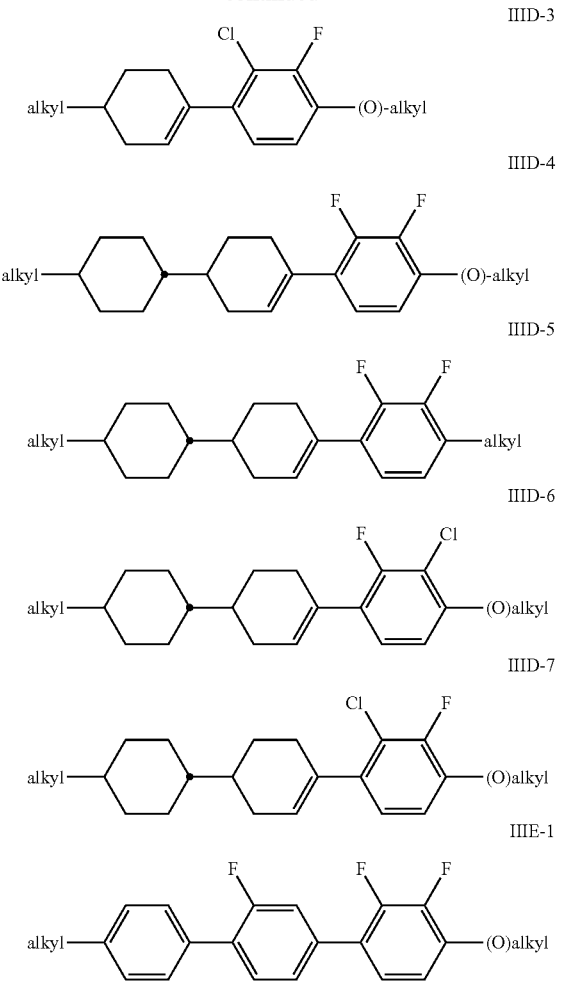

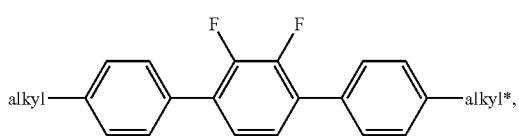

in which the parameter a denotes 1 or 2, alkyl and alkyl* each, independently of one another, denote a straight-chain alkyl radical having 1-6 C atoms, cycloalkyl denotes cyclopropyl, cyclobutyl, cyclopentyl, cyclopentenyl; alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Particularly preferred mixtures according to the invention comprise one or more compounds of the formulae IIIA-2, IIA-8, IIIA-10, IIIA-16, II-18, IIIA-40, IIIA-41, IIIA-42, IIIA-43, IIIB-2, IIIB-10, IIIB-16, IIIC-1, IIID-4 and IIIE-1.

The proportion of compounds of the formulae IIIA and/or IIIB in the mixture as a whole is preferably at least 20% by weight.

Particularly preferred media according to the invention comprise at least one compound of the formula IIIC-1, in which alkyl and alkyl* have the meanings indicated above, preferably in amounts of >3% by weight, in particular >5% by weight and particularly preferably 5 to 25% by weight.

In a preferred embodiment, the medium comprises one or more compounds of the formula IV,

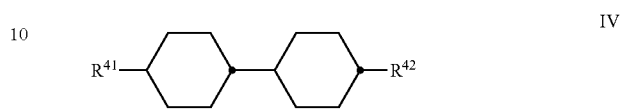

in which $R^{41}$ denotes an unsubstituted alkyl radical having 1 to 7 C atoms or an unsubstituted alkenyl radical having 2 to 7 C atoms, preferably an n-alkyl radical, particularly preferably having 2, 3, 4 or 5 C atoms, and $R^{42}$ denotes an unsubstituted alkyl radical having 1 to 7 C atoms or an unsubstituted alkoxy radical having 1 to 6 C atoms, both preferably having 2 to 5 C atoms, an unsubstituted alkenyl radical having 2 to 7 C atoms, preferably having 2, 3 or 4 C atoms, more preferably a vinyl radical or a 1-propenyl radical and in particular a vinyl radical.

The compounds of the formula IV are preferably selected from the group of the compounds of the formulae IV-1 to IV-4,

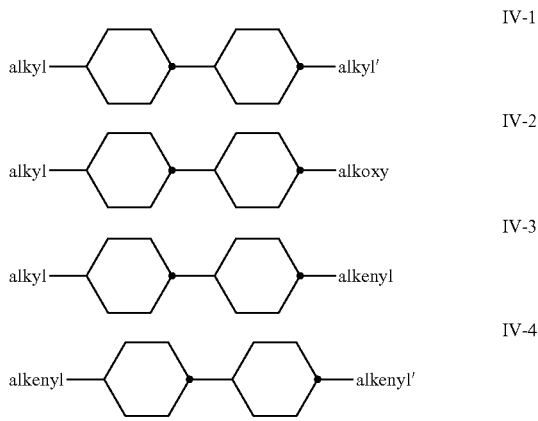

in which alkyl and alkyl', independently of one another, denote alkyl having 1 to 7 C atoms, preferably having 2 to 5 C atoms, alkenyl denotes an alkenyl radical having 2 to 5 C atoms, preferably having 2 to 4 C atoms, particularly preferably 2 C atoms, alkenyl' denotes an alkenyl radical having 2 to 5 C atoms, preferably having 2 to 4 C atoms, particularly preferably having 2 to 3 C atoms, and alkoxy denotes alkoxy having 1 to 5 C atoms, preferably having 2 to 4 C atoms.

Preferably, the medium comprises one or more compounds selected from the compounds of the formulae IV-1-1 to IV-1-4

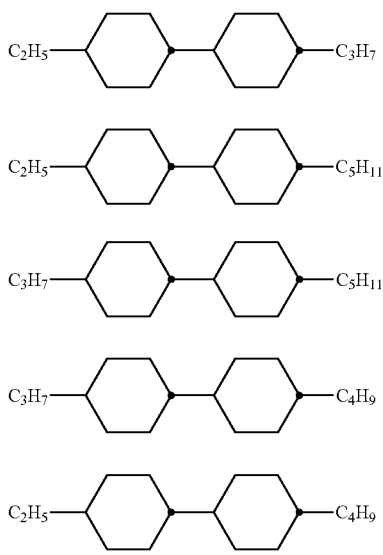

IV-1-1

IV-1-2

IV-1-3

IV-1-4

IV-1-5

Very preferably, the medium according to the invention comprises one or more compounds of the formulae IV-2-1 and/or IV-2-2

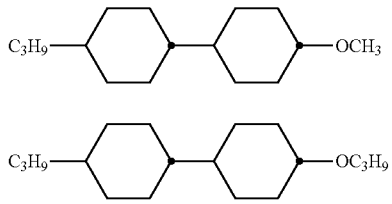

IV-1-1

IV-1-2

Very preferably, the medium according to the invention comprises a compound of formula IV-3, in particular selected from the compounds of the formulae IV-3-1 to IV-3-5

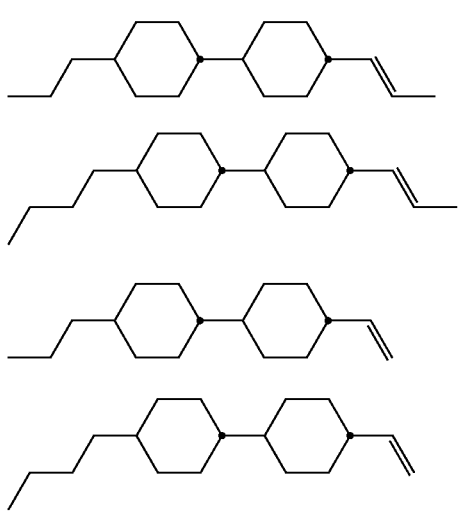

IV-3-1

IV-3-2

IV-3-3

IV-3-4

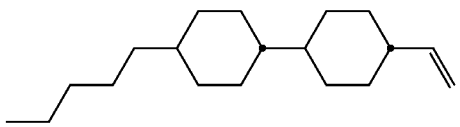

IV-3-5

Very preferably, the medium according to the invention comprises a compound of formula IV-4, in particular selected from the compounds of the formulae IV-4-1 and IV-4-2

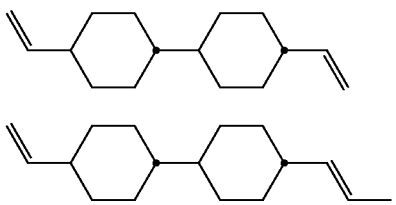

IV-4-1

IV-4-2

The liquid-crystalline medium preferably additionally comprises one or more compounds of the formula IVa,

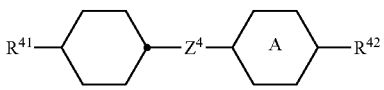

IVa in which $R^{41}$ and $R^{42}$ each, independently of one another, denote a straight-chain alkyl, alkoxy, alkenyl, alkoxyalkyl or alkoxy radical having up to

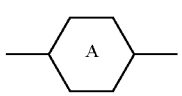

denotes

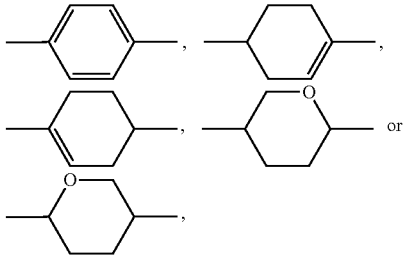

$Z^4$ denotes a single bond, —$CH_2CH_2$—, —CH=CH—, —$CF_2O$—, —$OCF_2$—, —$CH_2O$—, —$OCH_2$—, —COO—, —OCO—, —$C_2F_4$—, —$C_4H_8$—, —CF=CF—.

Preferred compounds of the formula IVa are indicated below:

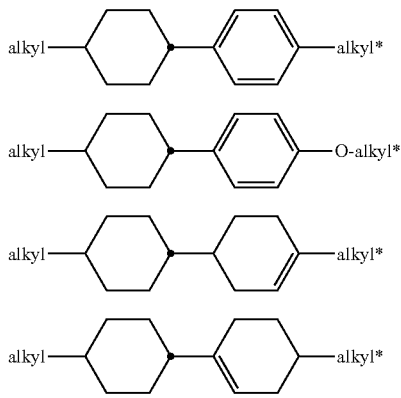

IVa-1

IVa-2

IVa-3

IVa-4 in which
alkyl and
alkyl* each, independently of one another, denote a straight-chain alkyl radical having 1 to 6 C atoms.

The medium according to the invention preferably comprises at least one compound of the formula IVa-1 and/or formula IVa-2.

The proportion of compounds of the formula IVa in the mixture as a whole is preferably at least 5% by weight Preferably, the medium comprises one or more compounds of formulae IVb-1 to IVb-3

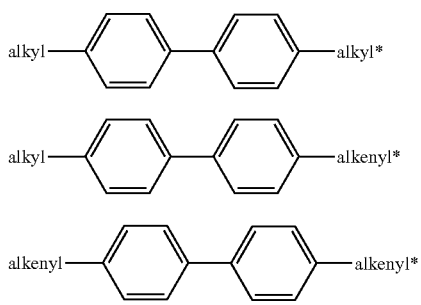

IVb-1

IVb-2

IVb-3 in which
alkyl and alkyl* each, independently of one another, denote a straight-chain alkyl radical having 1 to 6 C atoms, and
alkenyl and alkenyl* each, independently of one another, denote a straight-chain alkenyl radical having 2 to 6 C atoms.

The proportion of the biphenyls of the formulae IV-1 to IV-3 in the mixture as a whole is preferably at least 3% by weight, in particular >5% by weight.

Of the compounds of the formulae IVb-1 to IVb-3, the compounds of the formula IVb-2 are particularly preferred.

Particularly preferred biphenyls are

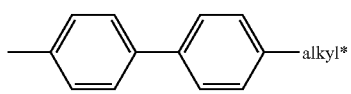

IVb-1-1

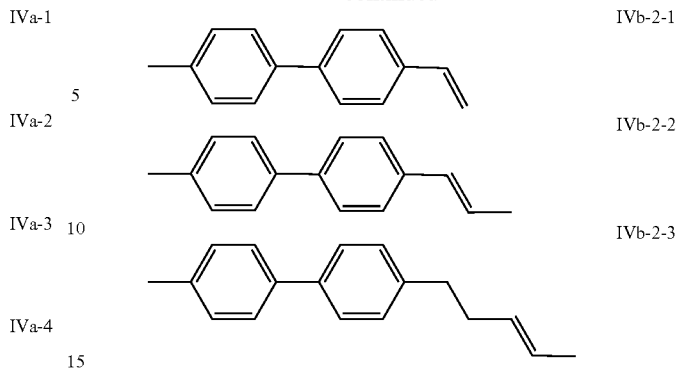

IVb-2-1

IVb-2-2

IVb-2-3 in which alkyl* denotes an alkyl radical having 1 to 6 C atoms and preferably denotes n-propyl. The medium according to the invention particularly preferably comprises one or more compounds of the formulae IVb-1-1 and/or IVb-2-3.

In a preferred embodiment, the medium comprises one or more compounds of formula V

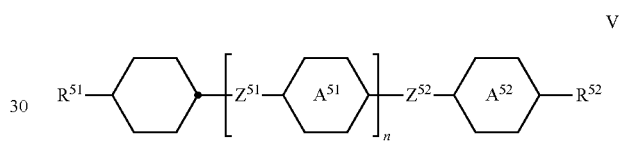

V in which
$R^{51}$ and $R^{52}$, independently of one another, have one of the meanings given for $R^{41}$ and $R^{42}$ and preferably denote alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

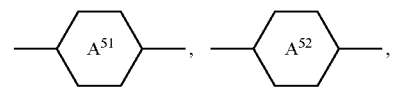

identically or differently, denote

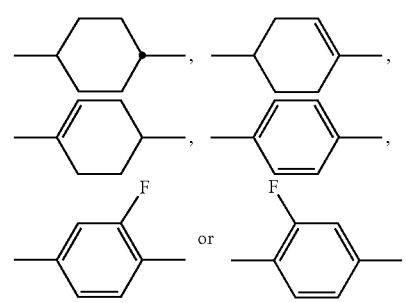

or where

preferably denotes or,

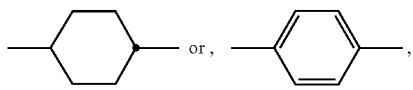

$Z^{51}$, $Z^{52}$ each, independently of one another, denote —CH$_2$—CH$_2$—, —CH$_2$—O—, —CH=CH—, —C≡C—, —COO— or a single bond, preferably —CH$_2$—CH$_2$—, —CH$_2$—O— or a single bond and particularly preferably a single bond, and n is 1 or 2.

The compounds of formula V are preferably selected from the compounds of the formulae V-1 to V-16:

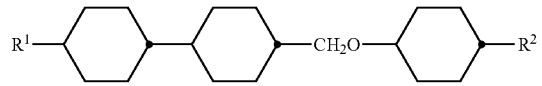
V-1

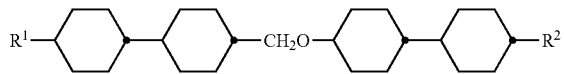
V-2

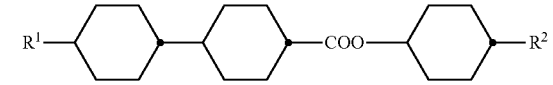
V-3

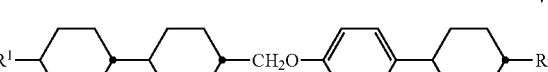
V-4

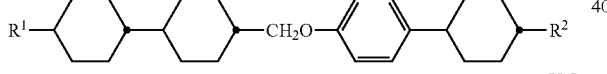
V-5

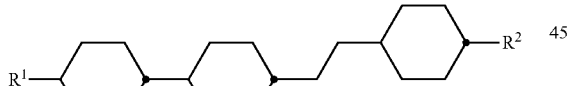
V-6

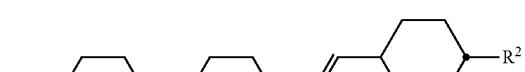
V-7

V-8

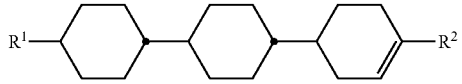
V-9

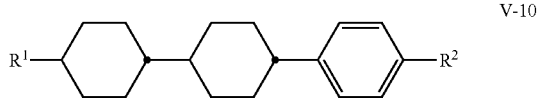
V-10

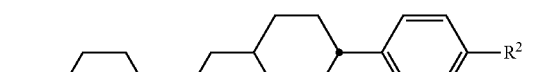
V-11

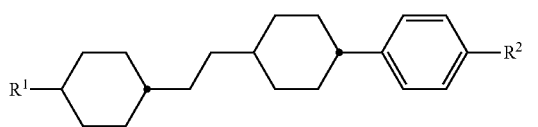
V-12

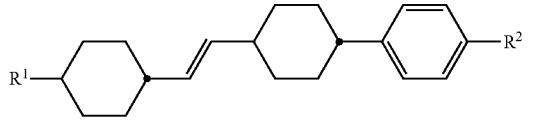
V-13

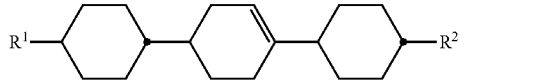
V-14

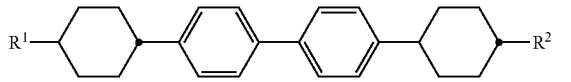
V-15

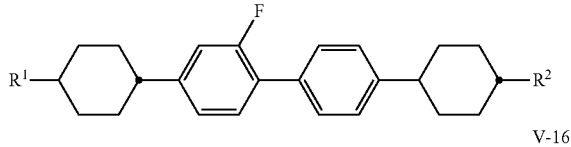
V-16

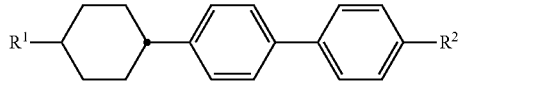
V-17 in which $R^1$ and $R^2$ have the meanings indicated for $R^{2A}$ above. $R^1$ and $R^2$ preferably each, independently of one another, denote straight-chain alkyl or alkenyl.

Preferred media comprise one or more compounds of the formulae V-1, V-3, V-4, V-6, V-7, V-10, V-11, V-12, V-14, V-15, and/or V-16

Mixtures according to the invention very particularly preferably comprise the compounds of the formula V-10, V-12, V-16 and/or IV-1, in particular in amounts of 5 to 30%.

Preferred compounds of the formulae V-10 are indicated below:

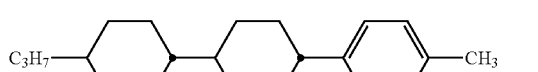
V-10a

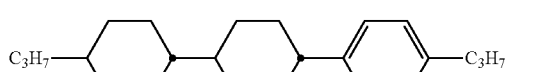
V-10b

V-10c

The medium according to the invention particularly preferably comprises the tricyclic compounds of the formula V-10a and/or of the formula V-10b in combination with one or more bicyclic compounds of the formulae IV-1 The total proportion of the compounds of the formulae V-10a and/or V-10b in combination with one or more compounds selected from the bicyclohexyl compounds of the formula IV-1 is 5 to 40%, very particularly preferably 15 to 35%.

Very particularly preferred mixtures comprise compounds V-10a and CC-2-3

V-10a

IV-1-1

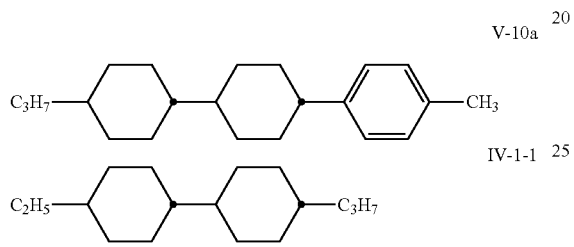

The compounds V-10a and IV-1-1 are preferably present in the mixture in a concentration of 15 to 35%, particularly preferably 17 to 25% and especially preferably 18 to 22%, based on the mixture as a whole.

Very particularly preferred mixtures comprise the compounds V-10b and IV-1-1:

V-10b

IV-1-1

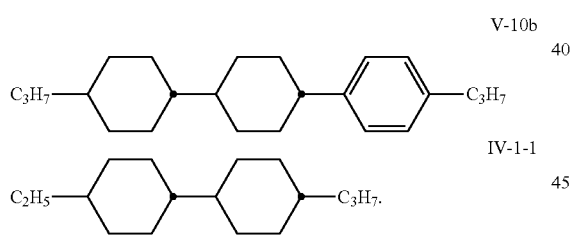

The compounds V-10b and IV-1-1 are preferably present in the mixture in a concentration of 15 to 35%, particularly preferably 17 to 25% and especially preferably 18 to 22%, based on the mixture as a whole.

Very particularly preferred mixtures comprise the following three compounds:

V-10a

V-10b

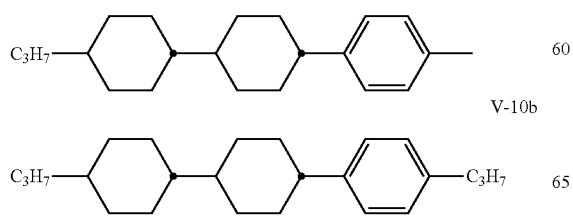

IV-1-1

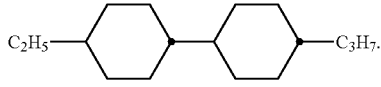

The compounds V-10a, V-10b and IV-1-1 are preferably present in the mixture in a concentration of 15 to 35%, particularly preferably 15 to 25% and especially preferably 18 to 22%, based on the mixture as a whole.

Preferred mixtures comprise at least one compound selected from the group of the compounds V-6, V-7 and IV-1:

V-6

V-7

IV-1

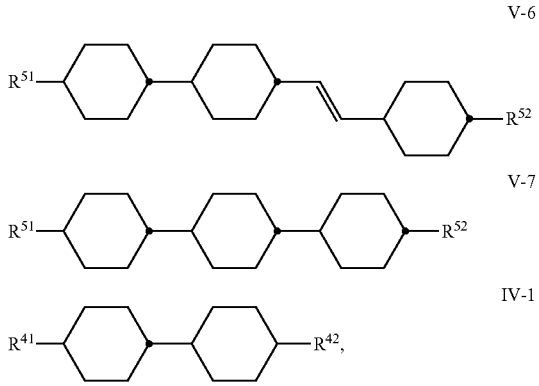

in which $R^{41}$ and $R^{42}$, and $R^{51}$ and $R^{52}$ have the meanings indicated above. Preferably in the compounds V-6, V-7 and IV-1, $R^{41}$ and $R^{51}$ denotes alkyl or alkenyl having 1 to 6 or 2 to 6 C atoms, respectively, and $R^{42}$ and $R^{52}$ denotes alkenyl having 2 to 6 C atoms.

Preferred mixtures comprise at least one compound of the formulae V-6a, V-6b, V-7a, V-7b, IV-4-1, IV-4-2, IV-3a and IV-3b:

V-6a

V-6b

V-7a

V-7b

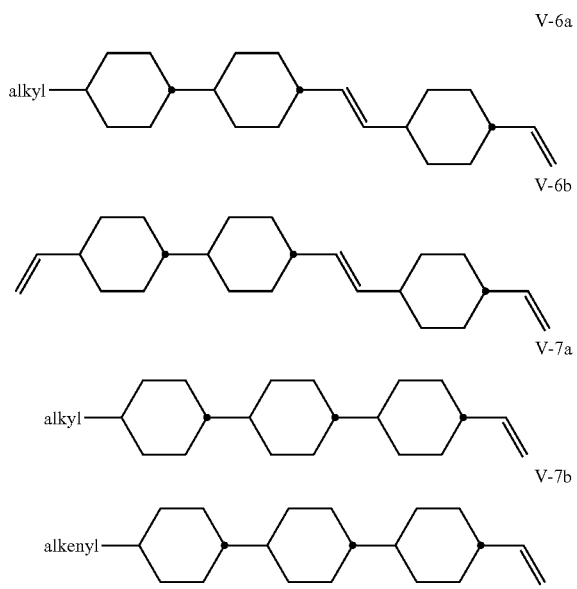

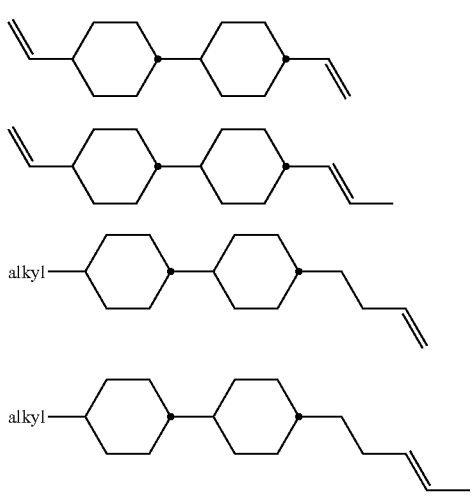

IV-4-1

IV-4-2

IV-3a

IV-3b

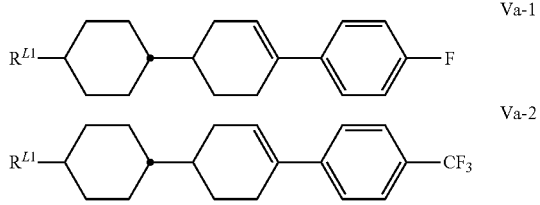

Va-1

Va-2 in which $R^{L1}$ has the meanings given above for formula I and, preferably denotes alkyl or alkenyl having 1 to 7 C atoms in which a $CH_2$ group may be replaced by cyclopropane-1,2-diyl.

In a preferred embodiment the medium comprises one or more compounds of formula Vb selected from the following sub-formulae:

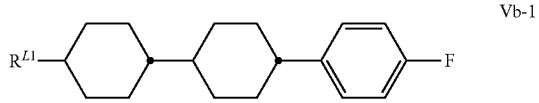

Vb-1

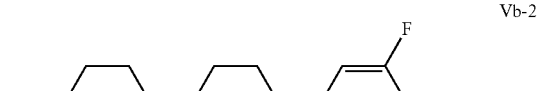

Vb-2

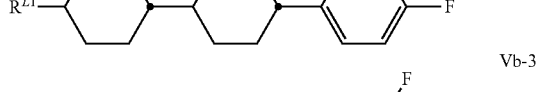

Vb-3

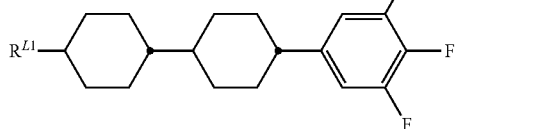

in which alkyl denotes an alkyl radical having 1 to 6 C atoms and alkenyl denotes an alkenyl radical having 2 to 6 C atoms.

The compounds of the formulae V-6a, V-6b, V-7a, V-7b, IV-4-1, IV-4-2, IV-3a and IV-3b are preferably present in the mixtures according to the invention in amounts of 1 to 40% by weight, preferably 5 to 35% by weight and very particularly preferably 10 to 30% by weight.

In a preferred embodiment, the medium comprises one or more compounds of the formula Va

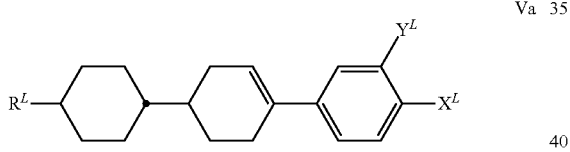

Va in which $R^L$ denotes H, a straight chain or branched alkyl or alkoxy radical having 1 to 15 C atoms, where one or more $CH_2$ groups in these radicals may each be replaced, independently of one another, by

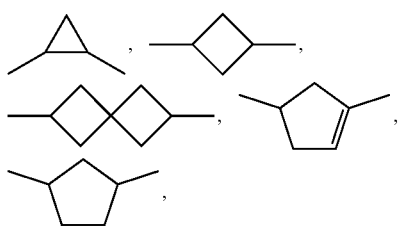

—C≡C—, —CF$_2$O—, —OCF$_2$—, —CH═CH—, —O—, —CO—O— or —O—CO— in such a way that O atoms are not linked directly to one another, and in which, in addition, one or more H atoms may be replaced by halogen, $X^L$ denotes F, Cl, CN, CHF$_2$, CF$_3$, OCF$_3$, or, identically or differently, has one of the meanings of $R^L$, and $Y^L$ denotes H, F, C or CH$_3$.

The compounds of formula Va are preferably selected form the group of compounds of the formulae Va-1 and Va-2 in which $R^{L1}$ has the meaning given above for formula Va.

Very preferably, the medium comprises the compound Vb-2, in which $R^{L1}$ denotes alkyl or alkenyl having up to 7 C atoms, in particular vinyl.

In a preferred embodiment of the present invention the medium additionally comprises one or more compounds of the formulae VI-1 to VI-9

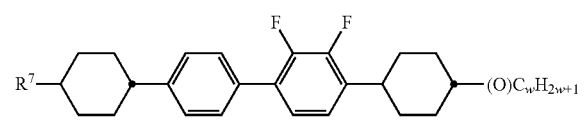

VI-1

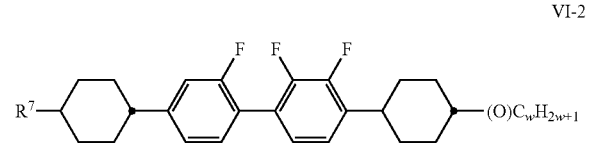

VI-2

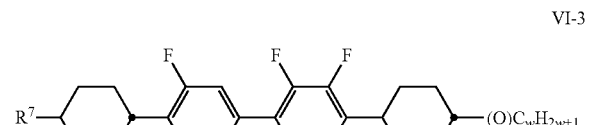

VI-3

-continued

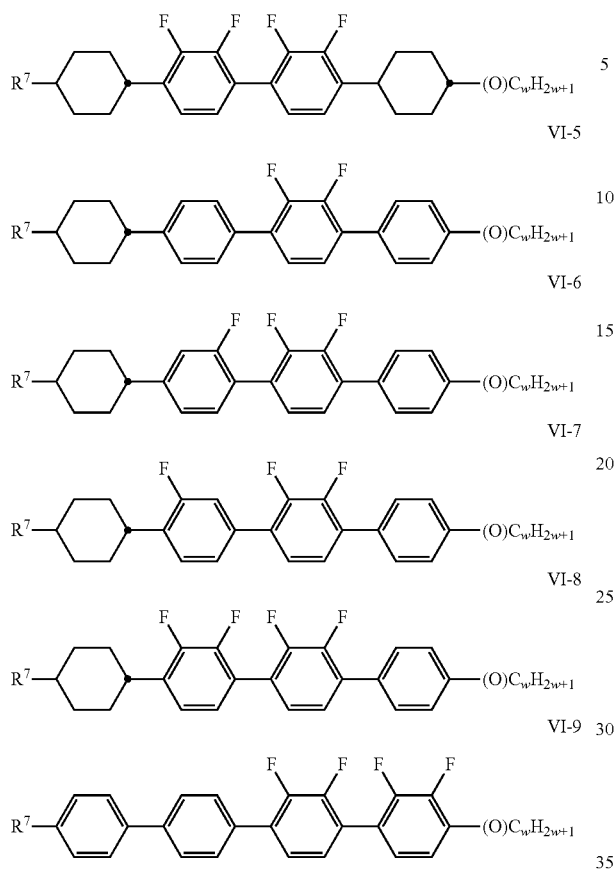

in which
R⁷ each, independently of one another, have one of the meanings indicated for $R^{2A}$ in Claim 5, and
w and x each, independently of one another, denote 1 to 6.

Particular preference is given to mixtures comprising at least one compound of the formula V-9.

In a preferred embodiment of the present invention the medium additionally comprises one or more compounds of the formulae VII-1 to VII-21,

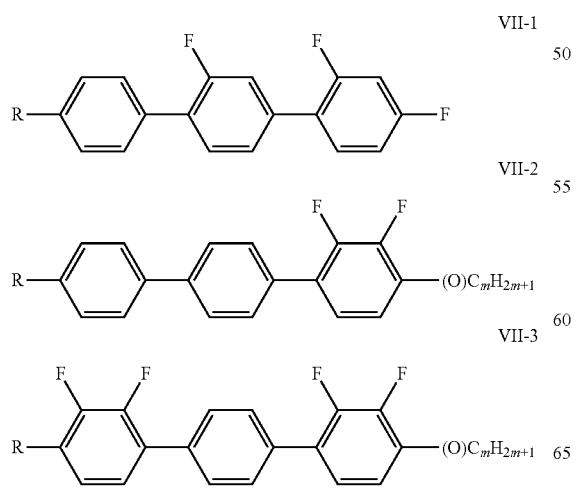

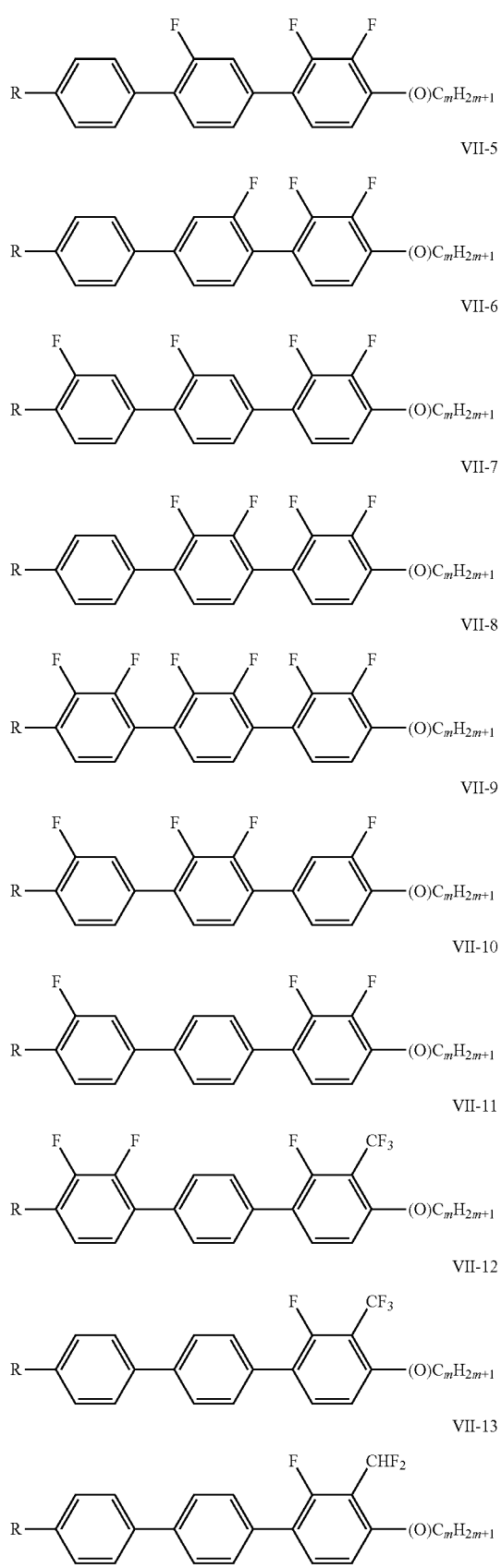

-continued

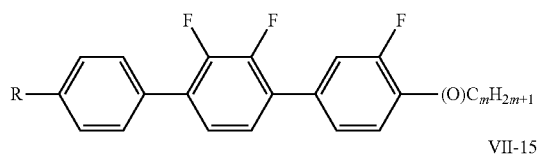
VII-14

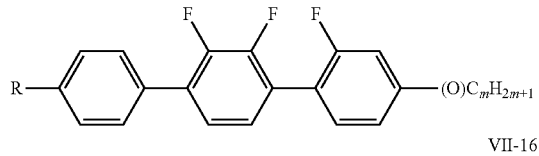
VII-15

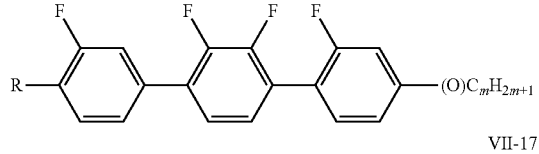
VII-16

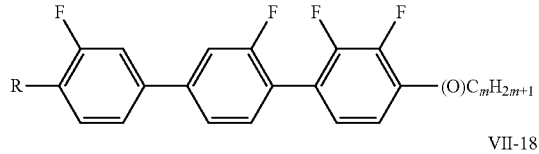
VII-17

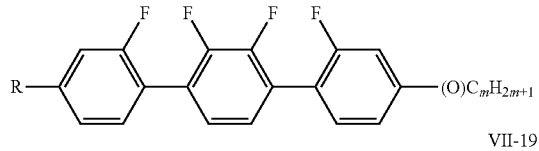
VII-18

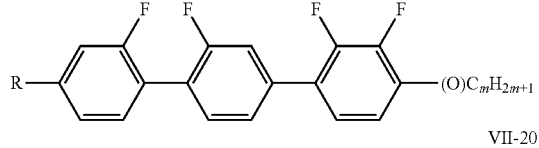
VII-19

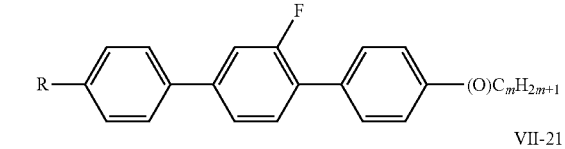
VII-20

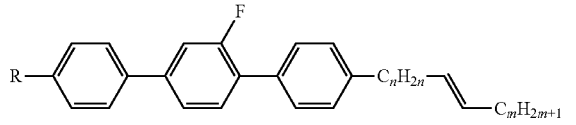
VII-21 in which

R denotes a straight-chain alkyl or alkoxy radical having 1 to 6 C atoms, (O) denotes —O— or a single bond, and m is 0, 1, 2, 3, 4, 5 or 6 and n is 0, 1, 2, 3 or 4.

R preferably denotes methyl, ethyl, propyl, butyl, pentyl, hexyl, methoxy, ethoxy, propoxy, butoxy, pentoxy.

The medium according to the invention preferably comprises the terphenyls of the formulae VII-1 to VII-21 in amounts of 2 to 30% by weight, in particular 5 to 20% by weight.

Particular preference is given to compounds of the formulae VII-1, VII-2, VII-4, VII-20 and VII-21. In these compounds, R preferably denotes alkyl, furthermore alkoxy, each having 1 to 5 C atoms. In the compounds of the formula VII-20, R preferably denotes alkyl or alkenyl, in particular alkyl. In the compound of the formula VII-21, R preferably denotes alkyl.

The terphenyls are preferably employed in the mixtures according to the invention if the Δn value of the mixture is to be >0.1. Preferred mixtures comprise 2 to 20% by weight of one or more terphenyl compounds selected from the group of the compounds VII-1 to VII-21.

Further preferred embodiments are listed below:

a) Liquid-crystalline medium comprising at least one compound of the formulae Z-1 to Z-7,

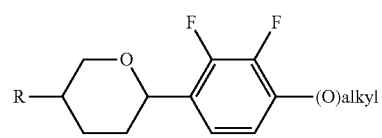
Z-1

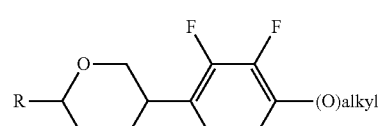
Z-2

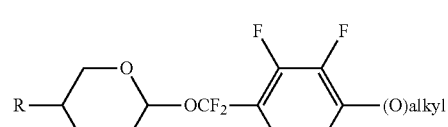
Z-3

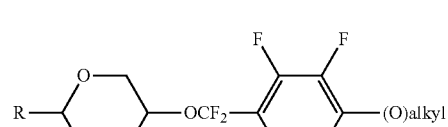
Z-4

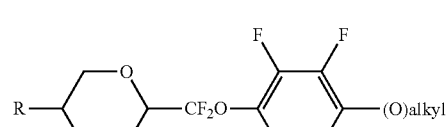
Z-5

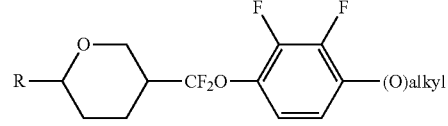
Z-6

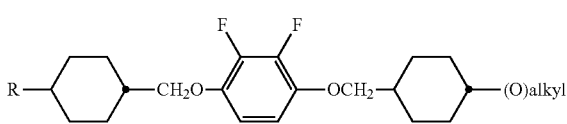
Z-7 in which R and alkyl have the meanings indicated above for formula II.

b) Preferred liquid-crystalline media according to the invention comprise one or more substances which contain a tetrahydronaphthyl or naphthyl unit, such as, for example, the compounds of the formulae N-1 to N-5,

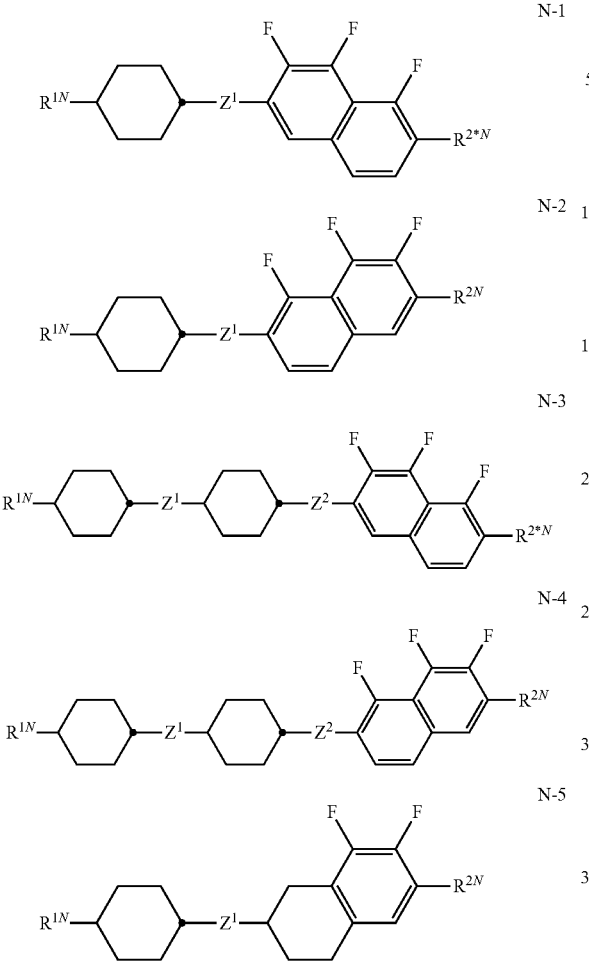

in which $R^{1N}$ and $R^{2N}$ each, independently of one another, have the meanings indicated for $R^{2A}$, preferably denote straight-chain alkyl, straight-chain alkoxy or straight-chain alkenyl, and $Z^1$ and $Z^2$ each, independently of one another, denote —C$_2$H$_4$—, —CH=CH—, —(CH$_2$)$_4$—, —(CH$_2$)$_3$O—, —O(CH$_2$)$_3$—, —CH=CH CH$_2$CH$_2$—, —CH$_2$CH$_2$CH=CH—, —CH$_2$O—, —OCH$_2$—, —COO—, —OCO—, —C$_2$F$_4$—, —CF=CF—, —CF=CH—, —CH=CF—, —CF$_2$O—, —OCF$_2$—, —CH$_2$— or a single bond.

c) Preferred mixtures comprise one or more compounds selected from the group of the difluorodibenzochroman compounds of the formula BC, chromans of the formula CR, fluorinated phenanthrenes of the formulae PH-1 and PH-2, fluorinated dibenzofurans of the formula BF-1 and BF-2,

BC

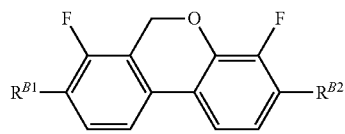

-continued

CR

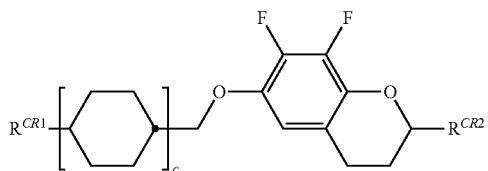

PH-1

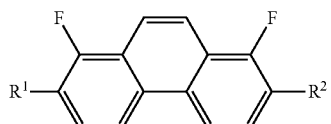

PH-2

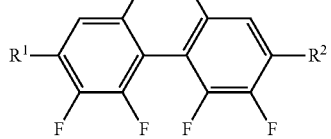

in which $R^{B1}$, $R^{B2}$, $R^{CR1}$, $R^{CR2}$, $R^1$, $R^2$ each, independently of one another, have the meaning of $R^{2A}$. c is 0, 1 or 2 and d denotes 1 or 2. $R^1$ and $R^2$ preferably, independently of one another, denote alkyl or alkoxy having 1 to 6 C atoms. The compounds of the formulae BF-1 and BF-2 should not be identical to one or more compounds of the formula I.

The mixtures according to the invention preferably comprise the compounds of the formulae BC, CR, PH-1, PH-2 and/or BF in amounts of 3 to 20% by weight, in particular in amounts of 5 to 15% by weight.

Particularly preferred compounds of the formulae BC and CR are the compounds BC-1 to BC-7 and CR-1 to CR-5,

BC-1

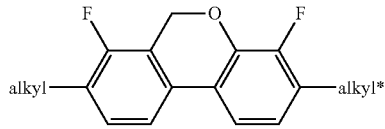

BC-2

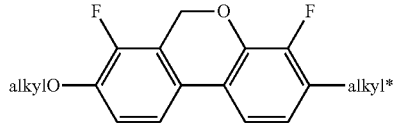

BC-3

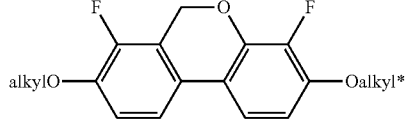

BC-4

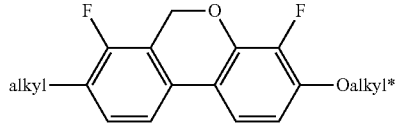

BC-5

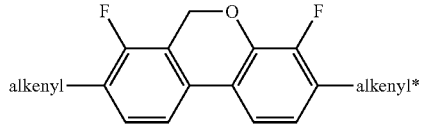

BC-6

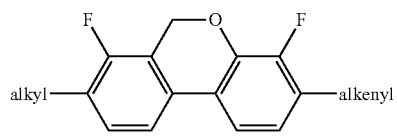

BC-7

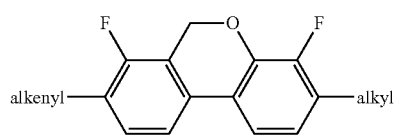

CR-1

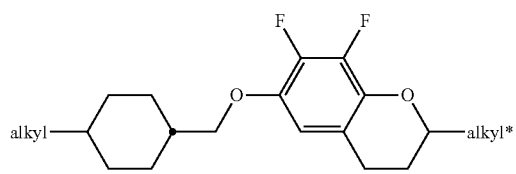

CR-2

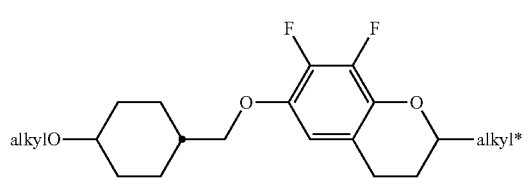

CR-3

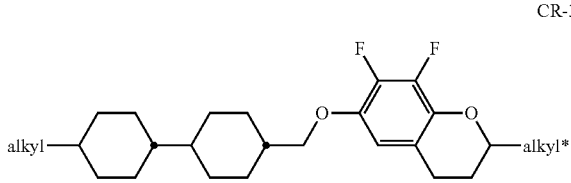

CR-4

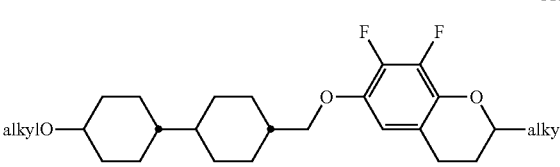

CR-5

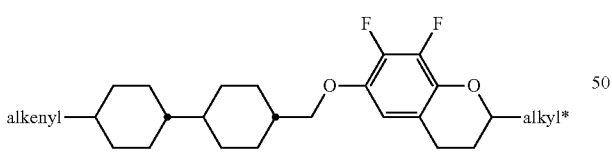

in which alkyl and alkyl* each, independently of one another, denote a straight-chain alkyl radical having 1 to 6 C atoms, and alkenyl and alkenyl* each, independently of one another, denote a straight-chain alkenyl radical having 2 to 6 C atoms.

Very particular preference is given to mixtures comprising one, two or three compounds of the formula BC-2.

d) Preferred mixtures comprise one or more indane compounds of the formula In,

In

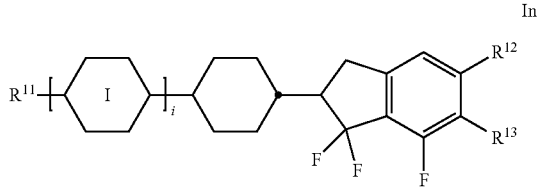

in which P8

$R^{11}$, $R^{12}$, $R^{13}$ each, independently of one another, denote a straight-chain alkyl, alkoxy, alkoxyalkyl or alkenyl radical having 1 to 6 C atoms, $R^{12}$ and $R^{13}$ additionally denote halogen, preferably F,

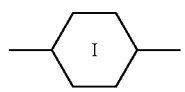

denotes

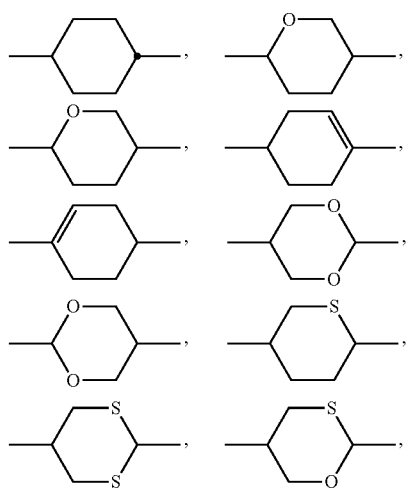

i is 0, 1 or 2.

Preferred compounds of the formula In are the compounds of the formulae In-1 to In-16 indicated below:

In-1

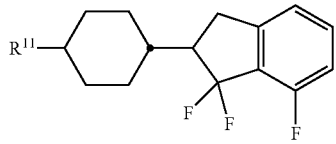

In-2

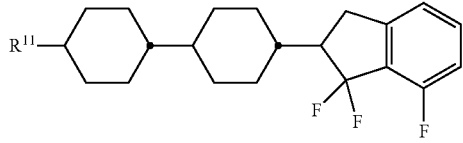

Particular preference is given to the compounds of the formulae In-1, In-2, In-3 and In-4.

The compounds of the formula In and the sub-formulae In-1 to In-16 are preferably employed in the mixtures according to the invention in concentrations ≥ 5% by weight, in particular 7 to 30% by weight and very particularly preferably 10 to 25% by weight.

e) Preferred mixtures additionally comprise one or more compounds of the formulae L-1 to L-11,

L-4

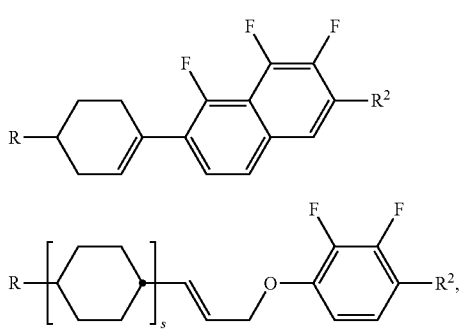

L-5

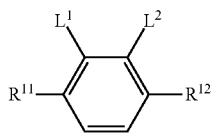

in which

R and $R^1$ each, independently of one another, have the meanings indicated for $R^{2A}$ in formula IIIA above, and alkyl denotes an alkyl radical having 1 to 6 C atoms. The parameter s denotes 1 or 2.

The compounds of the formulae L-1 to L-5 are preferably employed in concentrations of 5 to 50% by weight, in particular 8 to 40% by weight and very particularly preferably 10 to 40% by weight.

e) Preferred mixtures additionally comprise one or more compounds of formula Y

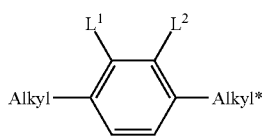 Y in which $R^{11}$ and $R^{12}$ have one of the meanings given in formula I above, and $L^1$ and $L^2$, identically or differently, denote F or $C_1$.

Preferred compounds of the formula Y are selected from the group consisting of the following sub-formulae

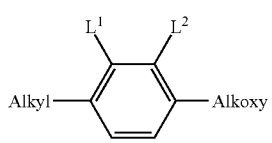 Y-1

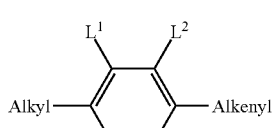 Y-2

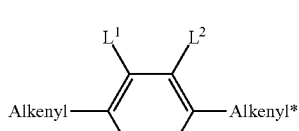 Y-3

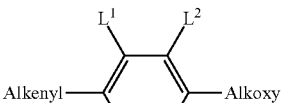 Y-4

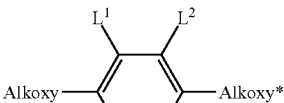 Y-5

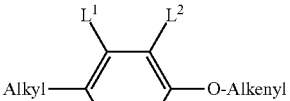 Y-6

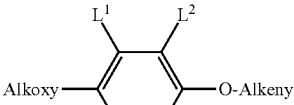 Y-7

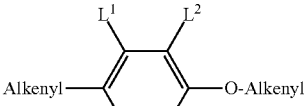 Y-8

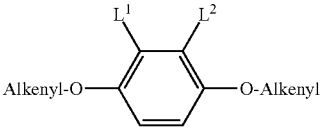 Y-9

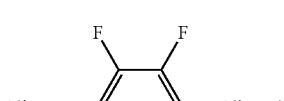 Y-10 in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Particularly preferred compounds of the formula Y are selected from the group consisting of following sub-formulae:

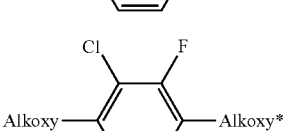 Y-6A

Y-6B in which Alkoxy and Alkoxy* have the meanings defined above and preferably denote methoxy, ethoxy, n-propyloxy, n-butyloxy or n-pentyloxy.

The liquid crystal medium according to the invention, herein also referred to as liquid crystal host mixture, is suitable for the use in polymer stabilised displays. To this end, the medium according to the invention optionally comprises one or more polymerisable compounds of formula P P-Sp-A¹-(Z¹-A²)$_z$-R     P in which the individual radicals, independently of each other and on each occurrence identically or differently, have the following meanings:
P a polymerisable group,
Sp a spacer group or a single bond,
A¹, A² an aromatic, heteroaromatic, alicyclic or heterocyclic group, preferably having 4 to 25 ring atoms, which may also contain fused rings, and which is unsubstituted, or mono- or polysubstituted by L,
Z¹ —O—, —S—, —CO—, —CO—O—, —O—CO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —CH=CF—, —CF=CH—, —C≡C—, —CH=CH—CO—O—, —O—CO—CH=CH—, —CH$_2$—CH$_2$—CO—O—, —O—CO—CH$_2$—CH$_2$—, —CR⁰R⁰⁰—, or a single bond,
R⁰, R⁰⁰ H or alkyl having 1 to 12 C atoms,
R H, L, or P-Sp-,
L F, Cl, —CN, P-Sp- or straight chain, branched or cyclic alkyl having 1 to 25 C atoms, wherein one or more non-adjacent CH$_2$-groups are optionally replaced by —O—, —S—, —CO—, —CO—O—, —O—CO—, —O—CO—O— in such a manner that O— and/or S-atoms are not directly connected with each other, and wherein one or more H atoms are each optionally replaced by P-Sp-, F or Cl,
z 0, 1, 2 or 3,
n1 1, 2, 3 or 4.

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

As used herein, the terms "tilt" and "tilt angle" will be understood to mean a tilted alignment of the LC molecules of an LC medium relative to the surfaces of the cell in an LC display (here preferably a PSA display). The tilt angle here denotes the average angle (<90°) between the longitudinal molecular axes of the LC molecules (LC director) and the surface of the plane-parallel outer plates which form the LC cell. A low value for the tilt angle (i.e. a large deviation from the 90° angle) corresponds to a large tilt here. A suitable method for measurement of the tilt angle is given in the examples. Unless indicated otherwise, tilt angle values disclosed above and below relate to this measurement method.

As used herein, the terms "reactive mesogen" and "RM" will be understood to mean a compound containing a mesogenic or liquid crystalline skeleton, and one or more functional groups attached thereto which are suitable for polymerisation and are also referred to as "polymerisable group" or "P".

Unless stated otherwise, the term "polymerisable compound" as used herein will be understood to mean a polymerisable monomeric compound.

As used herein, the term "low-molecular-weight compound" will be understood to mean to a compound that is monomeric and/or is not prepared by a polymerisation reaction, as opposed to a "polymeric compound" or a "polymer".

As used herein, the term "unpolymerisable compound" will be understood to mean a compound that does not contain a functional group that is suitable for polymerisation under the conditions usually applied for the polymerisation of the RMs.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in *Pure Appl. Chem.* 2001, 73(5), 888 and C. Tschierske, G. Pelzl, S. Diele, *Angew. Chem.* 2004, 116, 6340-6368.

As used herein, the terms "optically active" and "chiral" are synonyms for materials that are able to induce a helical pitch in a nematic host material, also referred to as "chiral dopants".

The term "spacer group", hereinafter also referred to as "Sp", as used herein is known to the person skilled in the art and is described in the literature, see, for example, *Pure Appl. Chem.* 2001, 73(5), 888 and C. Tschierske, G. Pelzl, S. Diele, *Angew. Chem.* 2004, 116, 6340-6368. As used herein, the terms "spacer group" or "spacer" mean a flexible group, for example an alkylene group, which connects the mesogenic group and the polymerisable group(s) in a polymerisable mesogenic compound.

Above and below,

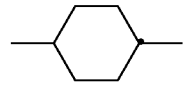

denotes a trans-1,4-cyclohexylene ring.
In a group

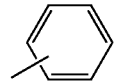

the single bond shown between the two ring atoms can be attached to any free position of the benzene ring.

Above and below "organic group" denotes a carbon or hydrocarbon group.

"Carbon group" denotes a mono- or polyvalent organic group containing at least one carbon atom, where this either contains no further atoms (such as, for example, —C≡C—) or optionally contains one or more further atoms, such as, for example, N, O, S, B, P, Si, Se, As, Te or Ge (for example carbonyl, etc.). The term "hydrocarbon group" denotes a carbon group which additionally contains one or more H atoms and optionally one or more heteroatoms, such as, for example, N, O, S, B, P, Si, Se, As, Te or Ge.

"Halogen" denotes F, Cl, Br or I, preferably F or Cl, very preferably F.

—CO—, —C(=O)— and —C(O)— denote a carbonyl group, i.e.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms, preferably selected from N, O, S, Se, Te, Si and Ge.

Preferred carbon and hydrocarbon groups are optionally substituted, straight-chain, branched or cyclic, alkyl, alkenyl, alkynyl, alkoxy, alkylcarbonyl, alkoxycarbonyl, alkylcarbonyloxy and alkoxycarbonyloxy having 1 to 40, preferably 1 to 20, very preferably 1 to 12, C atoms, optionally substituted aryl or aryloxy having 5 to 30, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 5 to 30, preferably 6 to 25, C atoms, wherein one or more C atoms may also be replaced by hetero atoms, preferably selected from N, O, S, Se, Te, Si and Ge.

Further preferred carbon and hydrocarbon groups are $C_1$-$C_{20}$ alkyl, $C_2$-$C_{20}$ alkenyl, $C_2$-$C_{20}$ alkynyl, $C_3$-$C_{20}$ allyl, $C_4$-$C_{20}$ alkyldienyl, $C_4$-$C_{20}$ polyenyl, $C_6$-$C_{20}$ cycloalkyl, $C_4$-$C_{15}$ cycloalkenyl, $C_6$-$C_{30}$ aryl, $C_6$-$C_{30}$ alkylaryl, $C_6$-$C_{30}$ arylalkyl, $C_6$-$C_{30}$ alkylaryloxy, $C_6$-$C_{30}$ arylalkyloxy, $C_2$-$C_{30}$ heteroaryl, $C_2$-$C_{30}$ heteroaryloxy.

Particular preference is given to $C_1$-$C_{12}$ alkyl, $C_2$-$C_{12}$ alkenyl, $C_2$-$C_{12}$ alkynyl, $C_6$-$C_{25}$ aryl and $C_2$-$C_{25}$ heteroaryl.

Further preferred carbon and hydrocarbon groups are straight-chain, branched or cyclic alkyl having 1 to 20, preferably 1 to 12, C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, F, Cl, CN, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O— and in which one or more H atoms may be replaced by F or Cl, or denotes an optionally substituted aryl or aryloxy group with 6 to 30 C atoms, or an optionally substituted heteroaryl or heteroaryloxy group with 2 to 30 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se. Particular preference is given to mono-, bi- or tricyclic aryl groups having 6 to 25 C atoms and mono-, bi- or tricyclic heteroaryl groups having 5 to 25 ring atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, 9,10-dihydro-phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, aza-carbazole, benzocarboline, phenanthridine, phenanthroline, thieno[2,3b]thiophene, thieno[3,2b]thiophene, dithienothiophene, isobenzothiophene, dibenzothiophene, benzothiophene, benzothiadiazothiophene, or combinations of these groups.

The aryl and heteroaryl groups mentioned above and below may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e.

those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 5 to 25 ring atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]pentane-1,3-diyl, bicyclo[2.2.2]octane-1,4-diyl, spiro[3.3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, hereinafter also referred to as "$L^S$", are, for example, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or C, optionally substituted silyl having 1 to 20 Si atoms, or optionally substituted aryl having 6 to 25, preferably 6 to 15, C atoms, wherein $R^x$ denotes H, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O— and/or S-atoms are not directly connected with each other, and wherein one or more H atoms are each optionally replaced by F, Cl, P— or P-Sp-, and $Y^1$ denotes halogen.

"Substituted silyl or aryl" preferably means substituted by halogen, —CN, $R^0$, —$OR^0$, —CO—$R^0$, —CO—O—$R^0$, —O—CO—$R^0$ or —O—CO—O—$R^0$, wherein $R^0$ denotes H or alkyl with 1 to 20 C atoms.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

$A^1$ and $A^2$ very preferably denote

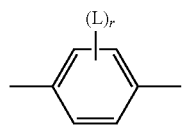

in which L has one of the meanings indicated above and r denotes 0, 1, 2, 3 or 4, in particular

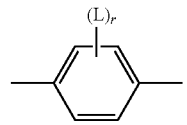

is preferably

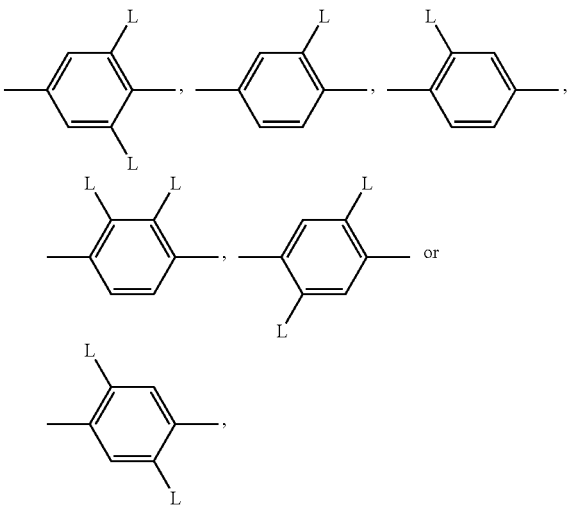

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups P are selected from the group consisting of $CH_2$=$CW^1$—CO—O—, $CH_2$=$CW^1$—CO—,

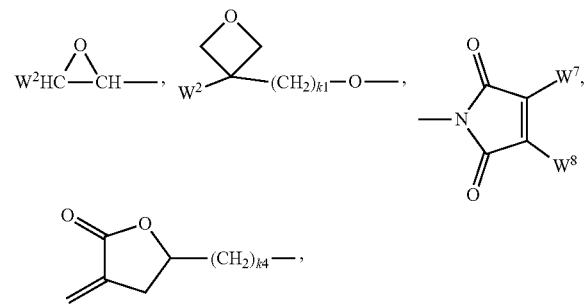

$CH_2$=$CW^2$—(O)$_{k3}$—, $CW^1$=CH—CO—(O)$_{k3}$—, $CW^1$=CH—CO—NH—, $CH_2$=$CW^1$—CO—NH—, $CH_3$—CH=CH—O—, ($CH_2$=CH)$_2$CH—OCO—, ($CH_2$=CH—$CH_2$)$_2$CH—OCO—, ($CH_2$=CH—$CH_2$)$_2$CH—O—, ($CH_2$=CH—$CH_2$)$_2$N—, ($CH_2$=CH—$CH_2$)$_2$N—CO—, HO—$CW^2W^3$—, HS—$CW^2W^3$—, $HW^2$N—,

HO—CW²W³—NH—, CH₂=CW¹—CO—NH—, CH₂=CH—(COO)$_{k1}$-Phe-(O)$_{k2}$—, CH₂=CH—(CO)$_{k1}$-Phe-(O)$_{k2}$—, Phe-CH=CH—, HOOC—, OCN— and W⁴W⁵W⁶Si—, in which W¹ denotes H, F, Cl, CN, CF₃, phenyl or alkyl having 1 to 5 C atoms, in particular H, F, Cl or CH₃, W² and W³ each, independently of one another, denote H or alkyl having 1 to 5 C atoms, in particular H, methyl, ethyl or n-propyl, W⁴, W⁵ and W⁶ each, independently of one another, denote Cl, oxaalkyl or oxacarbonylalkyl having 1 to 5 C atoms, W⁷ and W⁸ each, independently of one another, denote H, C₁ or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of CH₂=CW¹—CO—O—, CH₂=CW¹—CO—,

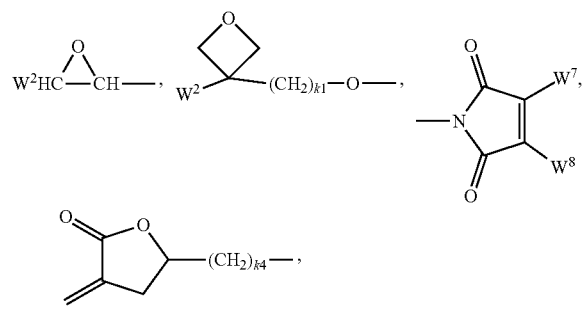

CH₂=CW²—O—, CH₂=CW²—, CW¹=CH—CO—(O)$_{k3}$—, CW¹=CH—CO—NH—, CH₂=CW¹—CO—NH—, (CH₂=CH)₂CH—OCO—, (CH₂=CH—CH₂)₂CH—OCO—, (CH₂=CH)₂CH—O—, (CH₂=CH—CH₂)₂N—, (CH₂=CH—CH₂)₂N—CO—, CH₂=CW¹—CO—NH—, CH₂=CH—(COO)$_{k1}$-Phe-(O)$_{k2}$—, CH₂=CH—(CO)$_{k1}$-Phe-(O)$_{k2}$—, Phe-CH=CH— and W⁴W⁵W⁶Si—, in which W¹ denotes H, F, Cl, CN, CF₃, phenyl or alkyl having 1 to 5 C atoms, in particular H, F, Cl or CH₃, W² and W³ each, independently of one another, denote H or alkyl having 1 to 5 C atoms, in particular H, methyl, ethyl or n-propyl, W⁴, W⁵ and W⁶ each, independently of one another, denote Cl, oxaalkyl or oxacarbonylalkyl having 1 to 5 C atoms, W⁷ and W⁸ each, independently of one another, denote H, C₁ or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of CH₂=CW¹—CO—O—, in particular CH₂=CH—CO—O—, CH₂=C(CH₃)—CO—O— and CH₂=CF—CO—O—, furthermore CH₂=CH—O—, (CH₂=CH)₂CH—O—CO—, (CH₂=CH)₂CH—O—,

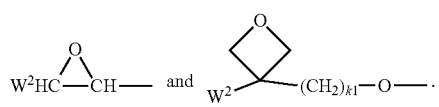

Further preferred polymerisable groups P are selected from the group consisting of vinyloxy, acrylate, methacrylate, fluoroacrylate, chloroacrylate, oxetane and epoxide, most preferably from acrylate and methacrylate.

If the spacer group Sp is different from a single bond, it is preferably of the formula Sp"-X", so that the respective radical P-Sp- conforms to the formula R-Sp"-X"—, wherein Sp" denotes linear or branched alkylene having 1 to 20, preferably 1 to 12, C atoms, which is optionally mono- or polysubstituted by F, C, Br, I or CN and in which, in addition, one or more non-adjacent CH₂ groups may each be replaced, independently of one another, by —O—, —S—, —NH—, —N(R⁰)—, —Si(R⁰R⁰⁰)—, —CO—, —CO—O—, —O—CO—, —O—CO—O—, —S—CO—, —CO—S—, —N(R⁰⁰)—CO—O—, —O—CO—N(R⁰)—, —N(R⁰)—CO—N(R⁰⁰)—, —CH=CH— or —C≡C— in such a way that O and/or S atoms are not linked directly to one another, X" denotes —O—, —S—, —CO—, —CO—O—, —O—CO—, —O—CO—O—, —CO—N(R⁰)—, —N(R⁰)—CO—, —N(R⁰)—CO—N(R⁰⁰)—, —OCH₂—, —CH₂O—, —SCH₂—, —CH₂S—, —CF₂O—, —OCF₂—, —CF₂S—, —SCF₂—, —CF₂CH₂—, —CH₂CF₂—, —CF₂CF₂—, —CH=N—, —N=CH—, —N=N—, —CH=CR⁰—, —CY²=CY³—, —C≡C—, —CH=CH—CO—O—, —O—CO—CH=CH— or a single bond, R⁰ and R⁰⁰ each, independently of one another, denote H or alkyl having 1 to 20 C atoms, and Y² and Y³ each, independently of one another, denote H, F, Cl or CN.

X" is preferably —O—, —S—, —CO—, —COO—, —OCO—, —O—COO—, —CO—NR⁰—, —NR⁰—CO—, —NR⁰—CO—NR⁰⁰— or a single bond.

Typical spacer groups Sp and -Sp"-X"— are, for example, —(CH₂)$_{p1}$—, —(CH₂)$_{p1}$—O—, —(CH₂)$_{p1}$—O—CO—, —(CH₂)$_{p1}$—CO—O—, —(CH₂)$_{p1}$—O—CO—O—, —(CH₂CH₂O)$_{q1}$—CH₂CH₂—, —CH₂CH₂—S—CH₂CH₂—, —CH₂CH₂—NH—CH₂CH₂— or —(SiR⁰R⁰⁰—O)$_{p1}$—, in which p1 is an integer from 1 to 12, q1 is an integer from 1 to 3, and R⁰ and R⁰⁰ have the meanings indicated above.

Particularly preferred groups Sp and -Sp"-X"— are —(CH₂)$_{p1}$—, —(CH₂)$_{p1}$—O—, —(CH₂)$_{p1}$—O—CO—, —(CH₂)$_{p1}$—CO—O—, —(CH₂)$_{p1}$—O—CO—O—, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

In a preferred embodiment of the invention the compounds of formula P and its subformulae contain a spacer group Sp that is substituted by one or more polymerisable groups P, so that the group Sp-P corresponds to Sp(P)$_s$, with s being≥2 (branched polymerisable groups).

Preferred compounds of formula P according to this preferred embodiment are those wherein s is 2, i.e. compounds which contain a group Sp(P)₂. Very preferred compounds of formula P according to this preferred embodiment contain a group selected from the following formulae:

| | |
|---|---|
| —X-alkyl-CHPP | S1 |
| —X-alkyl-CH((CH₂)$_{aa}$P)((CH₂)$_{bb}$P) | S2 |
| —X—N((CH₂)$_{aa}$P)((CH₂)$_{bb}$P) | S3 |
| —X-alkyl-CHP—CH₂—CH₂P | S4 |
| —X-alkyl-C(CH₂P)(CH₂P)—C$_{aa}$H$_{2aa+i}$ | S5 |

—X-alkyl-CHP—CH$_2$P                S6

—X-alkyl-CPP—C$_{aa}$H$_{2aa+i}$    S7

—X-alkyl-CHPCHP—C$_{aa}$H$_{2aa+i}$  S8 in which P is as defined in formula P, alkyl denotes a single bond or straight-chain or branched alkylene having 1 to 12 C atoms which is unsubstituted or mono- or polysubstituted by F, Cl or CN and in which one or more non-adjacent CH$_2$ groups may each, independently of one another, be replaced by —C(R$^0$)=C(R$^0$)—, —C≡C—, —N(R$^0$)—, —O—, —S—, —CO—, —CO—O—, —O—CO—, —O—CO—O— in such a way that O and/or S atoms are not linked directly to one another, where R$^0$ has the meaning indicated above, aa and bb each, independently of one another, denote 0, 1, 2, 3, 4, 5 or 6, X has one of the meanings indicated for X", and is preferably O, CO, SO$_2$, O—CO—, CO—O or a single bond.

Preferred spacer groups Sp(P)$_2$ are selected from formulae S1, S2 and S3.

Very preferred spacer groups Sp(P)$_2$ are selected from the following subformulae:

—CHPP                           S1a

—O—CHPP                         S1b

—CH$_2$—CHPP                    S1c

—OCH$_2$—CHPP                   S1d

—CH(CH$_2$—P)(CH$_2$—P)         S2a

—OCH(CH$_2$—P)(CH$_2$—P)        S2b

—CH$_2$—CH(CH$_2$—P)(CH$_2$—P)  S2c

—OCH$_2$—CH(CH$_2$—P)(CH$_2$—P) S2d

—CO—NH((CH$_2$)$_2$P)((CH$_2$)$_2$P)  S3a

In the compounds of formula P and its subformulae as described above and below, P is preferably selected from the group consisting of vinyloxy, acrylate, methacrylate, fluoroacrylate, chloroacrylate, oxetane and epoxide, most preferably from acrylate and methacrylate.

Further preferred are compounds of formula P and its subformulae as described above and below, wherein all polymerisable groups P that are present in the compound have the same meaning, and very preferably denote acrylate or methacrylate, most preferably methacrylate.

In the compounds of formula P and its subformulae as described above and below, R preferably denotes P-Sp-.

Further preferred are compounds of formula P and its subformulae as described above and below, wherein Sp denotes a single bond or —(CH$_2$)$_{p1}$—, —O—(CH$_2$)$_{p1}$—, —O—CO—(CH$_2$)$_{p1}$, or —CO—O—(CH$_2$)$_{p1}$, wherein p1 is 2, 3, 4, 5 or 6, and, if Sp is —O—(CH$_2$)$_{p1}$—, —O—CO—(CH$_2$)$_{p1}$ or —CO—O—(CH$_2$)$_{p1}$ the O-atom or CO-group, respectively, is linked to the benzene ring.

Further preferred are compounds of formula P and its subformulae as described above and below, wherein at least one group Sp is a single bond.

Further preferred are compounds of formula P and its subformulae as described above and below, wherein at least one group Sp is different from a single bond, and is preferably selected from —(CH$_2$)$_{p1}$—, —O—(CH$_2$)$_{p1}$—, —O—CO—(CH$_2$)$_{p1}$, or —CO—O—(CH$_2$)$_{p1}$, wherein p1 is 2, 3, 4, 5 or 6, and, if Sp is —O—(CH$_2$)$_{p1}$—, —O—CO—(CH$_2$)$_{p1}$ or —CO—O—(CH$_2$)$_{p1}$ the O-atom or CO-group, respectively, is linked to the benzene ring. Very preferred groups -A$^1$-(Z-A$^2$)$_z$- in formula P are selected from the following formulae

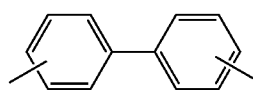

A1

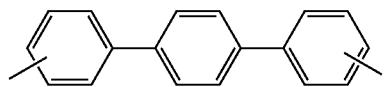

A2

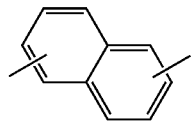

A3

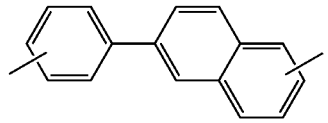

A4

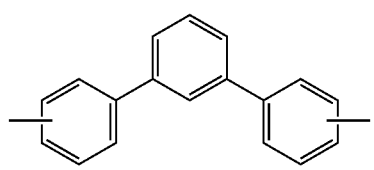

A5

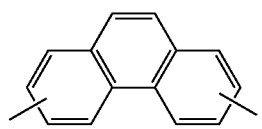

A6 wherein at least one benzene ring is substituted by at last one group L and the benzene rings are optionally further substituted by one or more groups L or P-Sp-.

Preferred compounds of formula P and their subformulae are selected from the following preferred embodiments, including any combination thereof:

All groups P in the compound have the same meaning,

-A$^1$-(Z-A$^2$)$_z$- is selected from formulae A1, A2 and A5, the compounds contain exactly two polymerizable groups (represented by the groups P), the compounds contain exactly three polymerizable groups (represented by the groups P), P is selected from the group consisting of acrylate, methacrylate and oxetane, very preferably acrylate or methacrylate, P is methacrylate, all groups Sp are a single bond, at least one of the groups Sp is a single bond and at least one of the groups Sp is different from a single bond, Sp, when being different from a single bond, is —(CH$_2$)$_{p2}$—, —(CH$_2$)$_{p2}$—O—, —(CH$_2$)$_{p2}$—CO—O—, —(CH$_2$)$_{p2}$—O—CO—, wherein p2 is 2, 3, 4, 5 or 6, and the O-atom or the CO-group, respectively, is connected to the benzene ring, Sp is a single bond or denotes —(CH$_2$)$_{p2}$—, —(CH$_2$)$_{p2}$—O—, —(CH$_2$)$_{p2}$—CO—O—, —(CH$_2$)$_{p2}$—O—CO—, wherein p2 is 2, 3, 4, 5 or 6, and the O-atom or the CO-group, respectively, is connected to the benzene ring, R denotes P-Sp-, R does not denote or contain a polymerizable group, R does not denote or contain a polymerizable group and denotes straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl or La, L or L' denote F, Cl or CN, La is F.

Suitable and preferred compounds of formula P are selected from the following formulae:

P-1
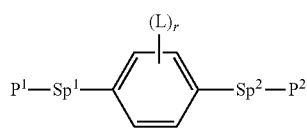

P-2
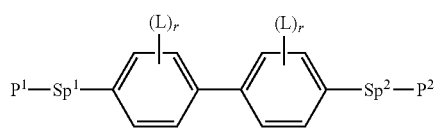

P-3
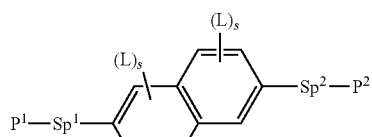

P-4
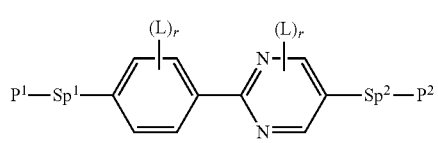

P-5
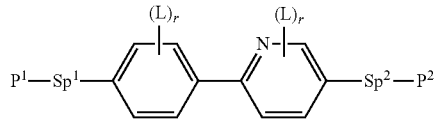

P-6
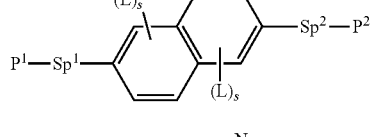

P-7
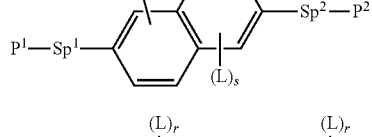

P-8
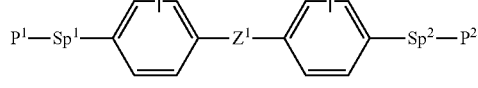

-continued

P-9
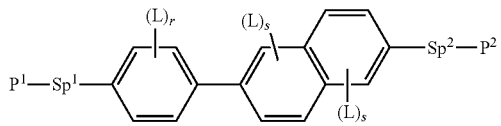

P-10
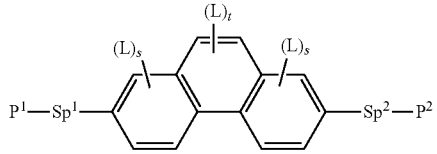

P-11
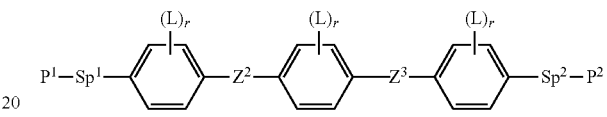

P-12
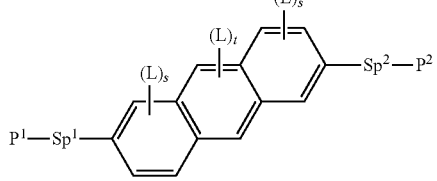

P-13
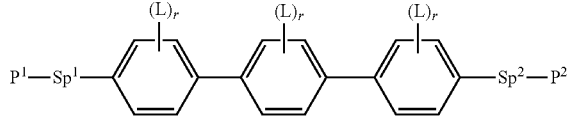

P-14
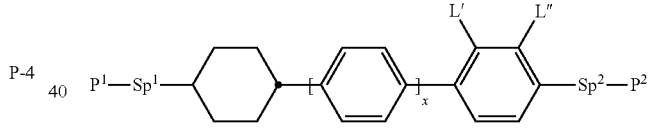

P-15
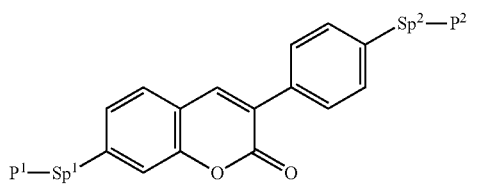

P-16

P-17
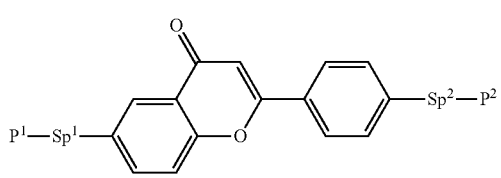

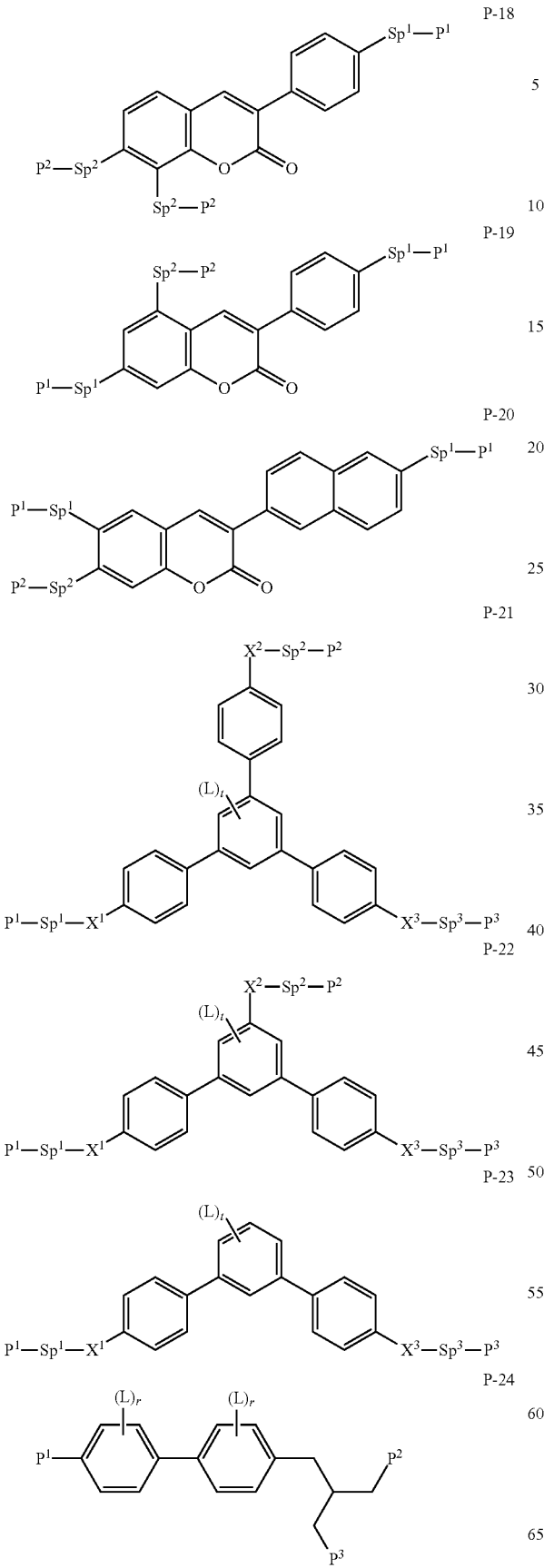
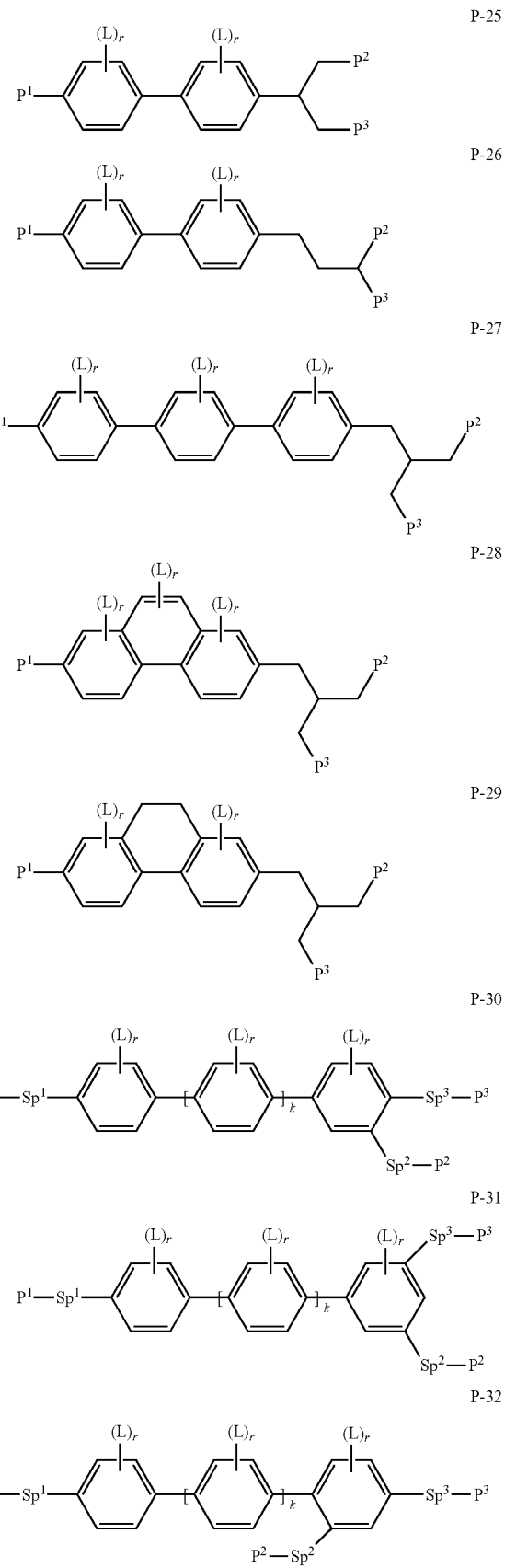

in which the individual radicals have the following meanings:

$P^1$, $P^2$ and $P^3$ each, independently of one another, denote an acrylate or methacrylate group, $Sp^1$, $Sp^2$ and $Sp^3$ each, independently of one another, denote a single bond or a spacer group having one of the meanings indicated above and below for Sp, and particularly preferably denote —$(CH_2)_{p1}$—, —$(CH_2)_{p1}$—O—, —$(CH_2)_{p1}$—CO—O—, —$(CH_2)_{p1}$—O—CO— or —$(CH_2)_{p1}$—O—CO—O—, in which p1 is an integer from 1 to 12, where, in addition, one or more of the radicals $P^1$-$Sp^1$-, $P^2$—$Sp^2$- and $P^3$—$Sp^3$- may denote $R^{aa}$, with the proviso that at least one of the radicals $P^1$-$Sp^1$-, $P^2$—$Sp^2$- and $P^3$—$Sp^3$- present is different from $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by $C(R^0)$=C($R^{00}$)—, —C≡C—, —N($R^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), $R^0$, $R^{00}$ each, independently of one another and identically or differently on each occurrence, denote H or alkyl having 1 to 12 C atoms, $R^y$ and $R^z$ each, independently of one another, denote H, F, $CH_3$ or $CF_3$, $X^1$, $X^2$ and $X^3$ each, independently of one another, denote —CO—O—, —O—CO— or a single bond, $Z^1$ denotes —O—, —CO—, —C($R^yR^z$)— or —$CF_2CF_2$—, $Z^2$ and $Z^3$ each, independently of one another, denote —CO—O—, —O—CO—, —$CH_2$O—, —$OCH_2$—, —$CF_2$O—, —$OCF_2$— or —$(CH_2)_n$—, where n is 2, 3 or 4, L on each occurrence, identically or differently, denotes F, C, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, k denotes 0 or 1, r denotes 0, 1, 2, 3 or 4, s denotes 0, 1, 2 or 3, t denotes 0, 1 or 2, x denotes 0 or 1.

Especially preferred are compounds of formulae P2, P13, P17, P22, P23, P24, P30, P31 and P32.

Further preferred are trireactive compounds P15 to P30, in particular P17, P18, P19, P22, P23, P24, P25, P26, P30, P31 and P32.

In the compounds of formulae P1 to P32 the group

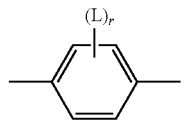

is preferably

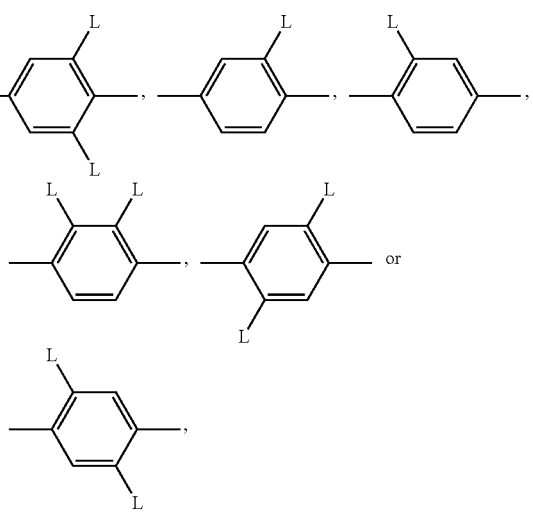

In which L on each occurrence, identically or differently, has one of the meanings given above or below, and is preferably F, Cl, CN, $NO_2$, $CH_3$, $C_2H_5$, $C(CH_3)_3$, CH($CH_3$)$_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, more preferably F, Cl, $CH_3$, $OCH_3$, $COCH_3$ oder $OCF_3$, especially F or $CH_3$.

The media according to the present invention comprise one or more chiral dopants. Preferably these chiral dopants have an absolute value of the helical twisting power (HTP) in the range of from 1 µm$^{-1}$ to 150 µm$^{-1}$, preferably in the range of from 10 µm$^{-1}$ to 100 µm$^{-1}$. In case the media comprise two or more chiral dopants, these may have opposite signs of their HTP-values. This condition is preferred for some specific embodiments, as it allows to compensate the chirality of the respective compounds to some degree and, thus, may be used to compensate various temperature dependent properties of the resulting media in the devices. Generally, however, it is preferred that most, preferably all of the chiral compounds present in the media according to the present invention have the same sign of their HTP-values.

Preferably the chiral dopants present in the media according to the instant application are mesogenic compounds and most preferably they exhibit a mesophase on their own.

In a preferred embodiment of the present invention, the medium comprises two or more chiral compounds which all have the same algebraic sign of the HTP.

The temperature dependence of the HTP of the individual compounds may be high or low. The temperature dependence of the pitch of the medium can be compensated by mixing compounds having different temperature dependencies of the HTP in corresponding ratios.

For the optically active component, a multitude of chiral dopants, some of which are commercially available, is available to the person skilled in the art, such as, for example, cholesteryl nonanoate, R- and S-811, R- and S-1011, R- and S-2011, R- and S-3011, R- and S-4011, or CB15 (all Merck KGaA, Darmstadt).

Particularly suitable dopants are compounds which contain one or more chiral groups and one or more mesogenic groups, or one or more aromatic or alicyclic groups which form a mesogenic group with the chiral group.

Suitable chiral groups are, for example, chiral branched hydrocarbon radicals, chiral ethane diols, binaphthols or dioxolanes, furthermore mono- or polyvalent chiral groups selected from the group consisting of sugar derivatives, sugar alcohols, sugar acids, lactic acids, chiral substituted glycols, steroid derivatives, terpene derivatives, amino acids or sequences of a few, preferably 1-5, amino acids.

Preferred chiral groups are sugar derivatives, such as glucose, mannose, galactose, fructose, arabinose and dextrose; sugar alcohols, such as, for example, sorbitol, mannitol, iditol, galactitol or anhydro derivatives thereof, in particular dianhydrohexitols, such as dianhydrosorbide (1,4: 3,6-dianhydro-D-sorbide, isosorbide), dianhydromannitol (isosorbitol) or dianhydroiditol (isoiditol); sugar acids, such as, for example, gluconic acid, gulonic acid and ketogulonic acid; chiral substituted glycol radicals, such as, for example, mono- or oligoethylene or propylene glycols, in which one or more $CH_2$ groups are substituted by alkyl or alkoxy; amino acids, such as, for example, alanine, valine, phenylglycine or phenylalanine, or sequences of from 1 to 5 of these amino acids; steroid derivatives, such as, for example, cholesteryl or cholic acid radicals; terpene derivatives, such as, for example, menthyl, neomenthyl, campheyl, pineyl, terpineyl, isolongifolyl, fenchyl, carreyl, myrthenyl, nopyl, geraniyl, linaloyl, neryl, citronellyl or dihydrocitronellyl.

The media according to the present invention preferably comprise chiral dopants which are selected from the group of known chiral dopants. Suitable chiral groups and mesogenic chiral compounds are described, for example, in DE 34 25 503, DE 35 34 777, DE 35 34 778, DE 35 34 779 and DE 35 34 780, DE 43 42 280, EP 01 038 941 and DE 195 41 820. Examples are also compounds listed in Table F below.

Chiral compounds preferably used according to the present invention are selected from the group consisting of the formulae shown below.

Particular preference is given to chiral dopants selected from the group consisting of compounds of the following formulae A-1 to A-III and A-Ch:

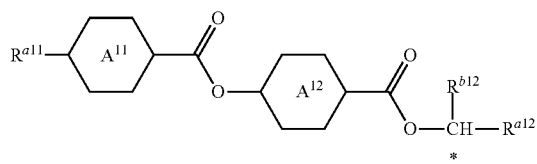

A-I

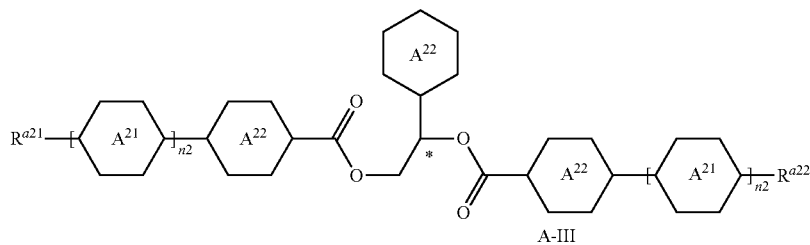

A-II

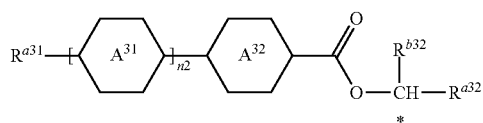

A-III

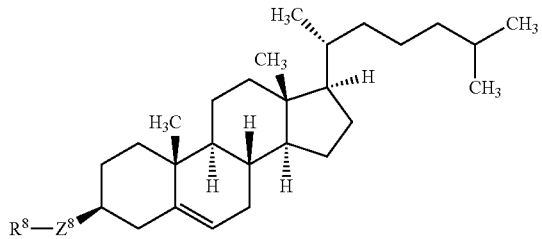

A-Ch in which $R^{a11}$, $R^{a12}$ and $R^{b12}$, independently of one another, denote alkyl having 1 to 15 C atoms, in which, in addition, one or more non-adjacent $CH_2$ groups may each be replaced, independently of one another, by —C($R^z$)═C($R^z$)—, —C≡C—, —O—, —S—, —CO—, —CO—O—, —O—CO— or —O—CO—O— in such a way that O and/or S atoms are not linked directly to one another, and in which, in addition, one or more H atoms may each be replaced by F, Cl, Br, I or CN, preferably alkyl, more preferably n-alkyl, with the proviso that $R^{a12}$ is different from $R^{b12}$ $R^{a21}$ and $R^{a22}$, independently of one another, denote alkyl having 1 to 15 C atoms, in which, in addition, one or more non-adjacent $CH_2$ groups may each be replaced, independently of one another, by —C($R^z$)═C($R^z$)—, —C≡C—, —O—, —S—, —CO—, —CO—O—, —O—CO— or —O—CO—O— in such a way that O and/or S atoms are not linked directly to one another, and in which, in addition, one or more H atoms may be replaced by F, C, Br, I or CN, preferably both are alkyl, more preferably n-alkyl, $R^{a31}$, $R^{a32}$ and $R^{b32}$, independently of one another, denote straight-chain or branched alkyl having 1 to 15 C atoms, in which, in addition, one or more non-adjacent CH$_2$ groups may each be replaced, independently of one another, by —C(R$^z$)=C(R$^z$)—, —C≡C—, —O—, —S—, —CO—, —CO—O—, —O—CO— or —O—CO—O— in such a way that O and/or S atoms are not linked directly to one another, and in which, in addition, one or more H atoms may be replaced by F, Cl, Br, I or CN, preferably alkyl, more preferably n-alkyl, with the proviso that R$^{a32}$ is different from R$^{b32}$;

R$^z$ denotes H, CH$_3$, F, Cl, or CN, preferably H or F,

R$^8$ has one of the meanings of R$^{a11}$ given above, preferably alkyl, more preferably n-alkyl having 1 to 15 C atoms, Z$^8$ denotes —C(O)O—, CH$_2$O, CF$_2$O or a single bond, preferably —C(O)O—, A$^{11}$ is defined as A$^{12}$ below, or alternatively denotes

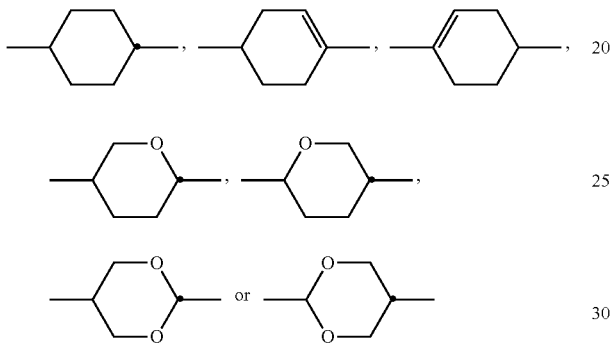

A$^{12}$ denotes

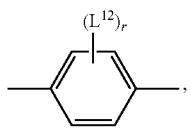

preferably

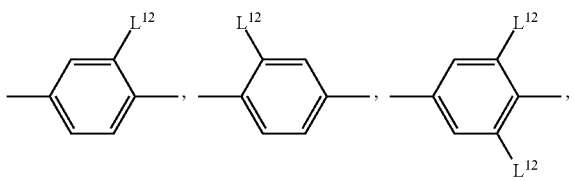

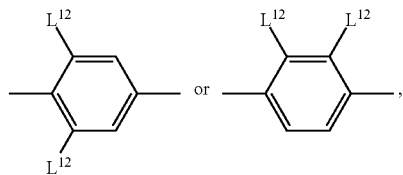

in which

L$^{12}$ on each occurrence, independently of one another, denotes halogen, CN, or alkyl, alkenyl, alkoxy or alkenyloxy having up to 12 C atoms and in which one or more H atoms are optionally replaced with halogen, preferably methyl, ethyl, C$_1$ or F, particularly preferably F, A$^{21}$ denotes

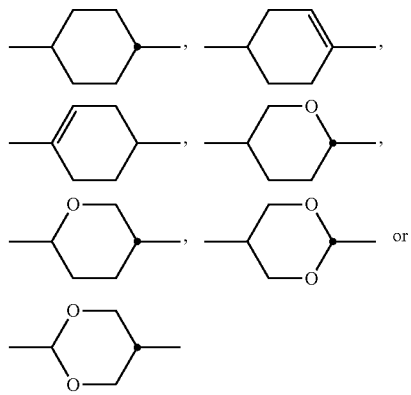

A$^{22}$ has the meanings given for A$^{12}$

A$^{31}$ has the meanings given for A$^{11}$, or alternatively denotes

A$^{32}$ has the meanings given for A$^{12}$.

n2 on each occurrence, identically or differently, is 0, 1 or 2, and n3 is 1, 2 or 3, and r is 0, 1, 2, 3 or 4.

Particular preference is given to dopants selected from the group consisting of the compounds of the following formulae:

A-I-1

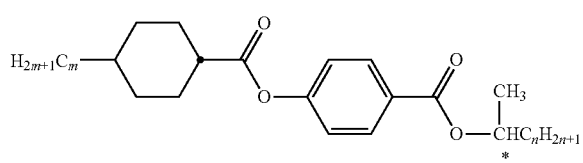

-continued

A-II-1

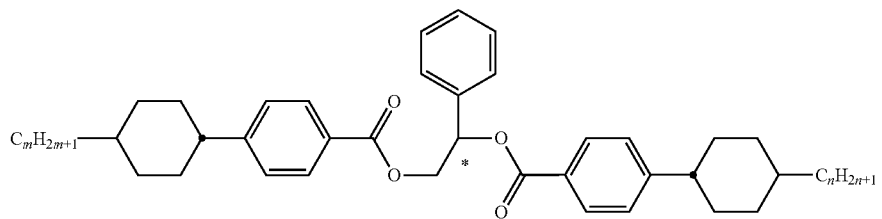

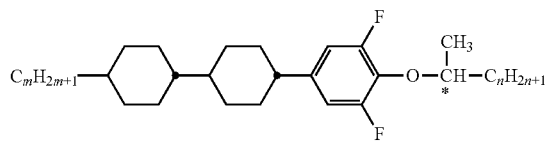
A-III-1

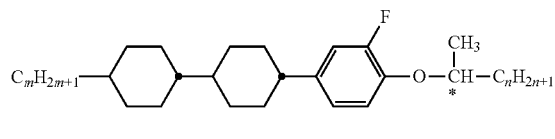
A-III-2

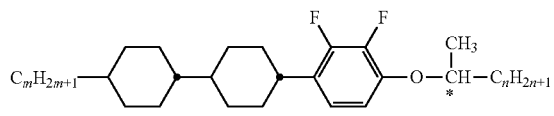
A-III-3

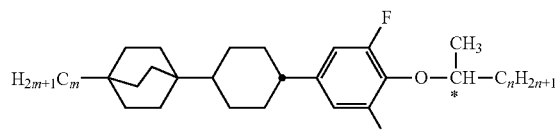
A-III-4

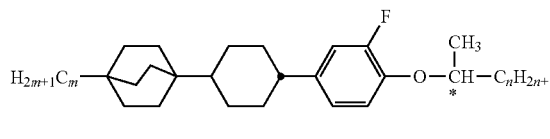
A-III-5 A-III-6

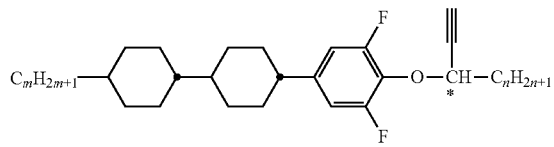
A-III-7 A-III-8

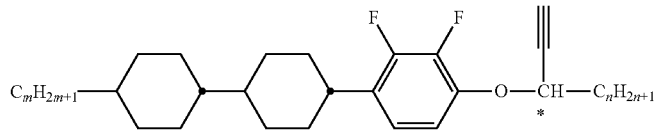
A-III-9 in which
m is, on each occurrence, identically or differently, an integer from 1 to 9 and
n is, on each occurrence, identically or differently, an integer from 2 to 9.

Particularly preferred compounds of formula A are compounds of formula A-III.

Further preferred dopants are derivatives of the isosorbide, isomannitol or isoiditol of the following formula A-IV:

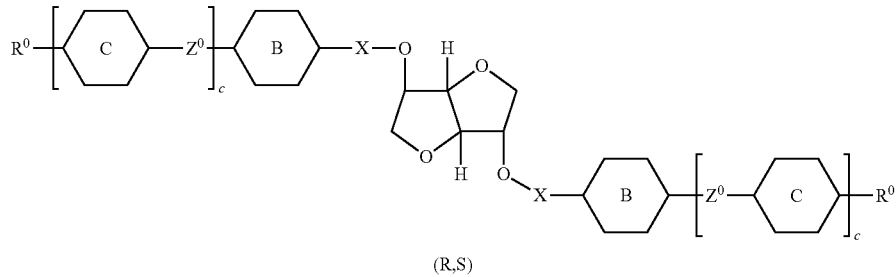
A-IV (R,S)

in which the group

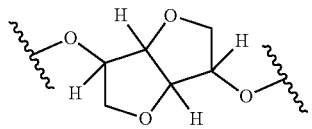 [SMILES: *OC1COC2C(O*)COC12]

is

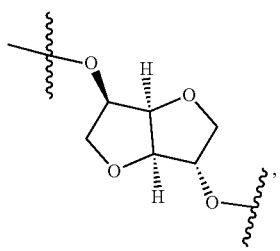
(dianhydrosorbitol)

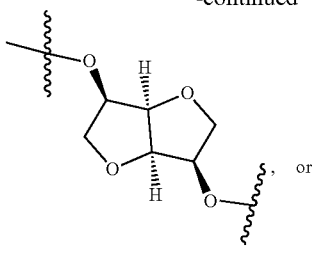
(dianhydromannitol)

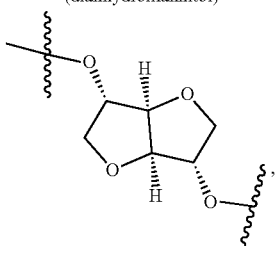
(dianhydroiditol), preferably dianhydrosorbitol,
and chiral ethane diols, such as, for example, diphenylethanediol (hydrobenzoin), in particular mesogenic hydrobenzoin derivatives of the following formula A-V:

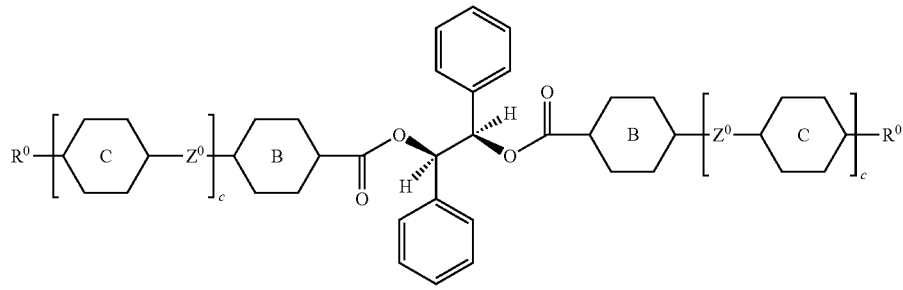
A-V including the (S,S) enantiomers, which are not shown, in which

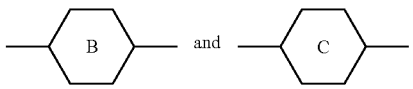

are each, independently of one another, 1,4-phenylene, which may also be mono-, di- or trisubstituted by L, or 1,4-cyclohexylene, L is H, F, Cl, CN or optionally halogenated alkyl, alkoxy, alkylcarbonyl, alkoxycarbonyl or alkoxycarbonyloxy having 1-7 carbon atoms, c is 0 or 1, X is $CH_2$ or $—C(O)—$, $Z^0$ is —COO—, —OCO—, —$CH_2CH_2$— or a single bond, and $R^0$ is alkyl, alkoxy, alkylcarbonyl, alkoxycarbonyl or alkylcarbonyloxy having 1-12 carbon atoms.

Examples of compounds of formula IV are:
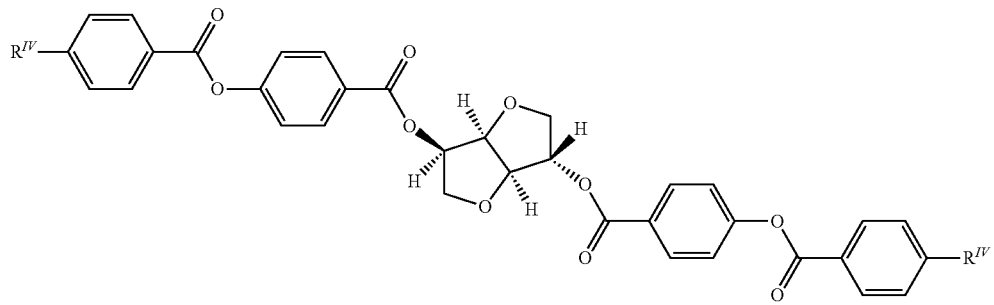
A-IV-1
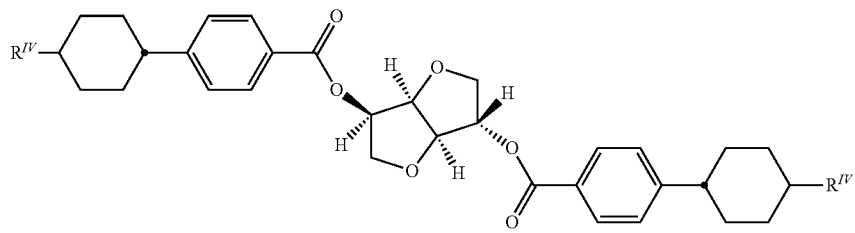
A-IV-2
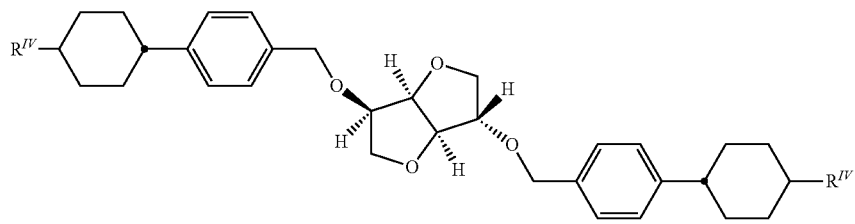
A-IV-3
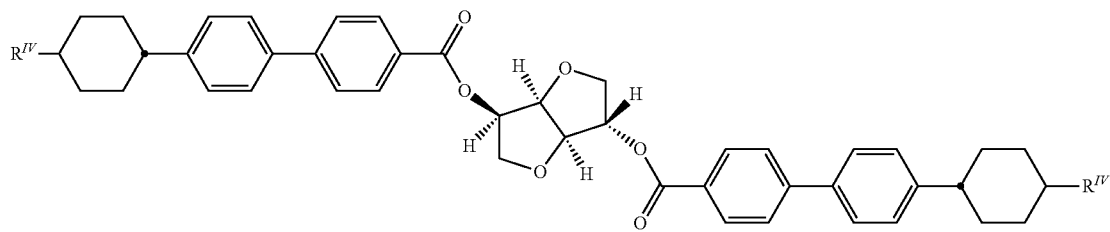
A-IV-4
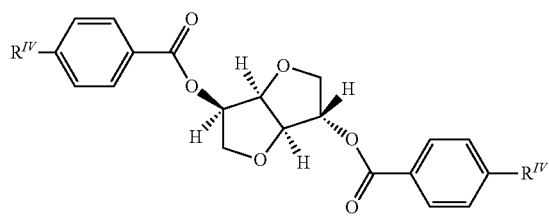
A-IV-5
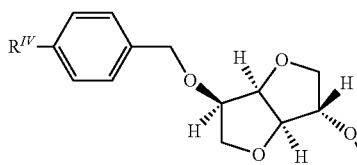
A-IV-6
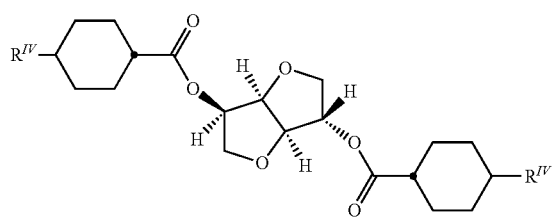
A-IV-7
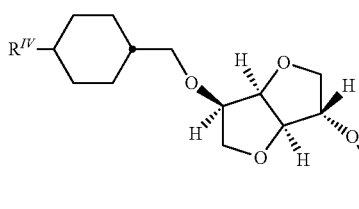
A-IV-8

The compounds of the formula A-IV are described in WO 98/00428. The compounds of the formula A-V are described in GB-A-2,328,207.

Very particularly preferred dopants are chiral binaphthyl derivatives, as described in WO 02/94805, chiral binaphthol acetal derivatives, as described in WO 02/34739, chiral TADDOL derivatives, as described in WO 02/06265, and chiral dopants having at least one fluorinated bridging group and a terminal or central chiral group, as described in WO 02/06196 and WO 02/06195.

Particular preference is given to chiral compounds of the formula A-VI

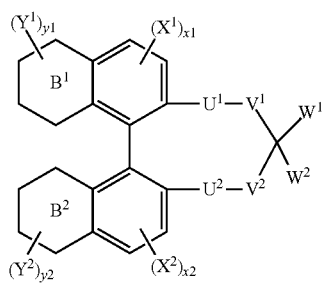

A-VI in which $X^1$, $X^2$, $Y^1$ and $Y^2$ are each, independently of one another, F, Cl, Br, I, CN, SCN, $SF_5$, straight-chain or branched alkyl having from 1 to 25 carbon atoms, which is unsubstituted or monosubstituted or polysubstituted by F, C, Br, I or CN and in which, in addition, one or more non-adjacent $CH_2$ groups may each, independently of one another, be replaced by —O—, —S—, —NH—, —NR$^x$—, —CO—, —COO—, —OCO—, —OCOO—, —S—CO—, —CO—S—, —CH=CH— or —C≡C— in such a way that O and/or S atoms are not bonded directly to one another, a polymerisable group or cycloalkyl or aryl having up to 20 carbon atoms, which may optionally be monosubstituted or polysubstituted by halogen, preferably F, or by a polymerisable group, $x^1$ and $x^2$ are each, independently of one another, 0, 1 or 2, $y^1$ and $y^2$ are each, independently of one another, 0, 1, 2, 3 or 4, $B^1$ and $B^2$ are each, independently of one another, an aromatic or partially or fully saturated aliphatic six-membered ring in which one or more CH groups may each be replaced by N and one or more non-adjacent $CH_2$ groups may each be replaced by O or S, $W^1$ and $W^2$ are each, independently of one another, —$Z^1$-$A^1$-($Z^2$-$A^2$)$_m$-R, and one of the two is alternatively $R^1$ or $A^3$, but both are not simultaneously H, or

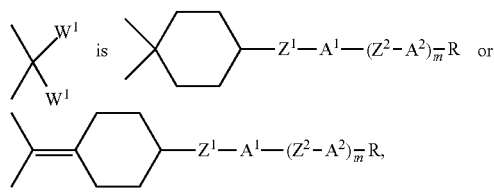

$U^1$ and $U^2$ are each, independently of one another, $CH_2$, O, S, CO or CS, $V^1$ and $V^2$ are each, independently of one another, $(CH_2)_n$, in which from one to four non-adjacent $CH_2$ groups may each be replaced by O or S, and one of $V^1$ and $V^2$ and, in the case where

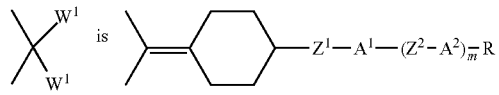

both are a single bond, n is 1, 2 or 3

$Z^1$ and $Z^2$ are each, independently of one another, —O—, —S—, —CO—, —COO—, —OCO—, —O—COO—, —CO—NR$^x$—, —NR$^x$—CO—, —O—$CH_2$—, —$CH_2$—O—, —S—$CH_2$—, —$CH_2$—S—, —$CF_2$—O—, —O—$CF_2$—, —$CF_2$—S—, —S—$CF_2$—, —$CH_2$—$CH_2$—, —$CF_2$—$CH_2$—, —$CH_2$—$CF_2$—, —$CF_2$—$CF_2$—, —CH=N—, —N=CH—, —N=N—, —CH=CH—, —CF=CH—, —CH=CF—, —CF=CF—, —C≡C—, a combination of two of these groups, where no two O and/or S and/or N atoms are bonded directly to one another, preferably —CH=CH—COO—, or —COO—CH=CH—, or a single bond, $R^x$ denotes alkyl having 1 to 6 C atoms, $A^1$, $A^2$ and $A^3$ are each, independently of one another, 1,4-phenylene, in which one or two non-adjacent CH groups may each be replaced by N, 1,4-cyclohexylene, in which one or two non-adjacent $CH_2$ groups may each be replaced by O or S, 1,3-dioxolane-4,5-diyl, 1,4-cyclohexenylene, 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, where each of these groups may be monosubstituted or polysubstituted by L, and in addition $A^1$ can be a single bond, L is a halogen atom, preferably F, CN, $NO_2$, alkyl, alkoxy, alkylcarbonyl, alkoxycarbonyl or alkoxycarbonyloxy having 1-7 carbon atoms, in which one or more H atoms may each be replaced by F or C, m is in each case, independently, 0, 1, 2 or 3, and R and $R^1$ are each, independently of one another, H, F, C, Br, I, CN, SCN, $SF_5$, straight-chain or branched alkyl having from 1 or 3 to 25 carbon atoms respectively, which may optionally be monosubstituted or polysubstituted by F, C, Br, I or CN, and in which one or more non-adjacent $CH_2$ groups may each be replaced by —O—, —S—, —NH—, —NR$^o$—, —CO—, —COO—, —OCO—, —O—COO—, —S—CO—, —CO—S—, —CH=CH— or —C≡C—, where no two O and/or S atoms are bonded directly to one another, or a polymerisable group.

Particular preference is given to chiral binaphthyl derivatives of the formula A-VI-1

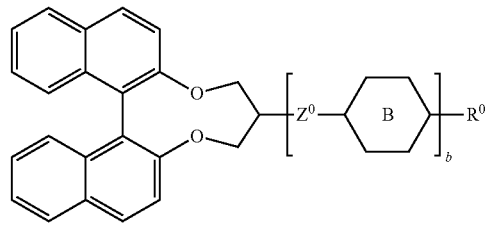

A-VI-1 in which ring B, $R^0$ and $Z^0$ are as defined for the formulae A-IV and A-V, and b is 0, 1, or 2, in particular those selected from the following formulae A-VI-1a to A-VI-1c:

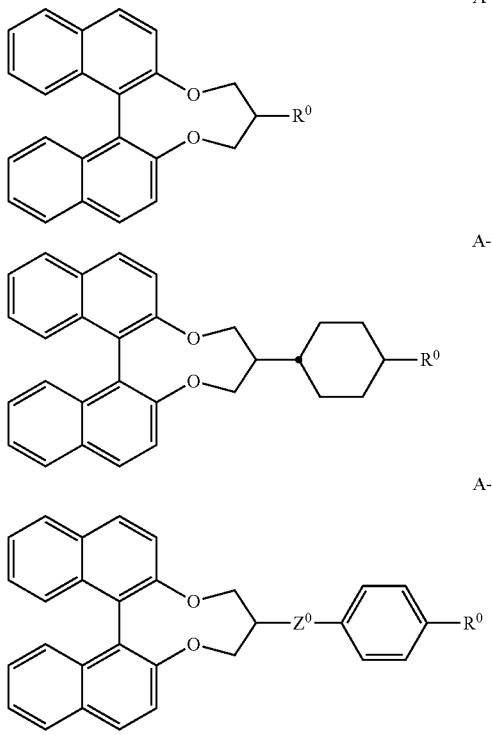

A-VI-1a

A-VI-1b

A-VI-1c in which ring B, $R^0$ and $Z^0$ are as defined for the formula A-VI-1, and $R^0$ as defined for formula A-IV or H or alkyl having from 1 to 4 carbon atoms, and b is 0, 1 or 2, and $Z^0$ is, in particular, —OC(O)— or a single bond.

The concentration of the one or more chiral dopant(s), in the LC medium is preferably in the range from 0.001% to 20%, preferably from 0.05% to 5%, more preferably from 0.1% to 2%, and, most preferably from 0.5% to 1.5%. These preferred concentration ranges apply in particular to the chiral dopant S-4011 or R-4011 (both from Merck KGaA) and for chiral dopants having the same or a similar HTP. For Chiral dopants having either a higher or a lower absolute value of the HTP compared to S-4011 these preferred concentrations have to be decreased, respectively increased proportionally according to the ratio of their HTP values relatively to that of S-4011.

The pitch p of the LC media or host mixtures according to the invention is preferably in the range of from 5 to 50 µm, more preferably from 8 to 30 m and particularly preferably from 10 to 20 µm.

Preferably, the media according to the invention, comprise a stabilizer selected from the group of compounds of the formulae ST-1 to ST-19.

ST-1

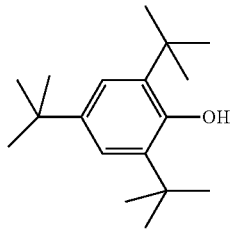

ST-2

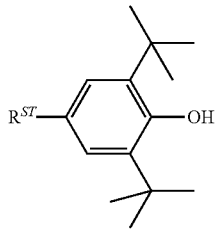

ST-3

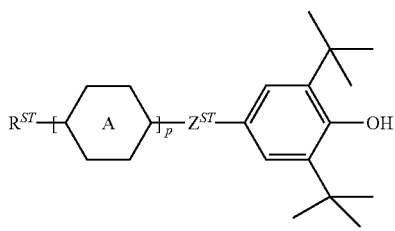

ST-4

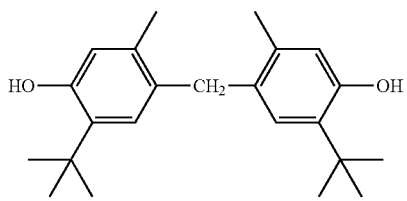

-continued
ST-5
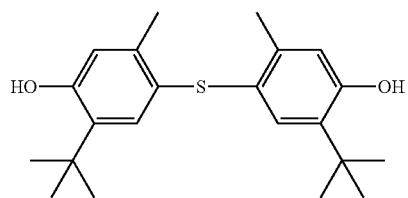
ST-6
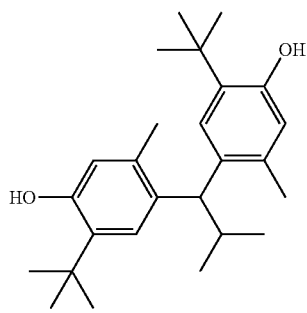
ST-7
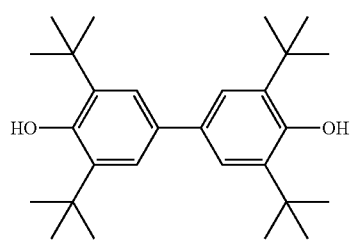
ST-8
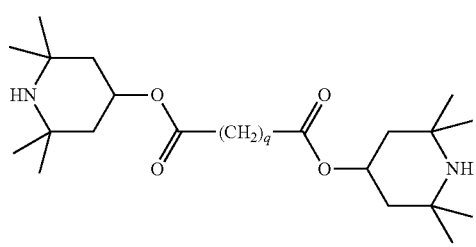
ST-9
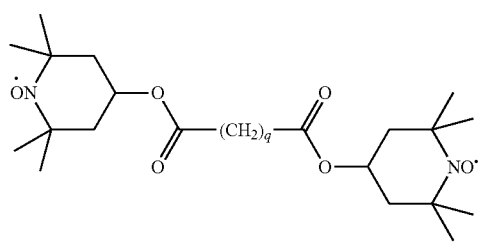
ST-10
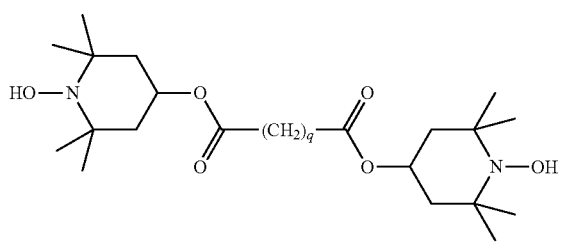
ST-11
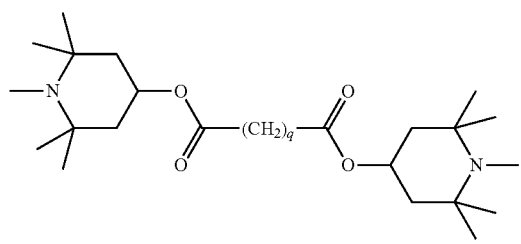
ST-12
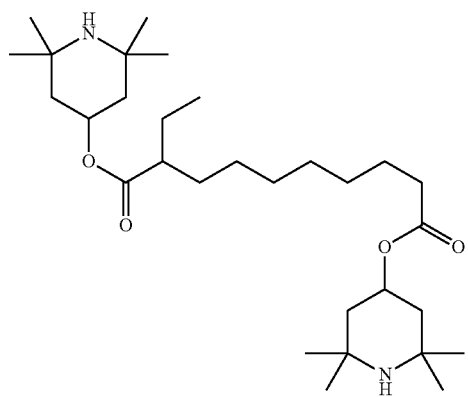
ST-13
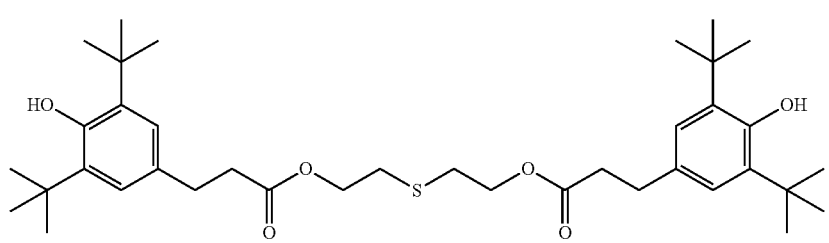

-continued
ST-14
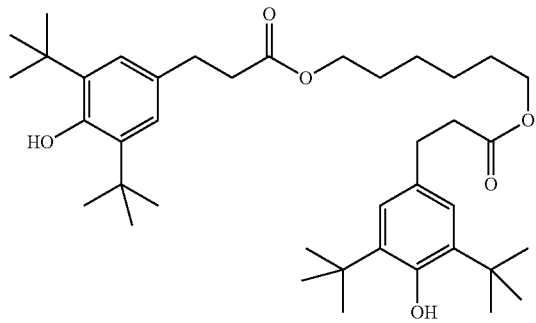
ST-15
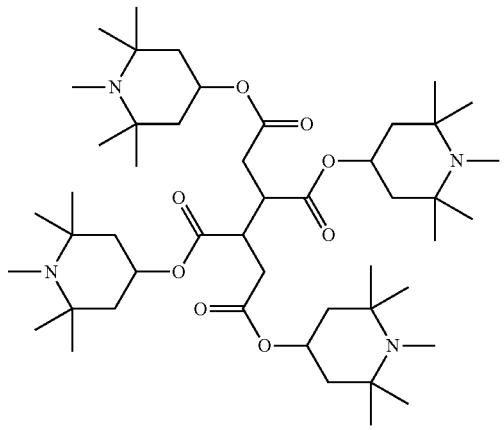
ST-16
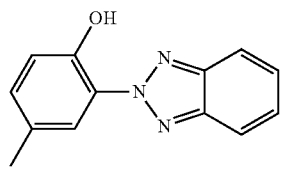
ST-17
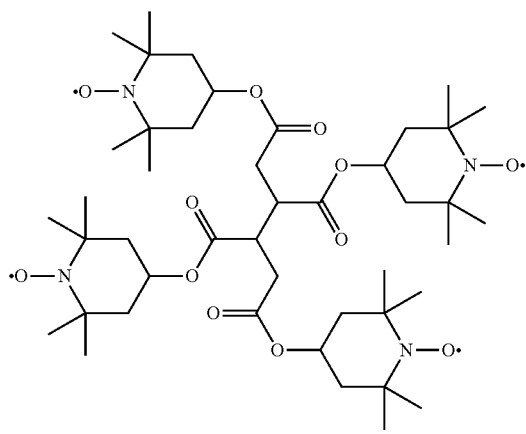
ST-18
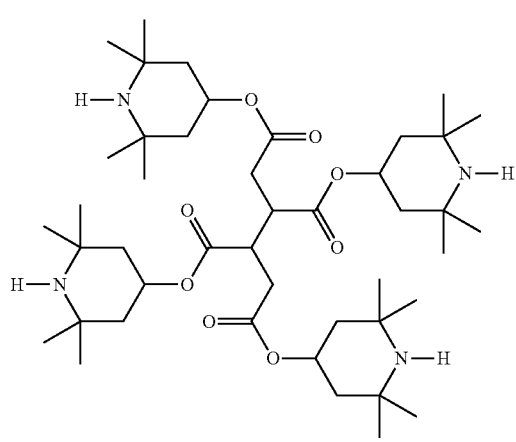

ST-19
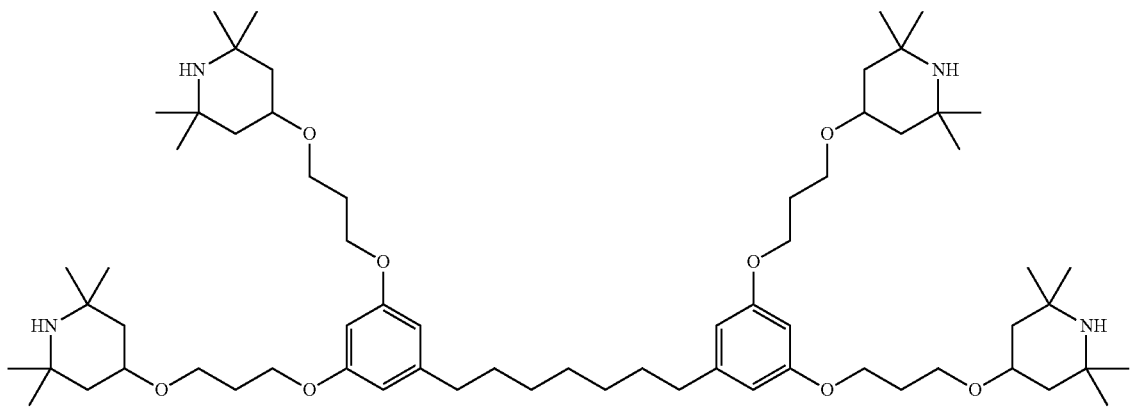
in which
R$^{ST}$ denotes H, an alkyl or alkoxy radical having 1 to 15 C atoms, where, in addition, one or more CH$_2$ groups in these radicals may each be replaced, independently of one another, by —C≡C—, —CF$_2$O—, —OCF$_2$—, —CH=CH—,
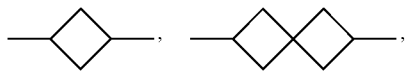
—O—, —CO—O—, —O—CO— in such a way that O atoms are not linked directly to one another, and in which, in addition, one or more H atoms may be replaced by halogen,
denotes
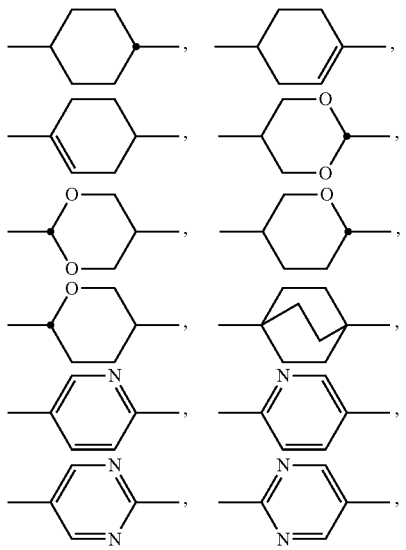
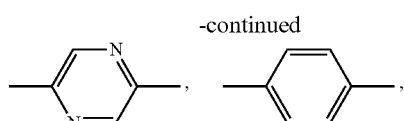
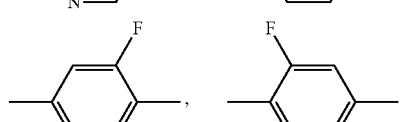
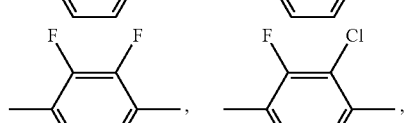
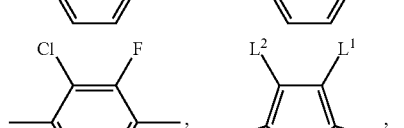
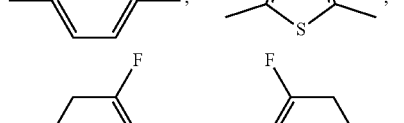
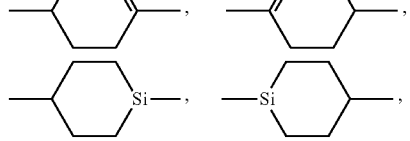
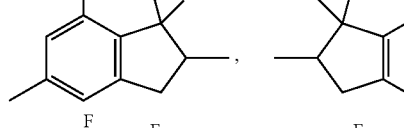

-continued

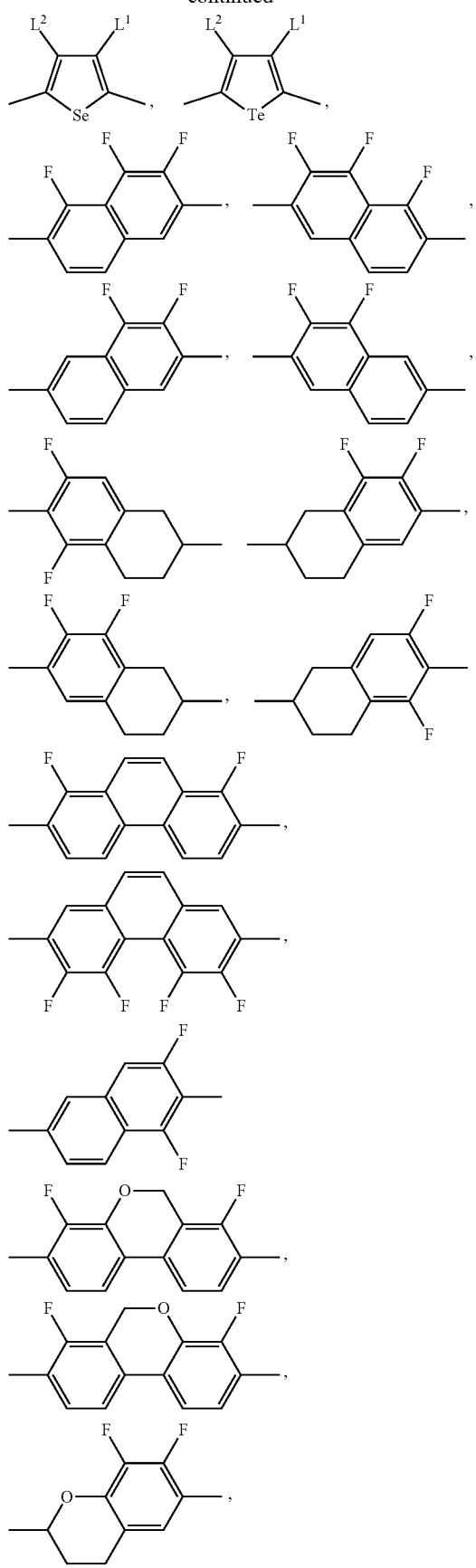

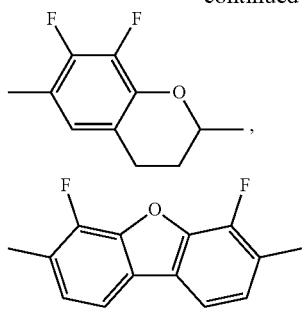

$Z^{ST}$ each, independently of one another, denote —CO—O—, —O—CO—, —CF$_2$O—, —OCF$_2$—, —CH$_2$O—, —OCH$_2$—, —CH$_2$—, —CH$_2$CH$_2$—, —(CH$_2$)$_4$—, —CH═CH—CH$_2$O—, —C$_2$F$_4$—, —CH$_2$CF$_2$—, —CF$_2$CH$_2$—, —CF═CF—, —CH═CF—, —CF═CH—, —CH═CH—C≡C— or a single bond, $L^1$ and $L^2$ each, independently of one another, denote F, Cl, CF$_3$ or CHF$_2$, p denotes 1 or 2, q denotes 1, 2, 3, 4, 5, 6, 7, 8, 9 or 10.

Of the compounds of the formula ST, special preference is given to the compounds of the formulae

ST-1

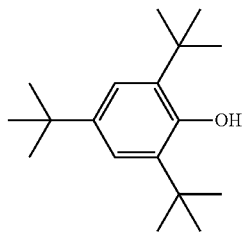

ST-2a

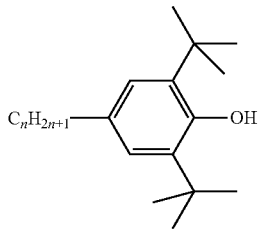

in which n=1, 2, 3, 4, 5, 6 or 7, preferably n=1 or 7

ST-3a

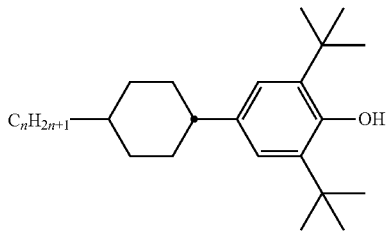

in which n=1, 2, 3, 4, 5, 6 or 7, preferably n=3

ST-3b
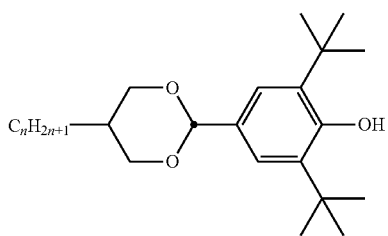
in which n=1, 2, 3, 4, 5, 6 or 7, preferably n=3
ST-8-1
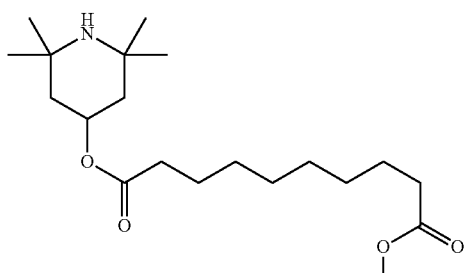
ST-9-1
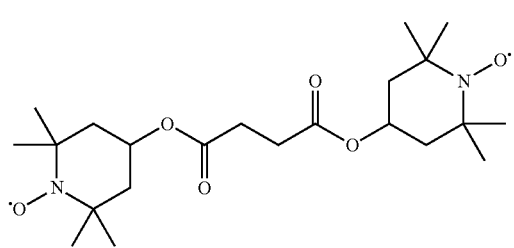
ST-12
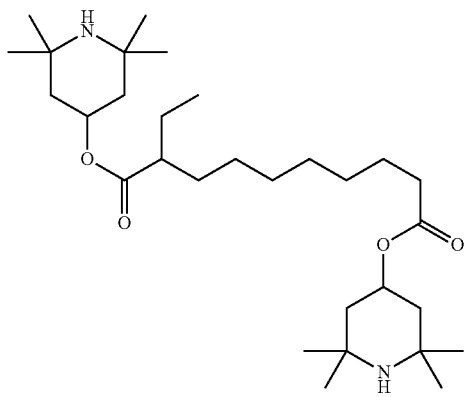
ST-16
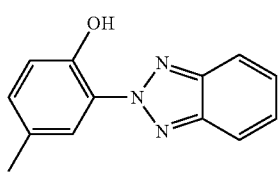
ST-17
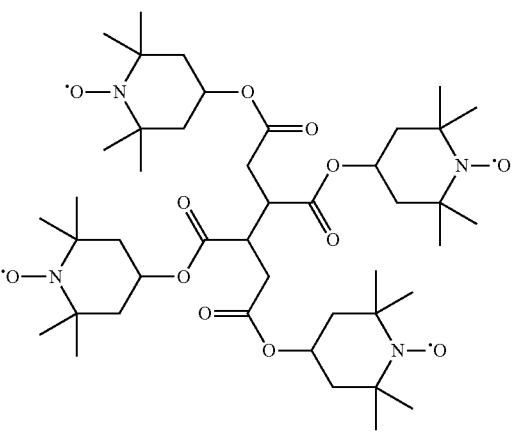
ST-18
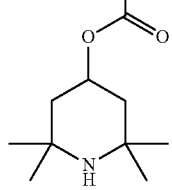
In the compounds of the formulae ST-3a and ST-3b, n preferably denotes 3. In the compounds of the formula ST-2a, n preferably denotes 7. Very particularly preferred mixtures according to the invention comprise one or more stabilizers from the group of the compounds of the formulae ST-2a-1, ST-3a-1, ST-3b-1, ST-8-1, ST-9-1 and ST-12:
ST-2a-1
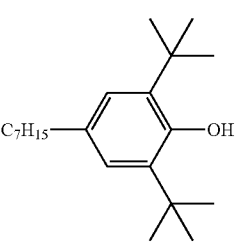
ST-3a-1
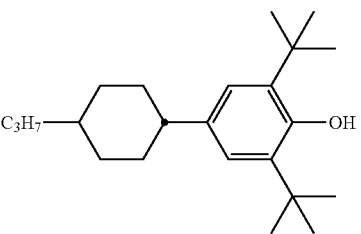

ST-3b-1

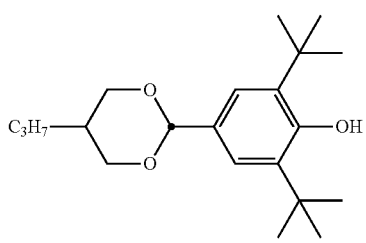

ST-8-1

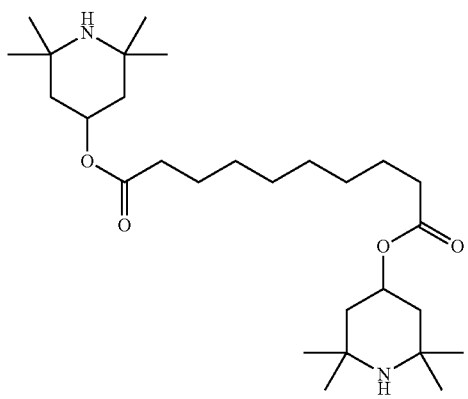

ST-9-1

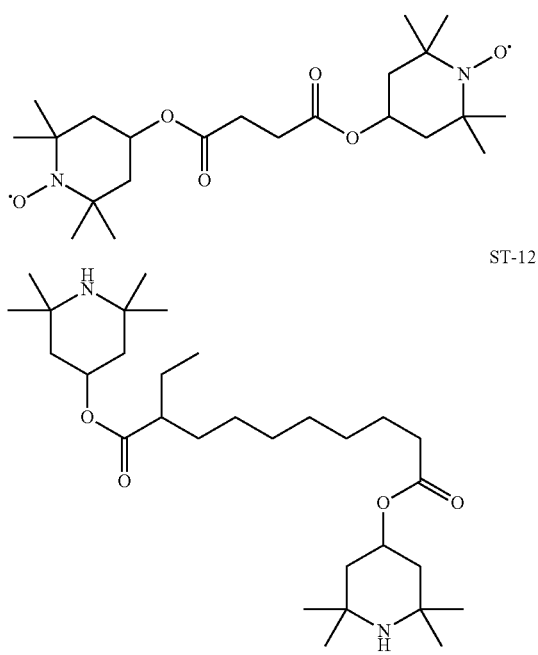

ST-12

The compounds of the formulae ST-1 to ST-19 are preferably each present in the liquid-crystal mixtures according to the invention in amounts of 0.005-0.5%, based on the mixture.

If the mixtures according to the invention comprise two or more compounds from the group of the compounds of the formulae ST-1 to ST-18, the concentration correspondingly increases to 0.01-1% in the case of two compounds, based on the mixtures.

However, the total proportion of the compounds of the formulae ST-1 to ST-18, based on the mixture according to the invention, should not exceed 2%.

The mixtures according to the invention comprise
one or more compounds of formula I, preferably of formula 1-1 and I-2, preferably in a total concentration in the range of from >0% to 30%, more preferably, from 2% to 25% or 3% to 23%, particularly preferably from 5% to 22%; The mixtures according to the invention preferably comprise one or more compounds of formulae-1 in a total concentration in the range of from 1% to 20%, preferably 4% to 15%, in particular from 5% to 12%;
and/or
one or more compounds of formula I-2 in a total concentration in the range of from 3% to 30%, preferably 4% to 25%, in particular from 5% to 22%;
and/or
one or more compounds of formula II and/or IIA-1 and/or IIA-2, preferably of formula II-2 and/or II-3, preferably in a total concentration in the range of from 2% to 25%, more preferably from 6% to 23%, particularly preferably from 7% to 20%;
and/or
one or more compounds of formula IIIA, preferably in a total concentration in the range of from 2% to 30%, more preferably from 3% to 25%, particularly preferably from 4% to 20%;
and/or
one or more compounds of formulae IIIA and IIIB, preferably in a total concentration in the range of from 8% to 35%, more preferably from 12% to 30%, particularly preferably from 15% to 26%;
and/or
one or more compounds of formula IIID, preferably in a total concentration in the range of from 5% to 45%, more preferably from 8% to 40%, particularly preferably from 10% to 35%;
and/or
one or more compounds of formulae IIIA and IID, preferably in a total concentration in the range of from 8% to 35%, more preferably from 12% to 30%, particularly preferably from 15% to 26%;
and/or
one or more compounds of formula IV, preferably in a total concentration in the range of from 35% to 75%, more preferably from 40% to 65%, particularly preferably from 45% to 55%;
and/or
one or more compounds of formula IV and IVb, preferably in a total concentration in the range of from 15% to 70%, more preferably from 20% to 65%, particularly preferably from 25% to 60%;
and/or
one or more compounds of formula IIA-Y, preferably in a total concentration in the range of from >0% to 10%, more preferably from 0.5% to 7%, in particular from 1% to 5%.

Preferably, the medium comprises one or more compounds selected from the group consisting of the formulae I, II, IIA-1, IIA-2, III and IV in a total concentration in the range of from 80% to 100% or 85% to 99%, more preferably from 90% to 98%, in particular from 93% to 97%.

In particular, the medium comprises
one or more compounds CY-n-Om, in particular CY-3-O4, CY-5-O4 and/or CY-3-O2, preferably in a total concentration in the range of from 1% to 20%, preferably 2% to 15%, very preferably 3 to 10% or 3 to 8%;
and/or
CPY-n-Om, in particular CPY-2-O2, CPY-3-O2 and/or CPY-5-O2, preferably in concentrations>5%, in particular 7% to 20%,
and/or
one or more compounds CCY-n-Om, preferably CCY-4-O2, CCY-3-O2, CCY-3-O3, CCY-3-O1 and/or CCY-5-O2, preferably in concentrations>3%, in particular 5 to 15%,
and/or CLY-n-Om, preferably CLY-2-O4, CLY-3-O2 and/or CLY-3-O3, preferably in concentrations>5%, in particular 15 to 30%, very preferably 20 to 25%, based on the mixture as a whole;
and/or
CLY-n-Om and PY-n-Om, preferably CLY-3-O2 and/or CLY-3-O3 and/or CLY-4-O2 and PY-3-O2 and/or PY-1-O2, preferably in concentrations of 5 to 35%, more preferably 15 to 33% to based on the mixture as a whole, and/or
CC-V-V, preferably in concentrations of 5 to 50%, based on the mixture as a whole.
and/or
the compound(s) of the formula CC-3-V1 and/or CC-4-V1, in a total concentration in the range of from 5 to 40%, more preferably from 15% to 35%, particularly preferably from 20% to 30%,
and/or
one or more compounds of formula B-nO-Om and/or B(S)-nO-Om, in particular the compound B(S)-2O-O5, preferably in a concentration in the range of from 2 to 10%, and the compound CC-3-V1 and/or the compound CC-4-V1 in a total concentration in the range of from 10 to 30%, preferably 15 to 20%.
and/or
0.1% to 3% of the compound PPGU-3-F
and/or
>0% to 10%, preferably 4% to 8% of the compound PGIY-nO-Om.

The invention furthermore relates to an electro-optical display having active-matrix addressing, characterised in that it contains, as dielectric, a liquid-crystalline medium according to claim 1 and wherein the display is a VA, SA-VA, IPS, U-IPS, FFS, UB-FFS, SA-FFS, PS-VA, PS-OCB, PS-IPS, PS-FFS, PS-UB-FFS, PS-posi-VA, PS-TN, polymer stabilised SA-VA or polymer stabilised SA-FFS display.

It is advantageous for the liquid-crystalline medium according to the invention to preferably have a nematic phase from −20° C. to >70° C., particularly preferably from −30° C. to >80° C., very particularly preferably from −40° C. to >90° C.

The medium according to the invention has a clearing temperature of 70° C. or 75° C. or more, preferably of 80° C. or more, more preferably of 85° C. or 90° C. or more in particular of 95° C. or more.

The liquid-crystal mixture preferably has a nematic phase range of at least 60 K and a flow viscosity $v_{20}$ of at most 30 mm$^2\cdot$s$^{-1}$ at 20° C.

The mixture is nematic at a temperature of −20° C. or less, preferably at −30° C. or less, very preferably at −40° C. or less.

The expression "have a nematic phase" here means on the one hand that no smectic phase and no crystallisation are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the medium is referred to as stable at this temperature.

At temperatures of −30° C. and −40° C., the corresponding times are 500 h and 250 h respectively. At high temperatures, the clearing point is measured by conventional methods in capillaries.

The values of the birefringence Δn in the liquid-crystal mixture are generally between 0.07 and 0.16, preferably between 0.08 and 0.15, very preferably between 0.09 and 0.14.

In a preferred embodiment of the present invention, the medium has a birefringence in the range of from 0.085 to 0.105, preferably from 0.090 to 0.100, in particular from 0.092 to 0.094.

In another preferred embodiment, the medium has a birefringence in the range of from 0.095 to 0.106, preferably from 0.100 to 0.105, in particular from 0.101 to 0.103.

The liquid-crystal mixture according to the invention has a dielectric anisotropy Δε of −1.5 to −8.0, preferably of −2.7 to −5.0, in particular −3.3 to −4.8.

The rotational viscosity $\gamma_1$ at 20° C. is preferably ≤160 mPa·s, in particular ≤130 mPa·s.

The medium according to the invention has an average elastic constant $K_{avg}$ of 15 or more, preferably 15.3 or more, very preferably 15.4 or more, in particular 15.5 or 15.6 more.

The medium according to the invention has a value $\gamma_1/K_1$ of 7.9 or 7.8 or 7.7 or 7.6 or less, preferably 7.0 or less, more preferably 6.9 or less, in particular 6.8 or less.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a Δε>1.5, the term "dielectrically neutral compounds" denotes those having −1.5≤Δε≤1.5 and the term "dielectrically negative compounds" denotes those having Δε<−1.5. The dielectric anisotropy of the compounds is determined here by dissolving 10% of the compounds in a liquid-crystalline host and determining the capacitance of the resultant mixture in at least one test cell in each case having a layer thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

All temperature values indicated for the present invention are in ° C.

The mixtures according to the invention are suitable for all VA-TFT applications, such as, for example, VAN, MVA, (S)-PVA, ASV, PSA (polymer sustained VA) and PS-VA (polymer stabilized VA). They are furthermore suitable for IPS (in-plane switching) and FFS (fringe field switching) applications having negative Δε.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of −0.5. Besides one or more compounds of the formula I, it preferably comprises the compounds of the formulae IIIA, IIIB and/or IIIC, furthermore one or more compounds of the formula IV-1.

The proportion of component A is preferably between 45 and 100%, in particular between 60 and 85%.

For component A, one (or more) individual compound(s) which has (have) a value of
Δε≤−0.8 is (are) preferably selected. This value must be more negative, the smaller the proportion A in the mixture as a whole.

Component B has pronounced nematogeneity and a flow viscosity of not greater than 30 mm$^2\cdot$s$^{-1}$, preferably not greater than 25 mm$^2\cdot$s$^{-1}$, at 20° C.

A multiplicity of suitable materials is known to the person skilled in the art from the literature. Particular preference is given to compounds of the formula O-17.

Particularly preferred individual compounds in component B are extremely low-viscosity nematic liquid crystals having a flow viscosity of not greater than 18 mm² s⁻¹, preferably not greater than 12 mm²·s⁻¹, at 20° C.

Component B is monotropically or enantiotropically nematic, has no smectic phases and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

The mixture may optionally also comprise a component C, comprising compounds having a dielectric anisotropy of $\Delta\varepsilon \geq 1.5$. These so-called positive compounds are generally present in a mixture of negative dielectric anisotropy in amounts of 20% by weight, based on the mixture as a whole.

| G denotes | —CH=CH— | —N(O)=N— |
|---|---|---|
| | —CH=CQ— | —CH=N(O)— |
| | —C≡C— | —CH₂—CH₂— |
| | —CO—O— | —CH₂—O— |
| | —CO—S— | —CH₂—S— |
| | —CH=N— | —COO-Phe-COO— |
| | —CF₂O— | —CF=CF— |
| | —OCF₂— | —OCH₂— |
| | —(CH₂)₄— | —(CH₂)₃O— |

Besides one or more compounds of the formula I and formula II, the medium preferably comprises 4 to 15, in particular 5 to 12, and particularly preferably <10, compounds of the formulae IIIA, IIIB and/or IIIC and optionally one or more compounds of the formula IV-1 Besides compounds of the formula IIIB and the compounds of the formulae IIIA, IIIB and/or IIIC and optionally IV-1, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolanes and substituted cinnamic acid esters.

The most important compounds which are suitable as constituents of liquid-crystal phases of this type can be characterised by the formula IV $$R^{20}\text{-L-G-E-}R^{21} \qquad \text{IV}$$

in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline, or a C—C single bond, Q denotes halogen, preferably chlorine, or —CN, and $R^{20}$ and $R^{21}$ each denote alkyl, alkenyl, alkoxy, alkoxyalkyl or alkoxycarbonyloxy having up to 18, preferably up to 8, carbon atoms, or one of these radicals alternatively denotes CN, NC, NO₂, NCS, CF₃, SF₅, OCF₃, F, Cl or Br.

In most of these compounds, $R^{20}$ and $R^{21}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS or FFS mixture according to the invention may also comprise compounds in which, for example, H, N, O, Cl and F have been replaced by the corresponding isotopes.

The compounds of formula P are optionally added to the mixtures according to the invention in concentrations of preferably 0.01 to 5% by weight, particularly preferably 0.2 to 2% by weight, based on the mixture. These mixtures may optionally also comprise an initiator, as described, for example, in U.S. Pat. No. 6,781,665. The initiator, for example Irganox-1076 from BASF, is preferably added to the mixture comprising polymerisable compounds in amounts of 0 to 1%. Mixtures of this type can be used for so-called polymer-stabilised VA modes (PS-VA) or PSA (polymer sustained VA), in which polymerisation of the reactive mesogens is intended to take place in the liquid-crystalline mixture after filling of a display panel. The prerequisite for this is that the liquid-crystalline compounds of the LC host do not react under the polymerisation conditions of the reactive mesogens, i.e. generally on exposure to UV in the wavelength range from 320 to 360 nm. Liquid-crystalline compounds containing an alkenyl side chain, such as, for example, CC-3-V, exhibit no reaction under the polymerisation conditions (UV polymerisation) for the RMs, hence, herein, such compounds are not to be considered as RMs.

The compounds according to the present invention can be synthesized by or in analogy to known methods described in the literature (for example in the standard works such as Houben-Weyl, Methoden der Organischen Chemie [Methods of Organic Chemistry], Georg-Thieme-Verlag, Stuttgart), under reaction conditions which are known and suitable for said reactions. Use may also be made here of variants which are known per se, but are not mentioned here. In particular, they can be prepared as described in or in analogy to the following reaction schemes.

Further methods for preparing the inventive compounds can be taken from the examples.

Other mesogenic compounds which are not explicitly mentioned above can optionally and advantageously also be used in the media in accordance with the present invention. Such compounds are known to the person skilled in the art.

The following examples explain the present invention without limiting it. However, they show the person skilled in the art preferred mixture concepts with compounds preferably to be employed and the respective concentrations thereof and combinations thereof with one another. In addition, the examples illustrate the properties and property combinations that are accessible.

For the present invention and in the following examples, the structures of the liquid-crystal compounds are indicated by means of acronyms, with the transformation into chemical formulae taking place in accordance with Tables A to C below. All radicals $C_nH_{2n+1}$, $C_mH_{2m+1}$, and $C_lH_{2l+1}$ or $C_nH_{2n}$, $C_mH_{2m}$ and $C_lH_{2l}$ are straight-chain alkyl radicals or alkylene radicals, in each case having n, m and l C atoms respectively. Preferably n, m and l are independently of each other 1, 2, 3, 4, 5, 6, or 7. Table A shows the codes for the ring elements of the nuclei of the compound, Table B lists the bridging units, and Table C lists the meanings of the symbols for the left- and right-hand end groups of the molecules. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A
| | Ring elements | | |
|---|---|---|---|
| C |  | | |
| D | 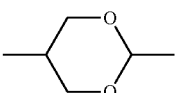 | Dl | 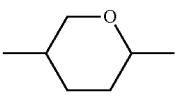 |
| A | 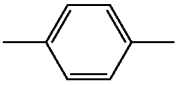 | Al | 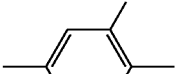 |
| P | 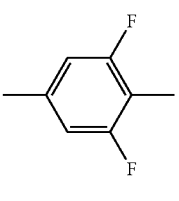 | | |
| G | 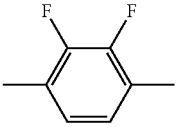 | Gl | 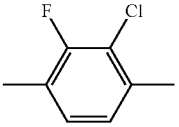 |
| U | 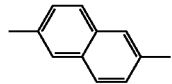 | Ul | 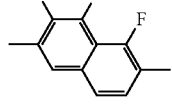 |
| Y | 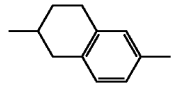 | | |
| P(F,Cl)Y | 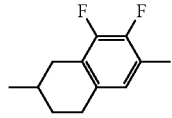 | P(Cl,F)Y | 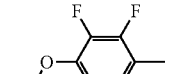 |
| np | 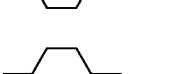 | | |
| n3f | 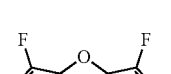 | nN3fl | 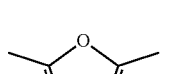 |
| th | 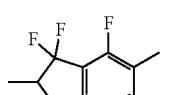 | thl | 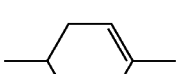 |
| tH2f | 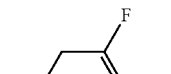 | tH2fl | 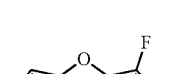 |
TABLE A-continued
| | Ring elements | | |
|---|---|---|---|
| o2f |  | o2fl | 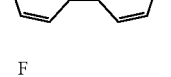 |
| dh | 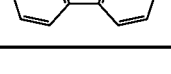 | | |
| B | | | |
| O | | S | |
| K | | Kl | |
| L | | Ll | |
| F | | Fl | |
| Bh | | Bh(S) | |
| Bf | | Bf(S) | |
| Bfi | | Bfi(S) | |
TABLE B
| Bridging units | |
|---|---|
| E | —CH$_2$—CH$_2$— |
| V | —CH═CH— |
| T | —C≡C— |
| W | —CF$_2$—CF$_2$— |
| B | —CF═CF— |
| Z | —CO—O— |
| X | —CF═CH— |
| O | —CH$_2$—O— |
| Q | —CF$_2$—O— |
| Zl | —O—CO— |
| Xl | —CH═CF— |
| Ol | —O—CH$_2$— |
| Ql | —O—CF$_2$— |

TABLE C

| End groups | | | |
|---|---|---|---|
| On the left individually or in combination | | On the right individually or in combination | |
| -n- | $C_nH_{2n+1}$— | -n | —$C_nH_{2n+1}$ |
| —nO— | $C_nH_{2n+1}$—O— | —On | —O—$C_nH_{2n+1}$ |
| —V— | $CH_2$=CH— | —V | —CH=$CH_2$ |
| —nV— | $C_nH_{2n+1}$—CH=CH— | —nV | —$C_nH_{2n}$—CH=$CH_2$ |
| —Vn— | $CH_2$=CH—$C_nH_{2n}$— | —Vn | —CH=CH—$C_nH_{2n+1}$ |
| —nVm— | $C_nH_{2n+1}$—CH=CH—$C_mH_{2m}$— | —nVm | —$C_nH_{2n}$—CH=CH—$C_mH_{2m+1}$ |
| —N— | N≡C— | —N | —C≡N |
| —S— | S=C=N— | —S | —N=C=S |
| —F— | F— | —F | —F |
| —CL— | Cl— | —CL | —Cl |
| —M— | $CFH_2$— | —M | —$CFH_2$ |
| —D— | $CF_2H$— | —D | —$CF_2H$ |
| —T— | $CF_3$— | —T | —$CF_3$ |
| —MO— | $CFH_2O$— | —OM | —$OCFH_2$ |
| —DO— | $CF_2HO$— | —OD | —$OCF_2H$ |
| —TO— | $CF_3O$— | —OT | —$OCF_3$ |
| —A— | H—C≡C— | —A | —C≡C—H |
| —nA— | $C_nH_{2n+1}$—C≡C— | —An | —C≡C—$C_nH_{2n+1}$ |
| —NA— | N≡C—C≡C— | —AN | —C≡C—C≡N |
| -(cn)- | $(CH_2)_{n-2}$ cyclopropyl | -(cn) | $(CH_2)_{n-2}$ cyclopropyl |
| -(cn)m- | $(CH_2)_{n-2}$—$(CH_2)_m$— | -m(cn) | —$(CH_2)_m$—$(CH_2)_{n-2}$ cyclopropyl |
| On the left only in combination | | On the right only in combination | |
| -...n...- | —$C_nH_{2n}$— | -...n... | —$C_nH_{2n}$— |
| —...M...— | —CFH— | —...M... | —CFH— |
| —...D...— | —$CF_2$— | —...D... | —$CF_2$— |
| —...V...— | —CH=CH— | —...V... | —CH=CH— |
| —...Z...— | —CO—O— | —...Z... | —CO—O— |
| —...ZI...— | —O—CO— | —...ZI... | —O—CO— |
| —...K...— | —CO— | —...K... | —CO— |
| —...W...— | —CF=CF— | —...W... | —CF=CF— | in which n and m are each integers, and the three dots "..." are placeholders for other abbreviations from this table.

Apart from the compounds of formula I, IIIA, IIIB, IIIC and/or IID, the mixtures according to the invention preferably comprise one or more compounds of the compounds mentioned below.

The following abbreviations are used:
(n, m, k and l are, independently of one another, each an integer, preferably 1 to 9 preferably 1 to 7, k and l possibly may be also 0 and preferably are 0 to 4, more preferably 0 or 2 and most preferably 2, n preferably is 1, 2, 3, 4 or 5, in the combination "-nO-" it preferably is 1, 2, 3 or 4, preferably 2 or 4, m preferably is 1, 2, 3, 4 or 5, in the combination "—Om" it preferably is 1, 2, 3 or 4, more preferably 2 or 4. The combination "-IVm" preferably is "2V1".)

TABLE D

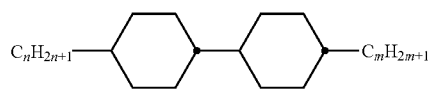

CC-n-m

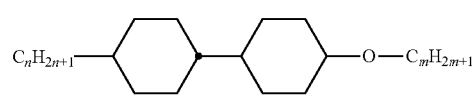

CC-n-Om

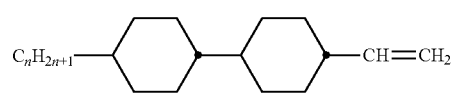

CC-n-V

TABLE D-continued
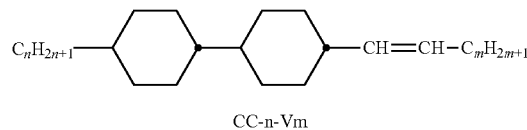
CC-n-Vm
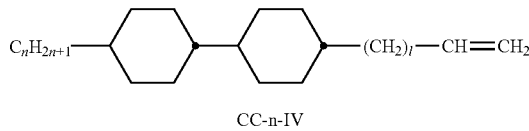
CC-n-IV
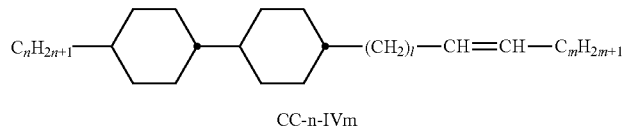
CC-n-IVm
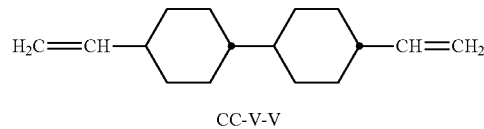
CC-V-V
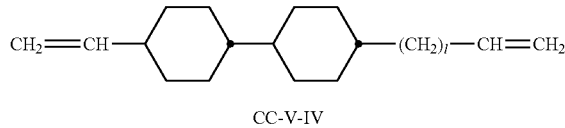
CC-V-IV
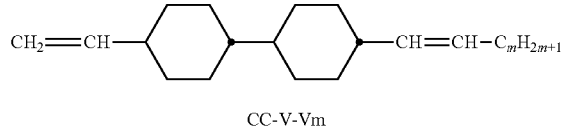
CC-V-Vm
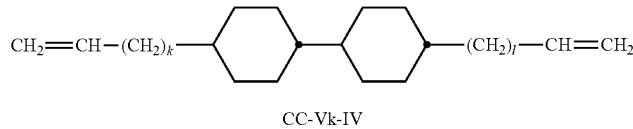
CC-Vk-IV
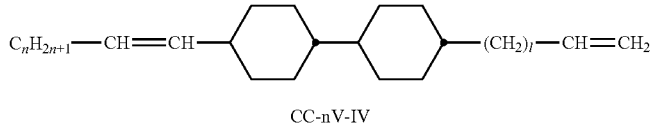
CC-nV-IV
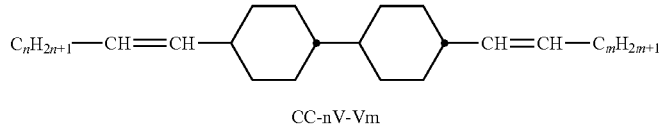
CC-nV-Vm
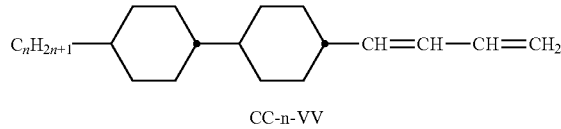
CC-n-VV TABLE D-continued
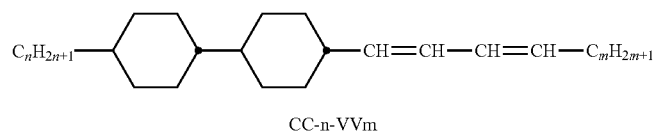
CC-n-VVm
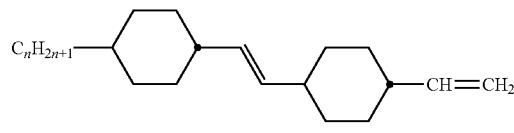
CVC-n-V
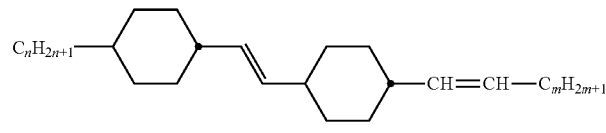
CVC-n-Vm
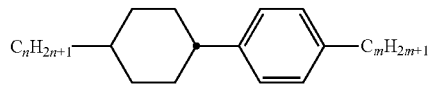
CP-n-m
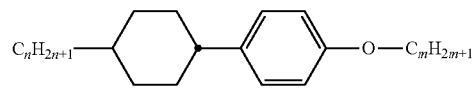
CP-n-Om
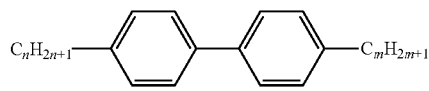
PP-n-m
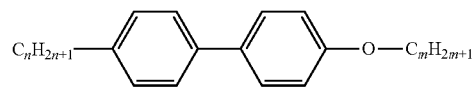
PP-n-Om
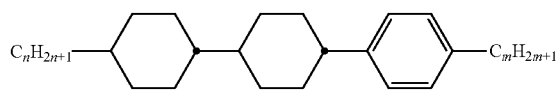
CCP-n-m
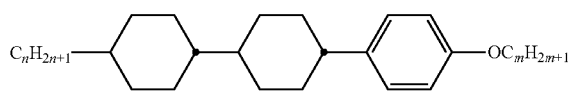
CCP-n-Om TABLE D-continued
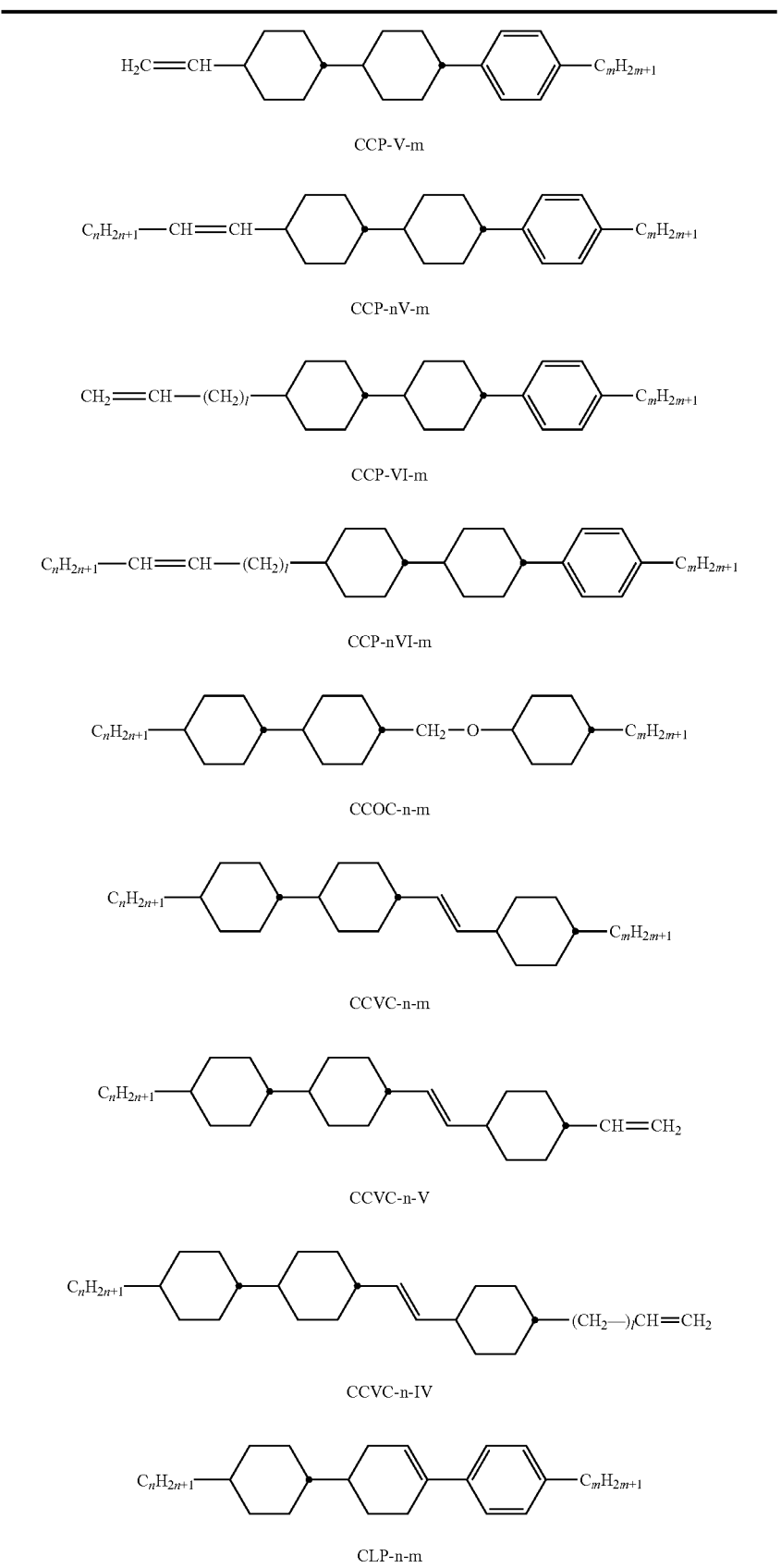

TABLE D-continued
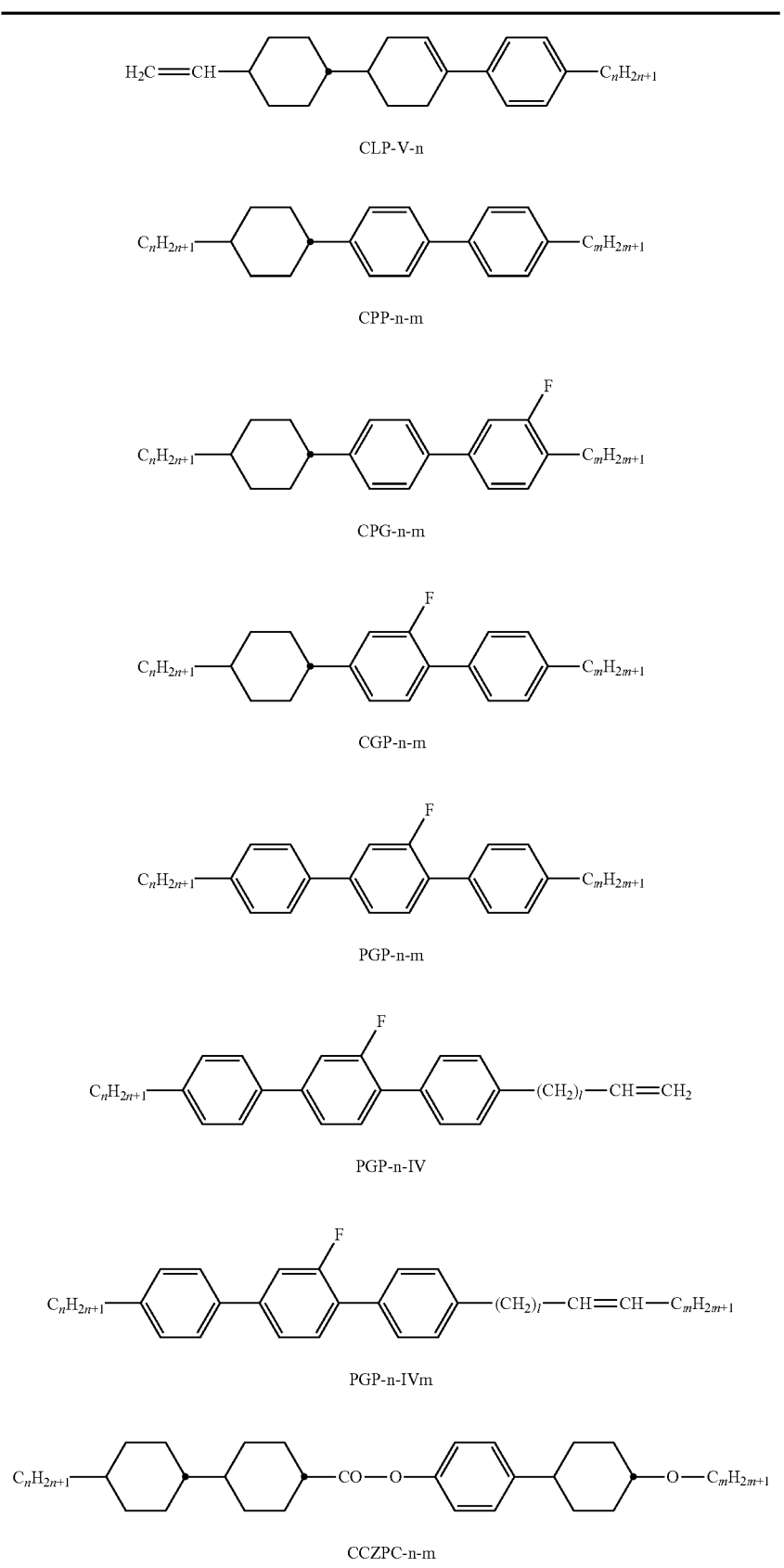

TABLE D-continued
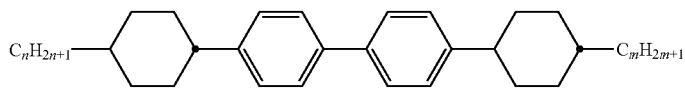
CPPC-n-m
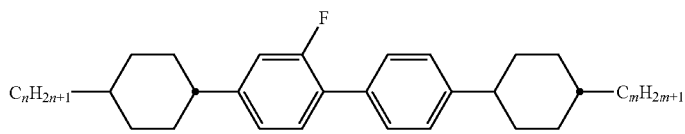
CGPC-n-m
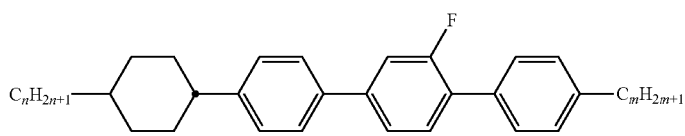
CPGP-n-m
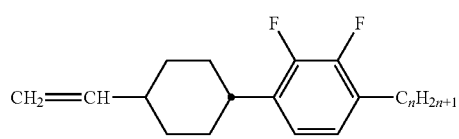
CY-V-n
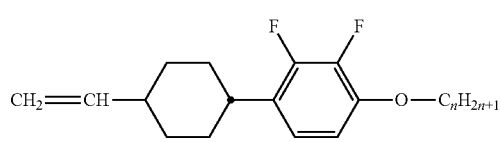
CY-V-On
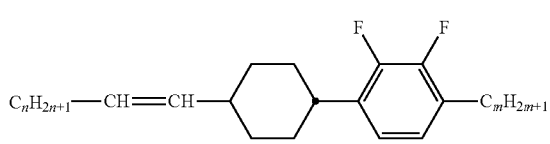
CY-nV-m
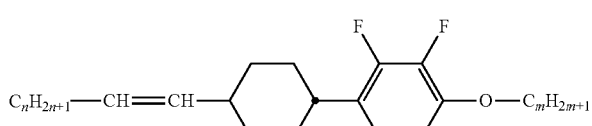
CY-nV-Om
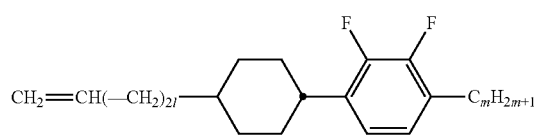
CY-VI-m TABLE D-continued
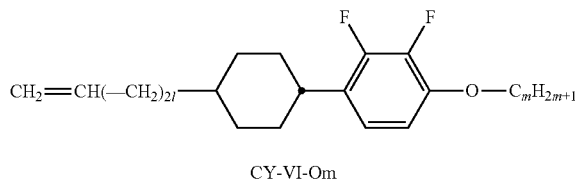
CY-VI-Om
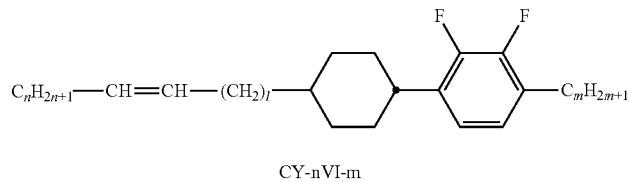
CY-nVI-m
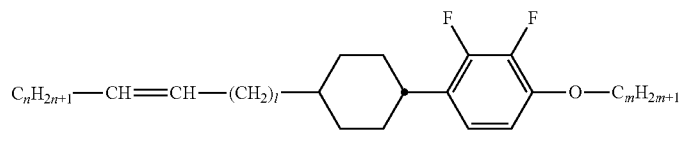
CY-nVI-Om
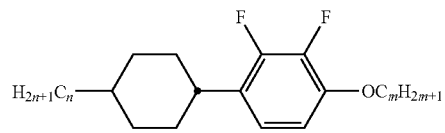
CEY-nO-Om
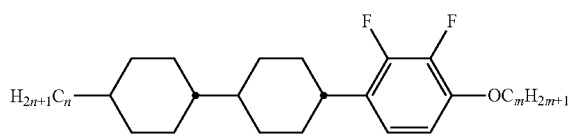
CCEY-nO-Om
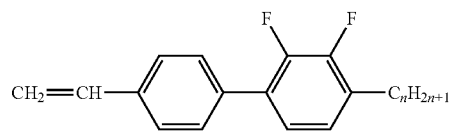
PY-V-n
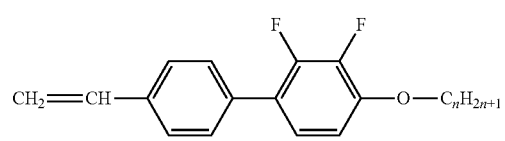
PY-V-On
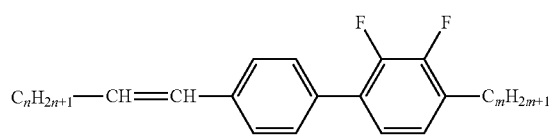
PY-nV-m TABLE D-continued
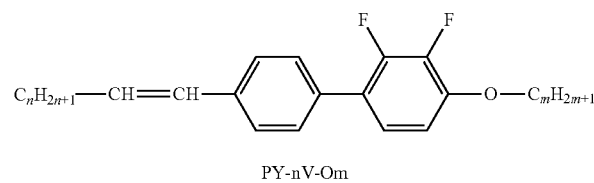
PY-nV-Om
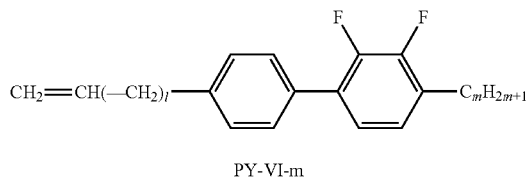
PY-VI-m
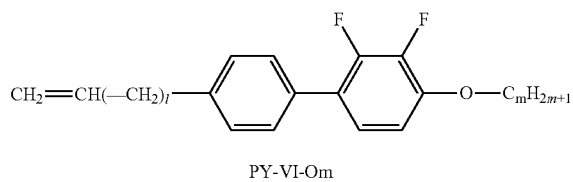
PY-VI-Om
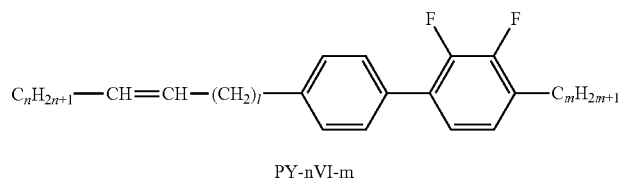
PY-nVI-m
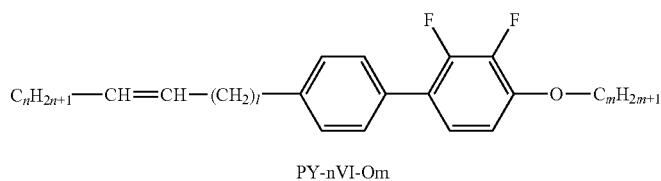
PY-nVI-Om
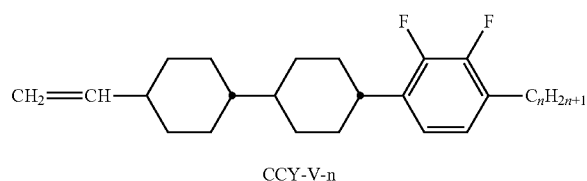
CCY-V-n
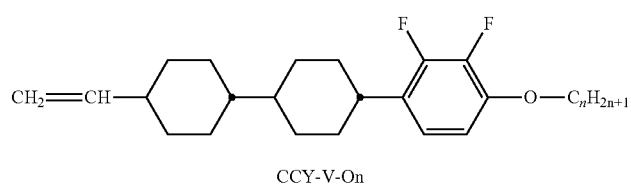
CCY-V-On
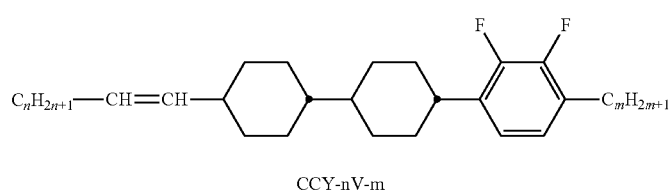
CCY-nV-m TABLE D-continued
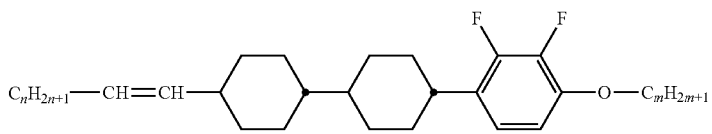
CCY-nV-Om
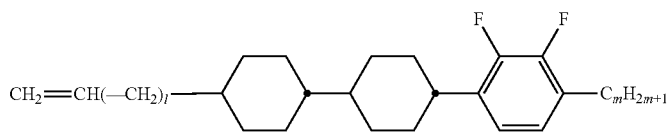
CCY-VI-m
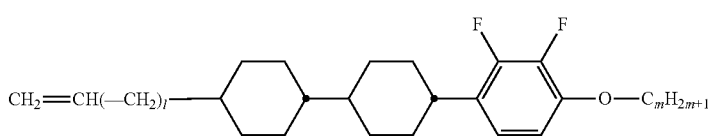
CCY-VI-Om
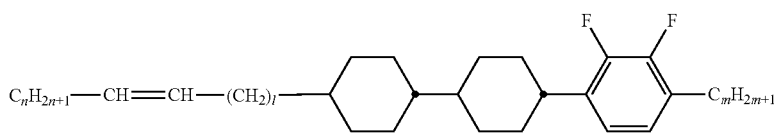
CCY-nVI-m
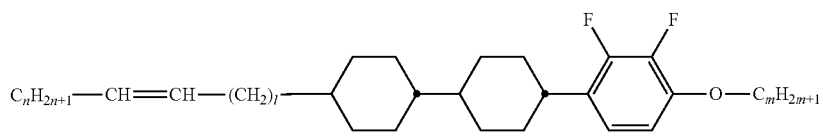
CCY-nVI-Om
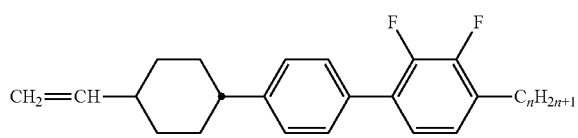
CPY-V-n
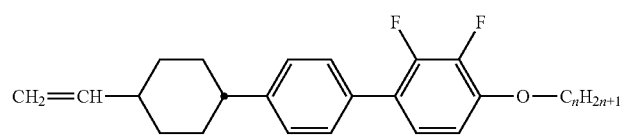
CPY-V-On
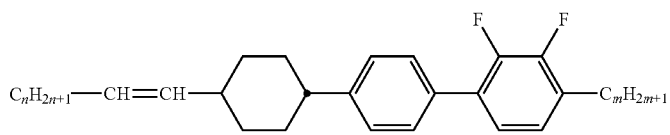
CPY-nV-m TABLE D-continued
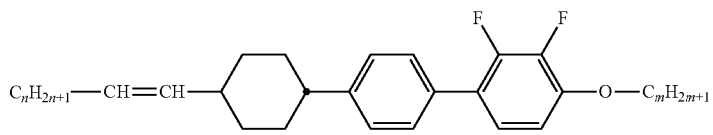
CPY-nV-Om
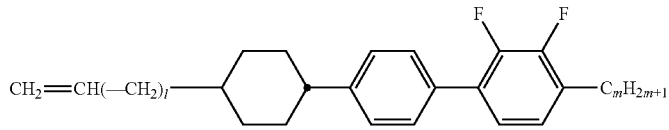
CPY-VI-m
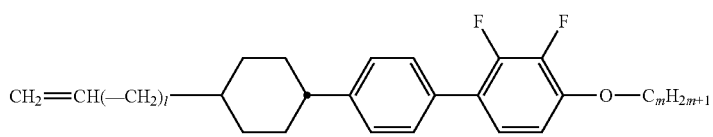
CPY-VI-Om
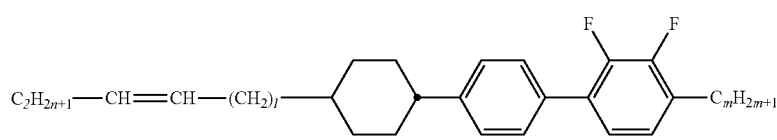
CPY-nVI-k
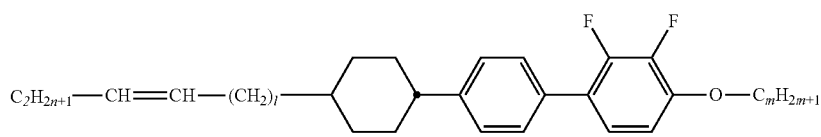
CPY-nVI-Om
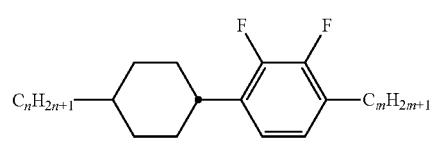
CY-n-m
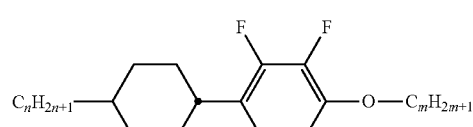
CY-n-Om TABLE D-continued
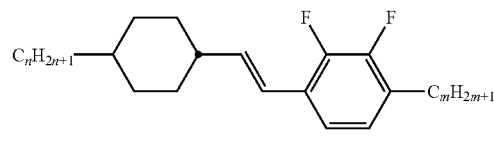
CVY-n-m
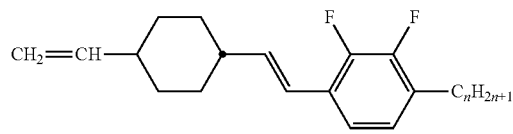
CVY-V-n
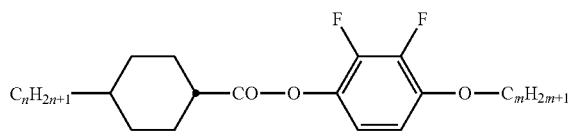
CZY-n-Om
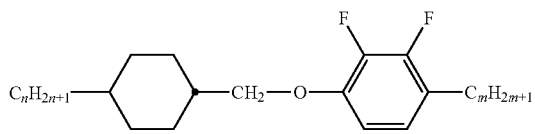
COY-n-m
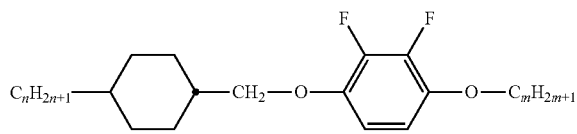
COY-n-Om
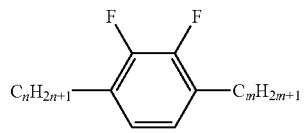
Y-n-m
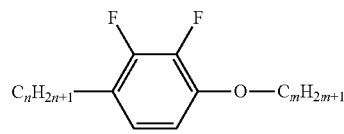
Y-n-Om
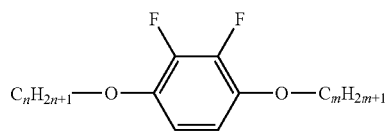
Y-nO-Om TABLE D-continued
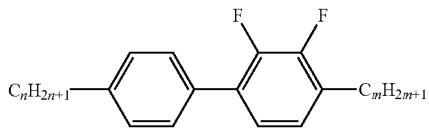
PY-n-m
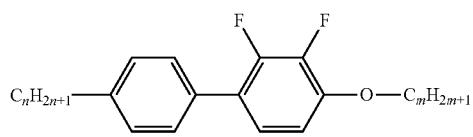
PY-n-Om
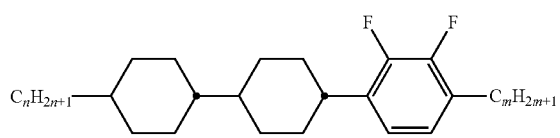
CCY-n-m
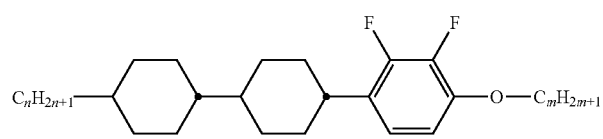
CCY-n-Om
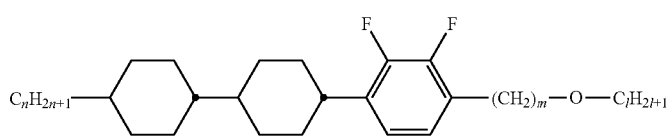
CCY-n-mOl
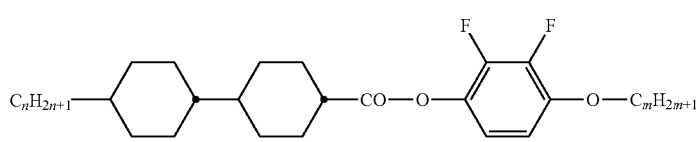
CCZY-n-Om
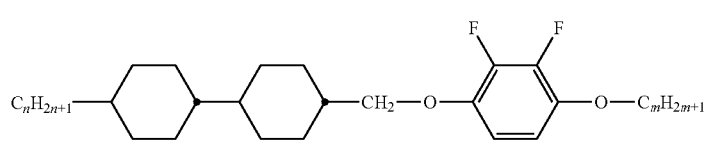
CCOY-n-m TABLE D-continued
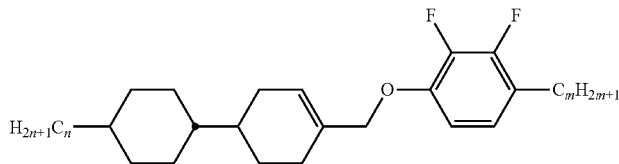
CLOY-n-Om
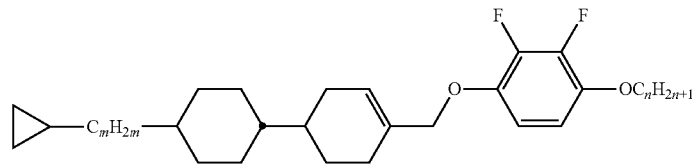
CLOY-(c3)m-On
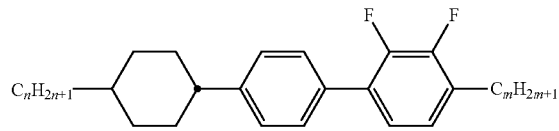
CPY-n-m
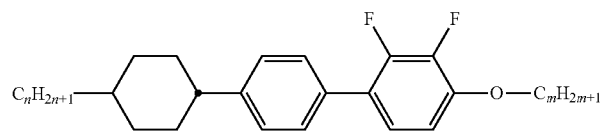
CPY-n-Om
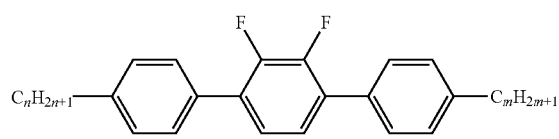
PYP-n-m
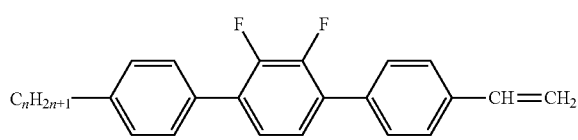
PYP-n-V
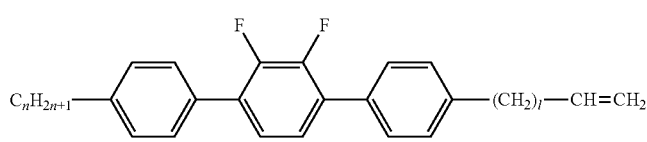
PYP-n-IV TABLE D-continued
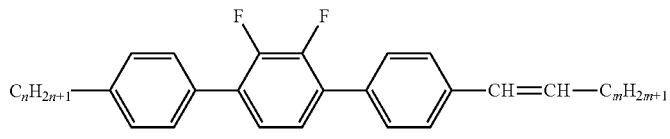
PYP-n-Vm
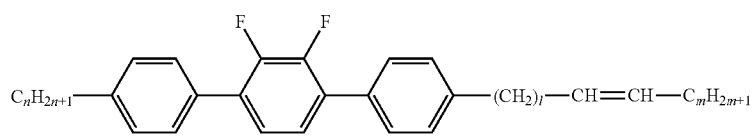
PYP-n-IVm
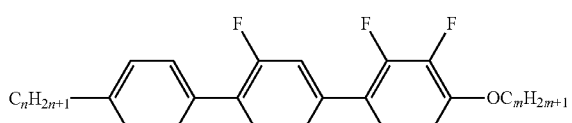
PGIY-nO-Om
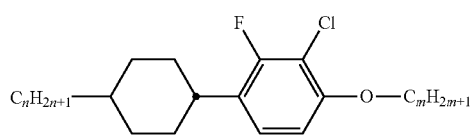
CP(F,Cl)-n-Om
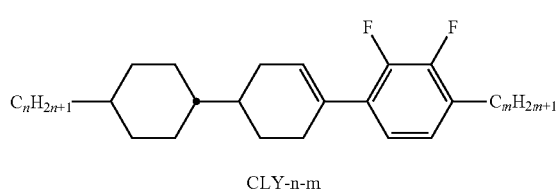
CLY-n-m
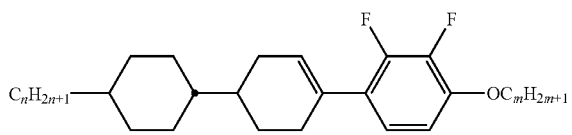
CLY-n-Om
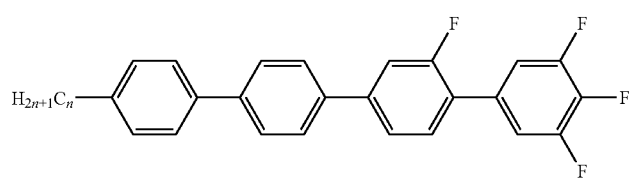
PPGU-n-F TABLE D-continued
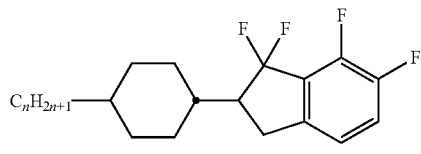
CK-n-F
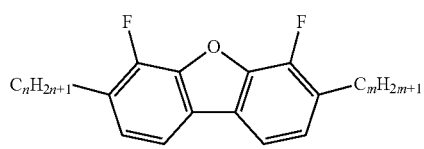
B-n-m
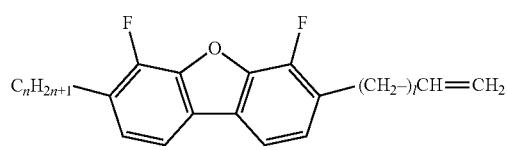
B-n-IV
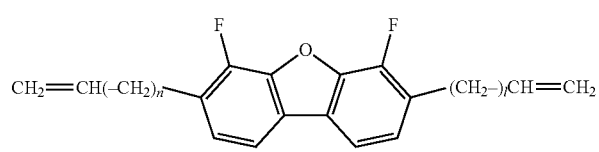
B-Vn-IV
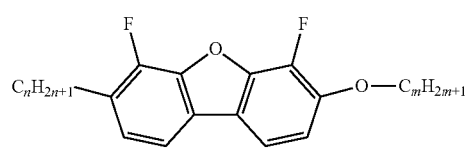
B-n-Om
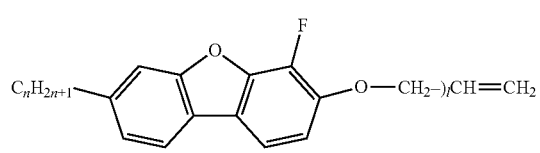
B-n-OIV
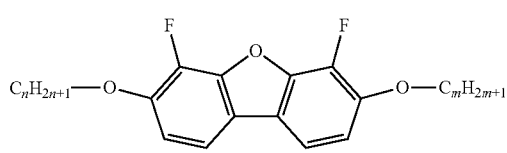
B-nO-Om TABLE D-continued
CB-n-Om
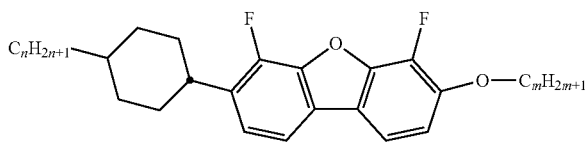
CB-n-Om
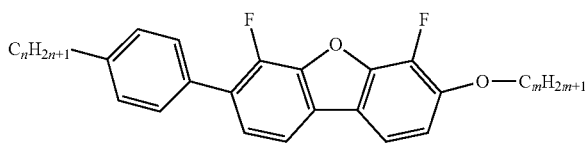
PB-n-Om
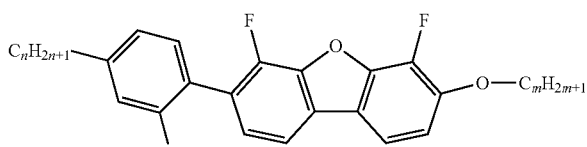
GB-n-Om
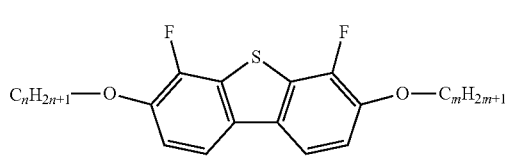
B(S)-nO-Om
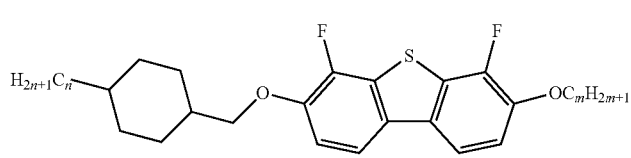
COB(S)-n-Om
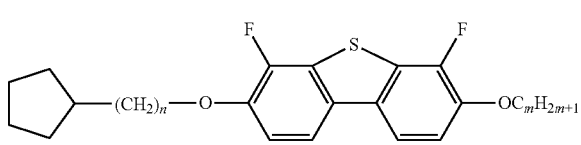
B(S)-(c5)nO-Om

TABLE E
Table E shows chiral dopants which can be added to the LC media according to the invention.
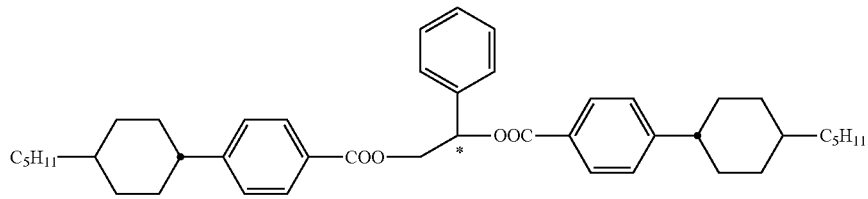
R/S-1011
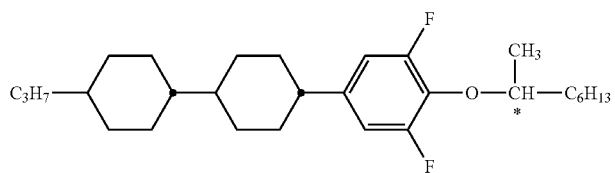
R/S-2011
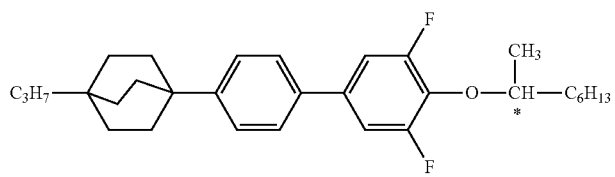
R/S-4011
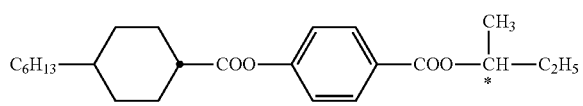
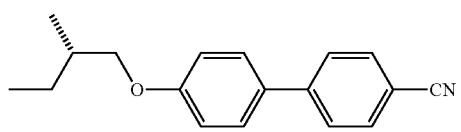
C 15
CB 15
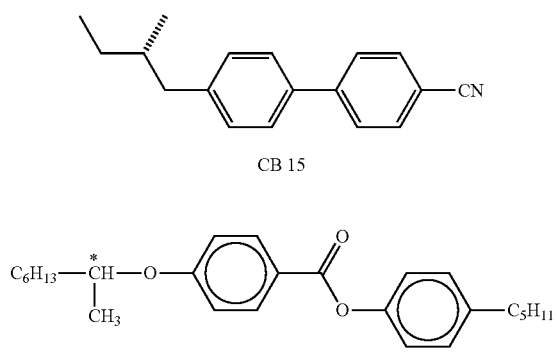
CM 21

TABLE E-continued
Table E shows chiral dopants which can be added to the LC media according to the invention.
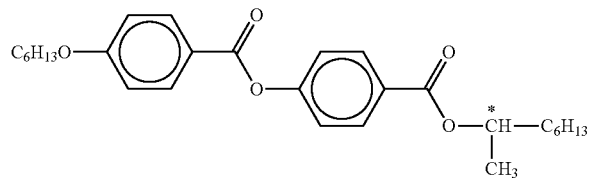
R/S-811
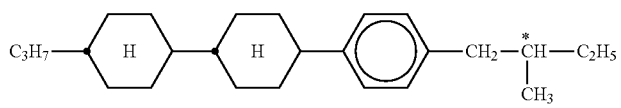
CM 44
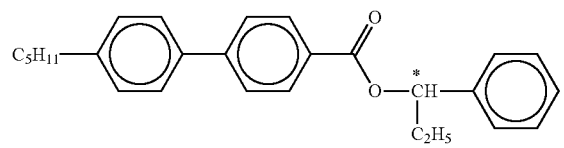
CM 45
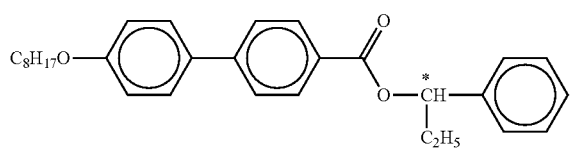
CM 47
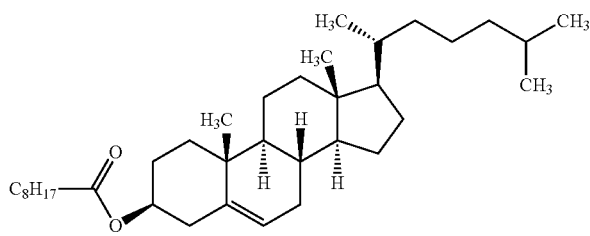
CN
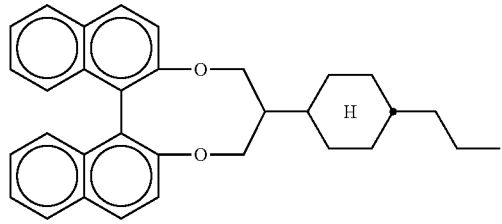
R/S-5011

TABLE E-continued
Table E shows chiral dopants which can be added to the LC media according to the invention.
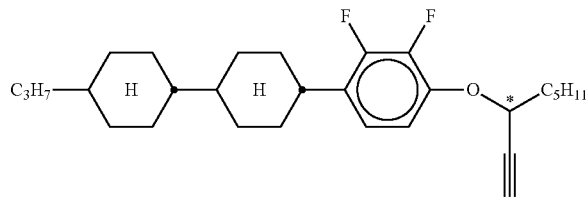
R/S-3011
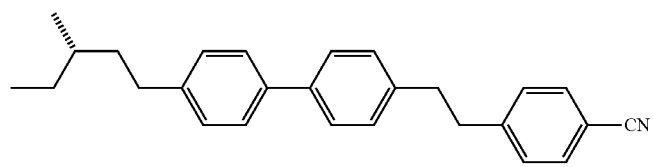 [SMILES: CC[C@H](C)CCc1ccc(-c2ccc(CCc3ccc(C#N)cc3)cc2)cc1]
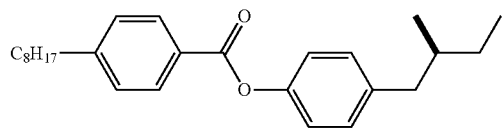
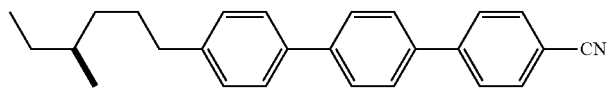
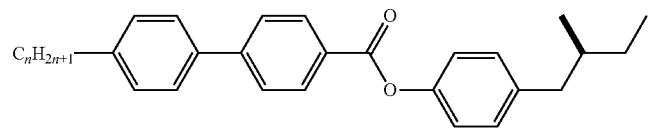
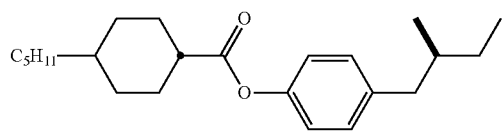
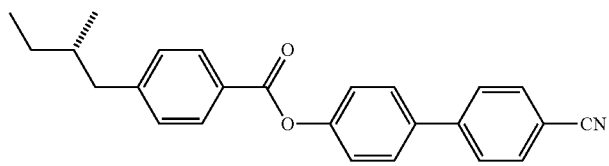 [SMILES: CC[C@H](C)Cc1ccc(C(=O)Oc2ccc(-c3ccc(C#N)cc3)cc2)cc1]
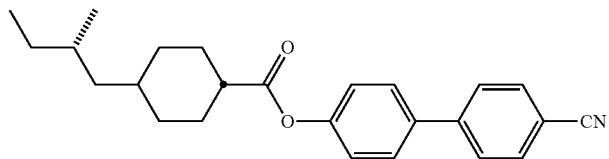
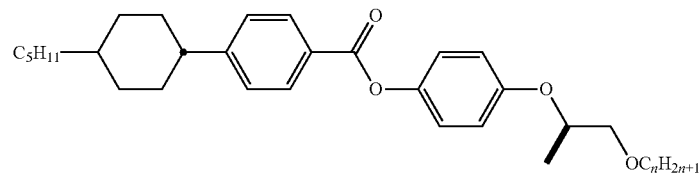

TABLE E-continued
Table E shows chiral dopants which can be added to the LC media according to the invention.
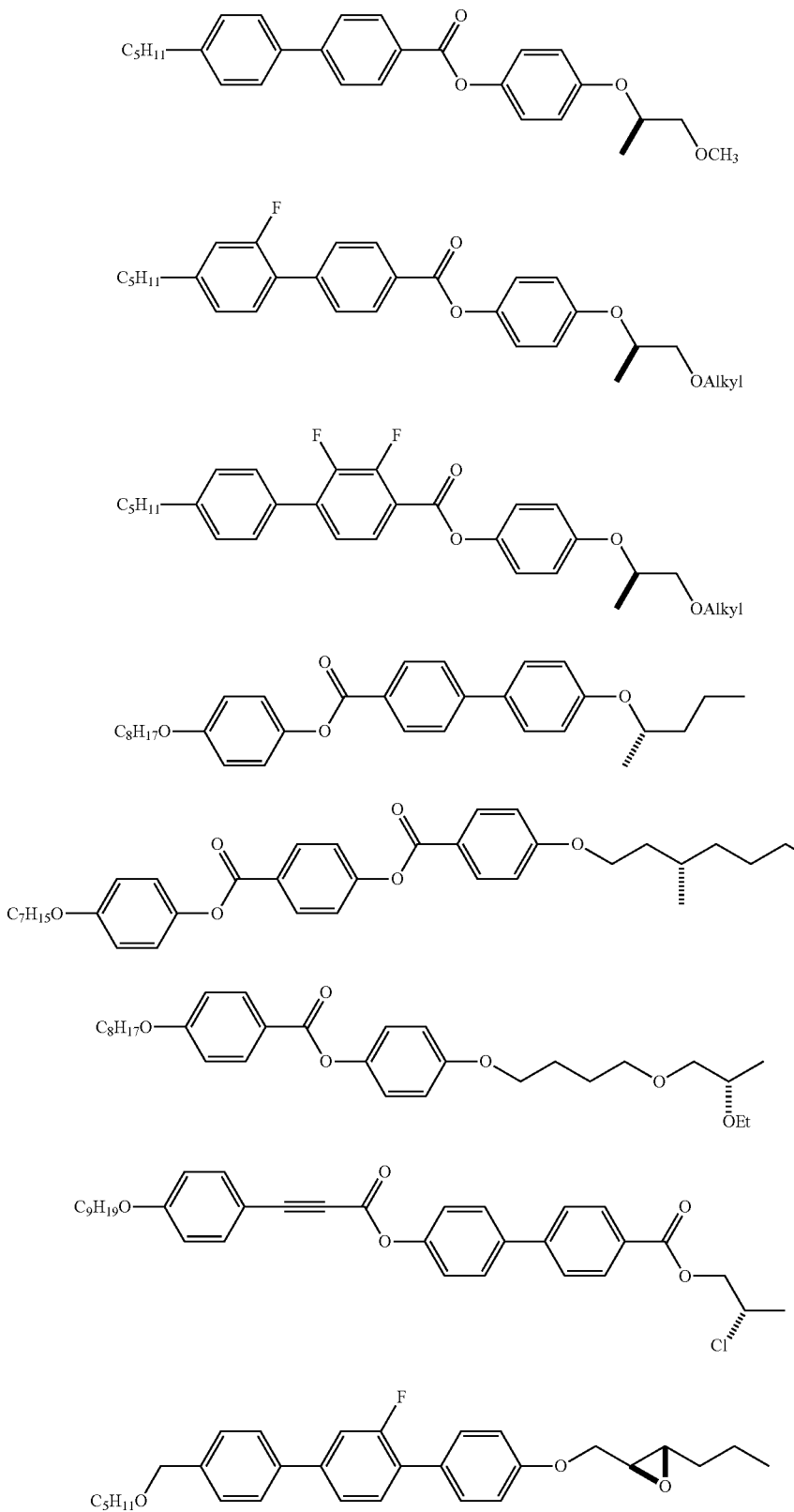

TABLE E-continued
Table E shows chiral dopants which can be added to the LC media according to the invention.
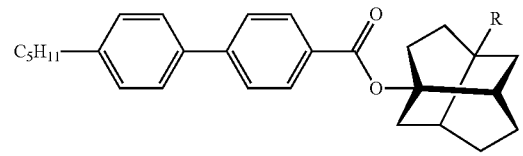
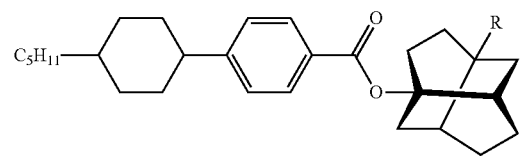
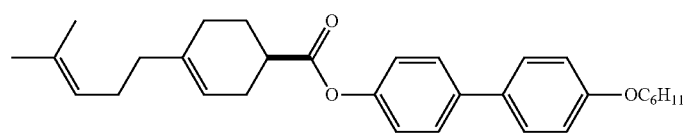
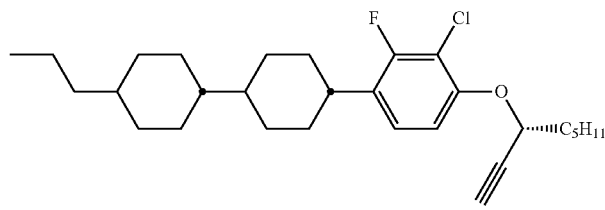
TABLE F
Table F shows illustrative reactive mesogenic compounds which can be used in the LC media in accordance with the present invention.
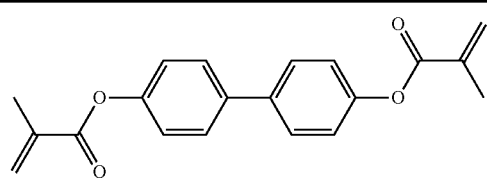
RM-1
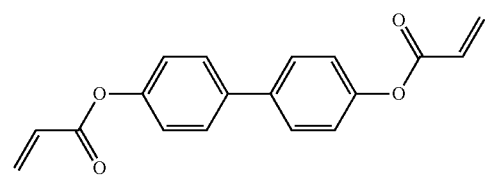
RM-2
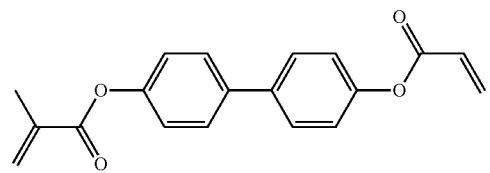 [SMILES: C=CC(=O)Oc1ccc(-c2ccc(OC(=O)C(=C)C)cc2)cc1]
RM-3

TABLE F-continued
Table F shows illustrative reactive mesogenic compounds which can be used in the LC media in accordance with the present invention.
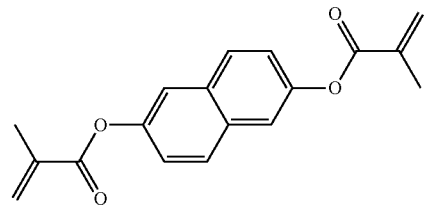 [SMILES: C=C(C)C(=O)Oc1ccc2cc(OC(=O)C(=C)C)ccc2c1]
RM-4
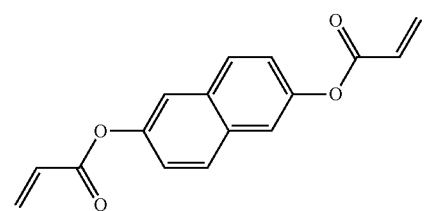 [SMILES: C=CC(=O)Oc1ccc2cc(OC(=O)C=C)ccc2c1]
RM-5
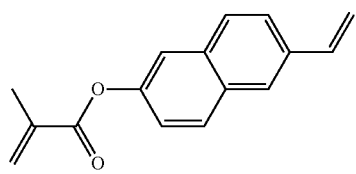 [SMILES: C=Cc1ccc2cc(OC(=O)C(=C)C)ccc2c1]
RM-6
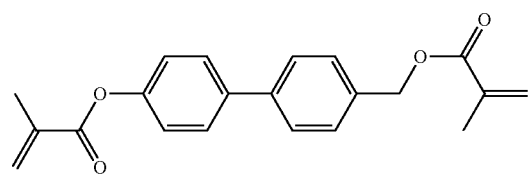 [SMILES: C=C(C)C(=O)OCc1ccc(-c2ccc(OC(=O)C(=C)C)cc2)cc1]
RM-7
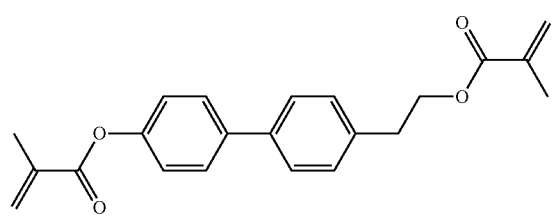 [SMILES: C=C(C)C(=O)OCCc1ccc(-c2ccc(OC(=O)C(=C)C)cc2)cc1]
RM-8
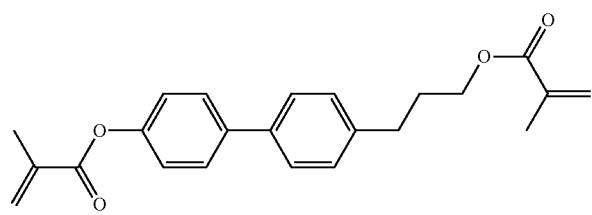 [SMILES: C=C(C)C(=O)OCCCc1ccc(-c2ccc(OC(=O)C(=C)C)cc2)cc1]
RM-9
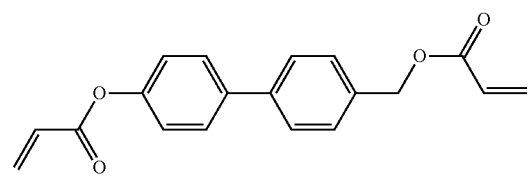 [SMILES: C=CC(=O)OCc1ccc(-c2ccc(OC(=O)C=C)cc2)cc1]
RM-10

TABLE F-continued
Table F shows illustrative reactive mesogenic compounds which can be used in the
LC media in accordance with the present invention.
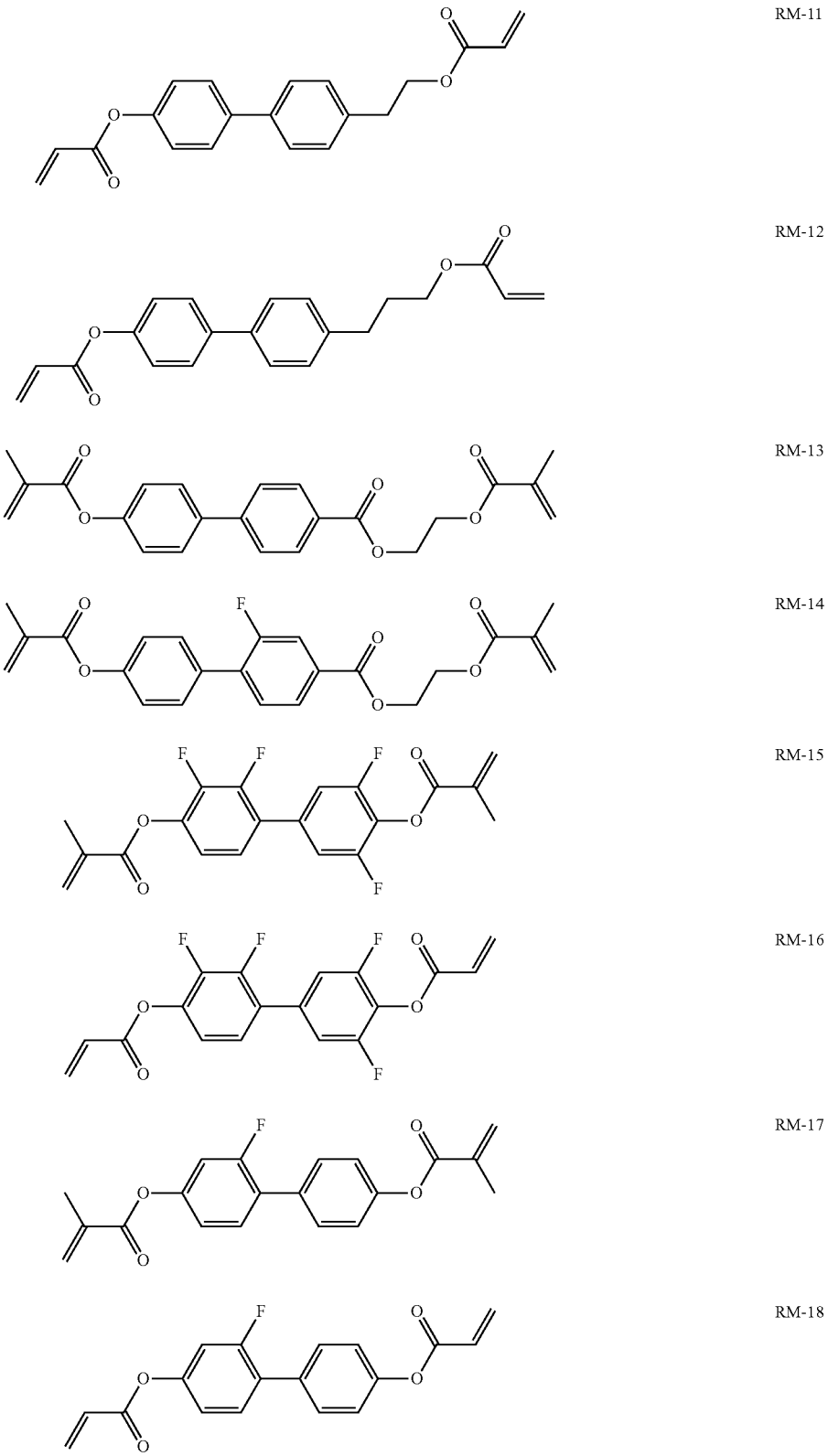
RM-11
RM-12
RM-13
RM-14
RM-15
RM-16
RM-17
RM-18

TABLE F-continued
Table F shows illustrative reactive mesogenic compounds which can be used in the LC media in accordance with the present invention.
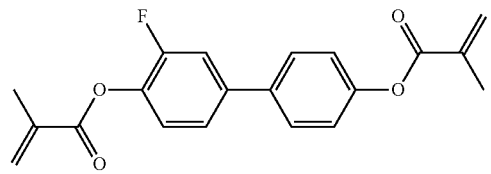 RM-19
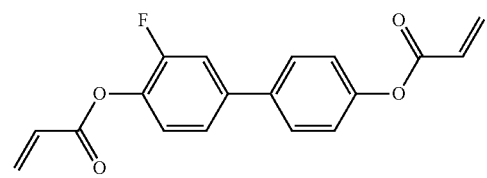 RM-20
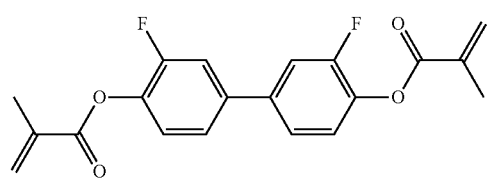 RM-21
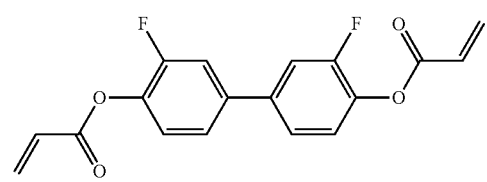 RM-22
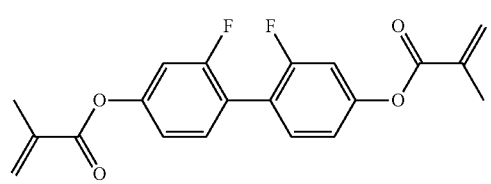 [SMILES: C=C(C)C(=O)Oc1ccc(-c2ccc(OC(=O)C(=C)C)cc2F)c(F)c1] RM-23
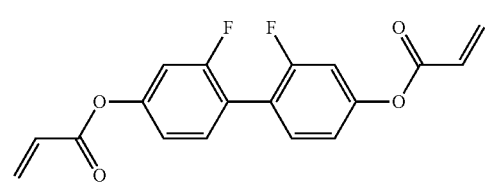 RM-24
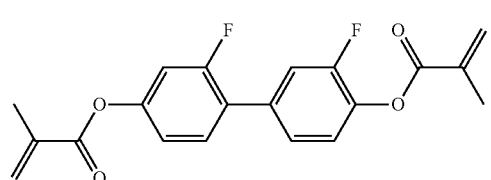 RM-25
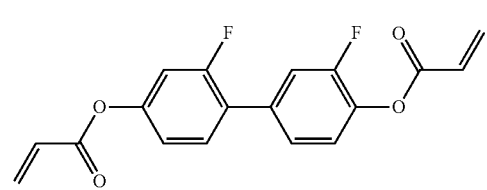 RM-26

TABLE F-continued
Table F shows illustrative reactive mesogenic compounds which can be used in the
LC media in accordance with the present invention.
| Structure | Code |
|---|---|
| 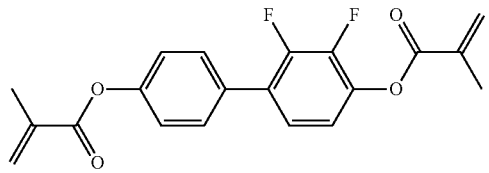 [SMILES: C=C(C)C(=O)Oc1ccc(-c2ccc(OC(=O)C(=C)C)c(F)c2F)cc1] | RM-27 |
| 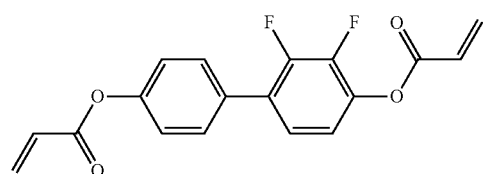 | RM-28 |
| 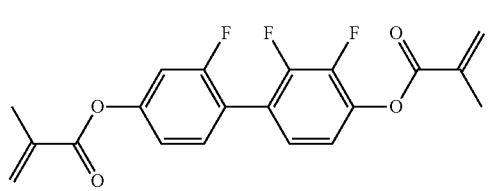 [SMILES: C=C(C)C(=O)Oc1ccc(-c2ccc(OC(=O)C(=C)C)c(F)c2F)c(F)c1] | RM-29 |
| 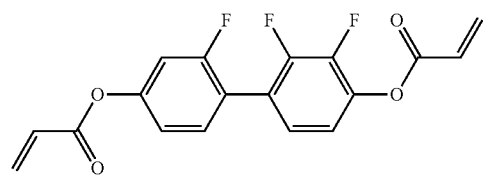 | RM-30 |
| 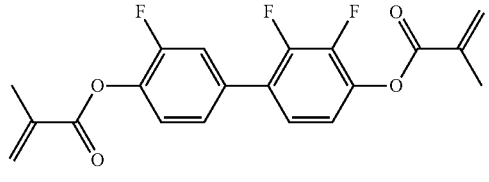 | RM-31 |
| 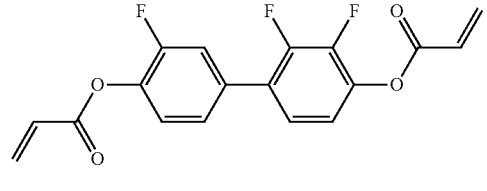 [SMILES: C=CC(=O)Oc1ccc(-c2ccc(OC(=O)C=C)c(F)c2F)cc1F] | RM-32 |
| 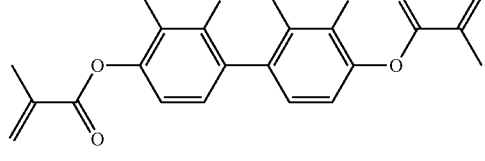 | RM-33 |
| 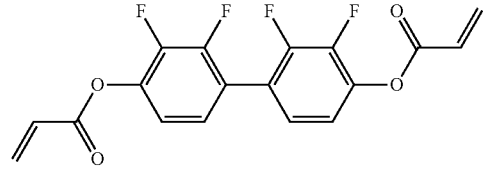 | RM-34 |

TABLE F-continued
Table F shows illustrative reactive mesogenic compounds which can be used in the
LC media in accordance with the present invention.
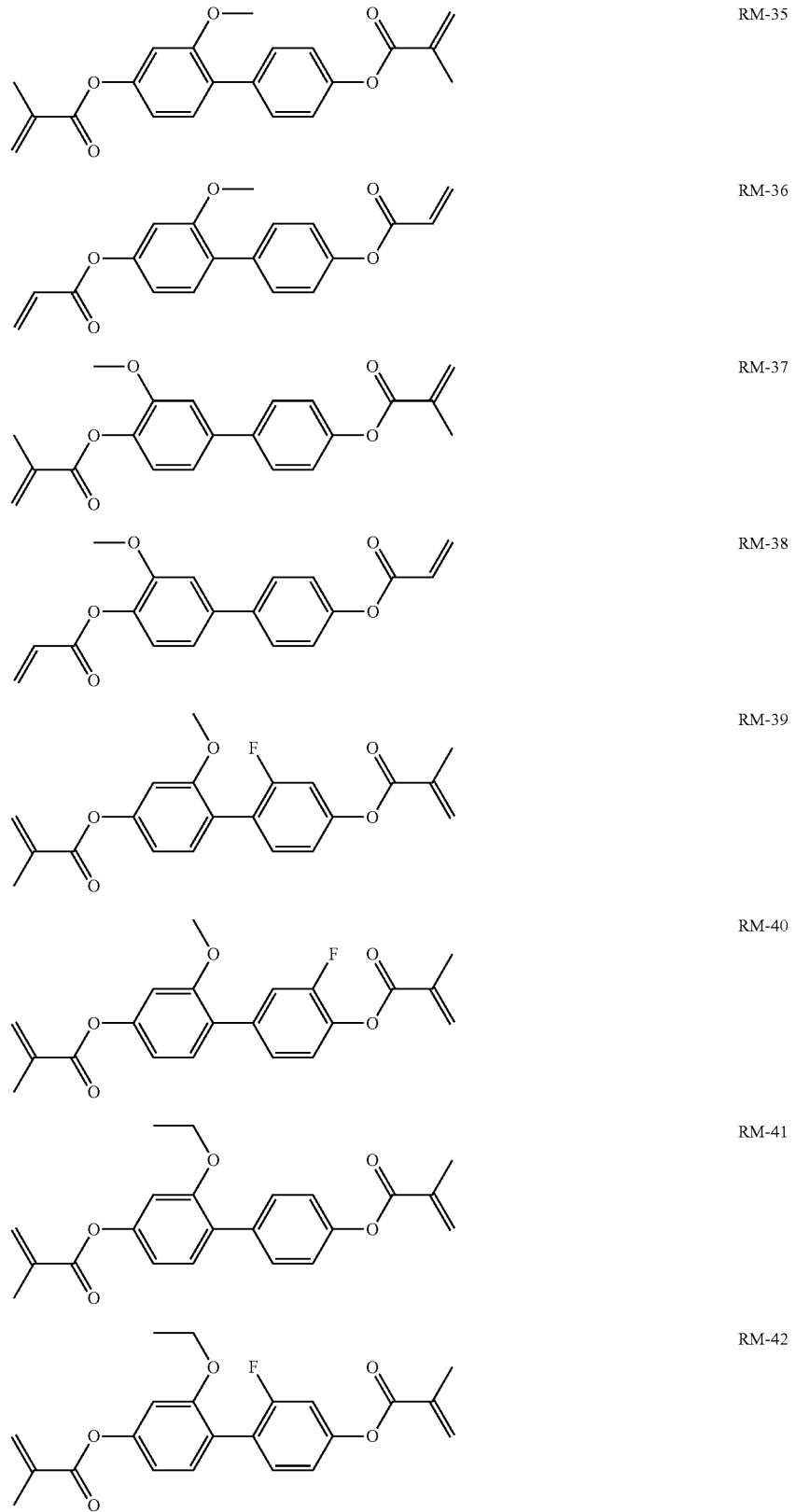
RM-35
RM-36
RM-37
RM-38
RM-39
RM-40
RM-41
RM-42

TABLE F-continued
Table F shows illustrative reactive mesogenic compounds which can be used in the
LC media in accordance with the present invention.
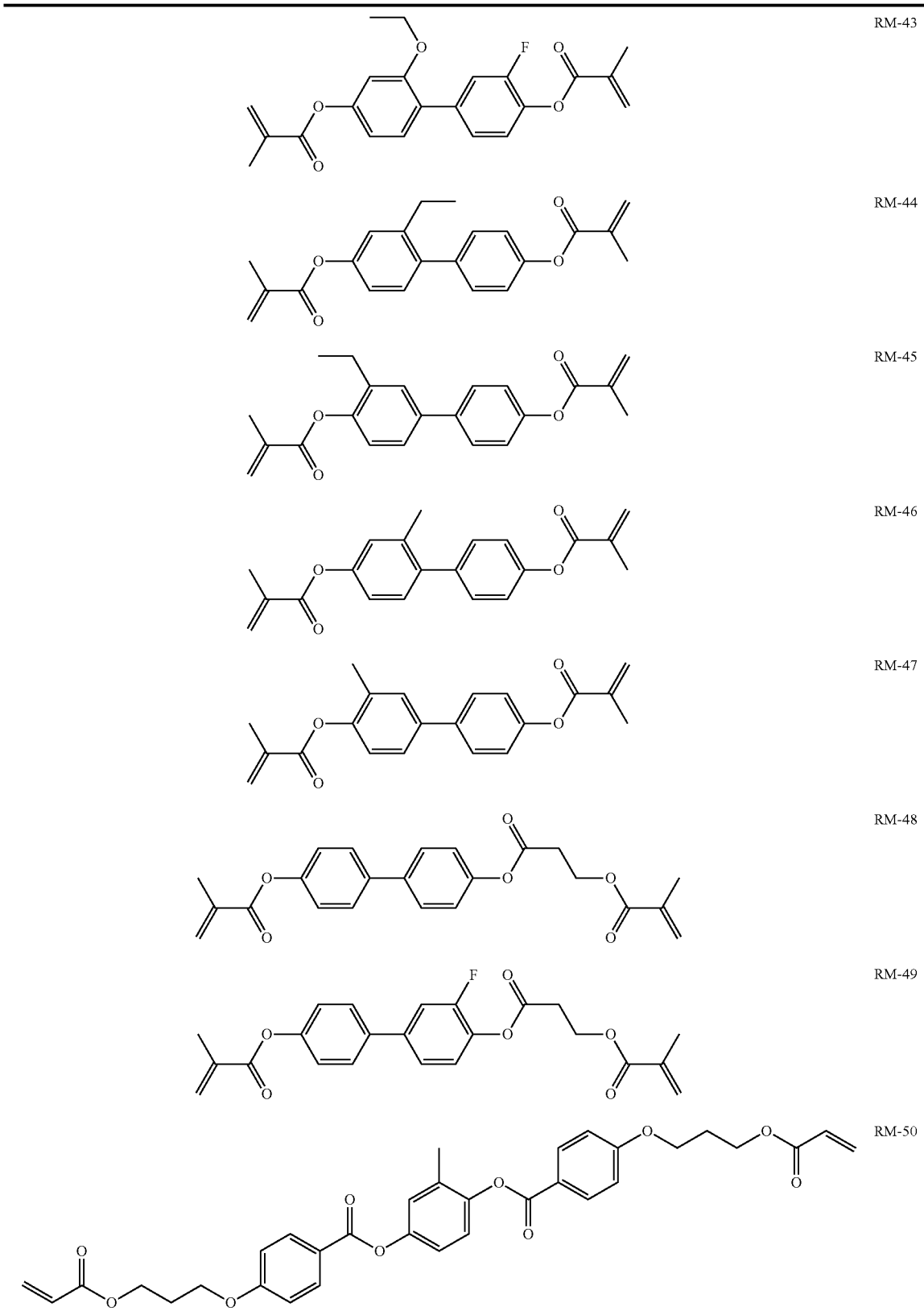
RM-43
RM-44
RM-45
RM-46
RM-47
RM-48
RM-49
RM-50

TABLE F-continued
Table F shows illustrative reactive mesogenic compounds which can be used in the LC media in accordance with the present invention.
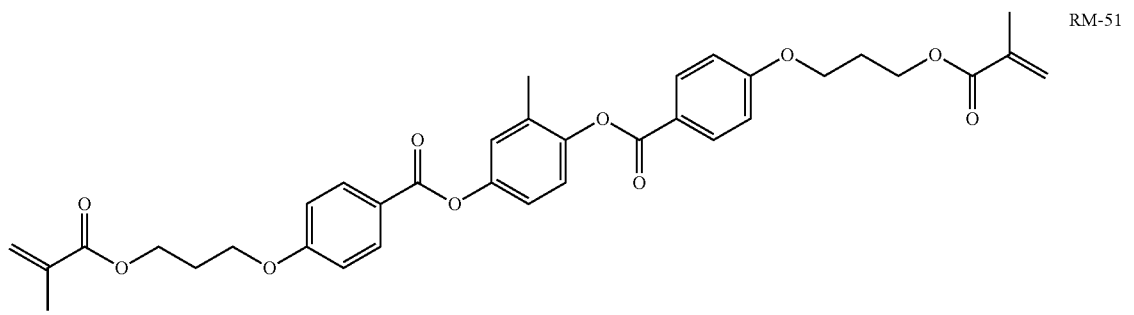
RM-51
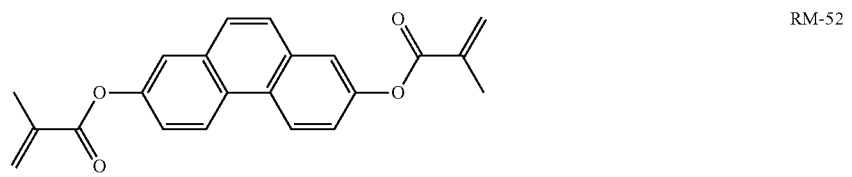
RM-52
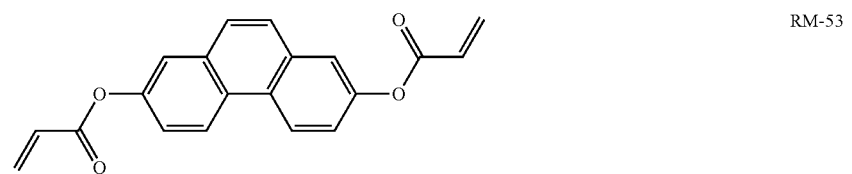
RM-53
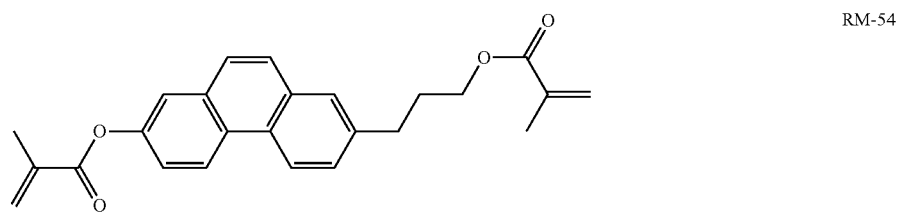
RM-54
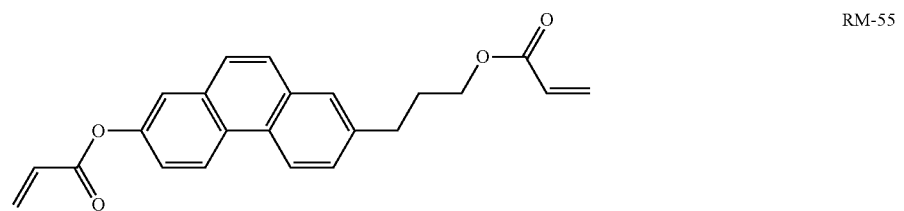
RM-55
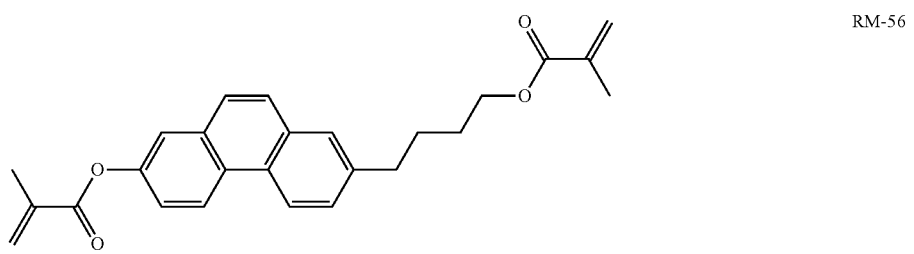
RM-56

TABLE F-continued
Table F shows illustrative reactive mesogenic compounds which can be used in the
LC media in accordance with the present invention.
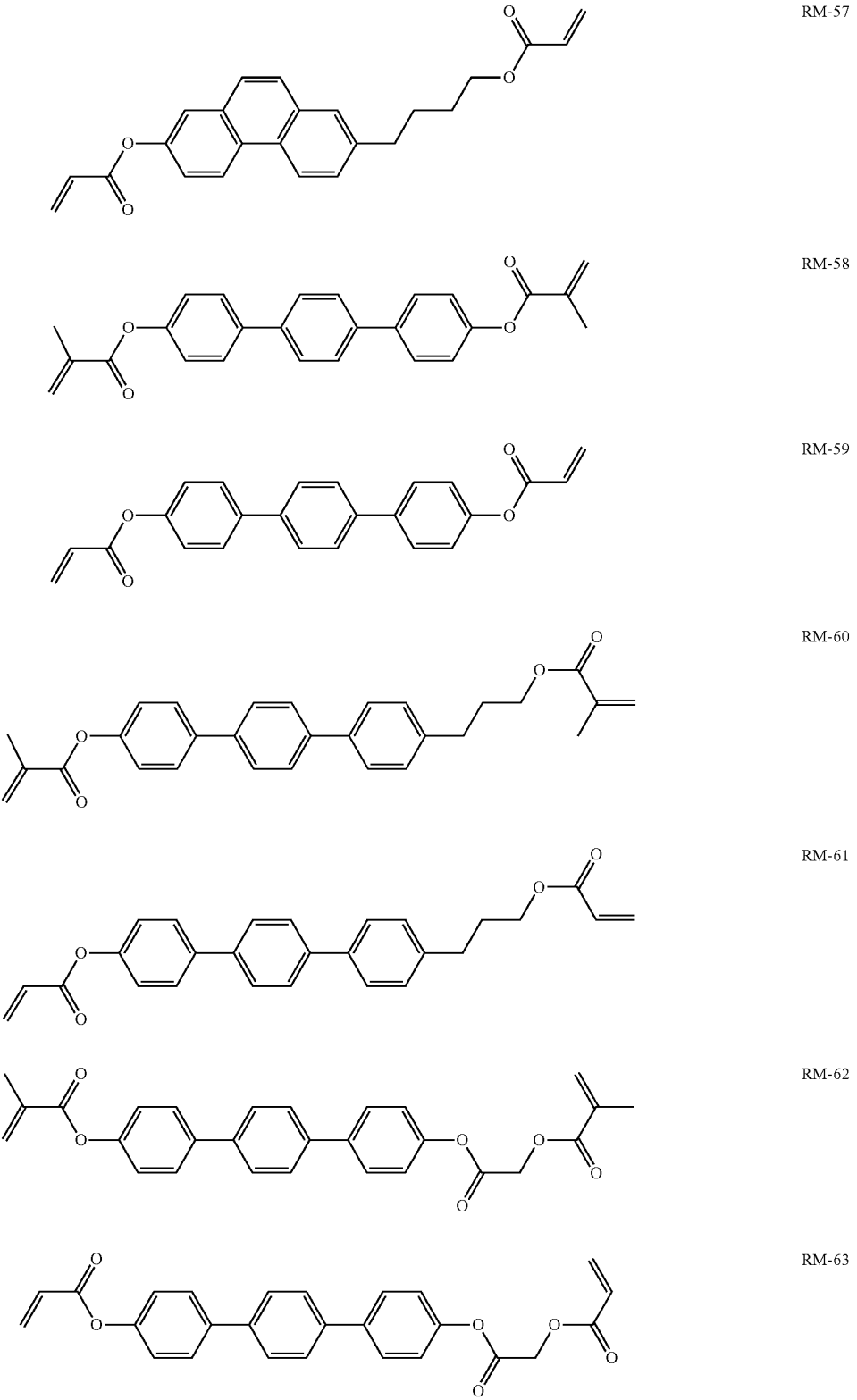

TABLE F-continued
Table F shows illustrative reactive mesogenic compounds which can be used in the
LC media in accordance with the present invention.
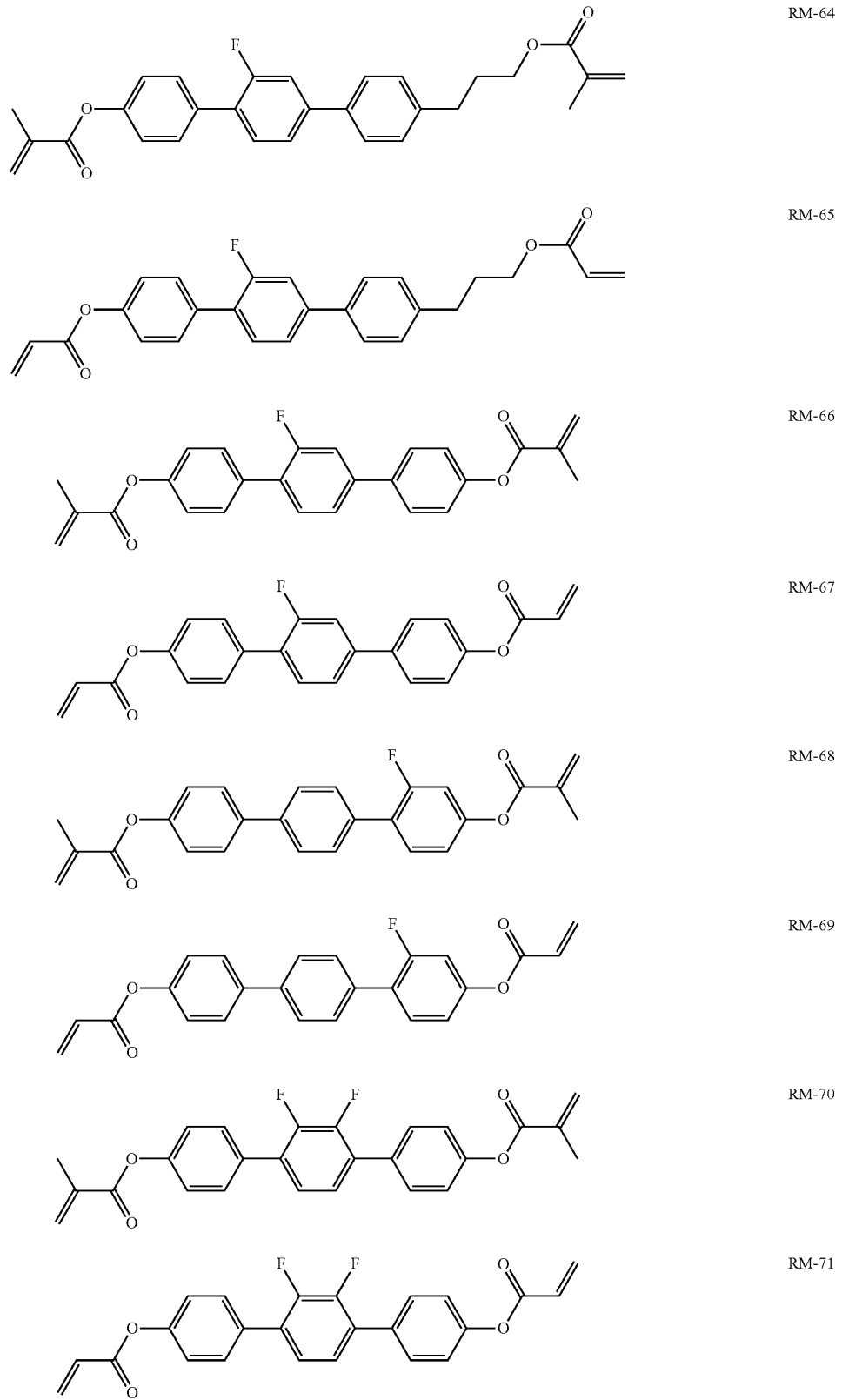

TABLE F-continued
Table F shows illustrative reactive mesogenic compounds which can be used in the
LC media in accordance with the present invention.
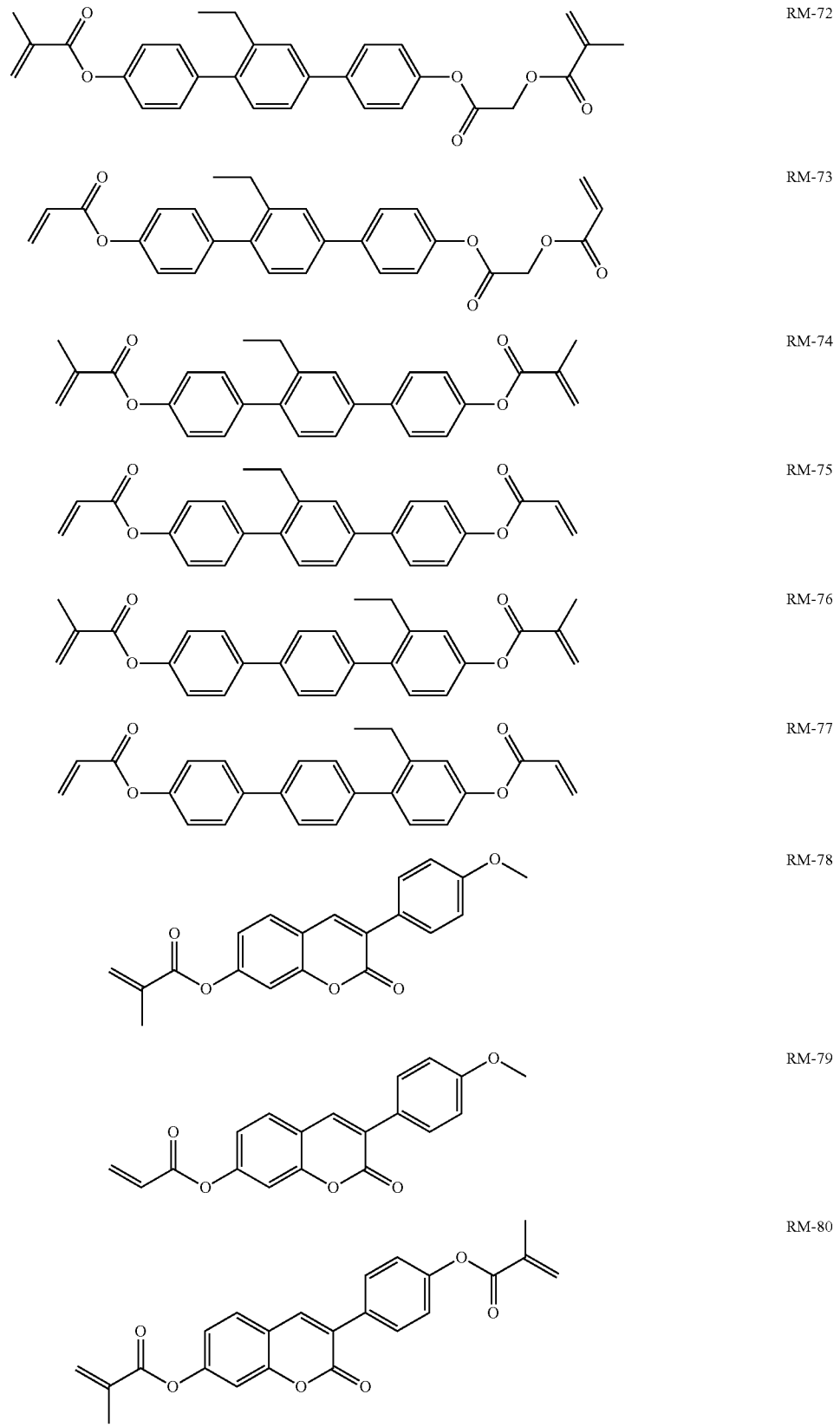

TABLE F-continued
Table F shows illustrative reactive mesogenic compounds which can be used in the
LC media in accordance with the present invention.
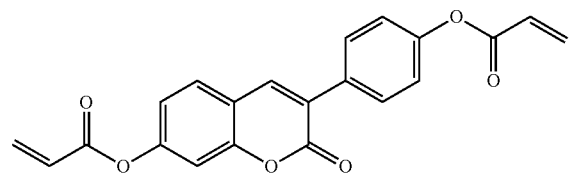 [SMILES: C=CC(=O)Oc1ccc(-c2cc3ccc(OC(=O)C=C)cc3oc2=O)cc1] RM-81
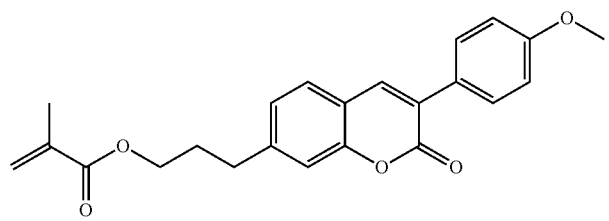 [SMILES: C=C(C)C(=O)OCCCc1ccc2cc(-c3ccc(OC)cc3)c(=O)oc2c1] RM-82
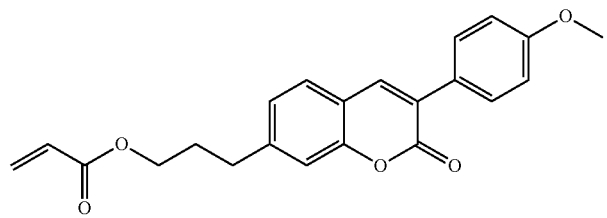 [SMILES: C=CC(=O)OCCCc1ccc2cc(-c3ccc(OC)cc3)c(=O)oc2c1] RM-83
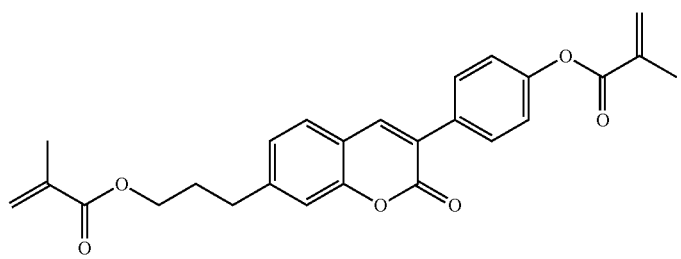 [SMILES: C=C(C)C(=O)OCCCc1ccc2cc(-c3ccc(OC(=O)C(=C)C)cc3)c(=O)oc2c1] RM-84
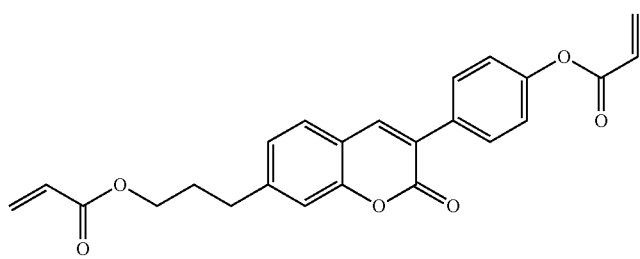 [SMILES: C=CC(=O)OCCCc1ccc2cc(-c3ccc(OC(=O)C=C)cc3)c(=O)oc2c1] RM-85
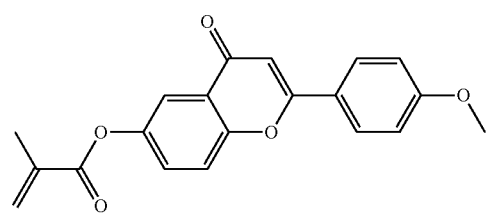 [SMILES: C=C(C)C(=O)Oc1ccc2oc(-c3ccc(OC)cc3)cc(=O)c2c1] RM-86

TABLE F-continued
Table F shows illustrative reactive mesogenic compounds which can be used in the
LC media in accordance with the present invention.
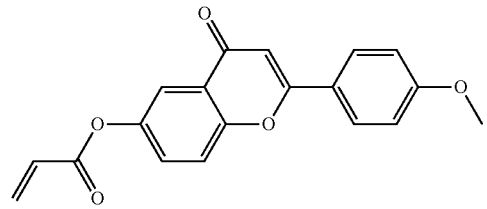 [SMILES: C=CC(=O)Oc1ccc2oc(-c3ccc(OC)cc3)cc(=O)c2c1] RM-87
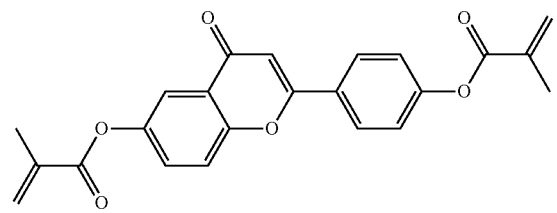 [SMILES: C=C(C)C(=O)Oc1ccc(-c2cc(=O)c3cc(OC(=O)C(=C)C)ccc3o2)cc1] RM-88
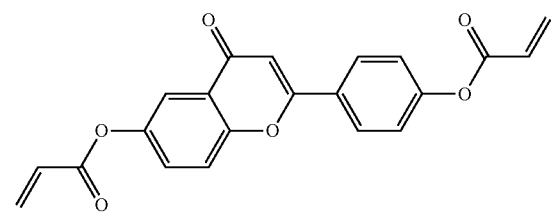 [SMILES: C=CC(=O)Oc1ccc(-c2cc(=O)c3cc(OC(=O)C=C)ccc3o2)cc1] RM-89
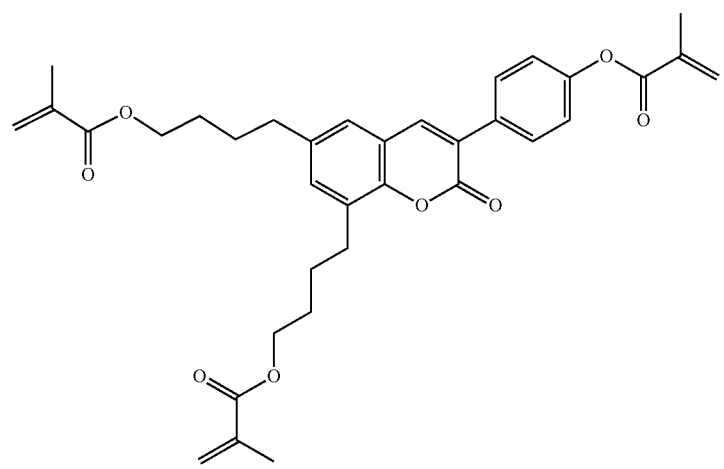 [SMILES: C=C(C)C(=O)OCCCCc1cc(CCCCOC(=O)C(=C)C)c2oc(=O)c(-c3ccc(OC(=O)C(=C)C)cc3)cc2c1] RM-90
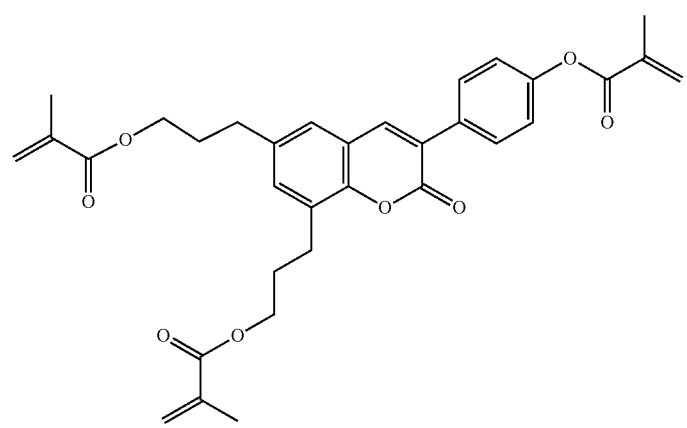 [SMILES: C=C(C)C(=O)OCCCc1cc(CCCOC(=O)C(=C)C)c2oc(=O)c(-c3ccc(OC(=O)C(=C)C)cc3)cc2c1] RM-91

TABLE F-continued
Table F shows illustrative reactive mesogenic compounds which can be used in the LC media in accordance with the present invention.
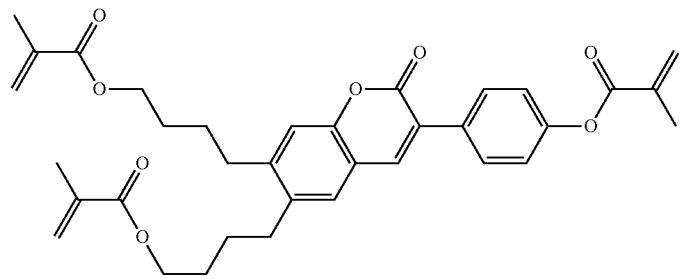 [SMILES: C=C(C)C(=O)OCCCCc1cc2cc(-c3ccc(OC(=O)C(=C)C)cc3)c(=O)oc2cc1CCCCOC(=O)C(=C)C]
RM-92
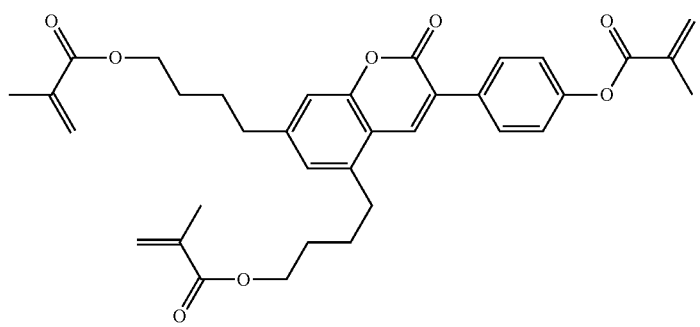 [SMILES: C=C(C)C(=O)OCCCCc1cc(CCCCOC(=O)C(=C)C)c2cc(-c3ccc(OC(=O)C(=C)C)cc3)c(=O)oc2c1]
RM-93
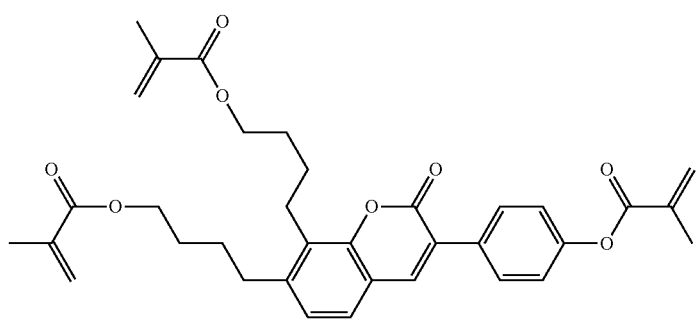 [SMILES: C=C(C)C(=O)OCCCCc1ccc2cc(-c3ccc(OC(=O)C(=C)C)cc3)c(=O)oc2c1CCCCOC(=O)C(=C)C]
RM-94
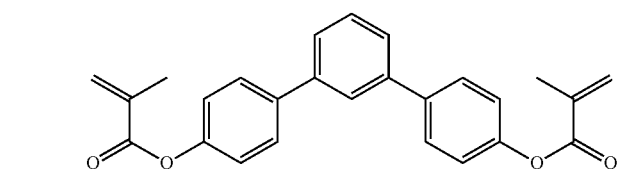 [SMILES: C=C(C)C(=O)Oc1ccc(-c2cccc(-c3ccc(OC(=O)C(=C)C)cc3)c2)cc1]
RM-95
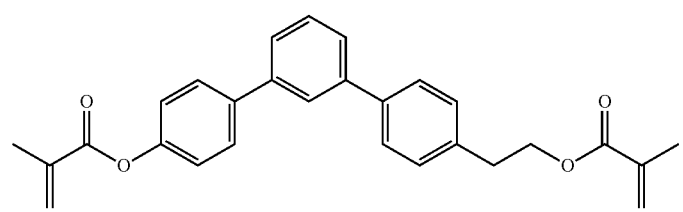 [SMILES: C=C(C)C(=O)OCCc1ccc(-c2cccc(-c3ccc(OC(=O)C(=C)C)cc3)c2)cc1]
RM-96
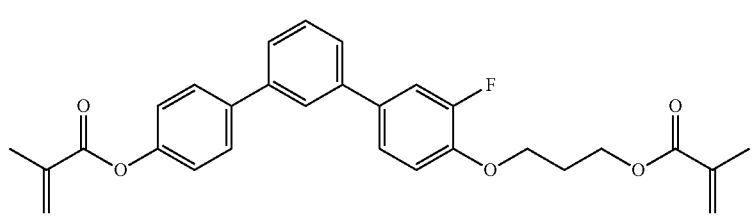 [SMILES: C=C(C)C(=O)OCCCOc1ccc(-c2cccc(-c3ccc(OC(=O)C(=C)C)cc3)c2)cc1F]
RM-97

TABLE F-continued
Table F shows illustrative reactive mesogenic compounds which can be used in the LC media in accordance with the present invention.
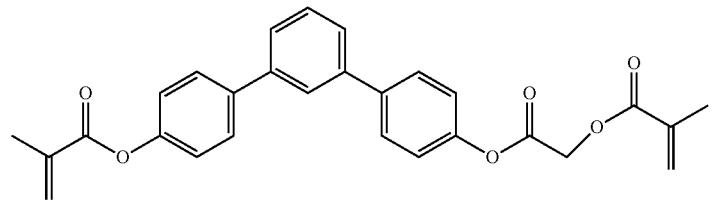 [SMILES: C=C(C)C(=O)OCC(=O)Oc1ccc(-c2cccc(-c3ccc(OC(=O)C(=C)C)cc3)c2)cc1]
RM-98
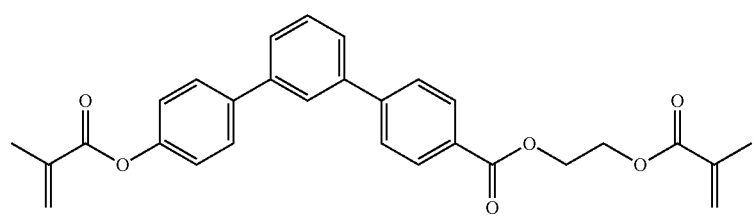 [SMILES: C=C(C)C(=O)OCCOC(=O)c1ccc(-c2cccc(-c3ccc(OC(=O)C(=C)C)cc3)c2)cc1]
RM-99
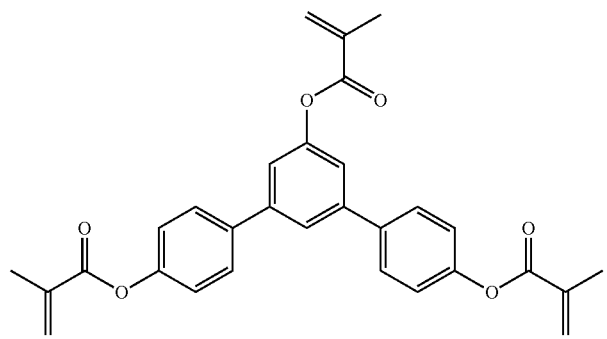 [SMILES: C=C(C)C(=O)Oc1ccc(-c2cc(OC(=O)C(=C)C)cc(-c3ccc(OC(=O)C(=C)C)cc3)c2)cc1]
RM-100
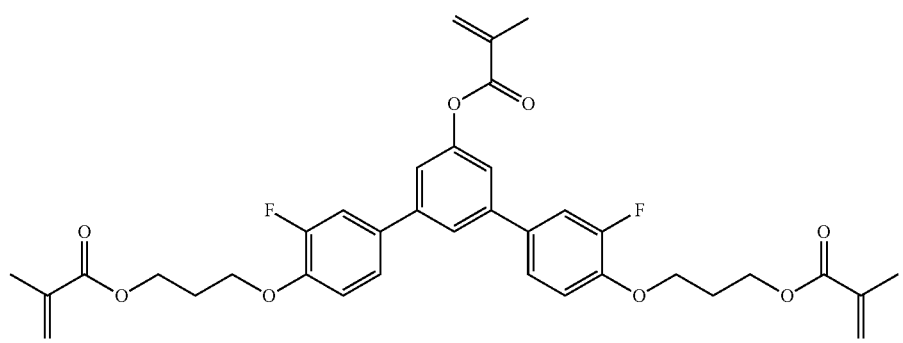 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-101
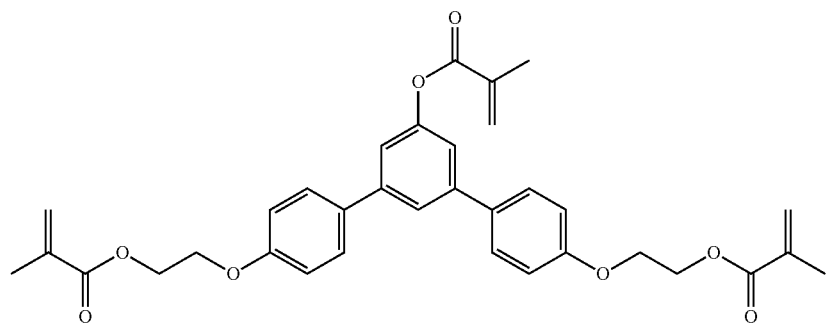 [SMILES: C=C(C)C(=O)OCCOc1ccc(-c2cc(OC(=O)C(=C)C)cc(-c3ccc(OCCOC(=O)C(=C)C)cc3)c2)cc1]
RM-102

TABLE F-continued
Table F shows illustrative reactive mesogenic compounds which can be used in the
LC media in accordance with the present invention.
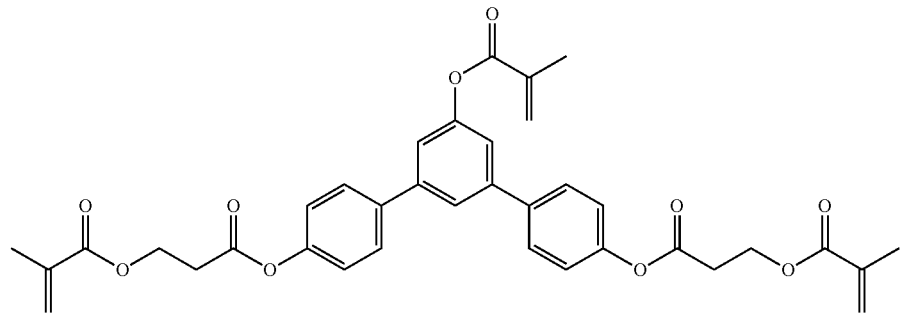 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-103
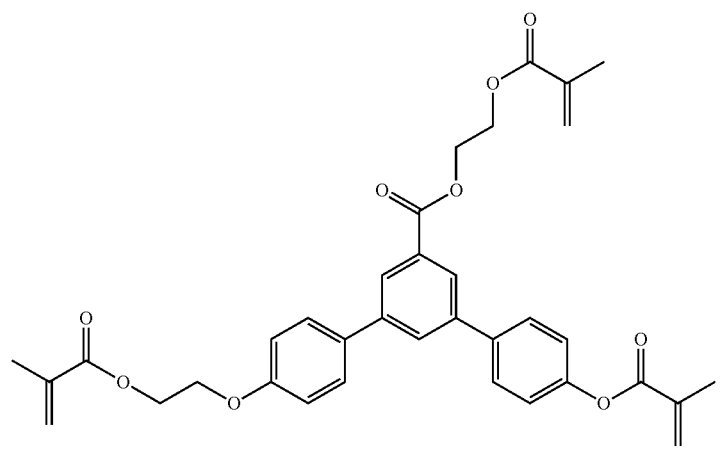 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-104
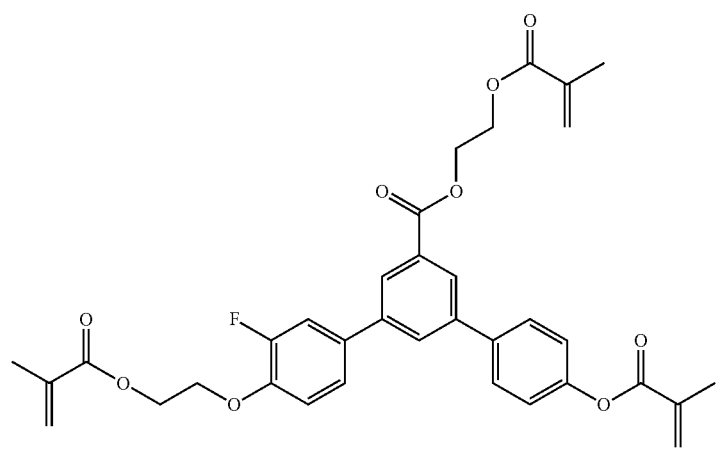 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]
RM-105
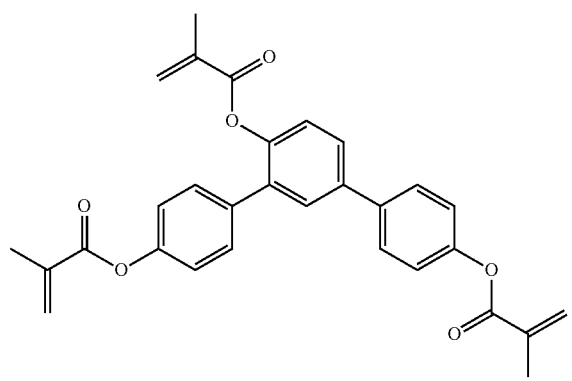 [SMILES: C=C(C)C(=O)Oc1ccc(-c2ccc(OC(=O)C(=C)C)c(-c3ccc(OC(=O)C(=C)C)cc3)c2)cc1]
RM-106

TABLE F-continued
Table F shows illustrative reactive mesogenic compounds which can be used in the LC media in accordance with the present invention.
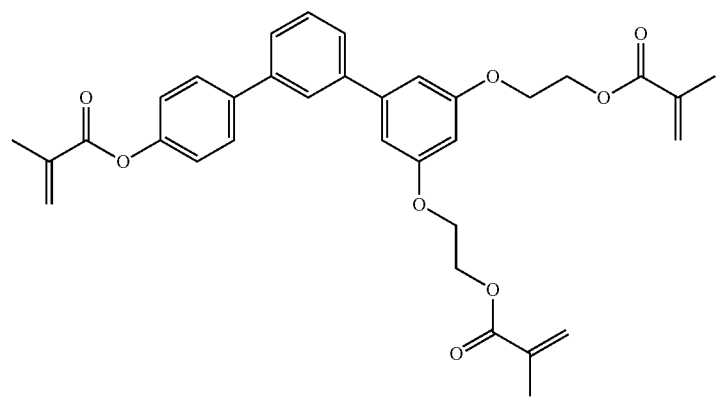 [SMILES: C=C(C)C(=O)OCCOc1cc(OCCOC(=O)C(=C)C)cc(-c2cccc(-c3ccc(OC(=O)C(=C)C)cc3)c2)c1]
RM-107
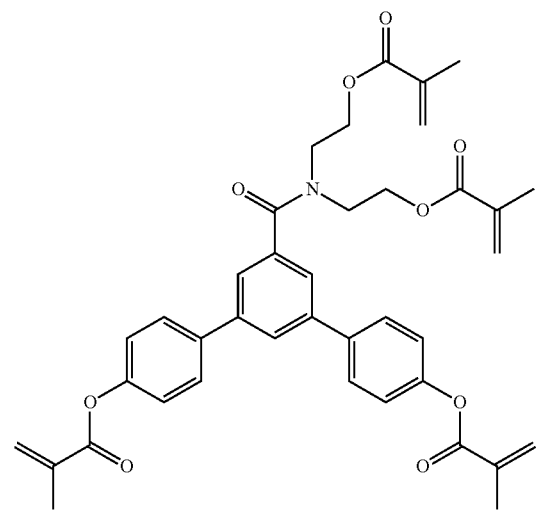 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-108
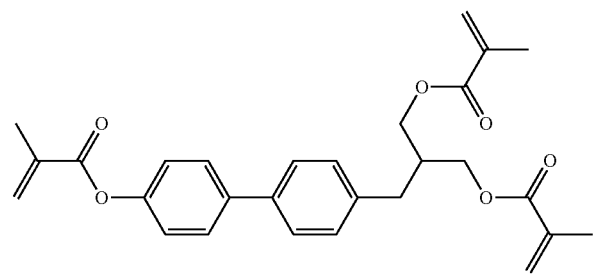
RM-109
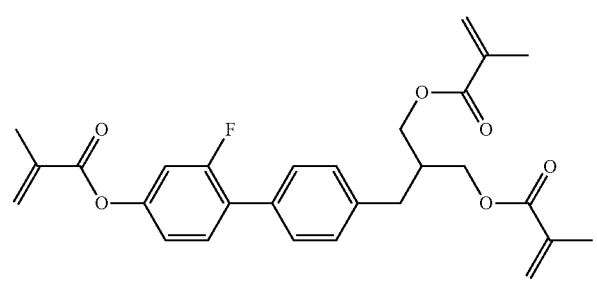 [SMILES: C=C(C)C(=O)OCC(COC(=O)C(=C)C)Cc1ccc(-c2ccc(OC(=O)C(=C)C)cc2F)cc1]
RM-110

TABLE F-continued
Table F shows illustrative reactive mesogenic compounds which can be used in the
LC media in accordance with the present invention.
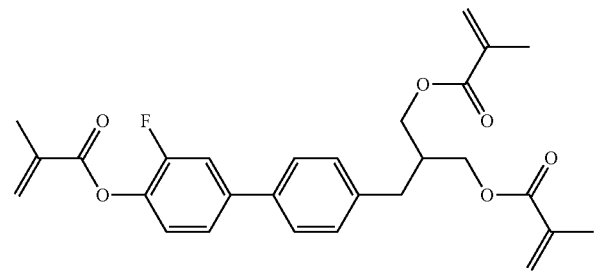 [SMILES: C=C(C)C(=O)OCC(COC(=O)C(=C)C)Cc1ccc(-c2ccc(OC(=O)C(=C)C)c(F)c2)cc1]
RM-111
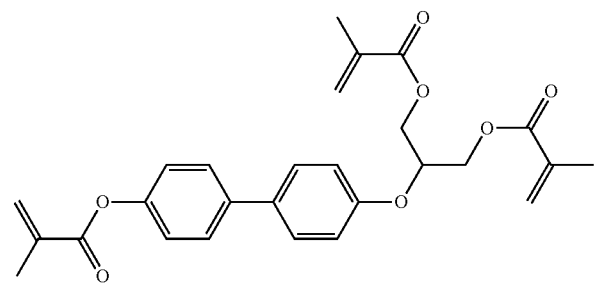 [SMILES: C=C(C)C(=O)OCC(COC(=O)C(=C)C)Oc1ccc(-c2ccc(OC(=O)C(=C)C)cc2)cc1]
RM-112
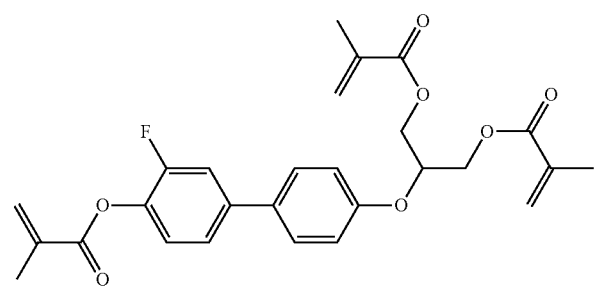 [SMILES: C=C(C)C(=O)OCC(COC(=O)C(=C)C)Oc1ccc(-c2ccc(OC(=O)C(=C)C)c(F)c2)cc1]
RM-113
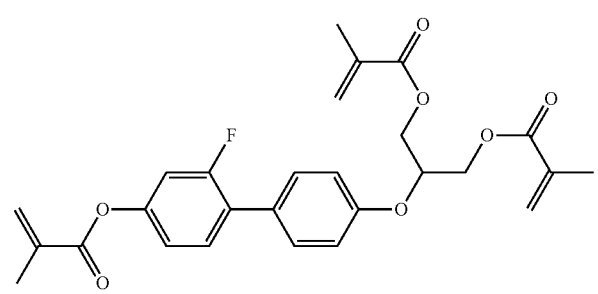 [SMILES: C=C(C)C(=O)OCC(COC(=O)C(=C)C)Oc1ccc(-c2ccc(OC(=O)C(=C)C)cc2F)cc1]
RM-114
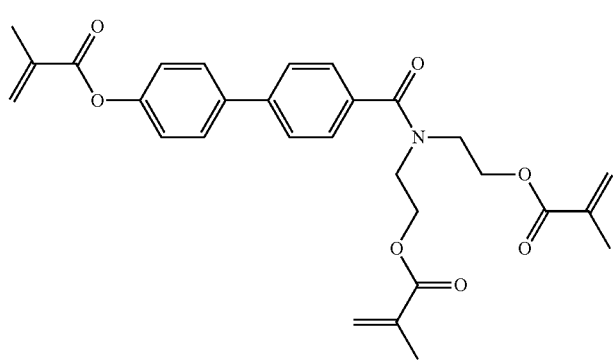 [SMILES: C=C(C)C(=O)OCCN(CCOC(=O)C(=C)C)C(=O)c1ccc(-c2ccc(OC(=O)C(=C)C)cc2)cc1]
RM-115

TABLE F-continued
Table F shows illustrative reactive mesogenic compounds which can be used in the
LC media in accordance with the present invention.
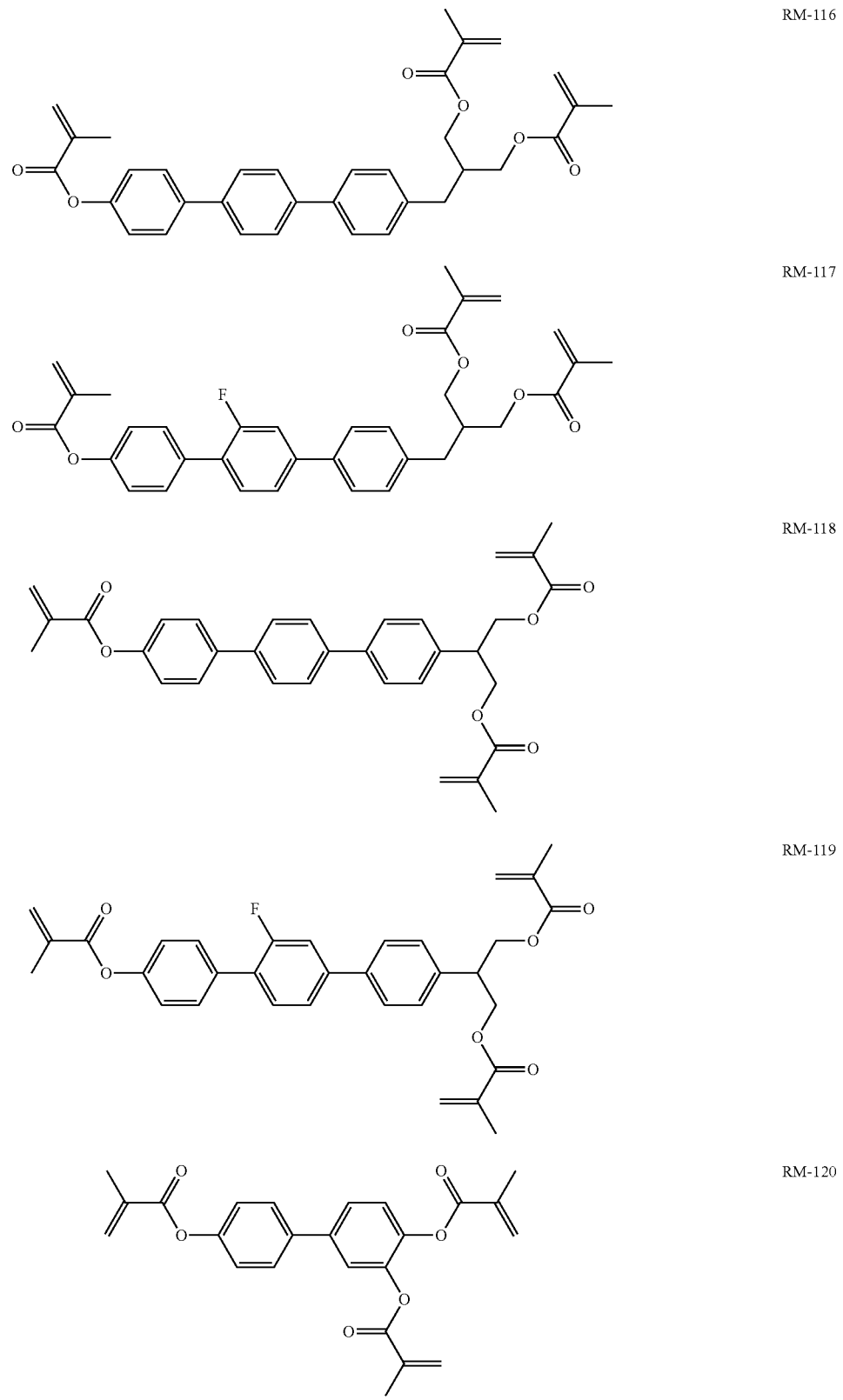
RM-116
RM-117
RM-118
RM-119
RM-120

TABLE F-continued
Table F shows illustrative reactive mesogenic compounds which can be used in the LC media in accordance with the present invention.
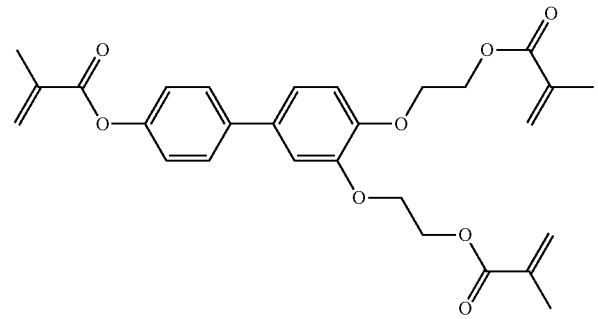 [SMILES: C=C(C)C(=O)OCCOc1ccc(-c2ccc(OC(=O)C(=C)C)cc2)cc1OCCOC(=O)C(=C)C] RM-121
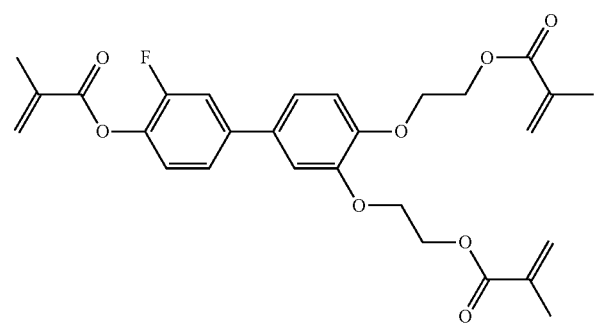 [SMILES: C=C(C)C(=O)OCCOc1ccc(-c2ccc(OC(=O)C(=C)C)c(F)c2)cc1OCCOC(=O)C(=C)C] RM-122
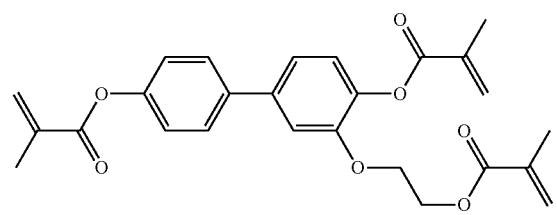 [SMILES: C=C(C)C(=O)OCCOc1cc(-c2ccc(OC(=O)C(=C)C)cc2)ccc1OC(=O)C(=C)C] RM-123
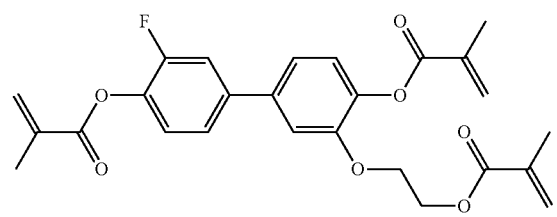 [SMILES: C=C(C)C(=O)OCCOc1cc(-c2ccc(OC(=O)C(=C)C)c(F)c2)ccc1OC(=O)C(=C)C] RM-124
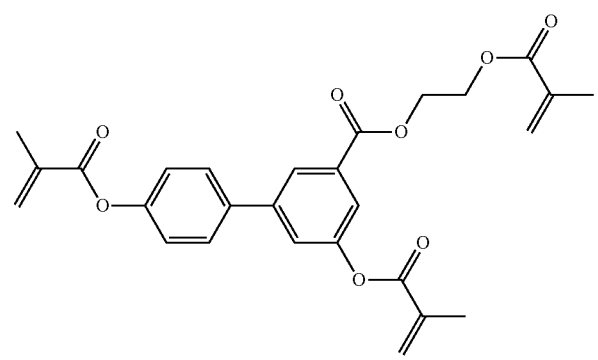 [SMILES: C=C(C)C(=O)OCCOC(=O)c1cc(OC(=O)C(=C)C)cc(-c2ccc(OC(=O)C(=C)C)cc2)c1] RM-125

TABLE F-continued
Table F shows illustrative reactive mesogenic compounds which can be used in the LC media in accordance with the present invention.
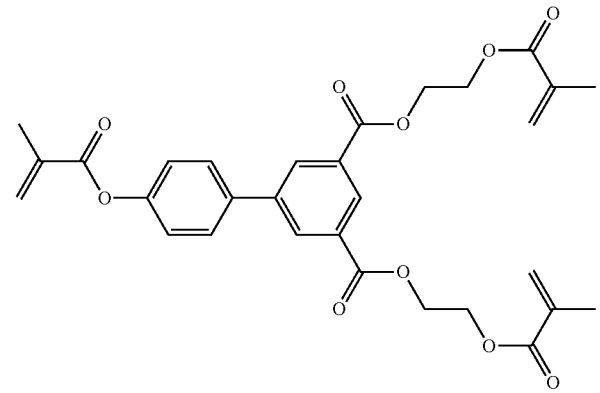 [SMILES: C=C(C)C(=O)OCCOC(=O)c1cc(C(=O)OCCOC(=O)C(=C)C)cc(-c2ccc(OC(=O)C(=C)C)cc2)c1]
RM-126
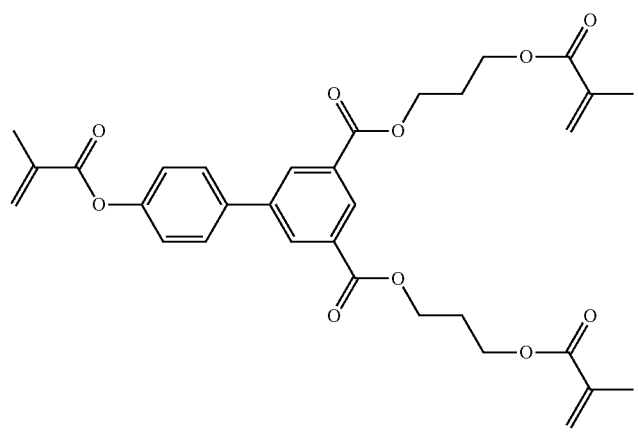 [SMILES: C=C(C)C(=O)OCCCOC(=O)c1cc(C(=O)OCCCOC(=O)C(=C)C)cc(-c2ccc(OC(=O)C(=C)C)cc2)c1]
RM-127
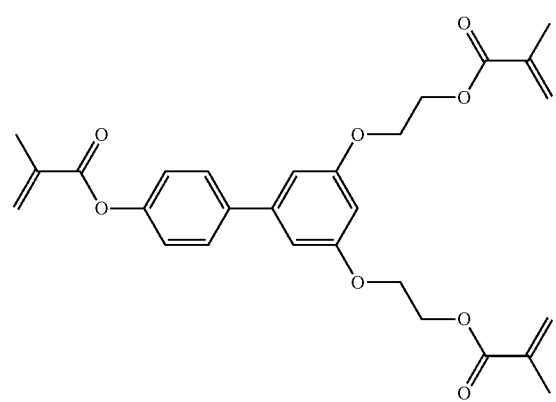 [SMILES: C=C(C)C(=O)OCCOc1cc(OCCOC(=O)C(=C)C)cc(-c2ccc(OC(=O)C(=C)C)cc2)c1]
RM-128

TABLE F-continued
Table F shows illustrative reactive mesogenic compounds which can be used in the LC media in accordance with the present invention.
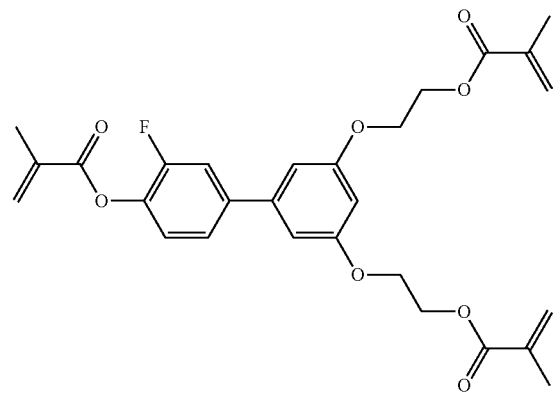 [SMILES: C=C(C)C(=O)OCCOc1cc(OCCOC(=O)C(=C)C)cc(-c2ccc(OC(=O)C(=C)C)c(F)c2)c1]
RM-129
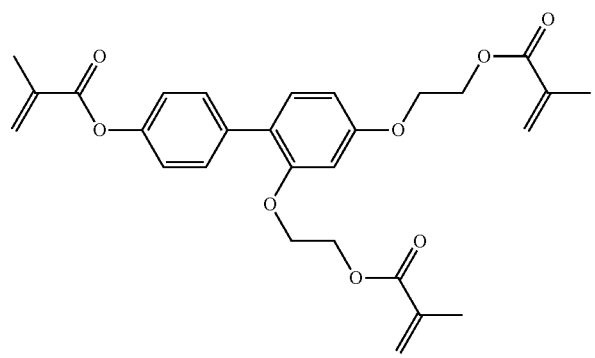 [SMILES: C=C(C)C(=O)OCCOc1ccc(-c2ccc(OC(=O)C(=C)C)cc2)c(OCCOC(=O)C(=C)C)c1]
RM-130
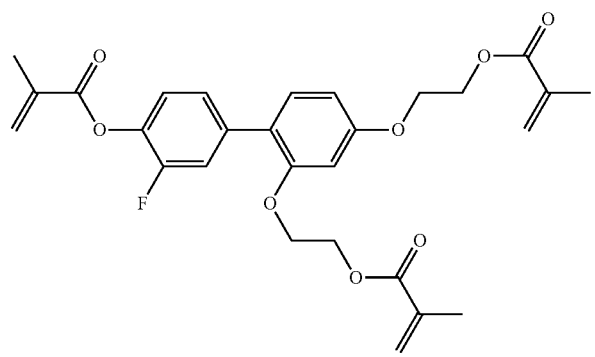 [SMILES: C=C(C)C(=O)OCCOc1ccc(-c2ccc(OC(=O)C(=C)C)c(F)c2)c(OCCOC(=O)C(=C)C)c1]
RM-131
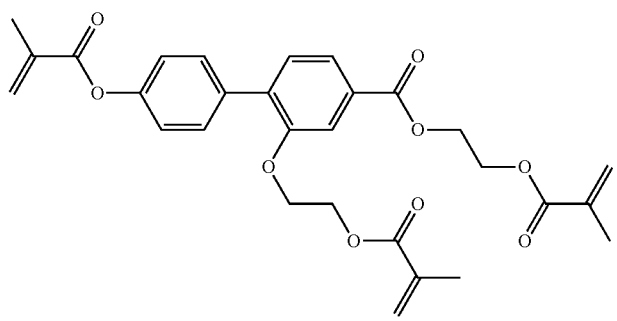 [SMILES: C=C(C)C(=O)OCCOC(=O)c1ccc(-c2ccc(OC(=O)C(=C)C)cc2)c(OCCOC(=O)C(=C)C)c1]
RM-132

TABLE F-continued
Table F shows illustrative reactive mesogenic compounds which can be used in the
LC media in accordance with the present invention.
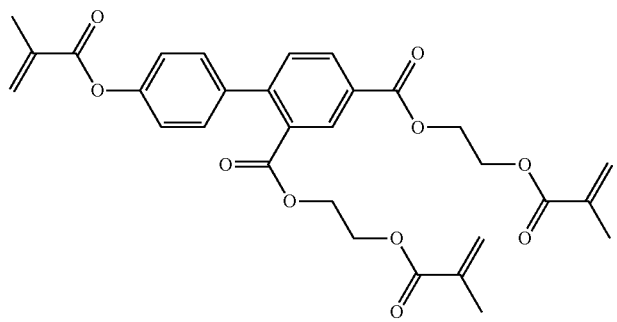 [SMILES: C=C(C)C(=O)OCCOC(=O)c1ccc(-c2ccc(OC(=O)C(=C)C)cc2)c(C(=O)OCCOC(=O)C(=C)C)c1]
RM-133
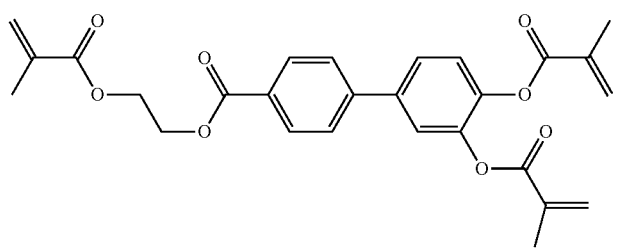 [SMILES: C=C(C)C(=O)OCCOC(=O)c1ccc(-c2ccc(OC(=O)C(=C)C)c(OC(=O)C(=C)C)c2)cc1]
RM-134
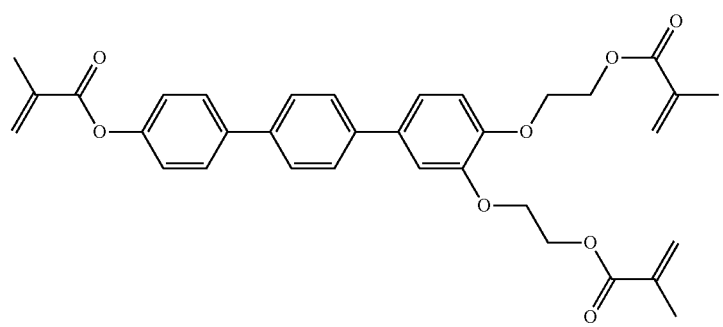 [SMILES: C=C(C)C(=O)OCCOc1ccc(-c2ccc(-c3ccc(OC(=O)C(=C)C)cc3)cc2)cc1OCCOC(=O)C(=C)C]
RM-135
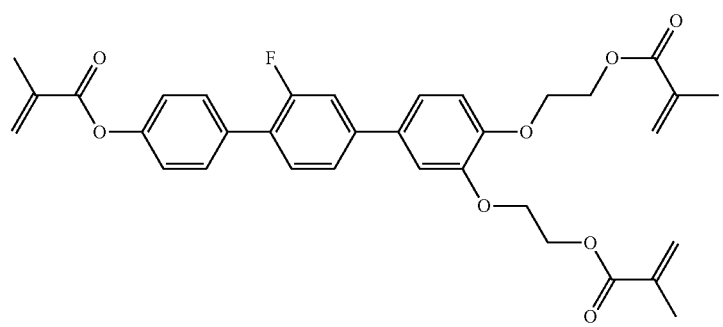 [SMILES: C=C(C)C(=O)OCCOc1ccc(-c2ccc(-c3ccc(OC(=O)C(=C)C)cc3)c(F)c2)cc1OCCOC(=O)C(=C)C]
RM-136

TABLE F-continued
Table F shows illustrative reactive mesogenic compounds which can be used in the
LC media in accordance with the present invention.
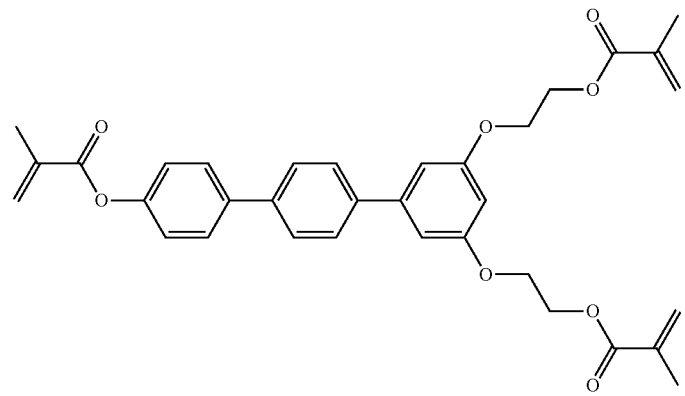 [SMILES: C=C(C)C(=O)OCCOc1cc(OCCOC(=O)C(=C)C)cc(-c2ccc(-c3ccc(OC(=O)C(=C)C)cc3)cc2)c1]
RM-137
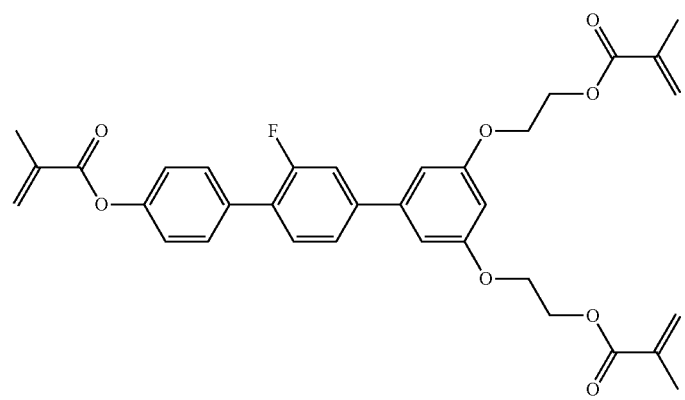 [SMILES: C=C(C)C(=O)OCCOc1cc(OCCOC(=O)C(=C)C)cc(-c2ccc(-c3ccc(OC(=O)C(=C)C)cc3)c(F)c2)c1]
RM-138
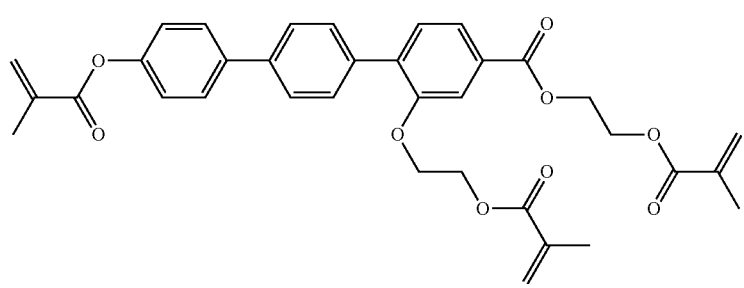 [SMILES: C=C(C)C(=O)OCCOC(=O)c1ccc(-c2ccc(-c3ccc(OC(=O)C(=C)C)cc3)cc2)c(OCCOC(=O)C(=C)C)c1]
RM-139
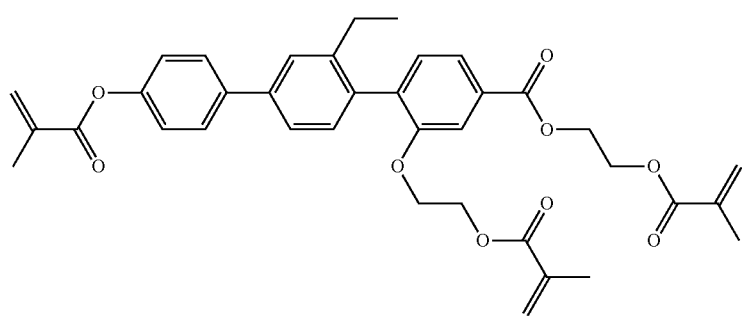 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]
RM-140

TABLE F-continued
Table F shows illustrative reactive mesogenic compounds which can be used in the
LC media in accordance with the present invention.
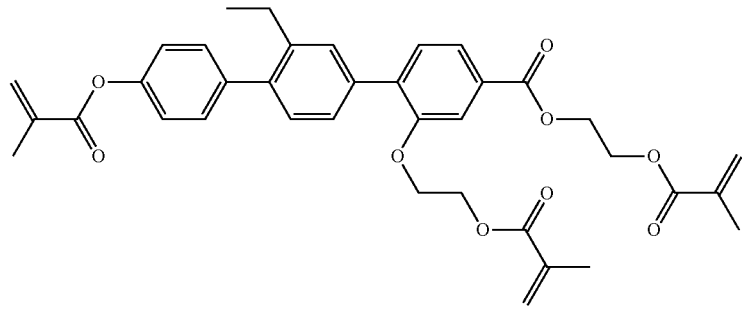 [SMILES: C=C(C)C(=O)OCCOC(=O)c1ccc(-c2ccc(-c3ccc(OC(=O)C(=C)C)cc3)c(CC)c2)c(OCCOC(=O)C(=C)C)c1]
RM-141
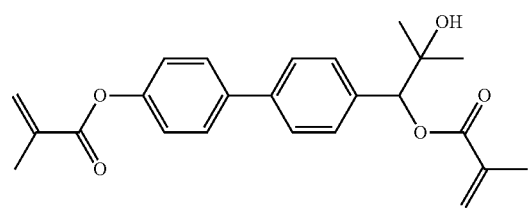 [SMILES: C=C(C)C(=O)Oc1ccc(-c2ccc(C(OC(=O)C(=C)C)C(C)(C)O)cc2)cc1]
RM-142
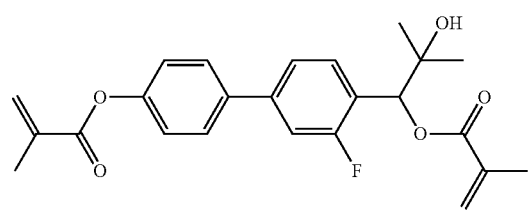 [SMILES: C=C(C)C(=O)Oc1ccc(-c2ccc(C(OC(=O)C(=C)C)C(C)(C)O)c(F)c2)cc1]
RM-143
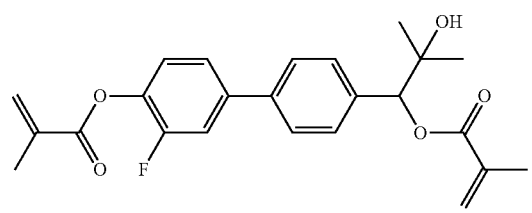 [SMILES: C=C(C)C(=O)Oc1ccc(-c2ccc(C(OC(=O)C(=C)C)C(C)(C)O)cc2)cc1F]
RM-144
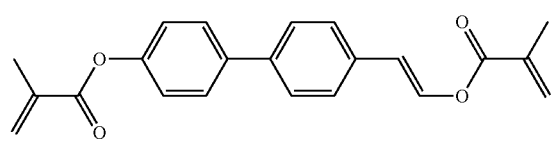 [SMILES: C=C(C)C(=O)O/C=C/c1ccc(-c2ccc(OC(=O)C(=C)C)cc2)cc1]
RM-145
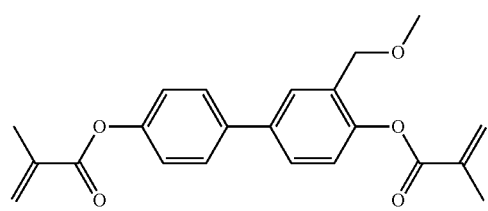 [SMILES: C=C(C)C(=O)Oc1ccc(-c2ccc(OC(=O)C(=C)C)c(COC)c2)cc1]
RM-146
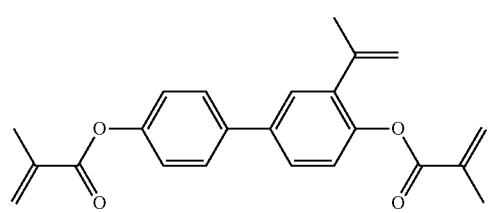 [SMILES: C=C(C)C(=O)Oc1ccc(-c2ccc(OC(=O)C(=C)C)c(C(=C)C)c2)cc1]
RM-147

TABLE F-continued

Table F shows illustrative reactive mesogenic compounds which can be used in the
LC media in accordance with the present invention.

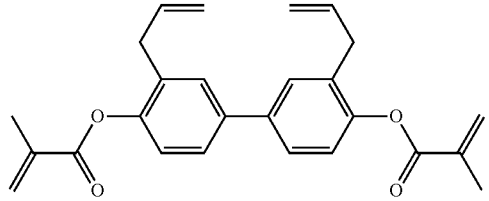 [SMILES: C=CCc1cc(-c2ccc(OC(=O)C(=C)C)c(CC=C)c2)ccc1OC(=O)C(=C)C]

RM-148

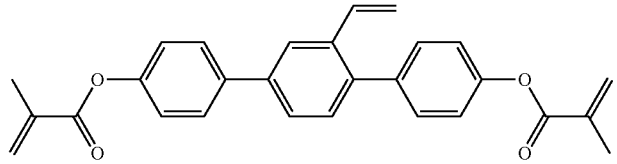

RM-149

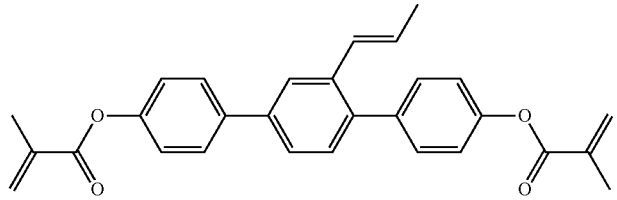

RM-150

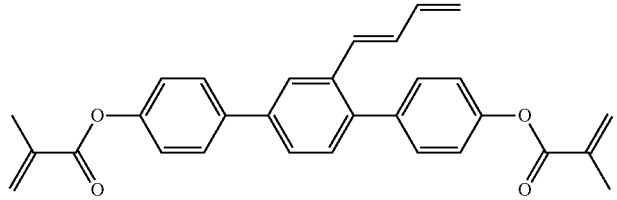 [SMILES: C=C/C=C/c1cc(-c2ccc(OC(=O)C(=C)C)cc2)ccc1-c1ccc(OC(=O)C(=C)C)cc1]

RM-151

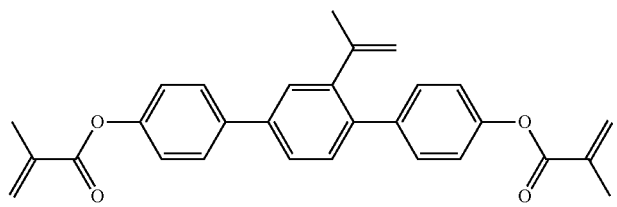 [SMILES: C=C(C)C(=O)Oc1ccc(-c2ccc(-c3ccc(OC(=O)C(=C)C)cc3)c(C(=C)C)c2)cc1]

RM-152

In a preferred embodiment, the mixtures according to the invention comprise one or more polymerisable compounds, preferably selected from the polymerisable compounds of the formulae RM-1 to RM-144. Of these, compounds RM-1, RM-4, RM-8, RM-17, RM-19, RM-35, RM-37, RM-39, RM-40, RM-41, RM-48, RM-52, RM-54, RM-57, RM-64, RM-74, RM-76, RM-88, RM-102, RM-103, RM-109, RM-117, RM-120, RM-121, RM-122 and RM-145 to RM-152 are particularly preferred.

In another preferred embodiment, the mixtures according to the invention comprise one or more polymerisable compounds selected from the formulae RM-145 to RM-152, very preferably from the formulae RM-147 to RM-152.

TABLE G

Table G shows self-alignment additives for vertical alignment which can be used in
LC media for SA-VA and SA-FFS displays according to the present invention
together with the polymerizable compounds of formula P:

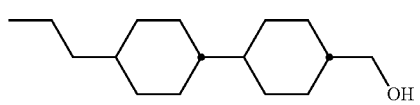

SA-1

TABLE G-continued
Table G shows self-alignment additives for vertical alignment which can be used in LC media for SA-VA and SA-FFS displays according to the present invention together with the polymerizable compounds of formula P:
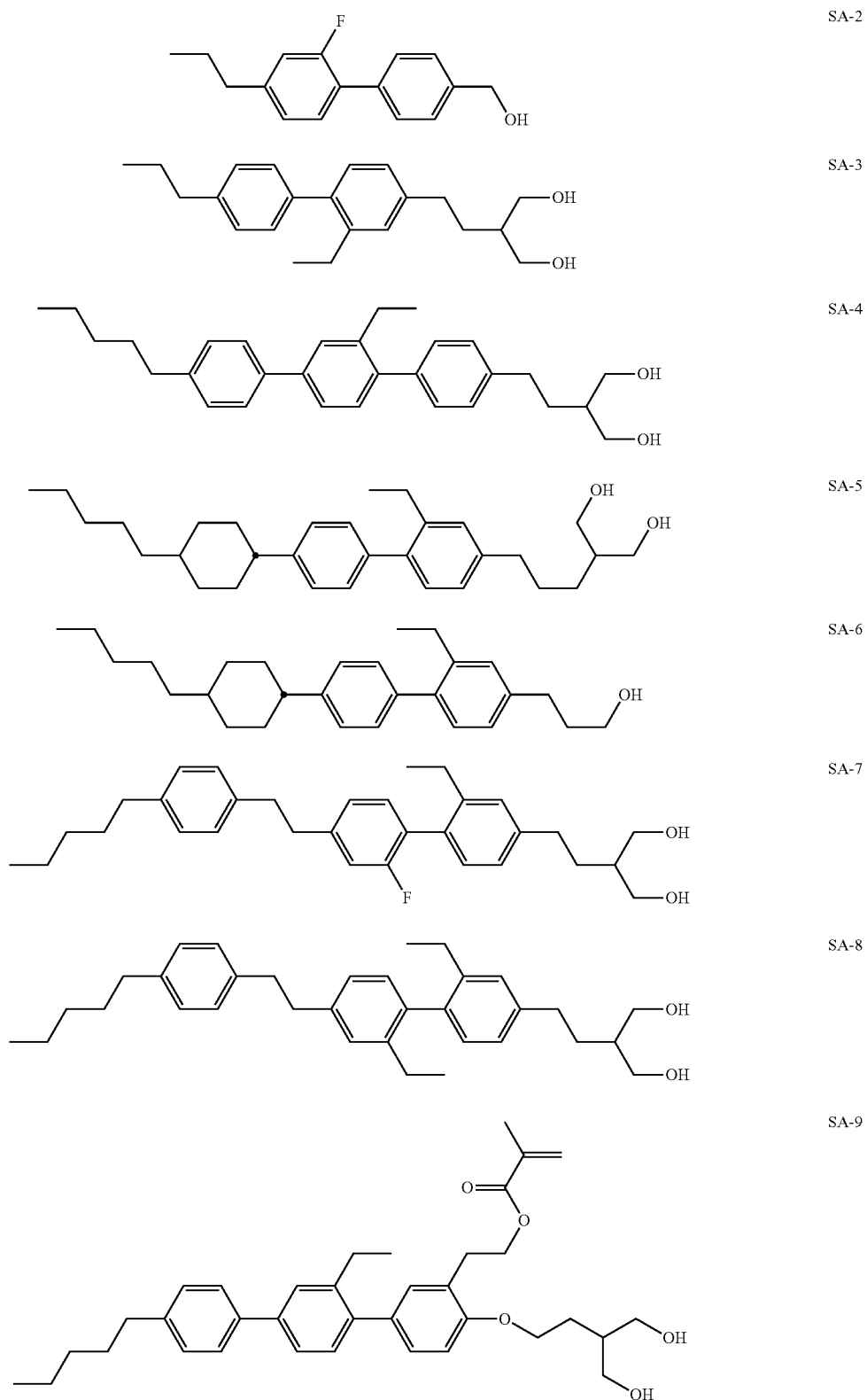
SA-2
SA-3
SA-4
SA-5
SA-6
SA-7
SA-8
SA-9

TABLE G-continued
Table G shows self-alignment additives for vertical alignment which can be used in
LC media for SA-VA and SA-FFS displays according to the present invention
together with the polymerizable compounds of formula P:
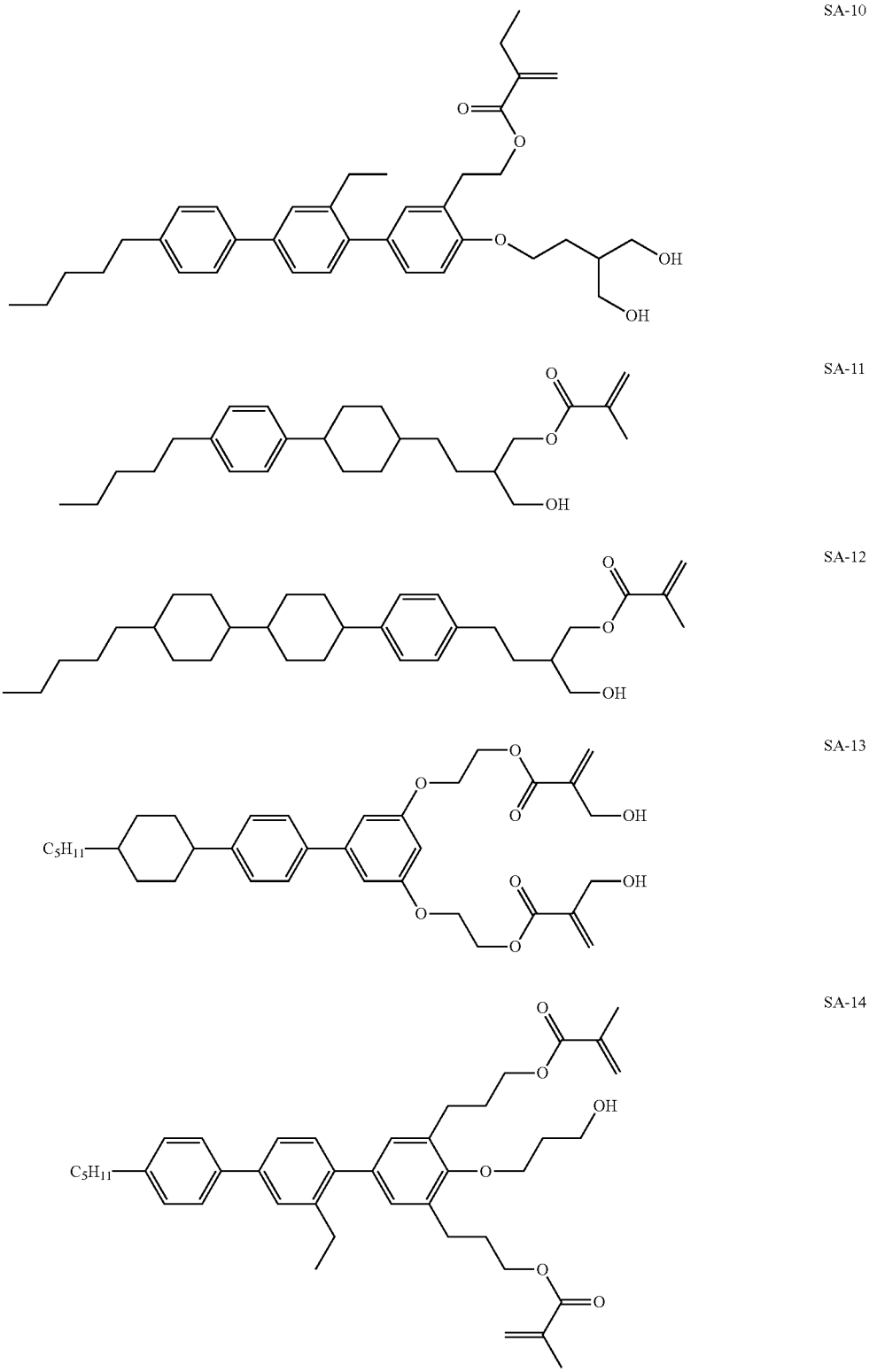
SA-10
SA-11
SA-12
SA-13
SA-14

TABLE G-continued
Table G shows self-alignment additives for vertical alignment which can be used in LC media for SA-VA and SA-FFS displays according to the present invention together with the polymerizable compounds of formula P:
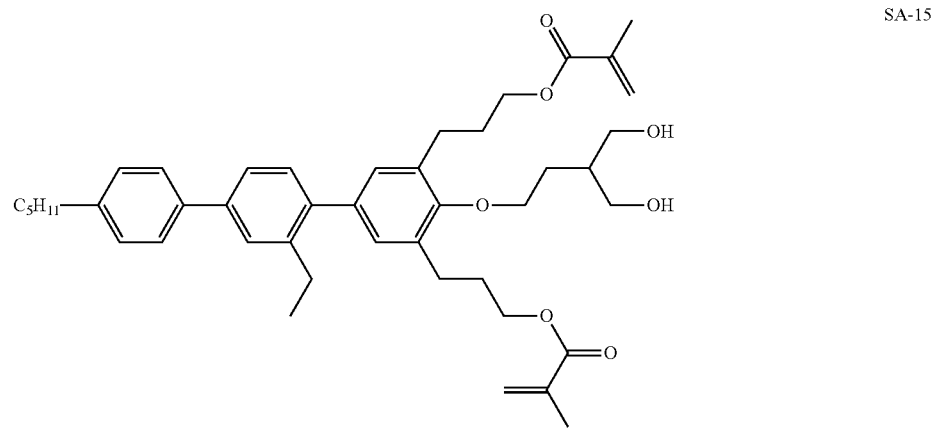
SA-15
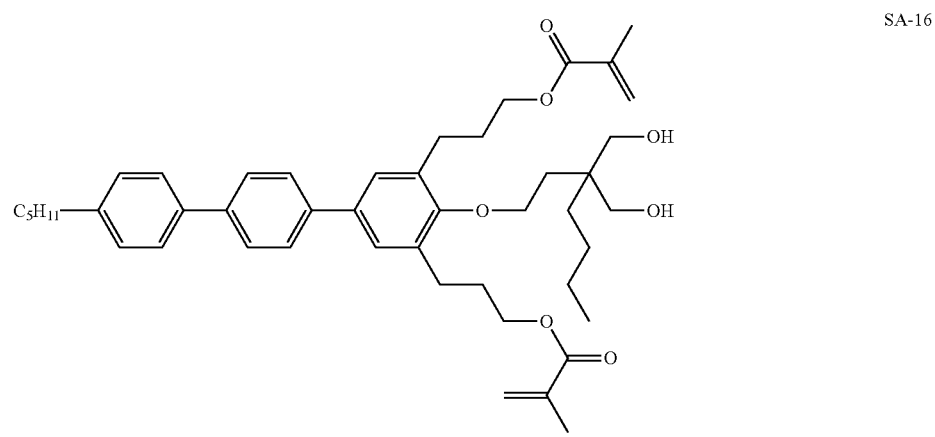
SA-16
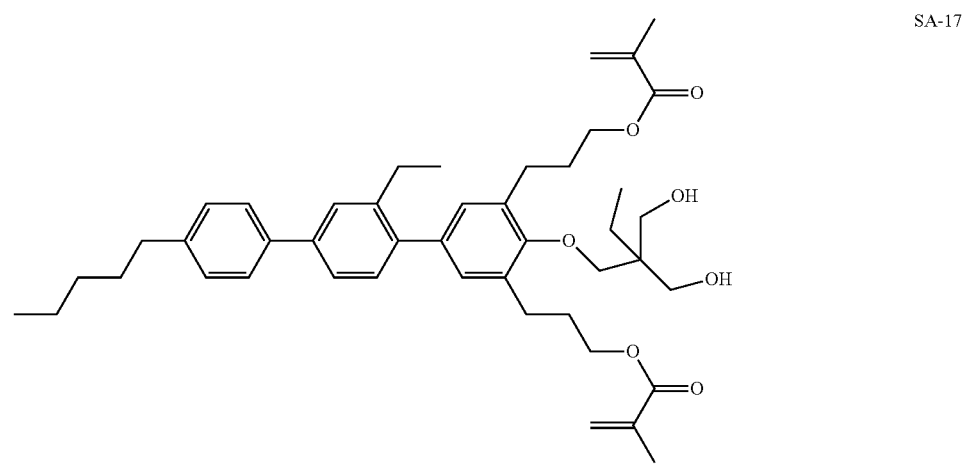
SA-17

TABLE G-continued
Table G shows self-alignment additives for vertical alignment which can be used in
LC media for SA-VA and SA-FFS displays according to the present invention
together with the polymerizable compounds of formula P:
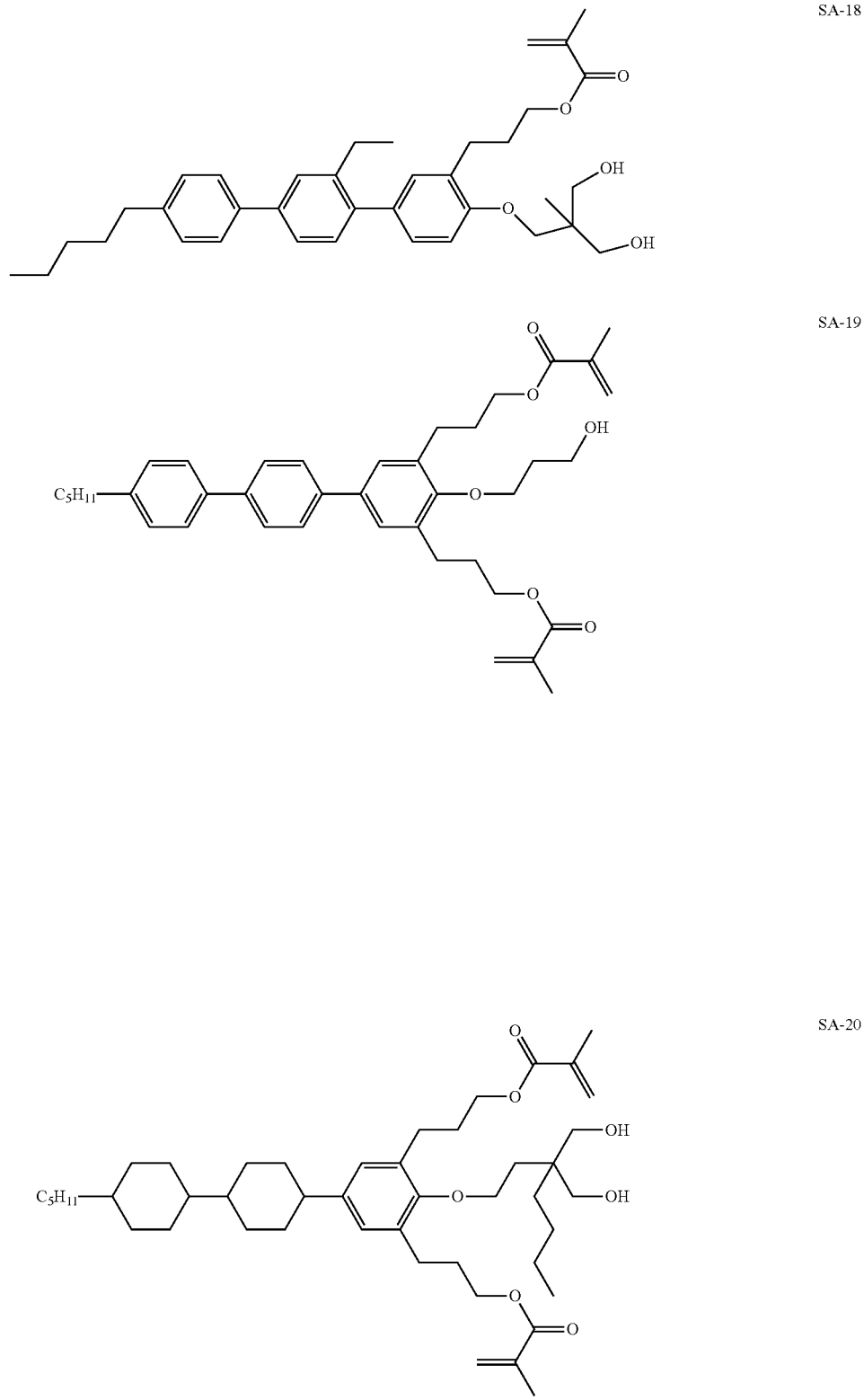
SA-18
SA-19
SA-20

TABLE G-continued
Table G shows self-alignment additives for vertical alignment which can be used in
LC media for SA-VA and SA-FFS displays according to the present invention
together with the polymerizable compounds of formula P:
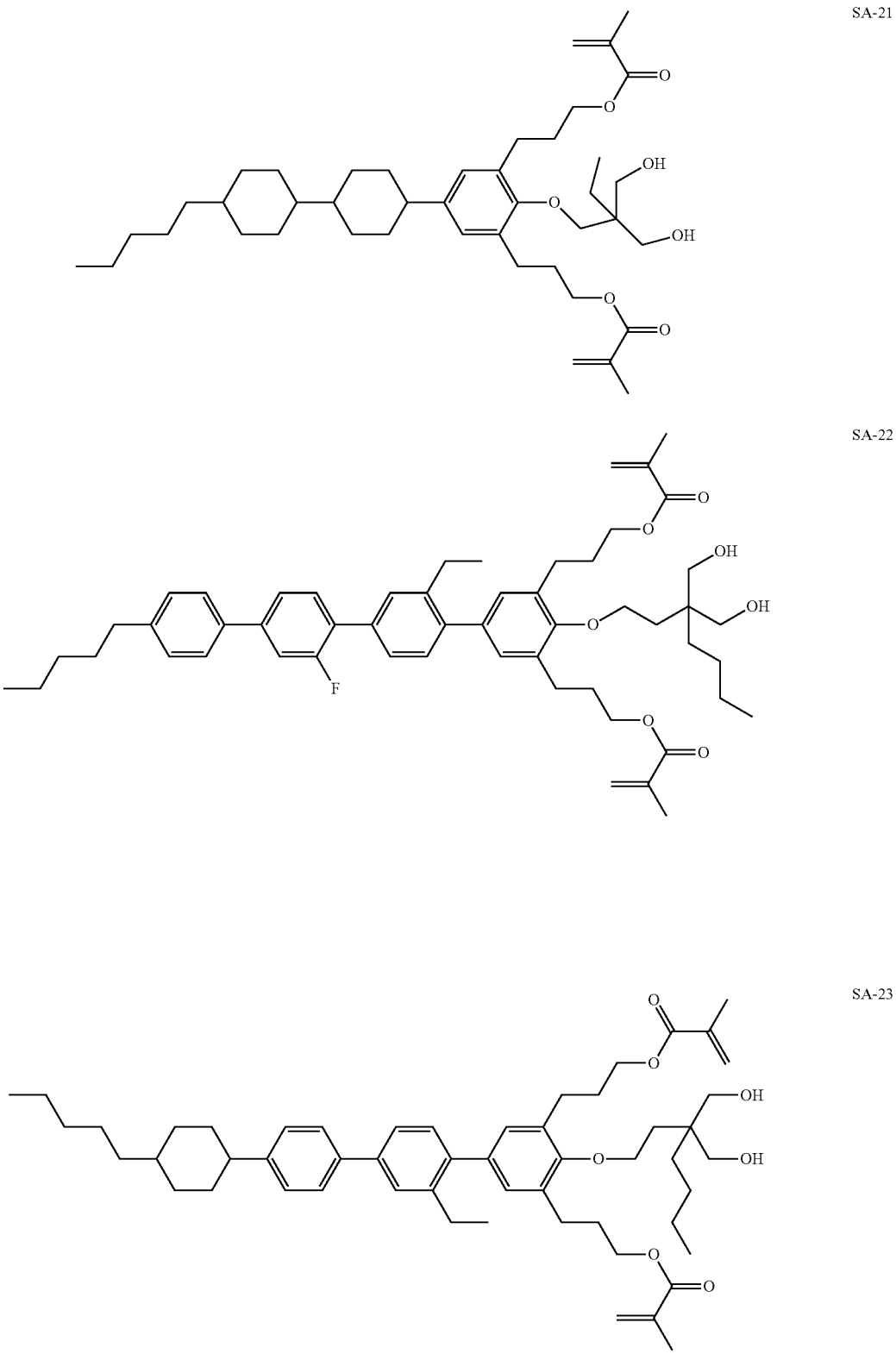
SA-21
SA-22
SA-23

TABLE G-continued
Table G shows self-alignment additives for vertical alignment which can be used in
LC media for SA-VA and SA-FFS displays according to the present invention
together with the polymerizable compounds of formula P:
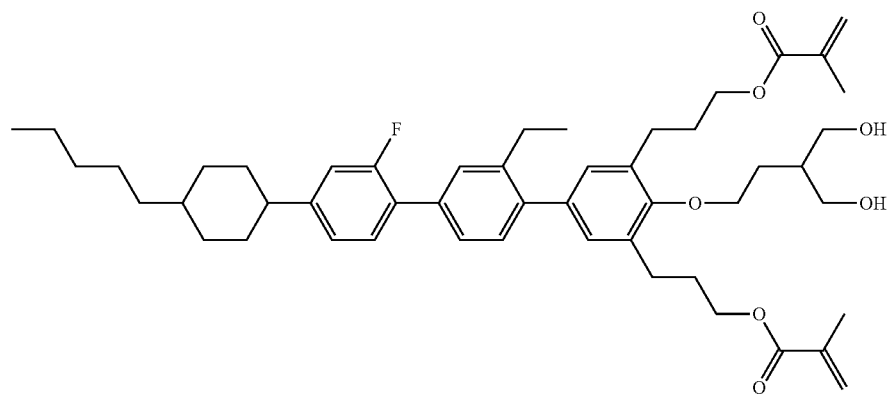 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)CO]
SA-24
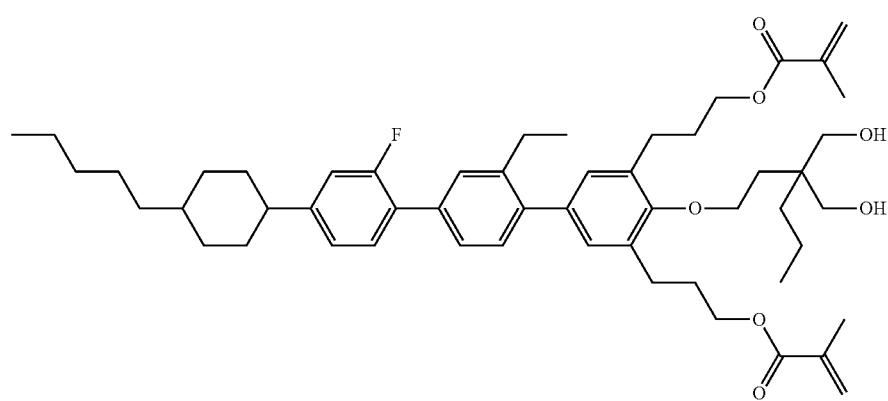
SA-25
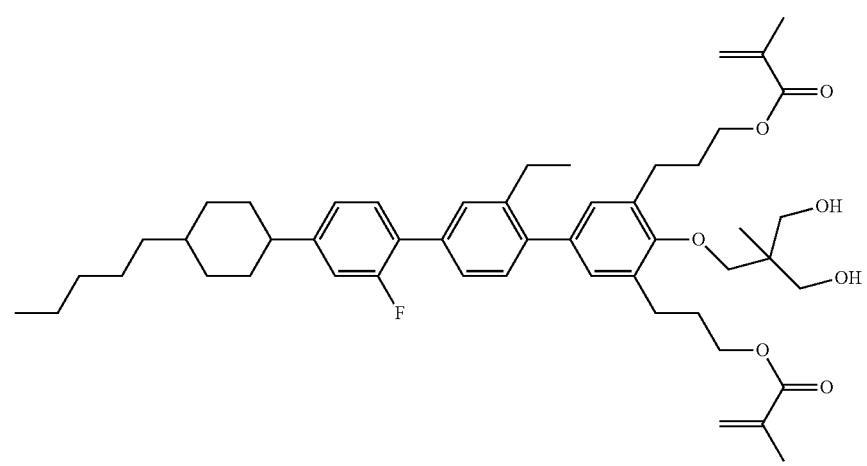 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCC(C)(CO)CO]
SA-26

TABLE G-continued
Table G shows self-alignment additives for vertical alignment which can be used in
LC media for SA-VA and SA-FFS displays according to the present invention
together with the polymerizable compounds of formula P:
SA-27
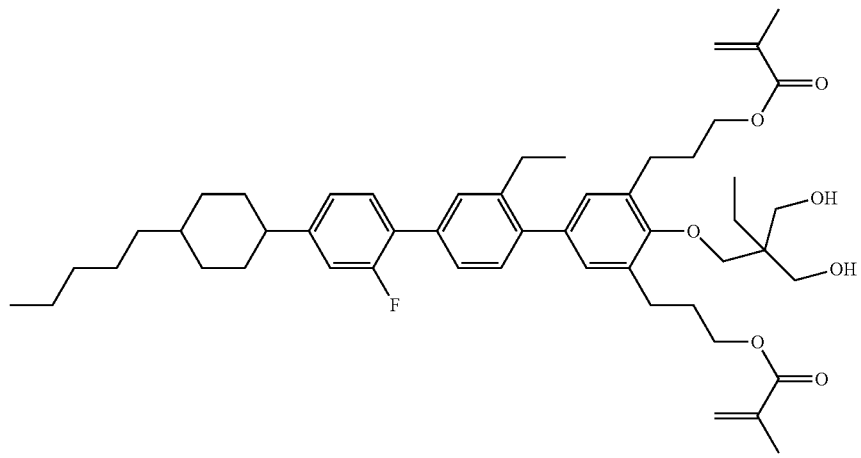
SA-28
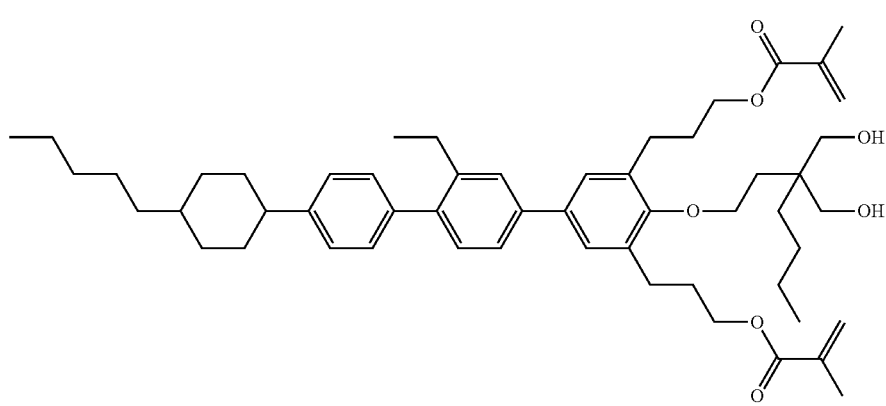 [SMILES: C=C(C)C(=O)OCCCc1cc(-c2ccc(-c3ccc(C4CCC(CCCCC)CC4)cc3)c(CC)c2)cc(CCCOC(=O)C(=C)C)c1OCCC(CO)(CO)CCCC]
SA-29
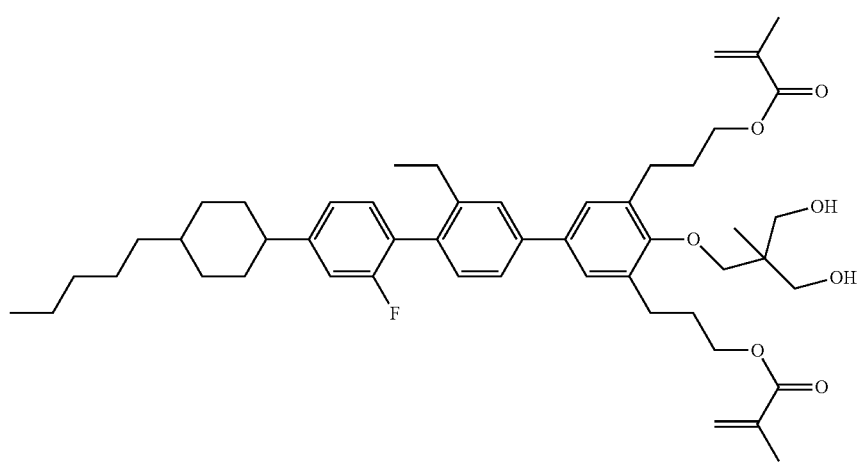 [SMILES: C=C(C)C(=O)OCCCc1cc(-c2ccc(-c3ccc(C4CCC(CCCCC)CC4)cc3F)c(CC)c2)cc(CCCOC(=O)C(=C)C)c1OCC(C)(CO)CO]

TABLE G-continued
Table G shows self-alignment additives for vertical alignment which can be used in
LC media for SA-VA and SA-FFS displays according to the present invention
together with the polymerizable compounds of formula P:
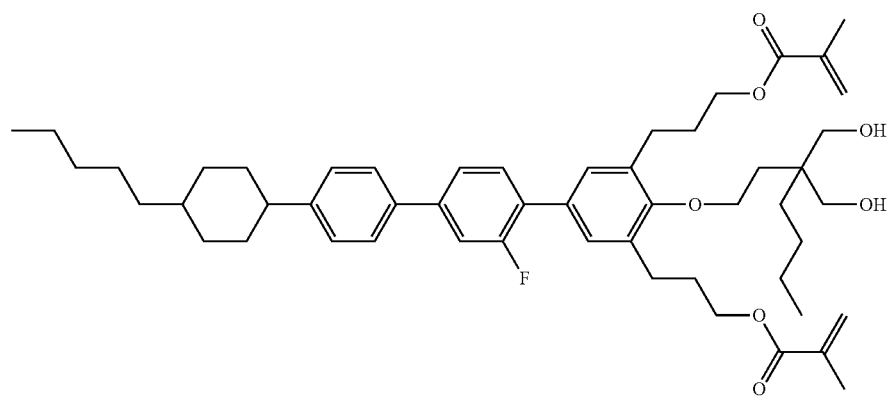 [SMILES: C=C(C)C(=O)OCCCc1cc(-c2ccc(-c3ccc(C4CCC(CCCCC)CC4)cc3)cc2F)cc(CCCOC(=O)C(=C)C)c1OCCC(CO)(CO)CCCC]
SA-30
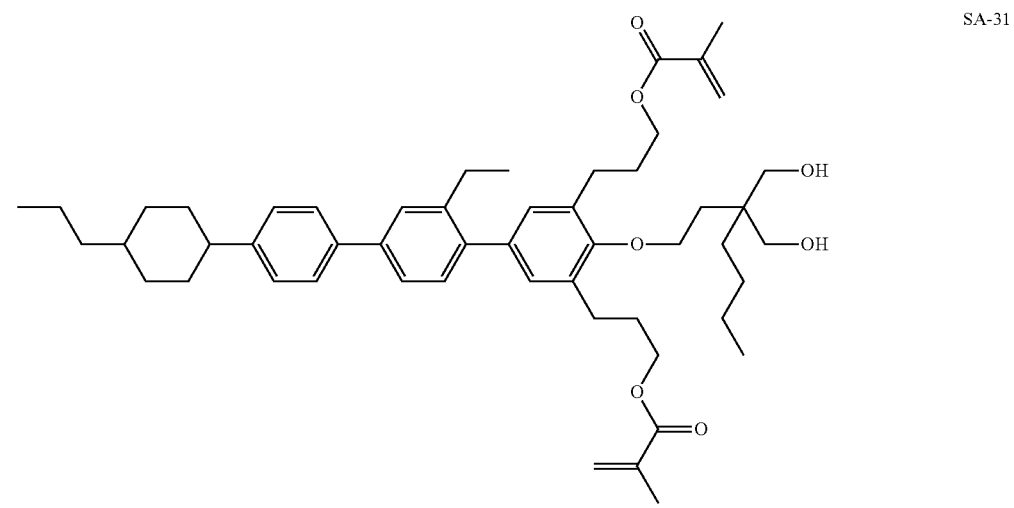
SA-31
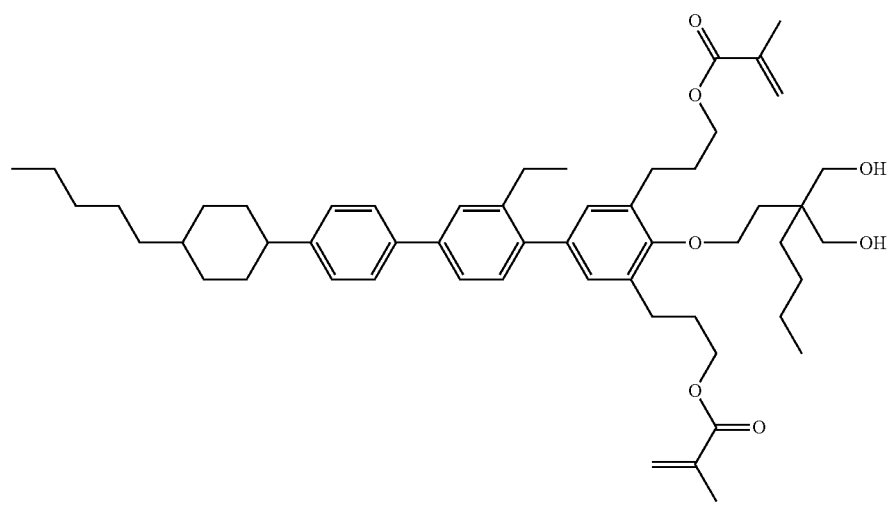 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCC]
SA-32

TABLE G-continued
Table G shows self-alignment additives for vertical alignment which can be used in
LC media for SA-VA and SA-FFS displays according to the present invention
together with the polymerizable compounds of formula P:
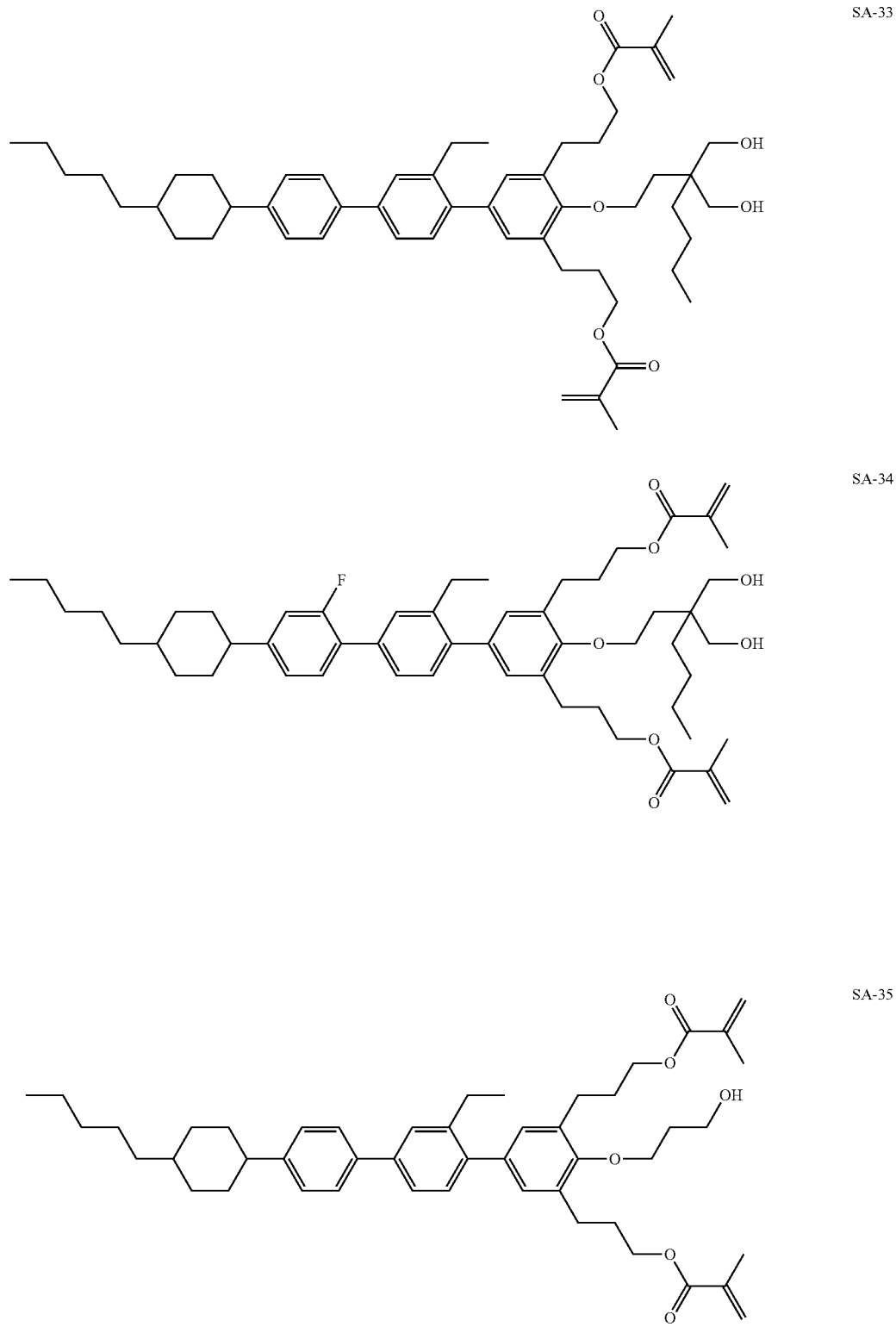
SA-33
SA-34
SA-35

TABLE G-continued
Table G shows self-alignment additives for vertical alignment which can be used in LC media for SA-VA and SA-FFS displays according to the present invention together with the polymerizable compounds of formula P:
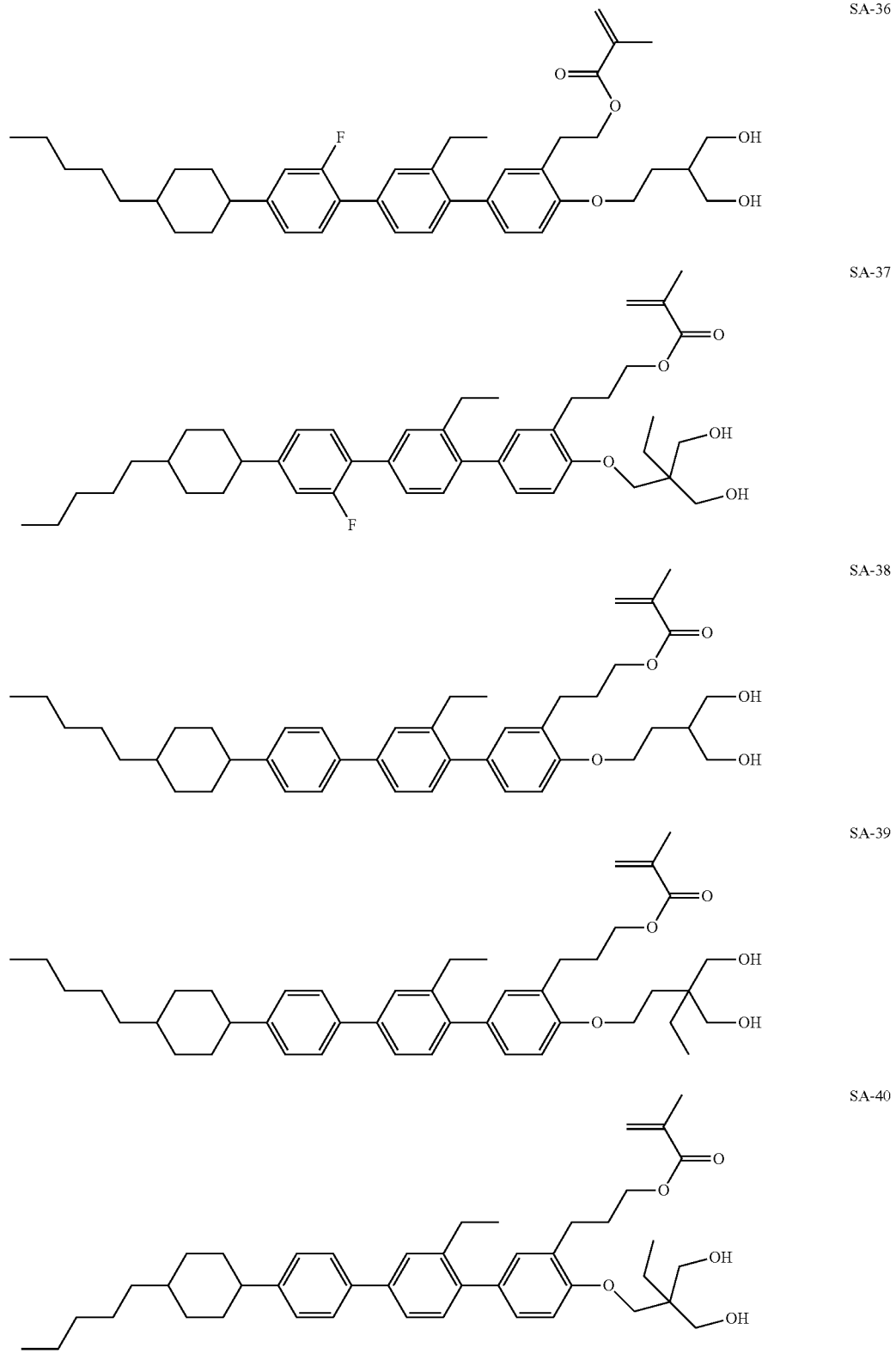
SA-36
SA-37
SA-38
SA-39
SA-40

TABLE G-continued
Table G shows self-alignment additives for vertical alignment which can be used in
LC media for SA-VA and SA-FFS displays according to the present invention
together with the polymerizable compounds of formula P:
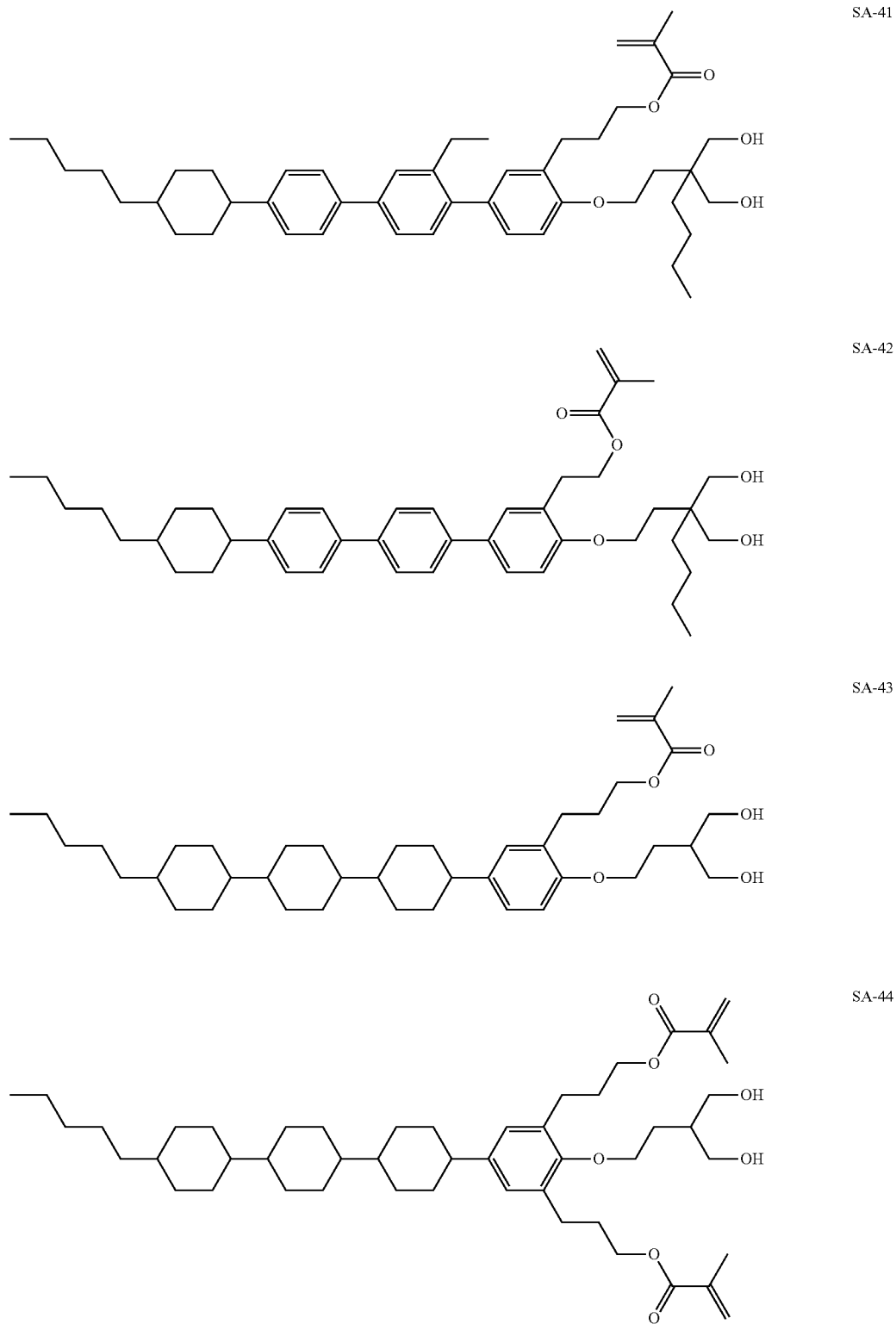
SA-41
SA-42
SA-43
SA-44

TABLE G-continued
Table G shows self-alignment additives for vertical alignment which can be used in
LC media for SA-VA and SA-FFS displays according to the present invention
together with the polymerizable compounds of formula P:
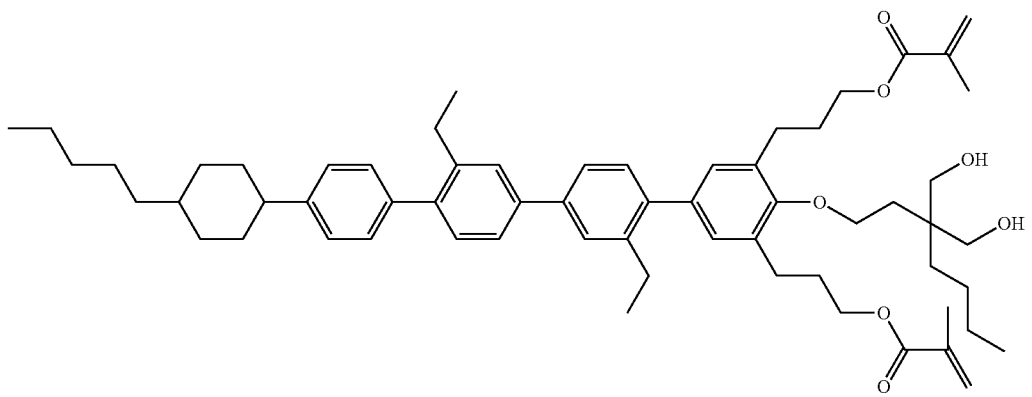 [SMILES: C=C(C)C(=O)OCCCc1cc(-c2ccc(-c3ccc(-c4ccc(C5CCC(CCCCC)CC5)cc4)c(CC)c3)cc2CC)cc(CCCOC(=O)C(=C)C)c1OCCC(CO)(CO)CCCC]
SA-45
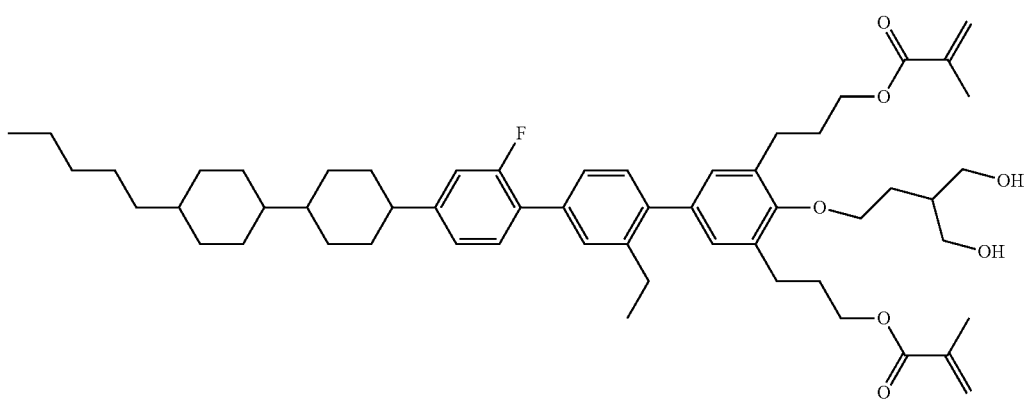 [SMILES: C=C(C)C(=O)OCCCc1cc(-c2ccc(-c3ccc(C4CCC(C5CCC(CCCCC)CC5)CC4)cc3F)cc2CC)cc(CCCOC(=O)C(=C)C)c1OCCC(CO)CO]
SA-46
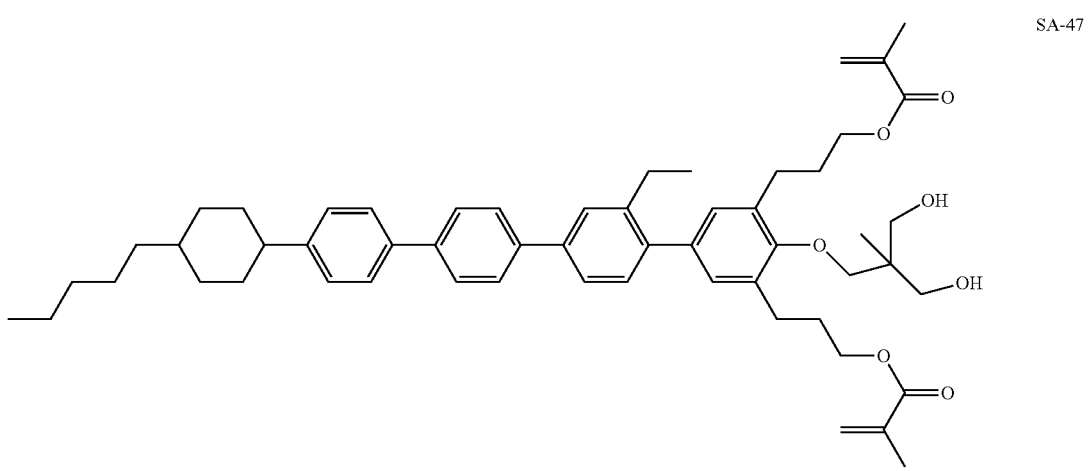
SA-47

TABLE G-continued

Table G shows self-alignment additives for vertical alignment which can be used in
LC media for SA-VA and SA-FFS displays according to the present invention
together with the polymerizable compounds of formula P:

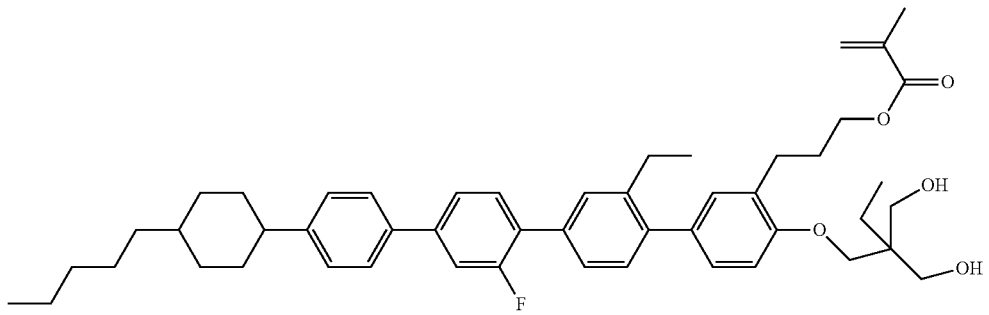 [SMILES: C=C(C)C(=O)OCCCc1cc(-c2ccc(-c3ccc(-c4ccc(C5CCC(CCCCC)CC5)cc4)cc3F)cc2CC)ccc1OCC(CC)(CO)CO]

SA-48

In a preferred embodiment, the LC media, SA-VA and SA-FFS displays according to the present invention comprise one or more SA additives selected from formulae SA-1 to SA-48, preferably from formulae SA-14 to SA-48, very preferably from formulae SA-20 to SA-34 and SA-44, in combination with one or more RMs of formula P.

Working Examples

The following examples are intended to explain the invention without limiting it. In the examples, m.p. denotes the melting point and C denotes the clearing point of a liquid-crystalline substance in degrees Celsius; boiling temperatures are denoted by m.p. Furthermore: C denotes crystalline solid state, S denotes smectic phase (the index denotes the phase type), N denotes nematic state, Ch denotes cholesteric phase, I denotes isotropic phase, $T_g$ denotes glass-transition temperature. The number between two symbols indicates the conversion temperature in degrees Celsius.

The host mixture used for determination of the optical anisotropy Δn of single compounds is the commercial mixture ZLI-4792 (Merck KGaA). The dielectric anisotropy Δε is determined using commercial mixture ZLI-2857. The physical data of the compound to be investigated are obtained from the change in the dielectric constants of the host mixture after addition of the compound to be investigated and extrapolation to 100% of the compound employed. In general, 10% of the compound to be investigated are dissolved in the host mixture, depending on the solubility.

Unless indicated otherwise, parts or percent data denote parts by weight or percent by weight.

Above and below:

$V_o$ denotes threshold voltage, capacitive [V] at 20° C., $n_e$ denotes extraordinary refractive index at 20° C. and 589 nm, $n_o$ denotes ordinary refractive index at 20° C. and 589 nm, Δn denotes optical anisotropy at 20° C. and 589 nm, $\varepsilon_\perp$ denotes dielectric permittivity perpendicular to the director at 20° C. and 1 kHz, $\varepsilon_\parallel$ denotes dielectric permittivity parallel to the director at 20° C. and 1 kHz, Δε denotes dielectric anisotropy at 20° C. and 1 kHz, cl.p., T(N,I) denotes clearing point [° C.], $\gamma_1$ denotes rotational viscosity measured at 20° C. [mPa·s], $K_1$ denotes elastic constant, "splay" deformation at 20° C. [pN], $K_2$ denotes elastic constant, "twist" deformation at 20° C. [pN], $K_3$ denotes elastic constant, "bend" deformation at 20° C. [pN], $K_{avg.}$ denotes average elastic constant defined as $K_{avg.} = \frac{1}{3}(1.5 K_1 + K_3)$ LTS denotes low-temperature stability (nematic phase), determined in test cells or in the bulk, as specified.

Unless explicitly noted otherwise, all values indicated in the present application for temperatures, such as, for example, the melting point T(C,N), the transition from the smectic (S) to the nematic (N) phase T(S,N) and the clearing point T(N,I) or cl.p., are indicated in degrees Celsius (° C.). M.p. denotes melting point. Furthermore, Tg=glass state, C=crystalline state, N=nematic phase, S=smectic phase and I=isotropic phase. The numbers between these symbols represent the transition temperatures.

The term "threshold voltage" for the present invention relates to the capacitive threshold ($V_0$), also called the Freedericksz threshold, unless explicitly indicated otherwise. In the examples, as is generally usual, the optical threshold can also be indicated for 10% relative contrast ($V_{10}$).

The display used for measurement of the capacitive threshold voltage consists of two plane-parallel glass outer plates at a separation of 20 μm, which each have on the insides an electrode layer and an unrubbed polyimide alignment layer on top, which cause a homeotropic edge alignment of the liquid-crystal molecules.

The display or test cell used for measurement of the tilt angle consists of two plane-parallel glass outer plates at a separation of 4 μm, which each have on the insides an electrode layer and a polyimide alignment layer on top, where the two polyimide layers are rubbed antiparallel to one another and cause a homeotropic edge alignment of the liquid-crystal molecules.

Unless indicated otherwise, the VHR is determined at 20° C. ($VHR_{20}$) and after 5 minutes in an oven at 100° C. ($VHR_{100}$) in a commercially available instrument Model LCM-1 (00004) from TOYO Corporation, Japan. The voltage used has a frequency of in a range from 1 Hz to 60 Hz, unless indicated more precisely.

The stability to UV irradiation is investigated in a "Suntest CPS+", a commercial instrument from Heraeus, Germany, using a Xenon lamp NXE1500B. The sealed test cells are irradiated for 2.0 h, unless explicitly indicated, without additional heating. The irradiation power in the wavelength range from 300 nm to 800 nm is 765 W/m² V. A UV "cut-off" filter having an edge wavelength of 310 nm is used in order to simulate the so-called window glass mode. In each series of experiments, at least four test cells are investigated for each condition, and the respective results are indicated as averages of the corresponding individual measurements.

The decrease in the voltage holding ratio (ΔVHR) usually caused by the exposure, for example by UV irradiation or by LCD backlighting, is determined in accordance with the following equation (1):

$$\Delta VHR(t) = VHR(t) - VHR(t=0) \quad (1)$$

In order to investigate the low-temperature stability, also known as "LTS", i.e. the stability of the LC mixture in the bulk against spontaneous crystallisation of individual components at low temperatures or the occurrence of smectic phases, as the case may be, several sealed bottles, each containing about 1 g of the material, are stored at one or more given temperatures, typically of −10° C., −20° C., −30° C. and/or −40° C. and it is inspected at regular intervals visually, whether a phase transition is observed or not. As soon as the first one of the samples at a given temperature shows a change time is noted. The time until the last inspection, at which no change has been observed, is noted as the respective LTS.

The ion density from which the resistivity is calculated is measured using the commercially available LC Material Characteristics Measurement System Model 6254 from Toyo Corporation, Japan, using VHR test cells with AL16301 Polyimide (JSR Corp., Japan) having a 3.2 μm cell gap. The measurement is performed after 5 min of storage in an oven at 60° C. or 100° C.

The so-called "HTP" denotes the helical twisting power of an optically active or chiral substance in an LC medium (in μm). Unless indicated otherwise, the HTP is measured in the commercially available nematic LC host mixture MLD-6260 (Merck KGaA) at a temperature of 20° C.

The Clearing point is measured using the Mettler Thermosystem FP900. The optical anisotropy (Δn) is measured using an Abbe-Refraktometer H005 (Natrium-spectral lamp Na10 at 589 nm, 20° C.). The dielectric anisotropy (Δε) is measured using an LCR-Meter E4980A/Agilent (G005) at 20° C. (c-parallel-cells with JALS 2096-R¹). The turn on voltage ($V_0$) is measured using an LCR-Meter E4980A/Agilent (G005) at 20° C. (c-parallel-cells with JALS 2096-R¹). The rotational viscosity (γ1) is measured using a TOYO LCM-2 (0002) at 20° C. (gamma 1 negative cells with JALS-2096-R 1). The elastic constant ($K_1$, splay) is measured using an LCR-Meter E4980A/Agilent (G005) at 20° C. (c parallel-cells with JALS 2096-R¹). $K_3$: The elastic constant ($K_3$, bend) is measured using an LCR-Meter E4980A/Agilent (G005) at 20° C. (c-parallel-cells with JALS 2096-R¹).

Unless explicitly noted otherwise, all concentrations in the present application are indicated in percent by weight and relate to the corresponding mixture as a whole, comprising all solid or liquid-crystalline components, without solvents. All physical properties are determined in accordance with "Merck Liquid Crystals, Physical Properties of Liquid Crystals", Status November 1997, Merck KGaA, Germany, and apply for a temperature of 20° C., unless explicitly indicated otherwise.

The following mixture examples having negative dielectric anisotropy are suitable, in particular, for liquid-crystal displays which have at least one planar alignment layer, such as, for example, IPS and FFS displays, in particular UB-FFS (=ultra-bright FFS), and for VA displays.

Mixture Examples and Comparative Examples

Comparative mixture C-1 and mixture examples N-1 to N-64 have the compositions and properties given in the following tables.

Comparative Mixture C1

| | | | |
|---|---|---|---|
| B(S)-2O-O5 | 3.0% | T(N, I) [° C.]: | 98.5 |
| CC-3-V | 29.5% | Δn [589 nm, 20° C.]: | 0.0926 |
| CC-3-V1 | 8.0% | $n_e$ [589 nm, 20° C.]: | 1.5731 |
| CCH-35 | 5.5% | $n_o$ [589 nm, 20° C.]: | 1.4805 |
| CCY-3-O1 | 6.0% | Δε [1 kHz, 20° C.]: | −3.9 |
| CCY-3-O2 | 8.0% | $\varepsilon_\parallel$ [1 kHz, 20° C.]: | 3.4 |
| CLY-3-O2 | 9.0% | $\varepsilon_\perp$ [1 kHz, 20° C.]: | 7.3 |
| CLY-3-O3 | 6.0% | γ1 [mPa s, 20° C.]: | 133 |
| CLY-4-O2 | 5.0% | $K_1$ [pN, 20° C.]: | 18.4 |
| CLY-5-O2 | 5.0% | $K_3$ [pN, 20° C.]: | 19.3 |
| COB(S)-2-O4 | 5.0% | LTS bulk [h, −20° C.]: | 432 |
| CY-3-O2 | 10.0% | | |
| Σ | 100.0% | | |

Mixture N-1

| | | | |
|---|---|---|---|
| B(S)-2O-O5 | 3.0% | T(N, I) [° C.]: | 95 |
| CC-3-V | 31.5% | Δn [589 nm, 20° C.]: | 0.0933 |
| CC-3-V1 | 6.5% | $n_e$ [589 nm, 20° C.]: | 1.5739 |
| CCH-35 | 5.0% | $n_o$ [589 nm, 20° C.]: | 1.4806 |
| CCY-3-O2 | 8.0% | Δε [1 kHz, 20° C.]: | −3.9 |
| CLY-3-O2 | 9.0% | $\varepsilon_\parallel$ [1 kHz, 20° C.]: | 3.4 |
| CLY-3-O3 | 6.0% | $\varepsilon_\perp$ [1 kHz, 20° C.]: | 7.2 |
| CLY-4-O2 | 5.0% | γ1 [mPa s, 20° C.]: | 128 |
| COB(S)-2-O4 | 5.0% | $K_1$ [pN, 20° C.]: | 18.3 |
| CY-3-O2 | 8.0% | $K_3$ [pN, 20° C.]: | 19.7 |
| PY-3-O2 | 3.0% | | |
| CCEY-3-O2 | 10.0% | | |
| Σ | 100.0% | | |

Mixture N-2

| | | | |
|---|---|---|---|
| B(S)-2O-O5 | 3.0% | T(N, I) [° C.]: | 90 |
| CC-3-V | 31.5% | Δn [589 nm, 20° C.]: | 0.0931 |
| CC-3-V1 | 6.5% | $n_e$ [589 nm, 20° C.]: | 1.5734 |
| CCH-35 | 5.0% | $n_o$ [589 nm, 20° C.]: | 1.4803 |
| CCY-3-O2 | 8.0% | Δε [1 kHz, 20° C.]: | −3.8 |
| CLY-3-O2 | 9.0% | $\varepsilon_\parallel$ [1 kHz, 20° C.]: | 3.4 |
| CLY-3-O3 | 5.0% | $\varepsilon_\perp$ [1 kHz, 20° C.]: | 7.2 |
| CLY-4-O2 | 3.0% | γ1 [mPa s, 20° C.]: | 121 |
| COB(S)-2-O4 | 5.0% | $K_1$ [pN, 20° C.]: | 18.1 |
| PY-3-O2 | 4.5% | $K_3$ [pN, 20° C.]: | 19.4 |
| CEY-3-O2 | 9.5% | | |
| CCEY-3-O2 | 10.0% | | |
| Σ | 100.0% | | |

Mixture N-3

| | | | |
|---|---|---|---|
| B(S)-2O-O4 | 3.0% | T(N, I) [° C.]: | 90.5 |
| B(S)-2O-O5 | 3.0% | Δn [589 nm, 20° C.]: | 0.0935 |
| CC-3-V | 32.5% | $n_e$ [589 nm, 20° C.]: | 1.5736 |
| CC-3-V1 | 6.5% | $n_o$ [589 nm, 20° C.]: | 1.4801 |
| CCH-35 | 5.0% | Δε [1 kHz, 20° C.]: | −3.9 |
| CCY-3-O2 | 9.0% | $\varepsilon_\parallel$ [1 kHz, 20° C.]: | 3.4 |
| CLY-3-O2 | 9.0% | $\varepsilon_\perp$ [1 kHz, 20° C.]: | 7.4 |
| CLY-3-O3 | 5.0% | γ1 [mPa s, 20° C.]: | 120 |
| COB(S)-2-O4 | 5.0% | $K_1$ [pN, 20° C.]: | 18.3 |

| | | | |
|---|---|---|---|
| PY-3-O2 | 2.0% | $K_3$ [pN, 20° C.]: | 19.5 |
| CEY-3-O2 | 10.0 | | |
| CCEY-3-O2 | 10.0% | | |
| Σ | 100.0% | | |

The comparison of the media N-1, N-2 and N-3 with medium C-1, which comprises a compound of formula II but no compound of formula I, unexpectedly shows significantly improved (lower) $\gamma_1/K_1$ values of the liquid crystalline media according to the invention due to the use of a compound of formula I, which results in faster switching of a display comprising the medium (cf. Table 1 below). In addition, the value of $K_{avg}$ is practically unchanged which corresponds to an unchanged high contrast. A particularly advantageously low value of $\gamma_1/K_1$ is achieved by the use of both a compound of formula 1-1 and of formula 1-2 (Mixtures N-2 and N-3).

TABLE 1

| Mixture | $\gamma_1/K_1$ | $K_{avg}$ |
|---|---|---|
| C-1 | 7.2 | 15.6 |
| N-1 | 7.0 | 15.7 |
| N-2 | 6.7 | 15.5 |
| N-3 | 6.5 | 15.7 |

Mixture N-4

| | | | |
|---|---|---|---|
| B(S)-2O-O5 | 3.0% | T(N, I) [° C.]: | 90.4 |
| CC-3-V | 32.5% | Δn [589 nm, 20° C.]: | 0.0934 |
| CC-3-V1 | 6.5% | $n_e$ [589 nm, 20° C.]: | 1.5735 |
| CCH-35 | 5.0% | $n_o$ [589 nm, 20° C.]: | 1.4801 |
| CCY-3-O2 | 8.0% | Δε [1 kHz, 20° C.]: | −3.9 |
| CLY-3-O2 | 9.0% | $\varepsilon_{\parallel}$ [1 kHz, 20° C.]: | 3.4 |
| CLY-3-O3 | 5.0% | $\varepsilon_{\perp}$ [1 kHz, 20° C.]: | 7.3 |
| COB(S)-2-O4 | 8.0% | $\gamma_1$ [mPa s, 20° C.]: | 121 |
| PY-3-O2 | 3.0% | $K_1$ [pN, 20° C.]: | 18.1 |
| CEY-3-O2 | 10.0% | $K_3$ [pN, 20° C.]: | 19.3 |
| CCEY-3-O2 | 10.0% | | |
| Σ | 100.0% | | |

Mixture N-5

| | | | |
|---|---|---|---|
| CCY-3-1 | 9.0% | T(N, I) [° C.]: | 105 |
| CCEY-3-O2 | 9.0% | Δn [589 nm, 20° C.]: | 0.1018 |
| CCY-3-O3 | 5.0% | $n_e$ [589 nm, 20° C.]: | 1.5840 |
| CLY-2-O4 | 3.0% | $n_o$ [589 nm, 20° C.]: | 1.4822 |
| CLY-3-O2 | 8.0% | Δε [1 kHz, 20° C.]: | −4.4 |
| CLY-3-O3 | 5.0% | $\varepsilon_{\parallel}$ [1 kHz, 20° C.]: | 3.5 |
| CLY-4-O2 | 5.0% | $\varepsilon_{\perp}$ [1 kHz, 20° C.]: | 7.9 |
| CLY-5-O2 | 5.0% | $\gamma_1$ [mPa s, 20° C.]: | 156 |
| CPY-3-O2 | 5.0% | $K_1$ [pN, 20° C.]: | 20.2 |
| B(S)-2O-O4 | 4.0% | $K_3$ [pN, 20° C.]: | 20.7 |
| B(S)-2O-O5 | 4.0% | LTS bulk [h, −20° C.]: | 1000 |
| CC-3-V | 29.0% | | |
| CC-3-V1 | 6.0% | | |
| Y-4O-O4 | 3.0% | | |
| Σ | 100.0% | | |

Mixture N-6

| | | | |
|---|---|---|---|
| CCY-3-O2 | 9.0% | T(N, I) [° C.]: | 102.5 |
| CCY-5-O2 | 1.5% | Δn [589 nm, 20° C.]: | 0.1016 |
| CCEY-3-O2 | 10.0% | $n_e$ [589 nm, 20° C.]: | 1.5851 |
| CLY-2-O4 | 1.0% | $n_o$ [589 nm, 20° C.]: | 1.4835 |
| CLY-3-O2 | 8.0% | Δε [1 kHz, 20° C.]: | −4.5 |
| CLY-3-O3 | 5.0% | $\varepsilon_{\parallel}$ [1 kHz, 20° C.]: | 3.4 |
| CLY-4-O2 | 2.0% | $\varepsilon_{\perp}$ [1 kHz, 20° C.]: | 7.9 |
| B(S)-2O-O4 | 4.0% | $\gamma_1$ [mPa s, 20° C.]: | 139 |
| B(S)-2O-O5 | 5.0% | $K_1$ [pN, 20° C.]: | 20.1 |
| B(S)-2O-O6 | 3.0% | $K_3$ [pN, 20° C.]: | 20.1 |
| COB(S)-2-O4 | 7.0% | LTS bulk [h, −20° C.]: | 648 |
| CC-3-V | 38.5% | | |
| CC-3-V1 | 6.0% | | |
| Σ | 100.0% | | |

Mixture N-7

| | | | |
|---|---|---|---|
| CCEY-3-O2 | 5.0% | T(N, I) [° C.]: | 75.5 |
| CLY-3-O3 | 4.5% | Δn [589 nm, 20° C.]: | 0.0962 |
| CLY-4-O2 | 5.0% | $n_e$ [589 nm, 20° C.]: | 1.5783 |
| CPY-3-O2 | 6.0% | $n_o$ [589 nm, 20° C.]: | 1.4821 |
| PGIY-2-O4 | 6.0% | Δε [1 kHz, 20° C.]: | −2.7 |
| PYP-2-3 | 0.5% | $\varepsilon_{\parallel}$ [1 kHz, 20° C.]: | 3.4 |
| B(S)-2O-O4 | 4.0% | $\varepsilon_{\perp}$ [1 kHz, 20° C.]: | 6.1 |
| B(S)-2O-O5 | 5.0% | $\gamma_1$ [mPa s, 20° C.]: | 68 |
| B(S)-2O-O6 | 3.0% | $K_1$ [pN, 20° C.]: | 14.6 |
| B-2O-O5 | 1.0% | $K_3$ [pN, 20° C.]: | 14.6 |
| CC-3-V | 50.0% | LTS bulk [h, −20° C.]: | 168 |
| CC-3-V1 | 6.0% | | |
| CCH-23 | 2.5% | | |
| Y-4O-O4 | 1.5% | | |
| Σ | 100.0% | | |

Mixture N-8

| | | | |
|---|---|---|---|
| CLY-2-O4 | 5.0% | T(N, I) [° C.]: | 93 |
| CLY-3-O2 | 7.0% | Δn [589 nm, 20° C.]: | 0.1015 |
| CLY-3-O3 | 5.0% | $n_e$ [589 nm, 20° C.]: | 1.5837 |
| CLY-4-O2 | 5.0% | $n_o$ [589 nm, 20° C.]: | 1.4822 |
| CLY-5-O2 | 8.0% | Δε [1 kHz, 20° C.]: | −4.0 |
| CCEY-3-O2 | 7.5% | $\varepsilon_{\parallel}$ [1 kHz, 20° C.]: | 3.5 |
| PGIY-2-O4 | 3.0% | $\varepsilon_{\perp}$ [1 kHz, 20° C.]: | 7.5 |
| B(S)-2O-O4 | 4.0% | $\gamma_1$ [mPa s, 20° C.]: | 112 |
| B(S)-2O-O5 | 5.0% | $K_1$ [pN, 20° C.]: | 18.3 |
| B(S)-2O-O6 | 3.0% | $K_3$ [pN, 20° C.]: | 17.9 |
| CC-3-V | 38.0% | LTS bulk [h, −20° C.]: | 552 |
| CC-3-V1 | 7.0% | | |
| Y-4O-O4 | 2.5% | | |
| Σ | 100.0% | | |

Mixture N-9

| | | | |
|---|---|---|---|
| CLY-2-O4 | 2.5% | T(N, I) [° C.]: | 100.5 |
| CLY-3-O2 | 8.0% | Δn [589 nm, 20° C.]: | 0.1007 |
| CLY-3-O3 | 5.0% | $n_e$ [589 nm, 20° C.]: | 1.5830 |
| CLY-4-O2 | 5.0% | $n_o$ [589 nm, 20° C.]: | 1.4823 |
| CLY-5-O2 | 6.0% | Δε [1 kHz, 20° C.]: | −4.6 |
| CPY-3-O2 | 2.0% | $\varepsilon_{\parallel}$ [1 kHz, 20° C.]: | 3.5 |
| B(S)-2O-O4 | 4.0% | $\varepsilon_{\perp}$ [1 kHz, 20° C.]: | 8.1 |
| B(S)-2O-O5 | 5.0% | $\gamma_1$ [mPa s, 20° C.]: | 140 |
| B(S)-2O-O6 | 3.0% | $K_1$ [pN, 20° C.]: | 20.0 |
| CC-3-V | 34.0% | $K_3$ [pN, 20° C.]: | 20.6 |
| CC-3-V1 | 6.0% | LTS bulk [h, −20° C.]: | 168 |
| Y-4O-O4 | 2.5% | | |
| CCEY-3-O2 | 17.0% | | |
| Σ | 100.0% | | |

Mixture N-10

| Component | % | Property | Value |
|---|---|---|---|
| CLY-2-O4 | 2.0% | T(N, I) [° C.]: | 98 |
| CLY-3-O2 | 8.0% | Δn [589 nm, 20° C.]: | 0.1013 |
| CLY-3-O3 | 5.0% | $n_e$ [589 nm, 20° C.]: | 1.5836 |
| CLY-4-O2 | 6.0% | $n_o$ [589 nm, 20° C.]: | 1.4823 |
| CLY-5-O2 | 9.0% | Δε [1 kHz, 20° C.]: | −4.6 |
| CPY-3-O2 | 2.0% | $ε_∥$ [1 kHz, 20° C.]: | 3.6 |
| CCEY-3-O2 | 12.0% | $ε_⊥$ [1 kHz, 20° C.]: | 8.1 |
| B(S)-2O-O4 | 4.0% | $γ_1$ [mPa s, 20° C.]: | 132 |
| B(S)-2O-O5 | 5.0% | $K_1$ [pN, 20° C.]: | 19.7 |
| B(S)-2O-O6 | 3.0% | $K_3$ [pN, 20° C.]: | 19.7 |
| CC-3-V | 33.5% | LTS bulk [h, −20° C.]: | 144 |
| CC-3-V1 | 7.0% | | |
| Y-4O-O4 | 3.5% | | |
| Σ | 100.0% | | |

Mixture N-11

| Component | % | Property | Value |
|---|---|---|---|
| CLY-2-O4 | 2.0% | T(N, I) [° C.]: | 101 |
| CLY-3-O2 | 8.0% | Δn [589 nm, 20° C.]: | 0.1017 |
| CLY-3-O3 | 5.0% | $n_e$ [589 nm, 20° C.]: | 1.5841 |
| CLY-4-O2 | 6.0% | $n_o$ [589 nm, 20° C.]: | 1.4824 |
| CLY-5-O2 | 9.0% | Δε [1 kHz, 20° C.]: | −4.5 |
| CPY-3-O2 | 1.5% | $ε_∥$ [1 kHz, 20° C.]: | 3.5 |
| CCEY-3-O2 | 13.5% | $ε_⊥$ [1 kHz, 20° C.]: | 8.0 |
| B(S)-2O-O4 | 4.0% | $γ_1$ [mPa s, 20° C.]: | 139 |
| B(S)-2O-O5 | 5.0% | $K_1$ [pN, 20° C.]: | 20.2 |
| B(S)-2O-O6 | 3.0% | $K_3$ [pN, 20° C.]: | 20.5 |
| CC-3-V | 33.5% | | |
| CC-3-V1 | 7.0% | | |
| Y-4O-O4 | 2.5% | | |
| Σ | 100.0% | | |

Mixture N-12

| Component | % | Property | Value |
|---|---|---|---|
| CLY-2-O4 | 2.0% | T(N, I) [° C.]: | 100 |
| CLY-3-O2 | 8.0% | Δn [589 nm, 20° C.]: | 0.1025 |
| CLY-3-O3 | 5.0% | $n_e$ [589 nm, 20° C.]: | 1.5855 |
| CCEY-3-O2 | 20.0% | $n_o$ [589 nm, 20° C.]: | 1.4830 |
| B(S)-2O-O4 | 4.0% | Δε [1 kHz, 20° C.]: | −4.5 |
| B(S)-2O-O5 | 5.0% | $ε_∥$ [1 kHz, 20° C.]: | 3.5 |
| B(S)-2O-O6 | 3.0% | $ε_⊥$ [1 kHz, 20° C.]: | 8.0 |
| COB(S)-2-O4 | 8.0% | $γ_1$ [mPa s, 20° C.]: | 138 |
| CC-3-V | 37.5% | $K_1$ [pN, 20° C.]: | 20.3 |
| CC-3-V1 | 7.0% | $K_3$ [pN, 20° C.]: | 20.3 |
| Y-4O-O4 | 0.5% | LTS bulk [h, −20° C.]: | 0 |
| Σ | 100.0% | | |

Mixture N-13

| Component | % | Property | Value |
|---|---|---|---|
| CCY-3-O2 | 10.0% | T(N, I) [° C.]: | 102.5 |
| CCY-4-O2 | 1.5% | Δn [589 nm, 20° C.]: | 0.1013 |
| CLY-3-O2 | 8.0% | $n_e$ [589 nm, 20° C.]: | 1.5838 |
| CLY-3-O3 | 5.0% | $n_o$ [589 nm, 20° C.]: | 1.4825 |
| CCEY-3-O2 | 15.0% | Δε [1 kHz, 20° C.]: | −4.8 |
| B(S)-2O-O4 | 4.0% | $ε_∥$ [1 kHz, 20° C.]: | 3.5 |
| B(S)-2O-O5 | 5.0% | $ε_⊥$ [1 kHz, 20° C.]: | 8.3 |
| B(S)-2O-O6 | 3.0% | $γ_1$ [mPa s, 20° C.]: | 146 |
| COB(S)-2-O4 | 5.5% | $K_1$ [pN, 20° C.]: | 20.3 |
| CC-3-V | 34.5% | $K_3$ [pN, 20° C.]: | 21.0 |
| CC-3-V1 | 7.0% | LTS bulk [h, −20° C.]: | 480 |
| Y-4O-O4 | 1.5% | | |
| Σ | 100.0% | | |

Mixture N-14

| Component | % | Property | Value |
|---|---|---|---|
| CCY-3-O2 | 10.0% | T(N, I) [° C.]: | 99.5 |
| CLY-3-O2 | 8.0% | Δn [589 nm, 20° C.]: | 0.1015 |
| CLY-3-O3 | 5.0% | $n_e$ [589 nm, 20° C.]: | 1.5840 |
| CCEY-3-O2 | 11.5% | $n_o$ [589 nm, 20° C.]: | 1.4825 |
| B(S)-2O-O4 | 4.0% | Δε [1 kHz, 20° C.]: | −4.5 |
| B(S)-2O-O5 | 5.0% | $ε_∥$ [1 kHz, 20° C.]: | 3.5 |
| B(S)-2O-O6 | 3.0% | $ε_⊥$ [1 kHz, 20° C.]: | 8.0 |
| COB(S)-2-O4 | 7.5% | $γ_1$ [mPa s, 20° C.]: | 132 |
| CC-3-V | 37.5% | $K_1$ [pN, 20° C.]: | 19.7 |
| CC-3-V1 | 7.5% | $K_3$ [pN, 20° C.]: | 20.0 |
| Y-4O-O4 | 1.0% | LTS bulk [h, −20° C.]: | 168 |
| Σ | 100.0% | | |

Mixture N-15

| Component | % | Property | Value |
|---|---|---|---|
| CCY-3-O2 | 0.5% | T(N, I) [° C.]: | 88.5 |
| CCEY-3-O2 | 7.0% | Δn [589 nm, 20° C.]: | 0.1020 |
| CLY-2-O4 | 2.0% | $n_e$ [589 nm, 20° C.]: | 1.5853 |
| CLY-3-O2 | 8.0% | $n_o$ [589 nm, 20° C.]: | 1.4833 |
| CLY-3-O3 | 5.0% | Δε [1 kHz, 20° C.]: | −3.8 |
| CLY-4-O2 | 5.0% | $ε_∥$ [1 kHz, 20° C.]: | 3.5 |
| CLY-5-O2 | 3.0% | $ε_⊥$ [1 kHz, 20° C.]: | 7.3 |
| CPY-3-O2 | 0.5% | $γ_1$ [mPa s, 20° C.]: | 101 |
| PGIY-2-O4 | 6.0% | $K_1$ [pN, 20° C.]: | 16.7 |
| B(S)-2O-O4 | 4.0% | $K_3$ [pN, 20° C.]: | 17.0 |
| B(S)-2O-O5 | 5.0% | LTS bulk [h, −20° C.]: | 504 |
| B(S)-2O-O6 | 3.0% | | |
| CC-3-V | 45.0% | | |
| CC-3-V1 | 2.0% | | |
| CY-3-O2 | 4.0% | | |
| Σ | 100.0% | | |

Mixture N-16

| Component | % | Property | Value |
|---|---|---|---|
| CCEY-3-O2 | 8.0% | T(N, I) [° C.]: | 94 |
| CLY-2-O4 | 2.0% | Δn [589 nm, 20° C.]: | 0.1015 |
| CLY-3-O2 | 8.0% | $n_e$ [589 nm, 20° C.]: | 1.5840 |
| CLY-3-O3 | 5.0% | $n_o$ [589 nm, 20° C.]: | 1.4825 |
| CLY-4-O2 | 9.0% | Δε [1 kHz, 20° C.]: | −4.0 |
| CPY-3-O2 | 8.0% | $ε_∥$ [1 kHz, 20° C.]: | 3.5 |
| B(S)-2O-O4 | 4.0% | $ε_⊥$ [1 kHz, 20° C.]: | 7.6 |
| B(S)-2O-O5 | 5.0% | $γ_1$ [mPa s, 20° C.]: | 114 |
| B(S)-2O-O6 | 3.0% | $K_1$ [pN, 20° C.]: | 18.3 |
| Y-4O-O4 | 3.0% | $K_3$ [pN, 20° C.]: | 19.1 |
| CC-3-V | 38.0% | LTS bulk [h, −20° C.]: | 48 |
| CC-3-V1 | 7.0% | | |
| Σ | 100.0% | | |

Mixture N-17

| Component | % | Property | Value |
|---|---|---|---|
| CCEY-3-O2 | 6.0% | T(N, I) [° C.]: | 99 |
| CLY-2-O4 | 5.0% | Δn [589 nm, 20° C.]: | 0.1019 |
| CLY-3-O2 | 7.0% | $n_e$ [589 nm, 20° C.]: | 1.5858 |
| CLY-3-O3 | 5.0% | $n_o$ [589 nm, 20° C.]: | 1.4839 |
| CLY-4-O2 | 5.0% | Δε [1 kHz, 20° C.]: | −3.9 |
| CLY-5-O2 | 8.0% | $ε_∥$ [1 kHz, 20° C.]: | 3.4 |
| CPY-3-O2 | 7.0% | $ε_⊥$ [1 kHz, 20° C.]: | 7.3 |
| B(S)-2O-O4 | 4.0% | $γ_1$ [mPa s, 20° C.]: | 118 |
| B(S)-2O-O5 | 5.0% | $K_1$ [pN, 20° C.]: | 18.9 |
| B(S)-2O-O6 | 3.0% | $K_3$ [pN, 20° C.]: | 18.7 |
| CC-3-V | 45.0% | LTS bulk [h, −20° C.]: | 192 |
| Σ | 100.0% | | |

Mixture N-18

| | | | | |
|---|---|---|---|---|
| CCEY-3-O2 | 5.5% | T(N, I) [° C.]: | | 93.5 |
| CLY-2-O4 | 5.0% | $\Delta n$ [589 nm, 20° C.]: | | 0.1010 |
| CLY-3-O2 | 7.0% | $n_e$ [589 nm, 20° C.]: | | 1.5836 |
| CLY-3-O3 | 5.0% | $n_o$ [589 nm, 20° C.]: | | 1.4826 |
| CLY-4-O2 | 5.0% | $\Delta\varepsilon$ [1 kHz, 20° C.]: | | −4.1 |
| CLY-5-O2 | 8.0% | $\varepsilon_\parallel$ [1 kHz, 20° C.]: | | 3.5 |
| CPY-3-O2 | 5.0% | $\varepsilon_\perp$ [1 kHz, 20° C.]: | | 7.7 |
| B(S)-2O-O4 | 4.0% | $\gamma_1$ [mPa s, 20° C.]: | | 113 |
| B(S)-2O-O5 | 5.0% | $K_1$ [pN, 20° C.]: | | 18.4 |
| B(S)-2O-O6 | 3.0% | $K_3$ [pN, 20° C.]: | | 18.2 |
| Y-4O-O4 | 3.0% | LTS bulk [h, −20° C.]: | | 240 |
| CC-3-V | 37.5% | | | |
| CC-3-V1 | 7.0% | | | |
| Σ | 100.0% | | | |

Mixture N-19

| | | | | |
|---|---|---|---|---|
| B(S)-2O-O5 | 4.0% | T(N, I) [° C.]: | | 89 |
| CC-3-V | 28.5% | $\Delta n$ [589 nm, 20° C.]: | | 0.0927 |
| CC-3-V1 | 5.5% | $n_e$ [589 nm, 20° C.]: | | 1.5731 |
| CCH-35 | 7.0% | $n_o$ [589 nm, 20° C.]: | | 1.4804 |
| CCY-3-1 | 6.0% | $\Delta\varepsilon$ [1 kHz, 20° C.]: | | −3.6 |
| CCY-3-O1 | 5.0% | $\varepsilon_\parallel$ [1 kHz, 20° C.]: | | 3.4 |
| CCY-3-O2 | 7.0% | $\varepsilon_\perp$ [1 kHz, 20° C.]: | | 7.1 |
| CLY-3-O2 | 7.5% | $\gamma_1$ [mPa s, 20° C.]: | | 120 |
| CLY-4-O2 | 5.0% | $K_1$ [pN, 20° C.]: | | 17.4 |
| CY-3-O2 | 7.0% | $K_3$ [pN, 20° C.]: | | 19.6 |
| PY-1-O2 | 7.5% | | | |
| CCEY-3-O2 | 10.0% | | | |
| Σ | 100.0% | | | |

Mixture N-20

| | | | | |
|---|---|---|---|---|
| B(S)-2O-O4 | 2.0% | T(N, I) [° C.]: | | 87 |
| B(S)-2O-O5 | 4.0% | $\Delta n$ [589 nm, 20° C.]: | | 0.0940 |
| CC-3-V | 36.0% | $n_e$ [589 nm, 20° C.]: | | 1.5789 |
| CC-3-V1 | 3.0% | $n_o$ [589 nm, 20° C.]: | | 1.4849 |
| CCP-V-1 | 16.0% | $\Delta\varepsilon$ [1 kHz, 20° C.]: | | −3.3 |
| COB(S)-2-O4 | 10.0% | $\varepsilon_\parallel$ [1 kHz, 20° C.]: | | 3.4 |
| CY-3-O2 | 13.0% | $\varepsilon_\perp$ [1 kHz, 20° C.]: | | 6.7 |
| CCEY-3-O2 | 10.0% | $\gamma_1$ [mPa s, 20° C.]: | | 102 |
| CCEY-3-O4 | 6.0% | $K_1$ [pN, 20° C.]: | | 15.3 |
| Σ | 100.0% | $K_3$ [pN, 20° C.]: | | 17.5 |
| | | LTS bulk [h, −20° C.]: | | 624 |

Mixture N-21

| | | | | |
|---|---|---|---|---|
| B(S)-2O-O4 | 3.5% | T(N, I) [° C.]: | | 99.3 |
| B(S)-2O-O5 | 2.0% | $\Delta n$ [589 nm, 20° C.]: | | 0.0916 |
| B(S)-2O-O6 | 4.0% | $n_e$ [589 nm, 20° C.]: | | 1.5711 |
| CC-3-V | 28.0% | $n_o$ [589 nm, 20° C.]: | | 1.4795 |
| CC-3-V1 | 7.5% | $\Delta\varepsilon$ [1 kHz, 20° C.]: | | −4.0 |
| CCEY-3-O2 | 10.0% | $\varepsilon_\parallel$ [1 kHz, 20° C.]: | | 3.4 |
| CCH-35 | 7.0% | $\varepsilon_\perp$ [1 kHz, 20° C.]: | | 7.4 |
| CCY-3-O1 | 7.5% | $\gamma_1$ [mPa s, 20° C.]: | | 143 |
| CCY-3-O2 | 8.0% | $K_1$ [pN, 20° C.]: | | 18.1 |
| CCY-3-O3 | 3.0% | $K_3$ [pN, 20° C.]: | | 20.6 |
| CCY-4-O2 | 3.0% | | | |
| CLY-3-O2 | 4.5% | | | |
| CLY-3-O3 | 1.5% | | | |
| CLY-4-O2 | 1.5% | | | |
| CLY-5-O2 | 2.5% | | | |
| CY-3-O2 | 6.5% | | | |
| Σ | 100.0% | | | |

Mixture N-22

| | | | | |
|---|---|---|---|---|
| B(S)-2O-O4 | 3.5% | T(N, I) [° C.]: | | 98 |
| B(S)-2O-O5 | 5.0% | $\Delta n$ [589 nm, 20° C.]: | | 0.0942 |
| B(S)-2O-O6 | 4.0% | $n_e$ [589 nm, 20° C.]: | | 1.5744 |
| CC-3-V | 29.5% | $n_o$ [589 nm, 20° C.]: | | 1.4802 |
| CC-3-V1 | 8.0% | $\Delta\varepsilon$ [1 kHz, 20° C.]: | | −4.0 |
| CCEY-3-O2 | 10.0% | $\varepsilon_\parallel$ [1 kHz, 20° C.]: | | 3.4 |
| CCH-35 | 8.0% | $\varepsilon_\perp$ [1 kHz, 20° C.]: | | 7.4 |
| CCY-3-O1 | 7.5% | $\gamma_1$ [mPa s, 20° C.]: | | 143 |
| CCY-3-O2 | 11.0% | $K_1$ [pN, 20° C.]: | | 18.1 |
| CLY-3-O2 | 9.0% | $K_3$ [pN, 20° C.]: | | 20.6 |
| CY-3-O2 | 4.5% | | | |
| Σ | 100.0% | | | |

Mixture N-23

| | | | | |
|---|---|---|---|---|
| B(S)-2O-O4 | 4.0% | T(N, I) [° C.]: | | 98.4 |
| B(S)-2O-O5 | 2.0% | $\Delta n$ [589 nm, 20° C.]: | | 0.0935 |
| B(S)-2O-O6 | 4.0% | $n_e$ [589 nm, 20° C.]: | | 1.5731 |
| CC-3-V | 28.0% | $n_o$ [589 nm, 20° C.]: | | 1.4796 |
| CC-3-V1 | 8.0% | $\Delta\varepsilon$ [1 kHz, 20° C.]: | | −4.0 |
| CCEY-3-O2 | 10.0% | $\varepsilon_\parallel$ [1 kHz, 20° C.]: | | 3.4 |
| CCH-35 | 8.0% | $\varepsilon_\perp$ [1 kHz, 20° C.]: | | 7.4 |
| CCY-3-O1 | 4.0% | $\gamma_1$ [mPa s, 20° C.]: | | 138 |
| CCY-3-O2 | 11.0% | $K_1$ [pN, 20° C.]: | | 18.6 |
| CLY-3-O2 | 9.0% | $K_3$ [pN, 20° C.]: | | 21.4 |
| CLY-5-O2 | 5.0% | | | |
| CY-3-O2 | 7.0% | | | |
| Σ | 100.0% | | | |

Mixture N-24

| | | | | |
|---|---|---|---|---|
| B(S)-2O-O4 | 3.0% | T(N, I) [° C.]: | | 89.5 |
| B(S)-2O-O5 | 4.0% | $\Delta n$ [589 nm, 20° C.]: | | 0.0938 |
| B(S)-2O-O6 | 3.0% | $n_e$ [589 nm, 20° C.]: | | 1.5746 |
| CC-3-V | 33.5% | $n_o$ [589 nm, 20° C.]: | | 1.4808 |
| CC-3-V1 | 6.5% | $\Delta\varepsilon$ [1 kHz, 20° C.]: | | −3.9 |
| CCH-35 | 5.0% | $\varepsilon_\parallel$ [1 kHz, 20° C.]: | | 3.4 |
| CCP-31 | 3.0% | $\varepsilon_\perp$ [1 kHz, 20° C.]: | | 7.3 |
| CCY-3-O2 | 9.0% | $\gamma_1$ [mPa s, 20° C.]: | | 115 |
| CLY-3-O2 | 5.0% | $K_1$ [pN, 20° C.]: | | 18.1 |
| CLY-3-O3 | 3.0% | $K_3$ [pN, 20° C.]: | | 19.2 |
| COB(S)-2-O4 | 5.0% | LTS bulk [h, −20° C.]: | | 360 |
| CEY-3-O2 | 10.0% | | | |
| CCEY-3-O2 | 10.0% | | | |
| Σ | 100.0% | | | |

Mixture N-25

| | | | | |
|---|---|---|---|---|
| B(S)-(c5)1O-O2 | 3.0% | T(N, I) [° C.]: | | 93 |
| CC-3-V | 31.5% | | | |
| CC-3-V1 | 6.5% | | | |
| CCH-35 | 5.0% | | | |
| CCY-3-O2 | 8.0% | | | |
| CLY-3-O2 | 9.0% | | | |
| CLY-3-O3 | 6.0% | | | |
| CLY-4-O2 | 5.0% | | | |
| COB(S)-2-O4 | 5.0% | | | |
| CY-3-O2 | 8.0% | | | |
| PY-3-O2 | 3.0% | | | |
| CCEY-3-O2 | 10.0% | | | |
| Σ | 100.0% | | | |

Mixture N-26

| | | | |
|---|---|---|---|
| B(S)-2O-O5 | 3.0% | T(N, I) [° C.]: | 92 |
| CC-3-V | 31.5% | Δn [589 nm, 20° C.]: | 0.0933 |
| CC-3-V1 | 6.5% | $n_e$ [589 nm, 20° C.]: | 1.5739 |
| CCH-35 | 5.0% | $n_o$ [589 nm, 20° C.]: | 1.4806 |
| CCY-3-O2 | 8.0% | Δε [1 kHz, 20° C.]: | −3.9 |
| CLY-3-O2 | 9.0% | $ε_∥$ [1 kHz, 20° C.]: | 3.4 |
| CLY-3-O3 | 6.0% | $ε_⊥$ [1 kHz, 20° C.]: | 7.2 |
| CLY-4-O2 | 5.0% | $γ_1$ [mPa s, 20° C.]: | 128 |
| COB(S)-2-O4 | 5.0% | $K_1$ [pN, 20° C.]: | 18.3 |
| CY-3-O2 | 8.0% | $K_3$ [pN, 20° C.]: | 19.7 |
| PY-3-O2 | 3.0% | | |
| CCEY-(c3)1-O2 | 10.0% | | |
| Σ | 100.0% | | |

The following mixtures N-27 to N-63 additionally contain the stabilisers indicated above. The amount of host mixture and the amount of stabiliser given in the table add up to give 100% by weight.

TABLE 2

Mixtures comprising stabilisers.

| Mixture | Host-Mixture | Stabiliser (percentage in the mixture) |
|---|---|---|
| N-27 | N-1 | 0.03% of ST-3a-1 |
| N-28 | N-2 | 0.02% of ST-12 |
| N-29 | N-3 | 0.01% of ST-3b-1 |
| N-30 | N-4 | 0.03% of ST-2a-1 and 0.02% of ST-3a-1 |
| N-31 | N-5 | 0.03% of ST-2a-1 |
| N-32 | N-6 | 0.015% of ST-9-1 |
| N-33 | N-7 | 0.015% of ST-8-1 |
| N-34 | N-8 | 0.03% of ST-12 |
| N-35 | N-9 | 0.03% of ST-8-1 |
| N-36 | N-10 | 0.25% of ST-3a-1 |
| N-37 | N-11 | 0.02% of ST-8-1 and 0.01% of ST-3a-1 |
| N-38 | N-12 | 0.02% of ST-8-1 and 0.1% of ST-3a-1 |
| N-39 | N-13 | 0.01% of ST-3a-1 |
| N-40 | N-14 | 0.025% of ST-8-1 |
| N-41 | N-15 | 0.025% of ST-12 |
| N-42 | N-16 | 0.02% of ST-9-1 and 0.02% of ST-3b-1 |
| N-43 | N-17 | 0.04% of ST-3b-1 and 0.01% of ST-9-1 |
| N-44 | N-18 | 0.02% of ST-3a-1 and 0.05% of ST-3b-1 |
| N-45 | N-19 | 0.02% of ST-3a-1 and 0.01% of ST-8-1 |
| N-46 | N-20 | 0.02% of ST-3a-1 and 0.3% of the compound of the formula |

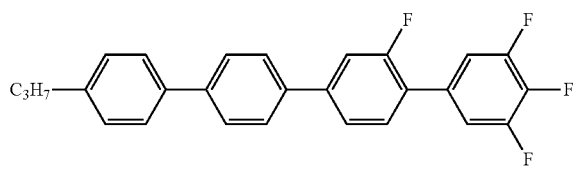

| | | |
|---|---|---|
| N-47 | N-21 | 0.01% of ST-17 |
| N-48 | N-22 | 0.05% of ST-3b-1 and 0.15% of ST-12 |
| N-49 | N-23 | 0.02% of ST-8-1 |
| N-50 | N-24 | 0.02% of ST-12 |
| N-51 | N-25 | 0.01% of ST-3b-1 |
| N-52 | N-26 | 0.03% of ST-2a-1 and 0.02% of ST-3a-1 |
| N-53 | N-1 | 0.03% of ST-2a-1 |
| N-54 | N-2 | 0.015% of ST-9-1 |
| N-55 | N-3 | 0.015% of ST-8-1 |
| N-56 | N-4 | 0.03% of ST-12 |
| N-57 | N-5 | 0.03% of ST-8-1 |
| N-58 | N-6 | 0.25% of ST-3a-1 |
| N-59 | N-7 | 0.02% of ST-8-1 and 0.01% of ST-3a-1 |
| N-60 | N-8 | 0.02% of ST-8-1 and 0.1% of ST-3a-1 |
| N-61 | N-9 | 0.01% of ST-3a-1 |
| N-62 | N-10 | 0.025% of ST-8-1 |
| N-63 | N-11 | 0.01% of ST-17 |

The chiral nematic mixture N-64 consists of 99.20% of Mixture N-27 and 0.80% of chiral dopant S-2011:

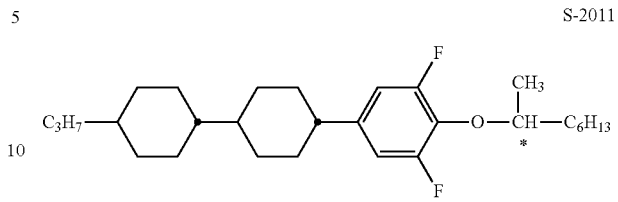

S-2011

Mixture N-64 is distinguished by very high stability under UV load and shows improved switching times.

The invention claimed is:
1. A liquid crystal medium comprising:
   one or more compounds of formula I-1 and one or more compounds of formula I-2

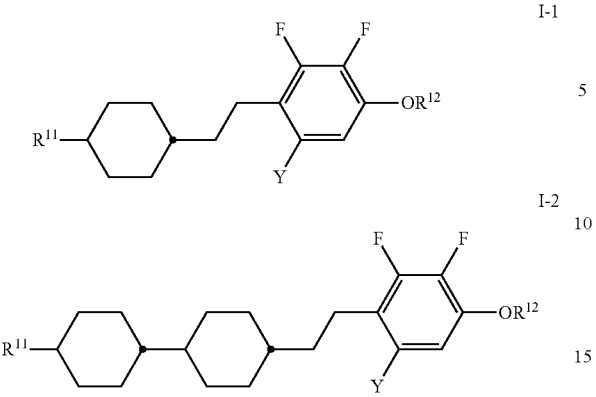

in which
R$^{11}$, R$^{12}$ identically or differently, denote H, or a straight chain alkyl having 1 to 15 C atoms or branched alkyl radical having 3 to 15 C atoms, where one or more CH$_2$ groups in these radicals may each be replaced, independently of one another, by

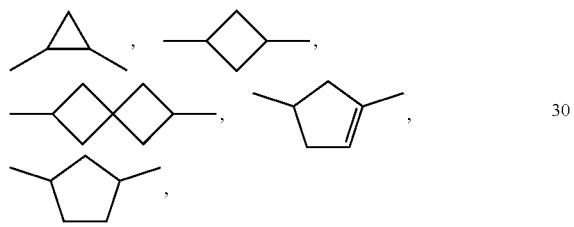

—C≡C—, —CF$_2$O—, —OCF$_2$—, —CH=CH—, —O—, —CO—O— or —O—CO— in such a way that O atoms are not linked directly to one another, and in which one or more H atoms may each be replaced by halogen, and
Y denotes H or CH$_3$;
one or more compounds of formula CLY-n-Om

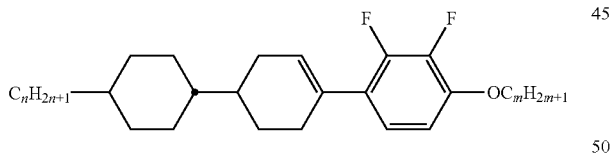

in which
n and m are each an integer from 1 to 9;
one or more compounds of formula II-2

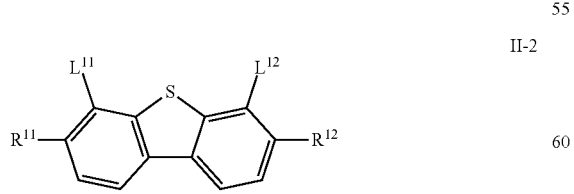

in which
R$^{11}$ and R$^{12}$, identically or differently, denote H, a straight chain alkyl or alkoxy having 1 to 15 C atoms, or branched alkyl or alkoxy having 3 to 15 C atoms, where one or more CH$_2$ groups in these radicals may each be replaced, independently of one another, by

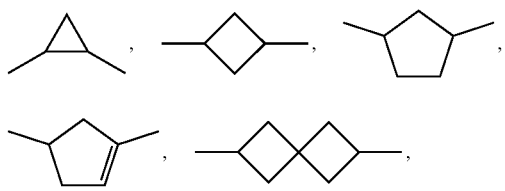

—C≡C—, —CF$_2$O—, —OCF$_2$—, —CH=CH—, —O—, —CO—O— or —O—CO— in such a way that O atoms are not linked directly to one another, and in which one or more H atoms may each be replaced by halogen, and
L$^{11}$ and L$^{12}$ each, independently of one another, denote H, F, Cl, CF$_3$ or CHF$_2$; and
one or more compounds of formula II-3

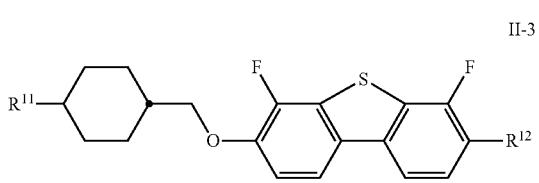

in which
R$^{11}$ and R$^{12}$, identically or differently, denote H, a straight chain alkyl or alkoxy having 1 to 15 C atoms, or branched alkyl or alkoxy having 3 to 15 C atoms, where one or more CH$_2$ groups in these radicals may each be replaced, independently of one another, by

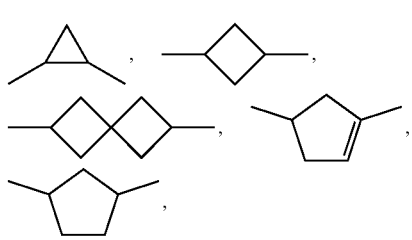

—C≡C—, —CF$_2$O—, —OCF$_2$—, —CH=CH—, —O—, —CO—O— or —O—CO— in such a way that O atoms are not linked directly to one another, and in which one or more H atoms may each be replaced by halogen;
wherein the total concentration of compounds formula I-1 and I-2 in the medium is in the range of from 2% to 25% by weight.

2. The medium according to claim 1, wherein the medium further comprises one or more compounds selected from formulae IIA, IIB, IIC, IID and IIE, denotes

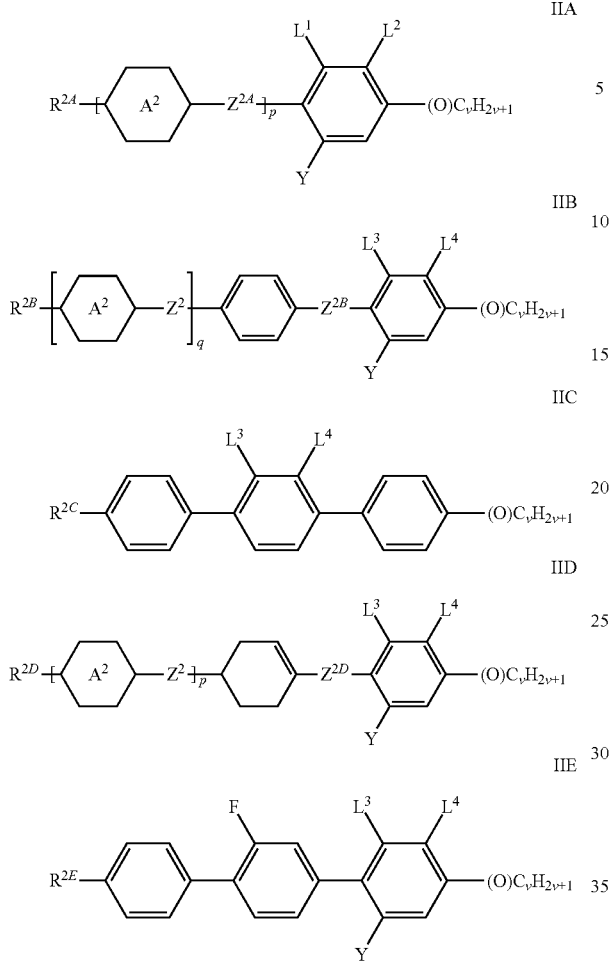

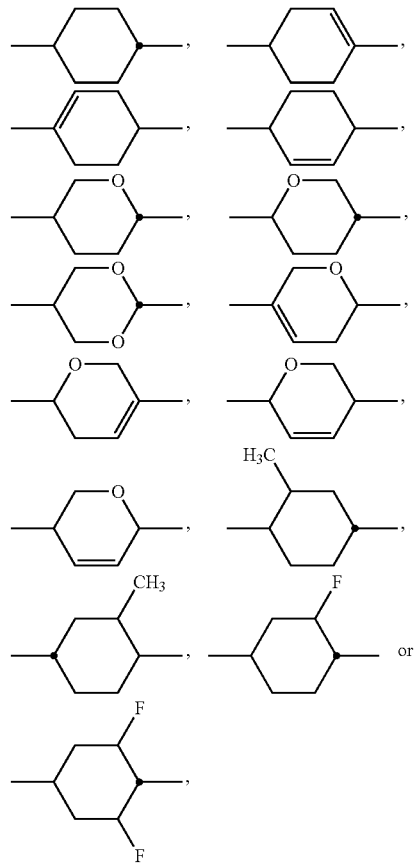

in which
R²ᴬ, R²ᴮ, R²ᶜ, R²ᴰ and R²ᴱ each, independently of one another, denote H, an alkyl having 1 to 15 C atoms or alkenyl having 2 to 15 C atoms which is unsubstituted, monosubstituted by CN or CF₃ or at least monosubstituted by halogen, where, in addition, one or more CH₂ groups in these radicals may each be replaced by —O—, —S—,

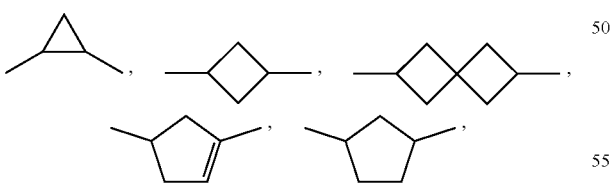

—C≡C—, —CF₂O—, —OCF₂—, —OC—O— or —O—CO— in such a way that O atoms are not linked directly to one another,

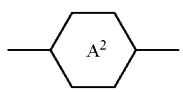

$L^1$ to $L^4$ each, independently of one another, denote F, Cl, CF₃ or CHF₂,

Y denotes H, F, Cl, CF₃, CHF₂ or CH₃, $Z^{2A}$ each, independently of one another, denote a single bond, —CH=CH—, —CF₂O—, —OCF₂—, —CH₂O—, —OCH₂—, —COO—, —OCO—, —C₂F₄—, —CF=CF—, —CH=CHCH₂O—, $Z^2$, $Z^{2B}$ and $Z^{2D}$ each, independently of one another, denote a single bond, —CH₂CH₂—, —CH=CH—, —CF₂O—, —OCF₂—, —CH₂O—, —OCH₂—, —COO—, —OCO—, —C₂F₄—, —CF=CF— or —CH=CHCH₂O—, p denotes 0, 1 or 2, q denotes 0 or 1, and v denotes an integer from 1 to 6, wherein the compounds of formula I-1 and formula I-2 are excluded.

3. The medium according to claim 1, wherein the medium comprises one or more compounds selected from the group of compounds of the following formulae:

IV-3-1

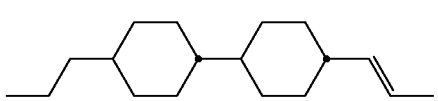

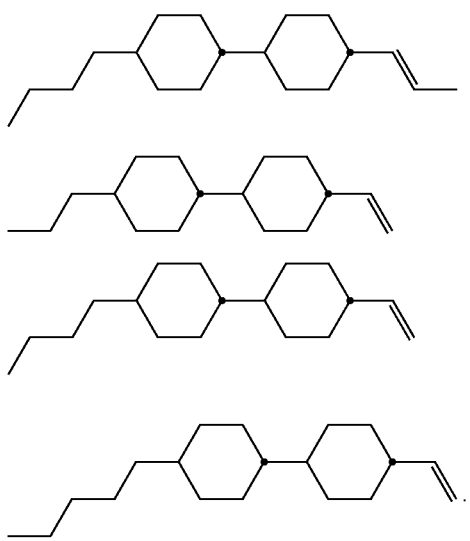

IV-3-2

IV-3-3

IV-3-4

IV-3-5

4. The medium according to claim 1, wherein the medium comprises a chiral dopant.

5. The medium according to claim 1, wherein the medium comprises one or more polymerizable compounds of formula P $$\text{P-Sp-A}^1\text{-(Z}^1\text{-A}_2)_z\text{-R} \quad \quad \quad \text{P}$$

in which

P denotes a polymerizable group,

Sp denotes a spacer group or a single bond, $A^1$, $A^2$ identically or differently, denote an aromatic, heteroaromatic, alicyclic or heterocyclic group, which may also contain fused rings, and which is unsubstituted, or mono- or polysubstituted by L, L denotes F, Cl, —CN, P—Sp-, or straight chain alkyl having 1 to 25 C atoms, branched alkyl having 3 to 25 C atoms or cyclic alkyl having 3 to 25 C atoms, wherein one or more non-adjacent $CH_2$-groups are each optionally replaced by —O—, —S—, —CO—, —CO—O—, —O—CO—, —O—CO—O— in such a manner that O- and/or S-atoms are not directly connected with each other, and wherein one or more H atoms are each optionally replaced by P-Sp-, F or Cl, $Z^1$ denotes —O—, —S—, —CO—, —CO—O—, —O—CO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH═CH—, —CF═CF—, —CH═CF—, —CF═CH—, —C═C—, —CH═CH—CO—O—, —O—CO—CH═CH—, —CH$_2$—CH$_2$—CO—O—, —O—CO—CH$_2$—CH$_2$—, —CR$^0$R$^{00}$—, or a single bond, $R^0$, $R^{00}$ identically or differently, denote H or alkyl having 1 to 12 C atoms, R denotes H, L, or P-Sp-, Z is 0, 1, 2 or 3, n1 is 1, 2, 3 or 4.

6. The liquid crystal medium according to claim 5, wherein the polymerizable compounds of formula P are polymerised.

7. A process of preparing a liquid crystal medium according to claim 1, comprising mixing one or more compounds selected from formula I-1, one or more compounds of formula I-2, one or more compounds of formula CLY-n-Om, one or more compounds of formula II-2, and one or more compounds of formula II-3, with one or more mesogenic or liquid-crystalline compounds, and optionally with one or more additives.

8. A liquid crystal display comprising a medium according to claim 1.

9. The liquid crystal display according to claim 8, wherein the display is a PSA display.

10. The liquid crystal display according to claim 9, wherein the display is a PS-VA, PS-IPS, PS-FFS, PS-UB-FFS, polymer stabilised SA-VA or polymer stabilised SA-FFS display.

11. The liquid crystal display according to claim 8, wherein the display is a VA, IPS, U-IPS, FFS, UB-FFS, SA-FFS or SA-VA display.

12. A method of generating an electro-optical effect comprising using a liquid-crystalline medium according to claim 1 in electro-optical displays.

13. The process according to claim 7, further comprising mixing one or more polymerizable compounds of formula P $$\text{P-Sp-A}^1\text{-(Z}^1\text{-A}^2)_z\text{-R} \quad \quad \quad \text{P}$$

in which

P denotes a polymerizable group,

Sp denotes a spacer group or a single bond, $A^1$, $A^2$ identically or differently, denote an aromatic, heteroaromatic, alicyclic or heterocyclic group, which may also contain fused rings, and which is unsubstituted, or mono- or polysubstituted by L, L denotes F, Cl, —CN, P—Sp- or straight chain alkyl having 1 to 25 C atoms, branched alkyl having 3 to 25 C atoms or cyclic alkyl having 1 to 25 C atoms, wherein one or more non-adjacent $CH_2$-groups are each optionally replaced by —O—, —S—, —CO—, —CO—O—, —O—CO—, —O—CO—O— in such a manner that O- and/or S-atoms are not directly connected with each other, and wherein one or more H atoms are each optionally replaced by P-Sp-, F or Cl, $Z^1$ denotes —O—, —S—, —CO—, —CO—O—, —O—CO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH═CH—, —CF═CF—, —CH═CF—, —CF═CH—, —C═C—, —CH═CH—CO—O—, —O—CO—CH═CH—, —CH$_2$—CH$_2$—CO—O—, —O—CO—CH$_2$—CH$_2$—, —CR$^0$R$^{00}$—, or a single bond, $R^0$, $R^{00}$ identically or differently, denote H or alkyl having 1 to 12 C atoms, R denotes H, L, or P-Sp-, Z is 0, 1, 2 or 3, n1 is 1, 2, 3 or 4.

14. The medium according to claim 1, wherein, in formula II-2, $R^{11}$ and $R^{12}$ are each, independently of one another, alkyl having 1 to 15 C atoms, alkenyl having 2 to 15 C atoms, or alkoxy radical having 1 to 15 C atoms.

15. The medium according to claim 1, wherein said medium has a ratio of rotational viscosity, γ1, to elastic constant splay deformation, $K_1$, of 7.9 or less.

16. The medium according to claim 1, wherein said medium has a ratio of rotational viscosity, γ1, to elastic constant splay deformation, $K_1$, of 7.0 or less.

17. The medium according to claim 15, wherein said medium has an average elastic constant $K_{avg}$ of 1 or more.

18. The medium according to claim 1, wherein said medium has an average elastic constant $K_{avg}$ of 15.3 or more.

19. The medium according to claim 1, wherein said medium has an average elastic constant $K_{avg}$ of 15.4 or more.

* * * * *